(12) United States Patent
Nagai et al.

(10) Patent No.: US 12,223,178 B2
(45) Date of Patent: Feb. 11, 2025

(54) INFORMATION PROCESSING APPARATUS

(71) Applicant: Kioxia Corporation, Tokyo (JP)

(72) Inventors: Koichi Nagai, Ota (JP); Naoki Esaka, Kawasaki (JP); Toyohide Isshi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 160 days.

(21) Appl. No.: 17/939,150

(22) Filed: Sep. 7, 2022

(65) Prior Publication Data

US 2023/0297246 A1 Sep. 21, 2023

(30) Foreign Application Priority Data

Mar. 15, 2022 (JP) .................. 2022-040562

(51) Int. Cl.
*G06F 3/06* (2006.01)
(52) U.S. Cl.
CPC .......... *G06F 3/0619* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 9,977,740 B2 | 5/2018 | Hayakawa et al. | |
| 10,468,077 B2 | 11/2019 | Chagam Reddy | |
| 10,649,898 B2 | 5/2020 | Kim et al. | |
| 11,011,243 B2 | 5/2021 | Lee et al. | |
| 11,016,905 B1 | 5/2021 | Manzanares et al. | |
| 2015/0169220 A1* | 6/2015 | Kondo | G06F 3/067 711/112 |
| 2016/0210066 A1 | 7/2016 | Yamaura et al. | |

(Continued)

FOREIGN PATENT DOCUMENTS

| | | |
|---|---|---|
| JP | 2016-133976 A | 7/2016 |
| JP | 6414853 B2 | 10/2018 |

(Continued)

OTHER PUBLICATIONS

Chen et al., "A Partial Page Cache Strategy for NVRAM Based Storage Devices", IEEE Transactions on Computer-Aided Design of Integrated Circuits and Systems, vol. 39, No. 2, 2020, pp. 373-386, DOI: 10.1109/TCAD.2018.2887045.

*Primary Examiner* — Stephanie Wu
(74) *Attorney, Agent, or Firm* — Oblon, McClelland, Maier & Neustadt, L.L.P.

(57) ABSTRACT

According to one embodiment, an information processing apparatus includes a nonvolatile memory and a CPU. The CPU stores, to the nonvolatile memory, first data, and management data including information equivalent to a write command associated with the first data and designating a first LBA range, and performs a first transmission of the write command to a memory system. When writing of second data to a second LBA range including a third LBA range that is at least a portion of the first LBA range or deallocation of the second LBA range is requested before a second response to the write command is received, the CPU transmits, to the system, a command to cancel writing to at least the third LBA range from writing of the first data to the first LBA range in accordance with the write command.

20 Claims, 55 Drawing Sheets

(56) References Cited

U.S. PATENT DOCUMENTS

| | | |
|---|---|---|
| 2017/0168951 A1 | 6/2017 | Kanno |
| 2019/0042460 A1 | 2/2019 | Trika et al. |
| 2019/0179546 A1* | 6/2019 | Ward .................... G06F 11/14 |
| 2019/0179567 A1 | 6/2019 | Kanno et al. |
| 2020/0045134 A1* | 2/2020 | Rozas .................... G06F 3/067 |
| 2020/0089407 A1 | 3/2020 | Baca et al. |
| 2021/0064520 A1 | 3/2021 | Kanno |
| 2021/0223994 A1 | 7/2021 | Kanno et al. |
| 2022/0091746 A1* | 3/2022 | Maeda .................. G06F 3/0683 |
| 2023/0070397 A1 | 3/2023 | Esaka et al. |

FOREIGN PATENT DOCUMENTS

| | | |
|---|---|---|
| JP | 2019-105873 A | 6/2019 |
| JP | 2021-114038 A | 8/2021 |
| JP | 2023-37883 A | 3/2023 |

* cited by examiner

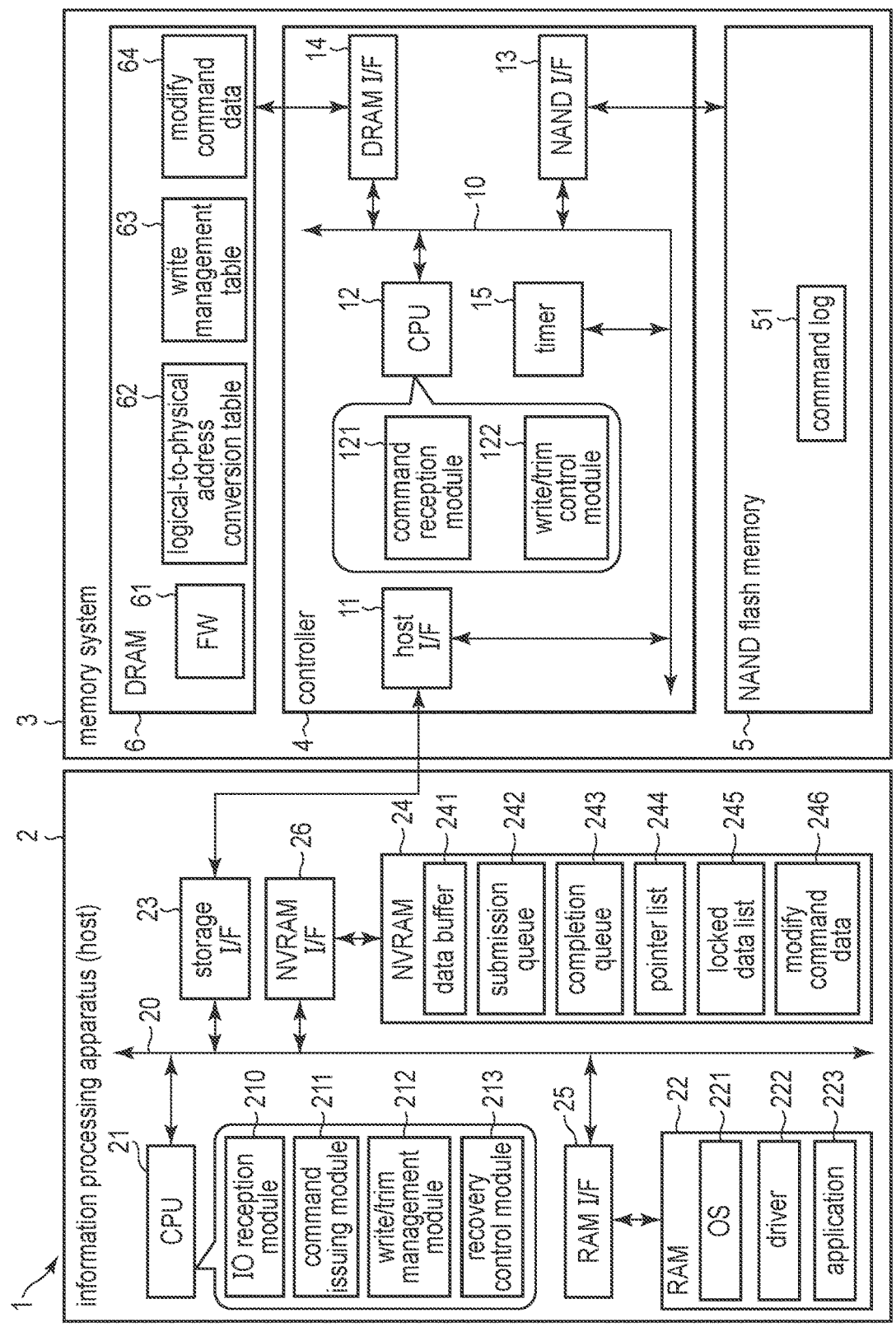
F I G. 1

| SQ entry information | completion order | data region management information | completion state | pointer to modify command data |
|---|---|---|---|---|
| | | | | |
| | | | | |
| | | | | |

FIG. 2

| Bit 63 | | Bit 11 | Bit 0 |
|---|---|---|---|
| Base Address (52bits) | | Offset (12bits) | |

F I G. 4 values of PRP entries in I/O command

| first PRP entry | upper 52 bits of D | α | ~921 |
|---|---|---|---|
| second PRP entry | upper 52 bits of X | λ | ~922 |

(A)

content of physical page X (list of second and subsequent PRP entries)

| upper 52 bits of A | 0 |
|---|---|
| upper 52 bits of B | 0 |
| upper 52 bits of C | 0 |
| upper 52 bits of (C+1) | 0 |
| ------ | ------ |
| upper 52 bits of (C+n-1) | 0 |
| upper 52 bits of Y | 0 |

(B)

content of physical page Y (last list of PRP entries)

| upper 52 bits of (C+n) | 0 |
|---|---|
| upper 52 bits of (C+q) | 0 |
| upper 52 bits of E | 0 |
| other data | |

(C)

F I G. 5

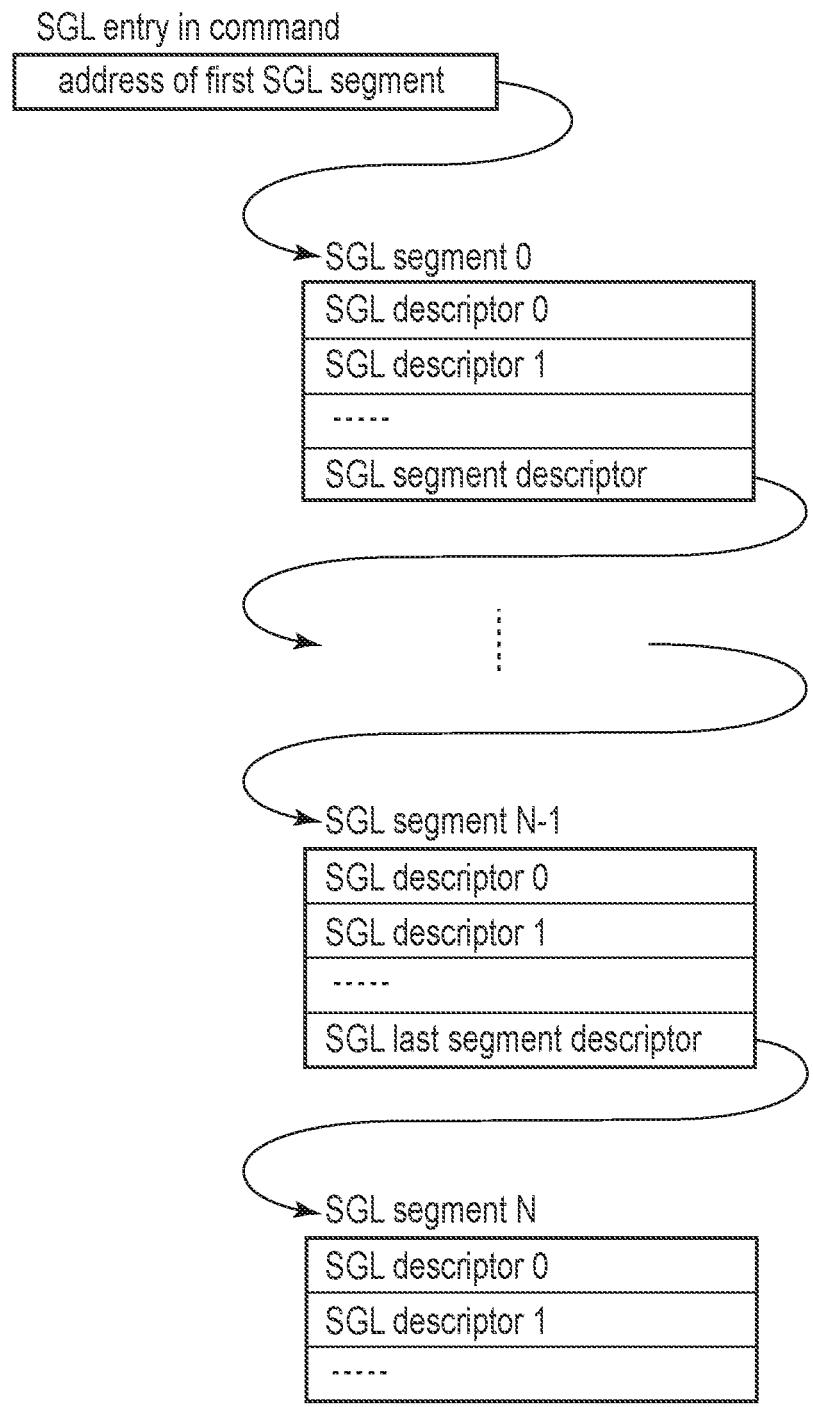
F I G. 6

| Range | Bytes | Field |
|---|---|---|
| Range 0 | 03:30 | Context Attributes |
| | 07:04 | length in logical blocks |
| | 15:08 | start LBA |
| Range 1 | 19:16 | Context Attributes |
| | 23:20 | length in logical blocks |
| | 31:24 | start LBA |
| ... | | |
| Range 255 | 4083:4080 | Context Attributes |
| | 4087:4084 | length in logical blocks |
| | 4095:4088 | start LBA |

FIG. 7

| start LBA of cancelled writing | number of cancelled sectors | pointer to next modify command data |
|---|---|---|
| | | |

FIG. 8

| LBA | physical address |
|-----|------------------|
| 0 | A |
| 1 | B |
| 2 | C |
| ⋮ | ⋮ |

F I G. 9

| command ID | LBA | data length | data pointer | pointer to modify command data |
|------------|-----|-------------|--------------|-------------------------------|
| | | | | |

F I G. 10

| SQ entry information | completion order | data region management information | completion state | pointer to modify command data |
|---|---|---|---|---|
| sqentry_info1 | | region_info1 | | NULL |
| | | | | |
| | | | | |

F I G. 14

| SQ entry information | completion order | data region management information | completion state | pointer to modify command data |
|---|---|---|---|---|
| sqentry_info1 | cseq1 | region_info1 | completed | NULL |
| | | | | |
| | | | | |

F I G. 15

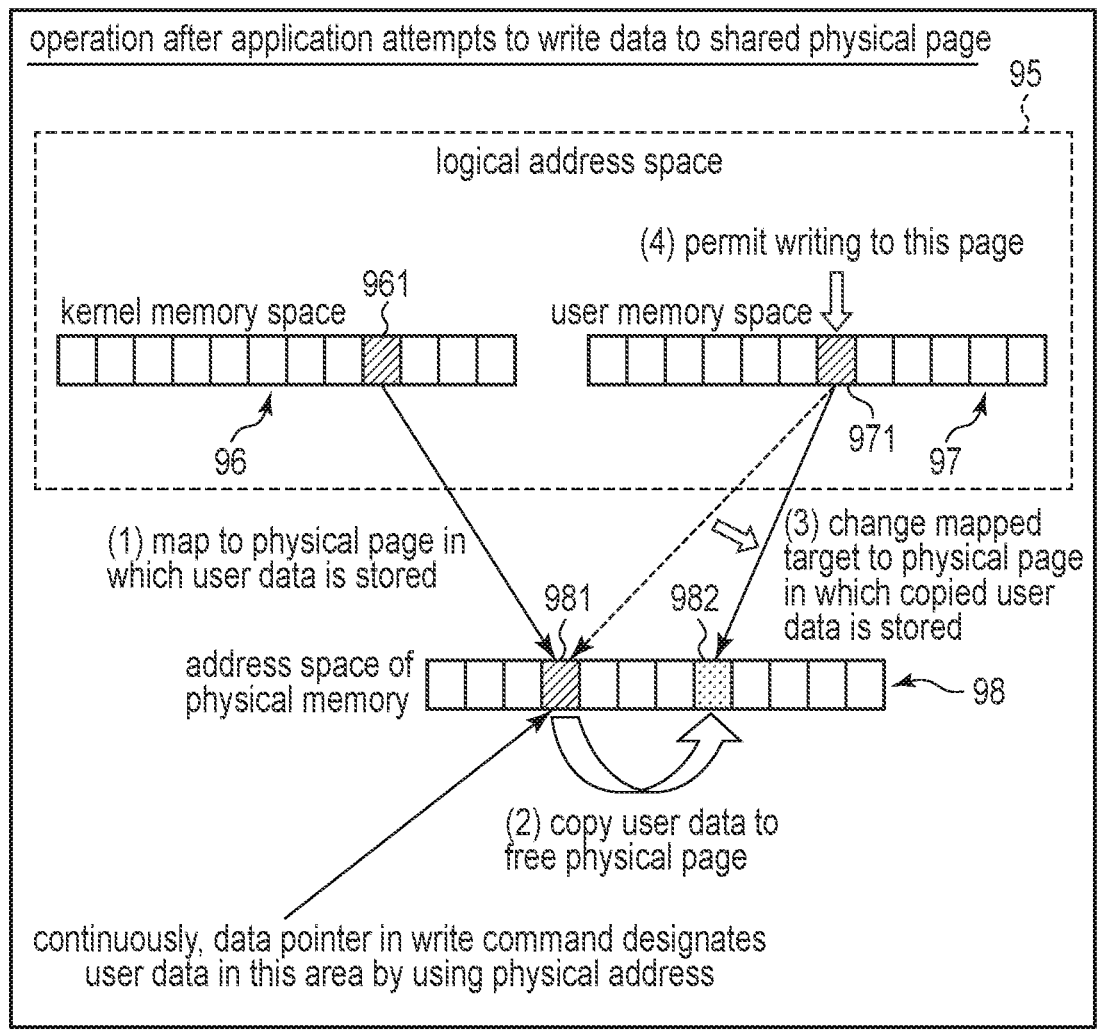
F I G. 18

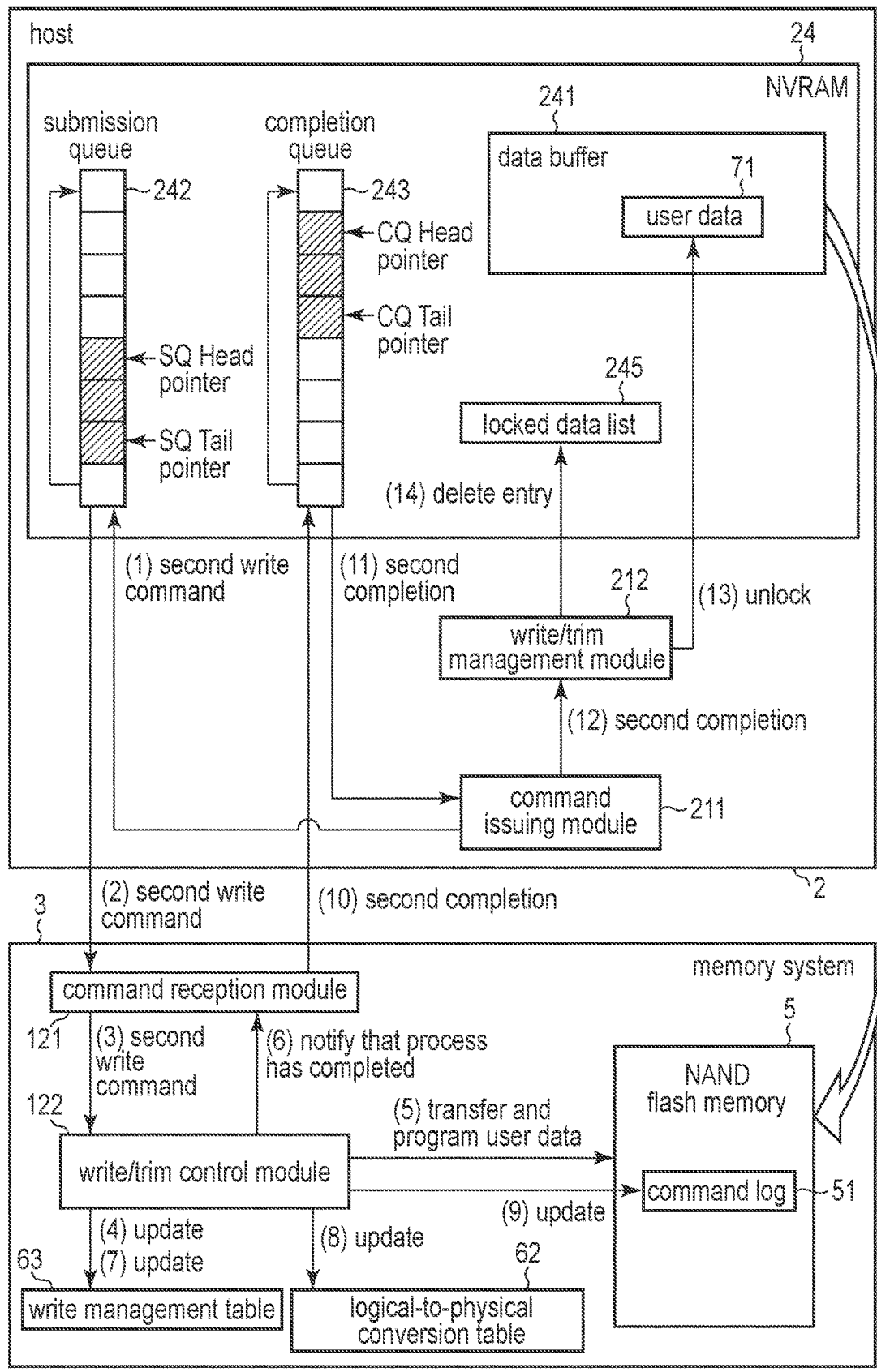
F I G. 19

| LBA | ... | x | x+1 | x+2 | x+3 | ... |
|---|---|---|---|---|---|---|
| #1 | | | X | X | | |
| #2a | | | W | W | | |
| #2b | | W | W | W | | |
| #2c | | | W | W | W | |
| #2d | | W | W | W | W | |

F I G. 20

| SQ entry information | completion order | data region management information | completion state | pointer to modify command data |
|---|---|---|---|---|
| sqentry_info1 | cseq1 | region_info1 | completed | NULL |
| sqentry_info2 | cseq2 | region_info2 | completed | NULL |
| ... | ... | ... | ... | ... |

81 ⇐ delete upon success of abort
82

F I G. 23

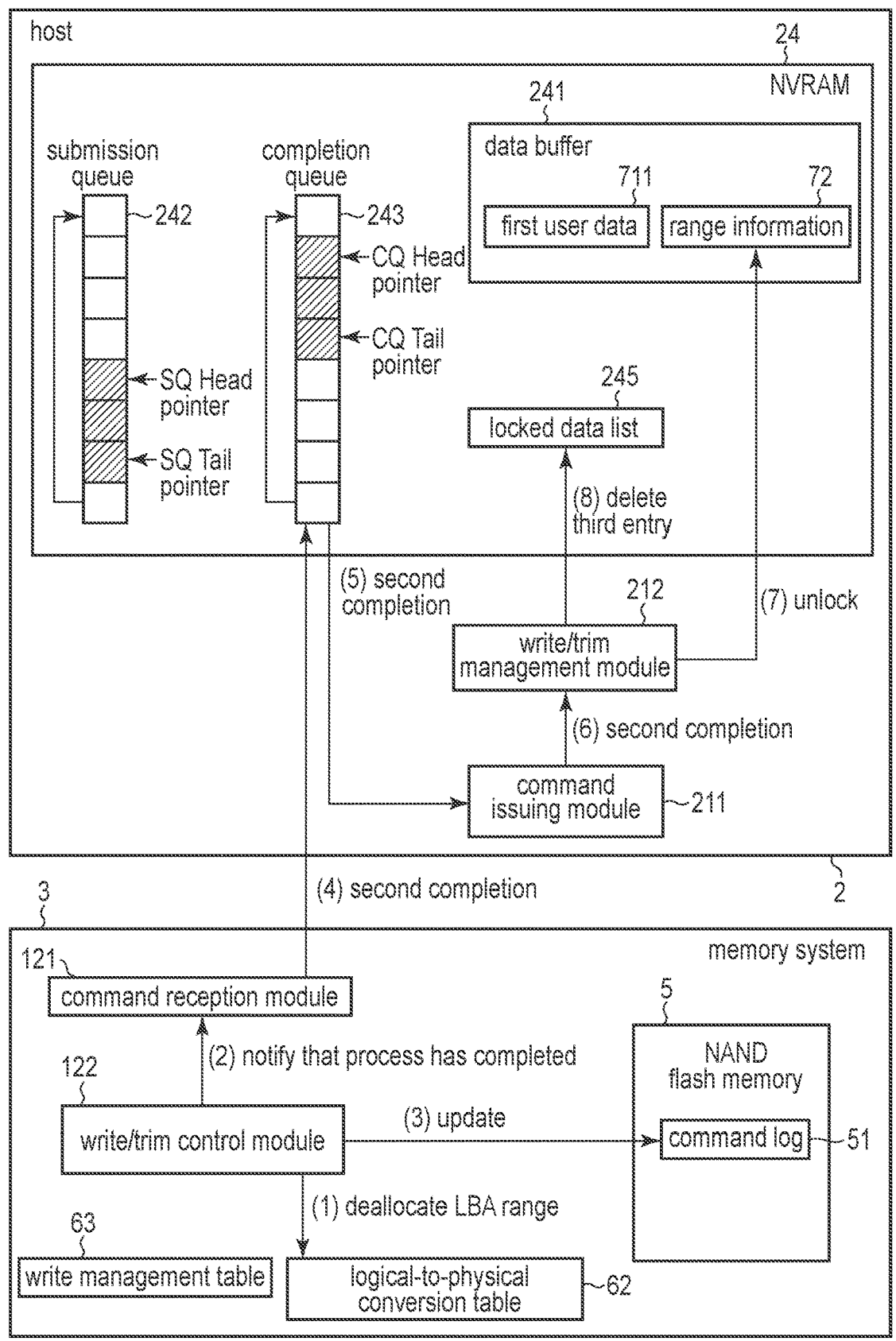
F I G. 25

| LBA | ... | x | x+1 | x+2 | x+3 | x+4 | x+5 | x+6 | ... |
|---|---|---|---|---|---|---|---|---|---|
| #1(#1X, #1Y) | | | X | X | | Y | Y | | |
| #2 | | W | W | W | W | W | W | W | |

F I G. 26

| LBA | ... | x | x+1 | x+2 | x+3 | ... |
|---|---|---|---|---|---|---|
| #1 | | | X | X | | |
| #2a | | W | W | | | |
| #2b | | | | W | W | |

F I G. 27

| LBA | ... | x | x+1 | x+2 | x+3 | x+4 | ... |
|---|---|---|---|---|---|---|---|
| #1 | | X | X | X | X | X | |
| #2 | | | | W | W | | |

F I G. 28

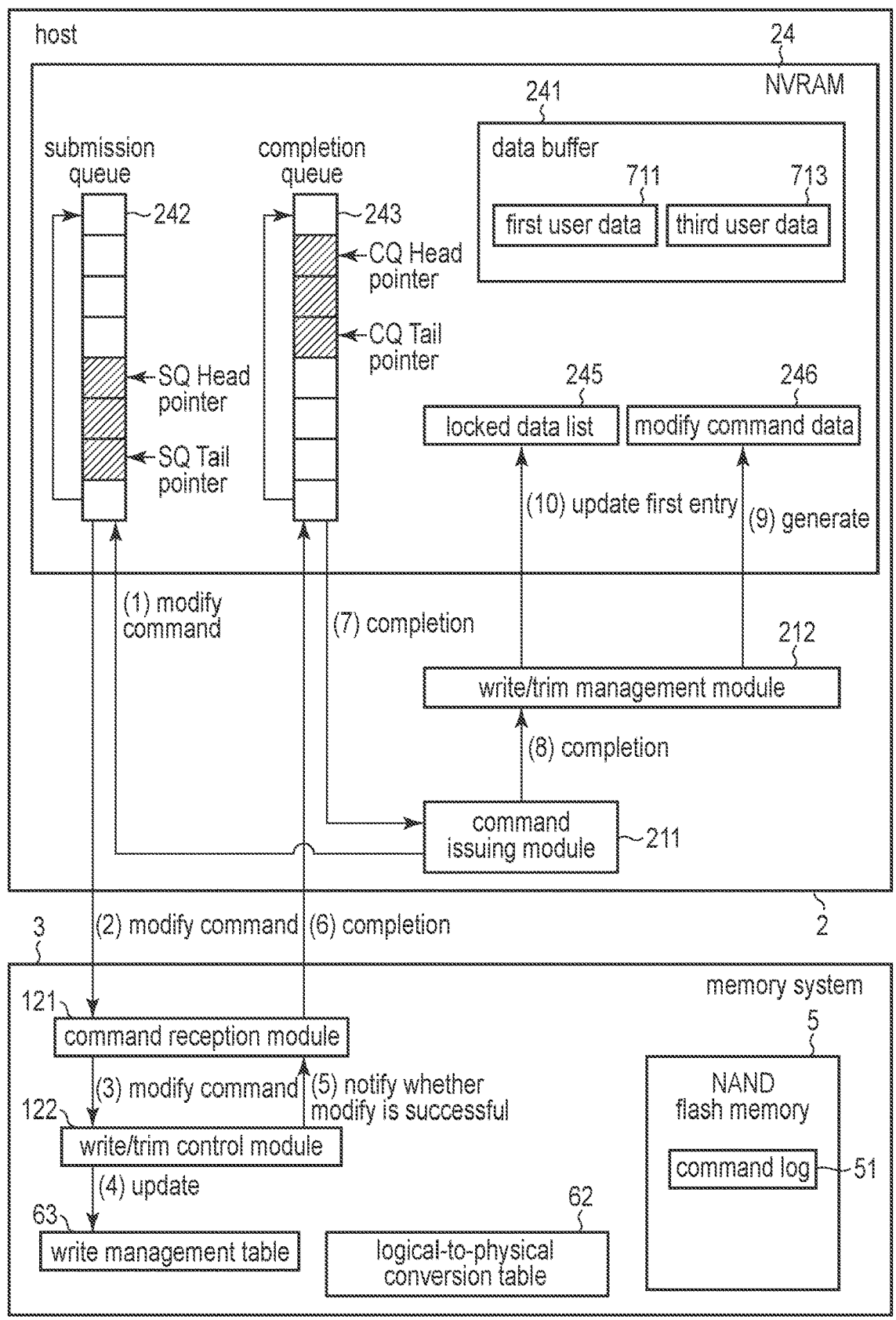
F I G. 29

| start LBA of cancelled writing | number of cancelled sectors | pointer to next modify command data |
|---|---|---|
| LBAx | n | NULL |

FIG. 30

| SQ entry information | completion order | data region management information | completion state | pointer to modify command data | |
|---|---|---|---|---|---|
| sqentry_info1 | cseq1 | region_info1 | completed | ptr1 | ~81 |
| sqentry_info3 | cseq3 | region_info3 | completed | NULL | |
| ... | ... | ... | ... | ... | ~83 |

FIG. 31

| LBA | x | x+1 | x+2 | x+3 | x+4 | x+5 | x+6 | x+7 |
|---|---|---|---|---|---|---|---|---|
| #1(#1X, #1Y, #1Z) | | X | X | | Z | | Y | Y |
| #2a | | | W | W | W | W | W | W |

FIG. 32

| LBA | ... | x | x+1 | x+2 | ... |
|---|---|---|---|---|---|
| #1 | | | A | B | |
| #2 | | C | D | | |
| #3 | | C | D | B | |

F I G. 33

| LBA | ... | x | x+1 | x+2 | x+3 | x+4 | ... |
|---|---|---|---|---|---|---|---|
| #1 | | A | B | C | D | E | |
| #2 | | | F | G | | | |
| #3 | | A | F | G | D | E | |

F I G. 34

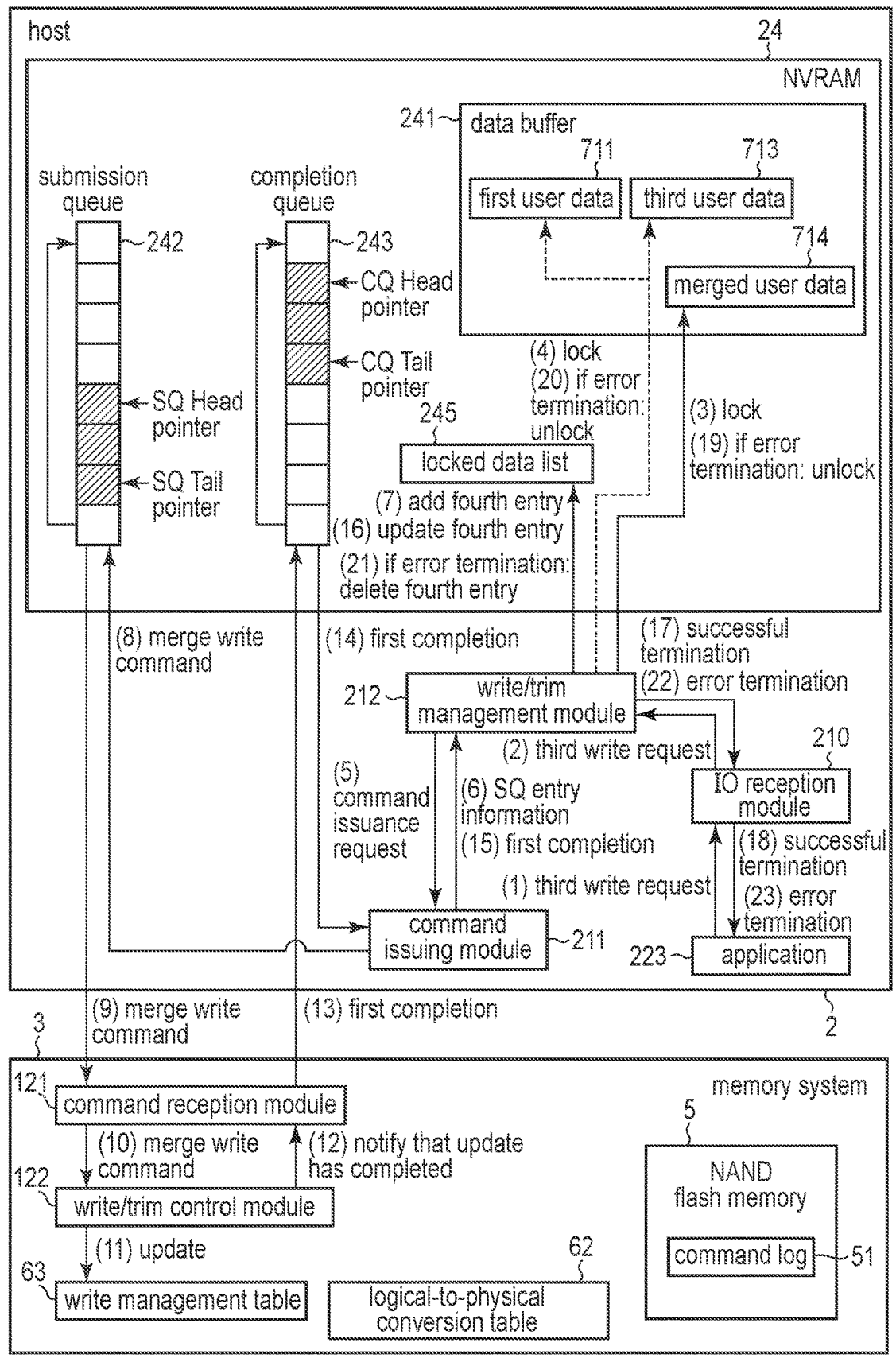
F I G. 35

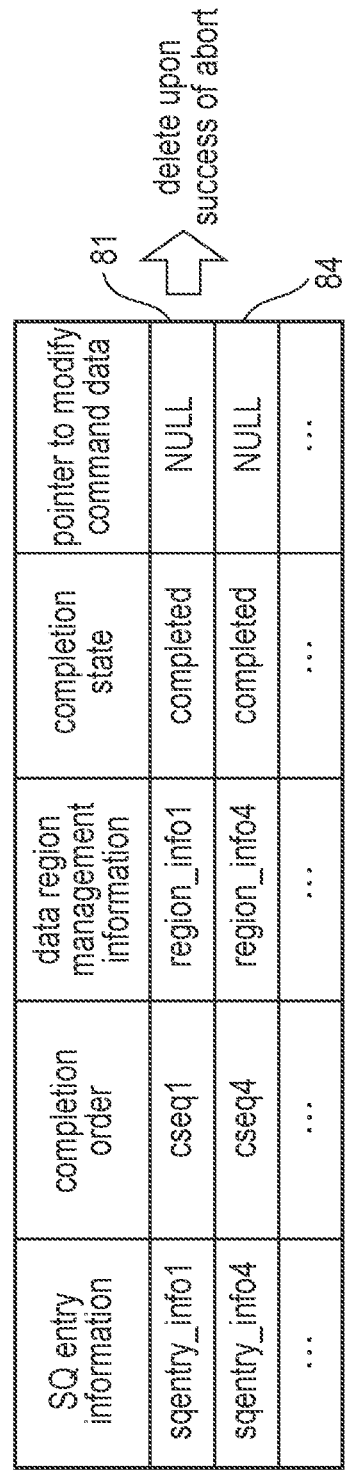
F I G. 36

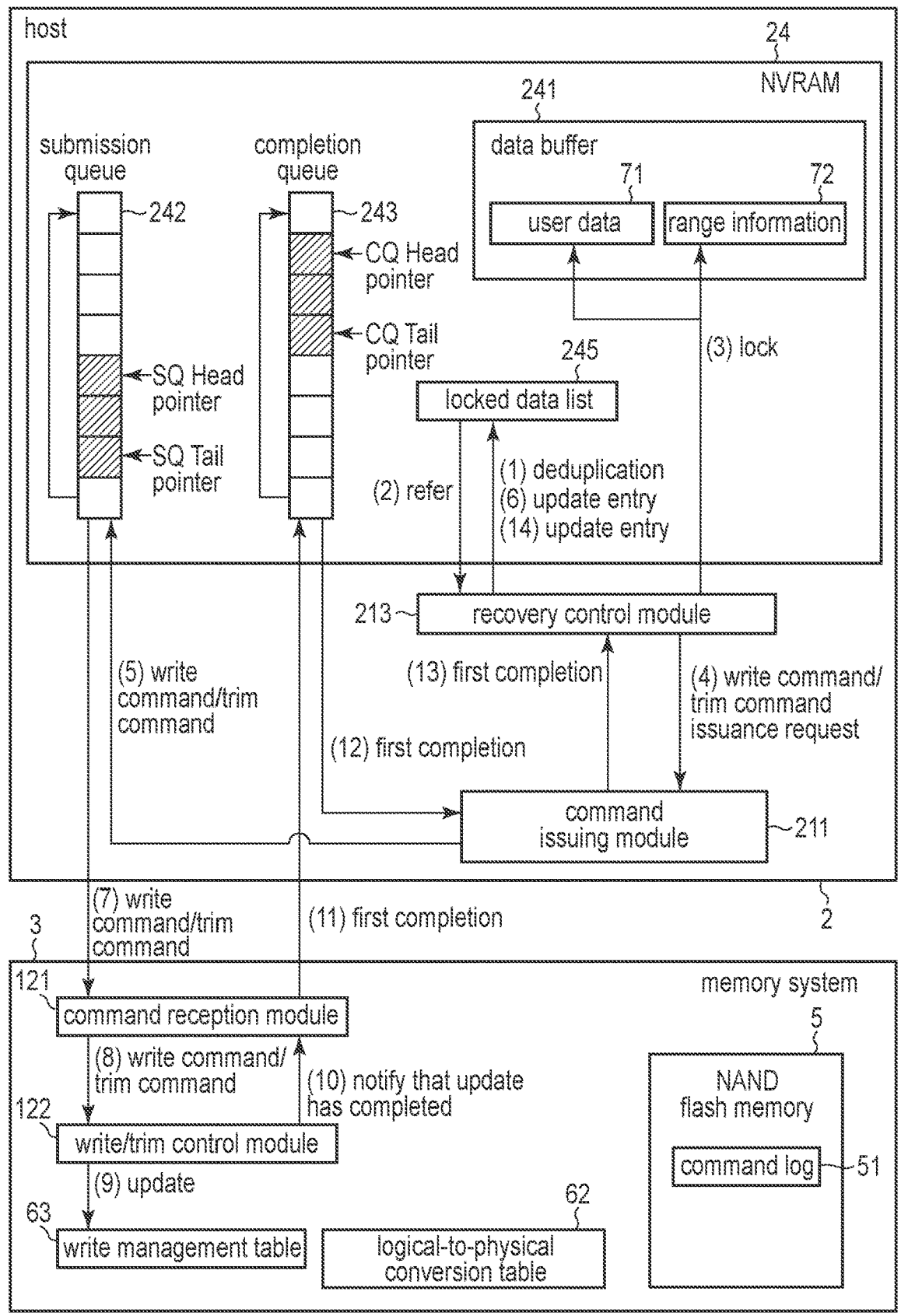
F I G. 37

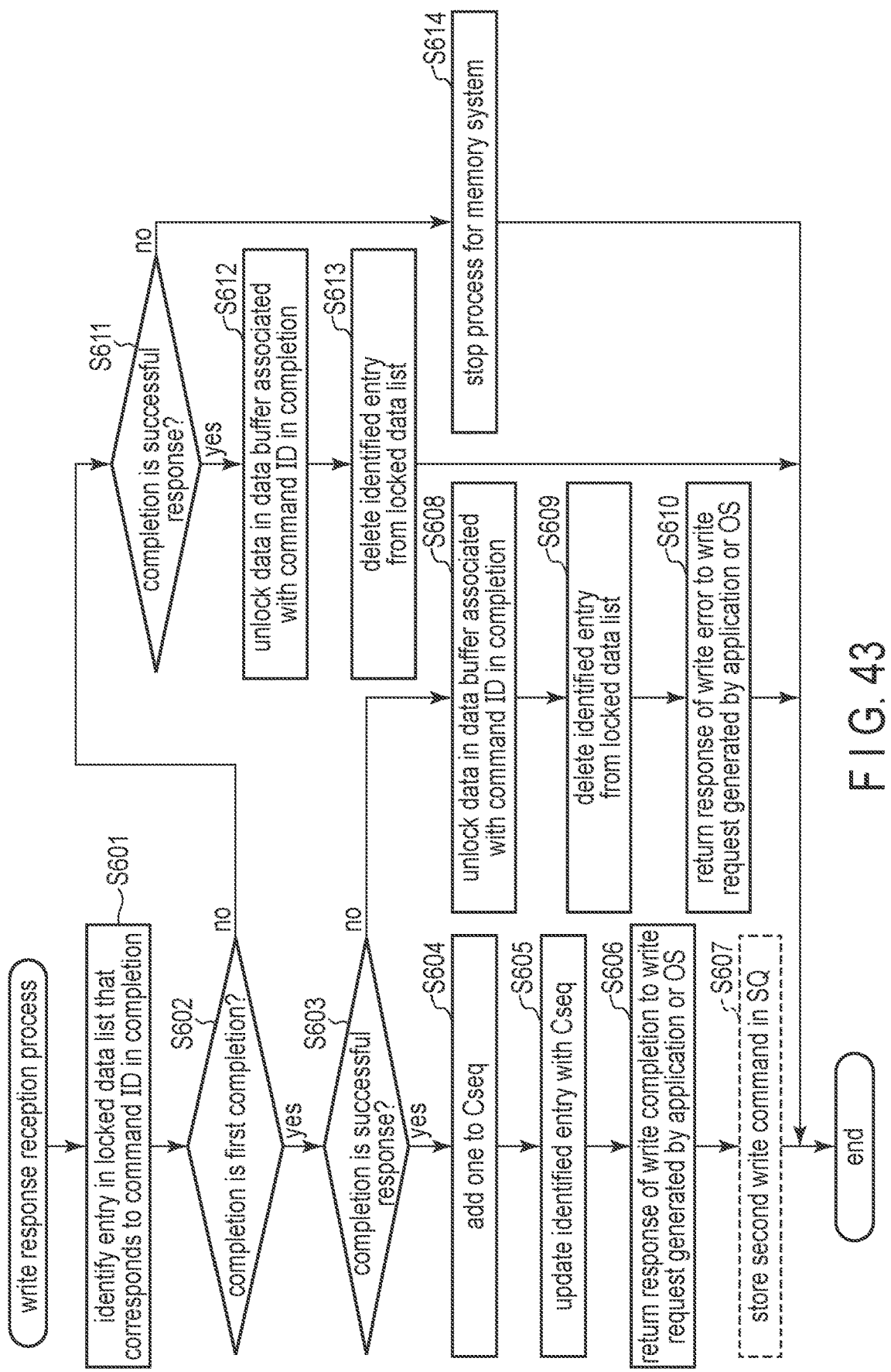
F I G. 43

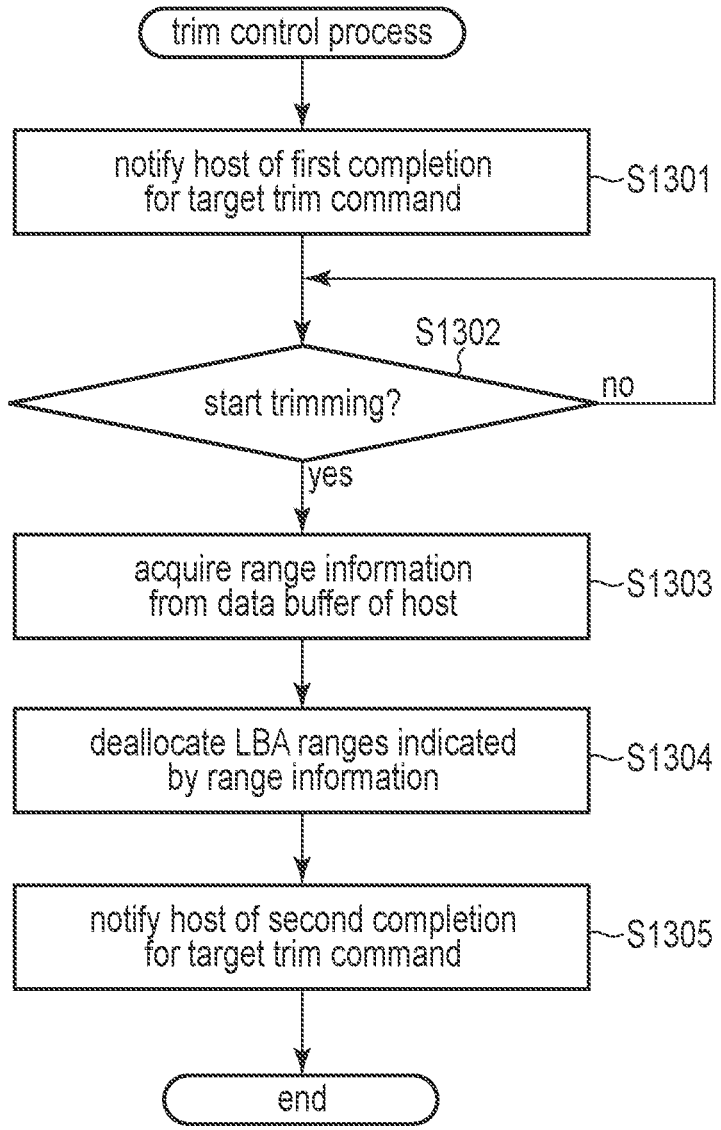
F I G. 50

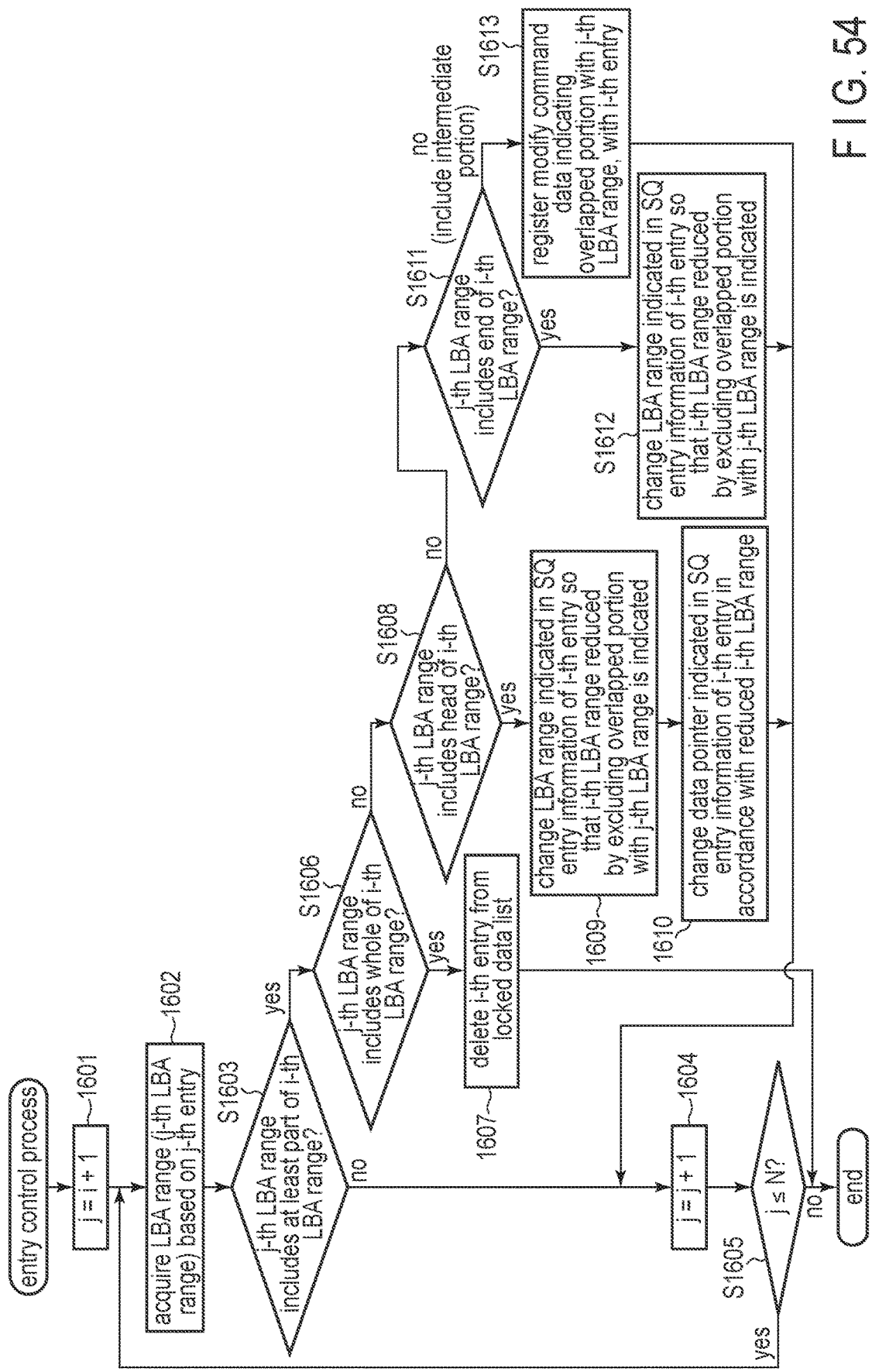
F I G. 54

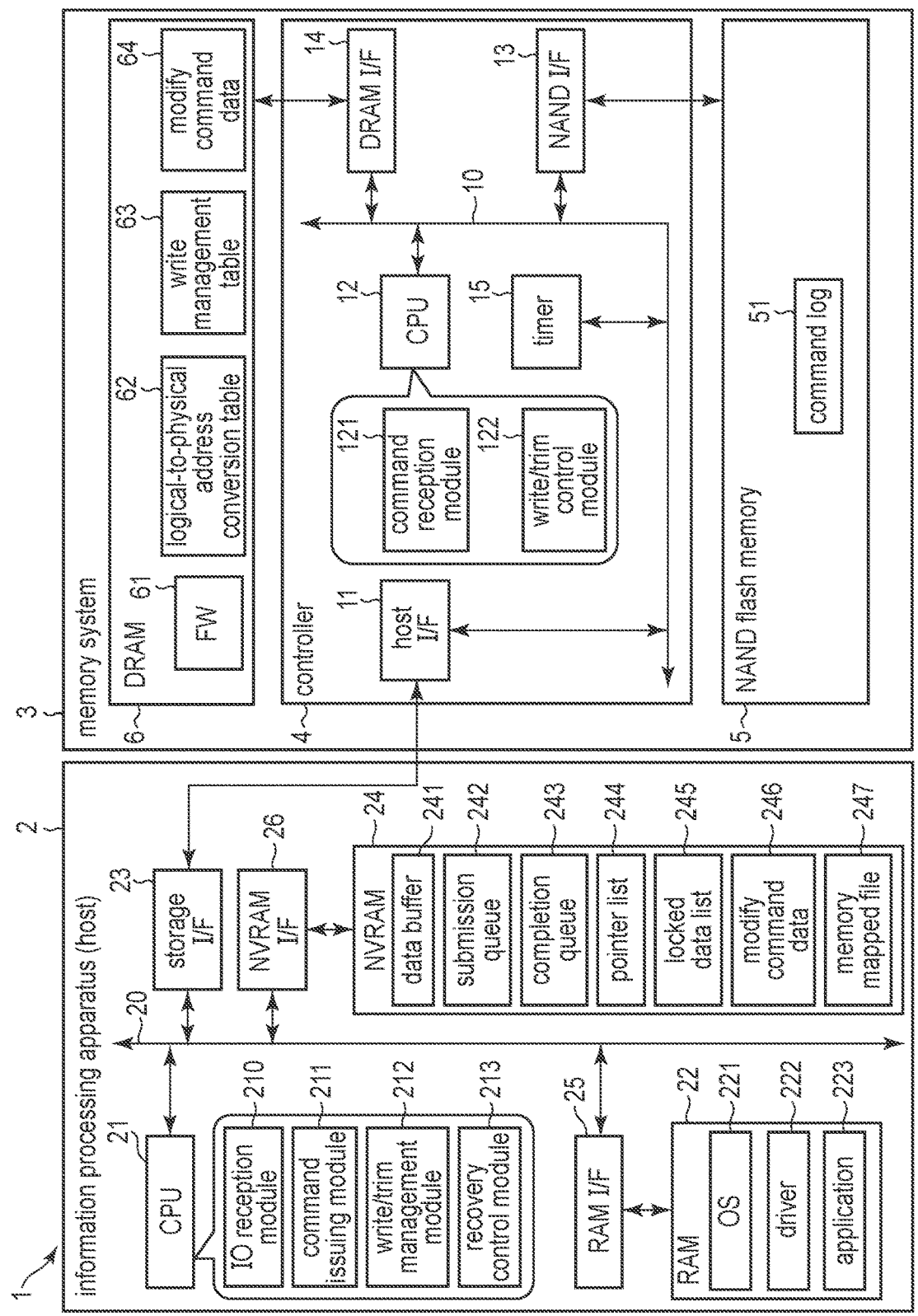
F I G. 55

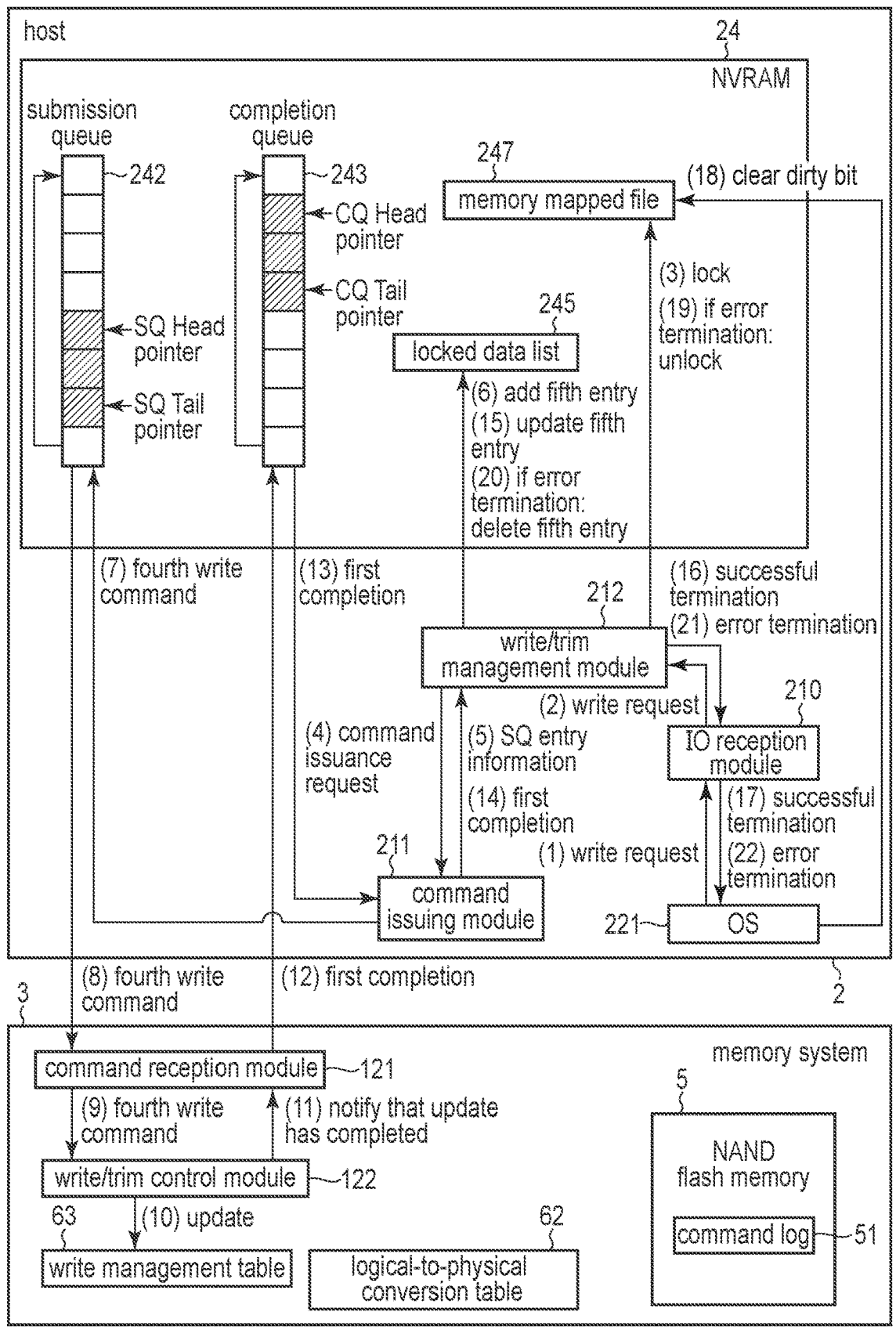
F I G. 57

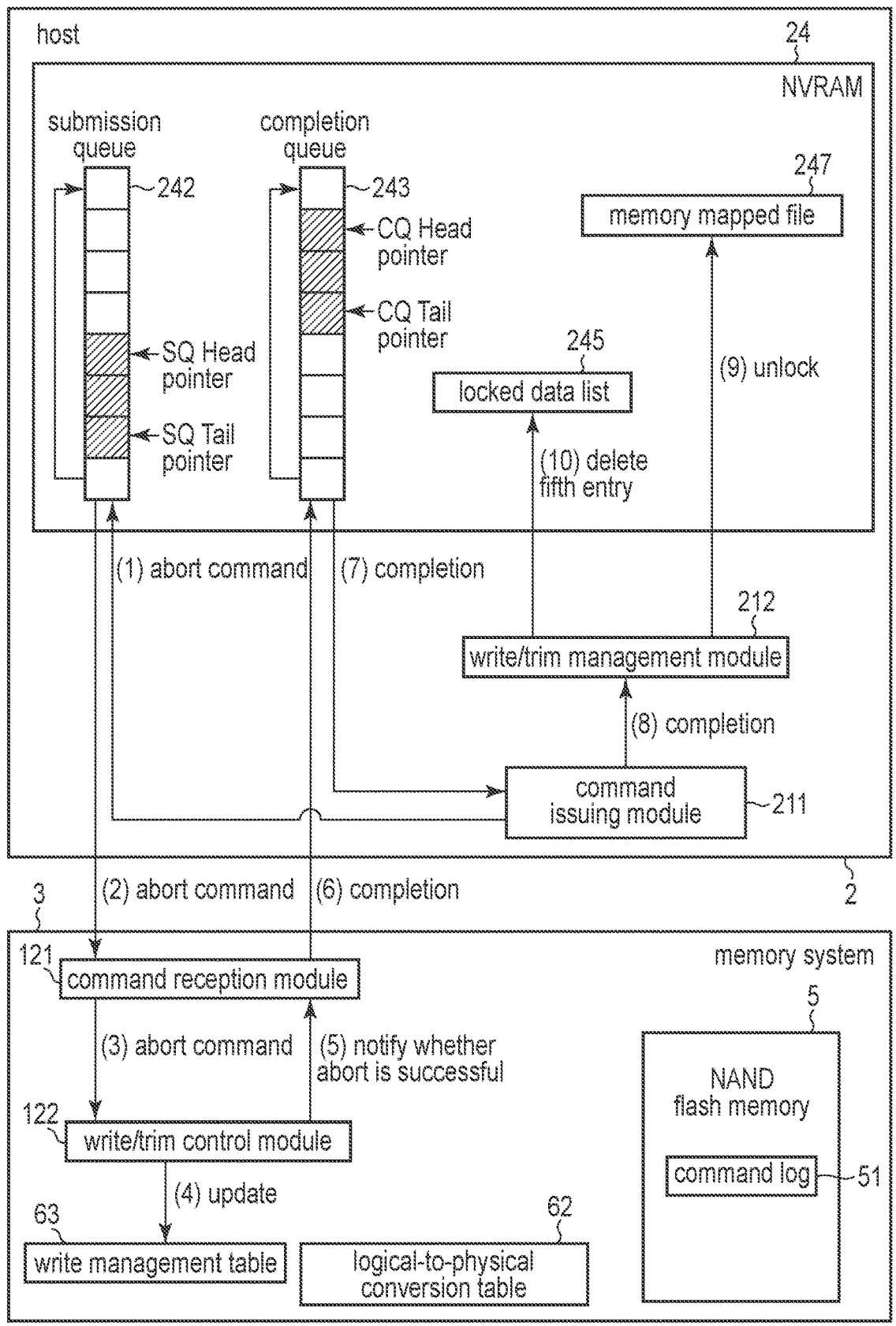
F I G. 60

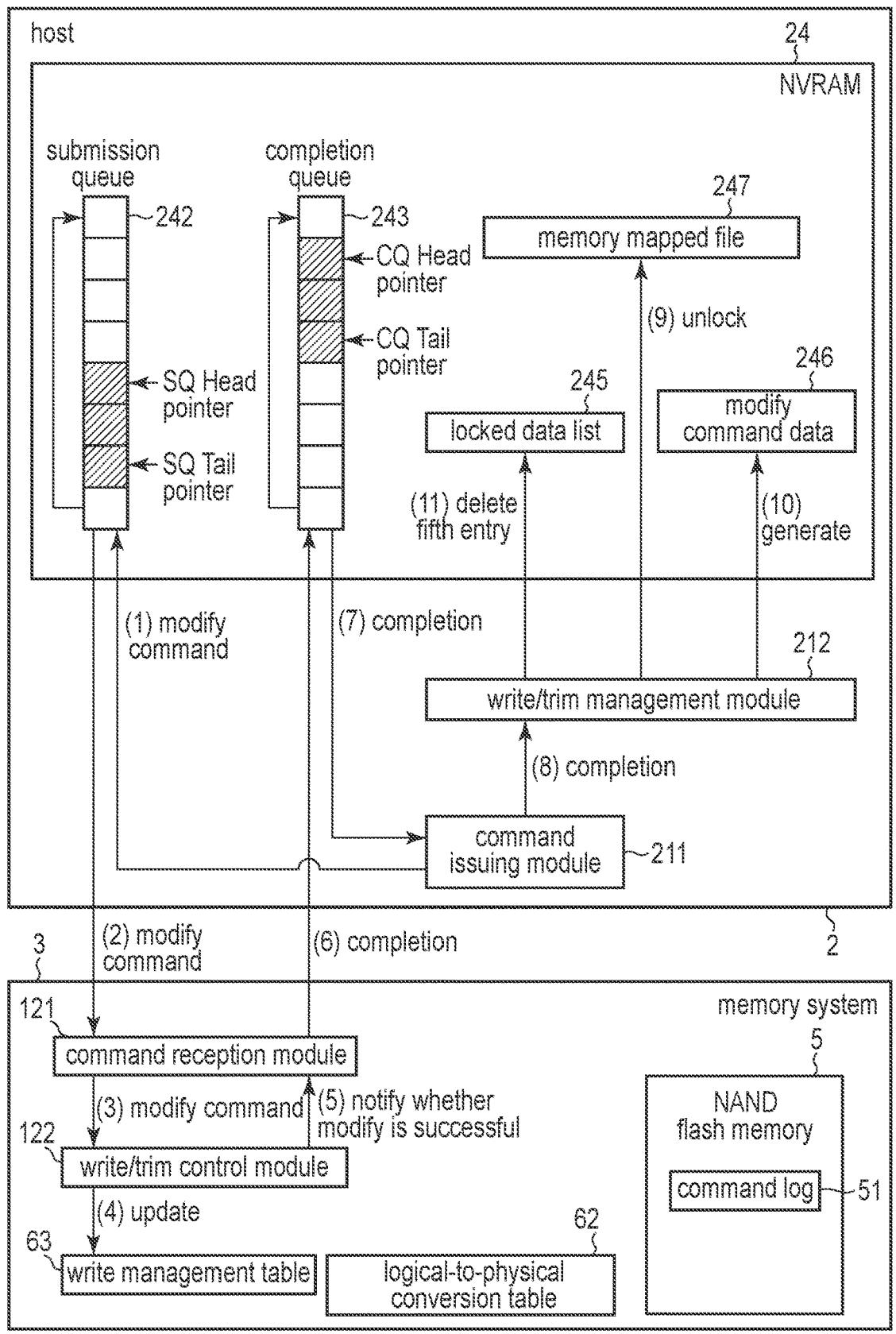
F I G. 63

INFORMATION PROCESSING APPARATUS

CROSS-REFERENCE TO RELATED APPLICATIONS

This application is based upon and claims the benefit of priority from Japanese Patent Application No. 2022-040562, filed Mar. 15, 2022, the entire contents of which are incorporated herein by reference.

FIELD

Embodiments described herein relate generally to a technique for controlling a nonvolatile memory.

BACKGROUND

In recent years, memory systems that include a nonvolatile memory are widely used. As one of such memory systems, a solid state drive (SSD) that includes a NAND flash memory is known. The SSD is used as a main storage for various computing devices.

When receiving a write request from a host, a memory system writes user data, which is received from the host along with the reception of the write request, into a nonvolatile memory, and transmits a response to the host.

Alternatively, after the total amount of user data requested to be written by multiple write requests received from the host reaches a specific data unit, the memory system writes the user data of the specific data unit into the nonvolatile memory, and transmits responses corresponding to the respective write requests to the host. The specific data unit is, for example, the amount of data that can be written into the nonvolatile memory in a single data write operation. That is, the memory system may use a mechanism in which writing in accordance a single write request is not immediately executed but writing in accordance with multiple write requests is executed after the total amount of user data requested to be written by the write requests reaches the specific data unit. Hereinafter, this mechanism is also referred to as a delayed write completion.

In the delayed write completion, for example, user data of a write unit including multiple pieces of user data that correspond to multiple write requests, respectively, is written into the nonvolatile memory, and thus, a storage area of the nonvolatile memory can be efficiently used. In the delayed write completion, however, writing and responding corresponding to each of write requests may be delayed until write requests corresponding to the user data of the write unit are received.

In addition, when write requests that designate the same logical address are transmitted to the memory system at short intervals, with respect to the same logical address, data is first written into the nonvolatile memory in accordance with the former write request, and data is then written into the nonvolatile memory in accordance with the latter write request. That is, writing the data into the nonvolatile memory in accordance with the latter write request makes the data that has been written in the nonvolatile memory in accordance with the former write request, invalid.

Alternatively, when a write request and a trim request that designate the same logical address are issued at short intervals, with respect to the same logical address, data is first written into the nonvolatile memory in accordance with the former write request, and the logical address is deallocated in accordance with the latter trim request. That is, deallocating the logical address in accordance with the latter trim request makes the data that has been written in the nonvolatile memory in accordance with the former write request, invalid.

In such a case, the nonvolatile memory wears owing to writing, into the nonvolatile memory, the data that will be made invalid soon.

BRIEF DESCRIPTION OF THE DRAWINGS

FIG. 1 is a block diagram illustrating an example of a configuration of an information processing system that includes a memory system and an information processing apparatus according to a first embodiment.

FIG. 2 is a diagram illustrating an example of a configuration of a locked data list that is used in the information processing apparatus according to the first embodiment.

FIG. 4 is a diagram illustrating an example of a structure of a physical region page (PRP) entry that is used in the information processing apparatus according to the first embodiment.

FIG. 5 is a diagram illustrating an example of a PRP entry list used in the information processing apparatus according to the first embodiment.

FIG. 6 is a diagram illustrating an example of a scatter gather list (SGL) that is used in the information processing apparatus according to the first embodiment.

FIG. 7 is a diagram illustrating an example of a configuration of range information used in the information processing system that includes the information processing apparatus according to the first embodiment.

FIG. 8 is a diagram illustrating an example of a configuration of modify command data used in the information processing system that includes the information processing apparatus according to the first embodiment.

FIG. 9 is a diagram illustrating an example of a configuration of a logical-to-physical address conversion table used in the memory system that communicates with the information processing apparatus according to the first embodiment.

FIG. 10 is a diagram illustrating an example of a configuration of a write management table used in the memory system that communicates with the information processing apparatus according to the first embodiment.

FIG. 14 is a diagram illustrating a first example of the locked data list that is updated in the information processing apparatus according to the first embodiment.

FIG. 15 is a diagram illustrating a second example of the locked data list that is updated in the information processing apparatus according to the first embodiment.

FIG. 18 is a diagram illustrating an example of an operation after the application attempts to perform writing to a write-inhibited storage area, in the information processing apparatus according to the first embodiment.

FIG. 19 is a block diagram illustrating still another example of the write operation in the information processing system that includes the information processing apparatus according to the first embodiment.

FIG. 20 is a diagram illustrating an example of a write request or a trim request (write/trim request) in the information processing apparatus according to the first embodiment.

FIG. 23 is a diagram illustrating a fourth example of the locked data list updated in the information processing system that includes the information processing apparatus according to the first embodiment.

FIG. 25 is a block diagram illustrating another example of the trim operation in the information processing system that includes the information processing apparatus according to the first embodiment.

FIG. 26 is a diagram illustrating another example of the write/trim request in the information processing apparatus according to the first embodiment.

FIG. 27 is a diagram illustrating still another example of the write/trim request in the information processing apparatus according to the first embodiment.

FIG. 28 is a diagram illustrating still another example of the write/trim request in the information processing apparatus according to the first embodiment.

FIG. 29 is a block diagram illustrating an example of a modify operation in the information processing system that includes the information processing apparatus according to the first embodiment.

FIG. 30 is a diagram illustrating an example of modify command data generated in the information processing system that includes the information processing apparatus according to the first embodiment.

FIG. 31 is a diagram illustrating a fifth example of the locked data list updated in the information processing system that includes the information processing apparatus according to the first embodiment.

FIG. 32 is a diagram illustrating still another example of the write/trim request in the information processing apparatus according to the first embodiment.

FIG. 33 is a diagram illustrating an example of a write command that is issued in the information processing apparatus according to the first embodiment.

FIG. 34 is a diagram illustrating another example of the write command that is issued in the information processing apparatus according to the first embodiment.

FIG. 35 is a block diagram illustrating still another example of the write operation in the information processing system that includes the information processing apparatus according to the first embodiment.

FIG. 36 is a diagram illustrating a sixth example of the locked data list updated in the information processing system that includes the information processing apparatus according to the first embodiment.

FIG. 37 is a block diagram illustrating an example of a recovery operation in the information processing system that includes the information processing apparatus according to the first embodiment.

FIG. 43 is a flowchart illustrating an example of the procedure of a write response reception process executed in the information processing apparatus according to the first embodiment.

FIG. 50 is a flowchart illustrating an example of the procedure of a trim control process executed in the memory system that communicates with the information processing apparatus according to the first embodiment.

FIG. 54 is a flowchart illustrating an example of the procedure of an entry control process executed in the information processing apparatus according to the first embodiment.

FIG. 55 is a block diagram illustrating an example of a configuration of an information processing system that includes a memory system and an information processing apparatus according to a second embodiment.

FIG. 57 is a block diagram illustrating an example of a write operation in the information processing system that includes the information processing apparatus according to the second embodiment.

FIG. 60 is a block diagram illustrating an example of an abort operation in the information processing system that includes the information processing apparatus according to the second embodiment.

FIG. 63 is a block diagram illustrating an example of a modify operation in the information processing system that includes the information processing apparatus according to the second embodiment.

DETAILED DESCRIPTION

Figure 3:
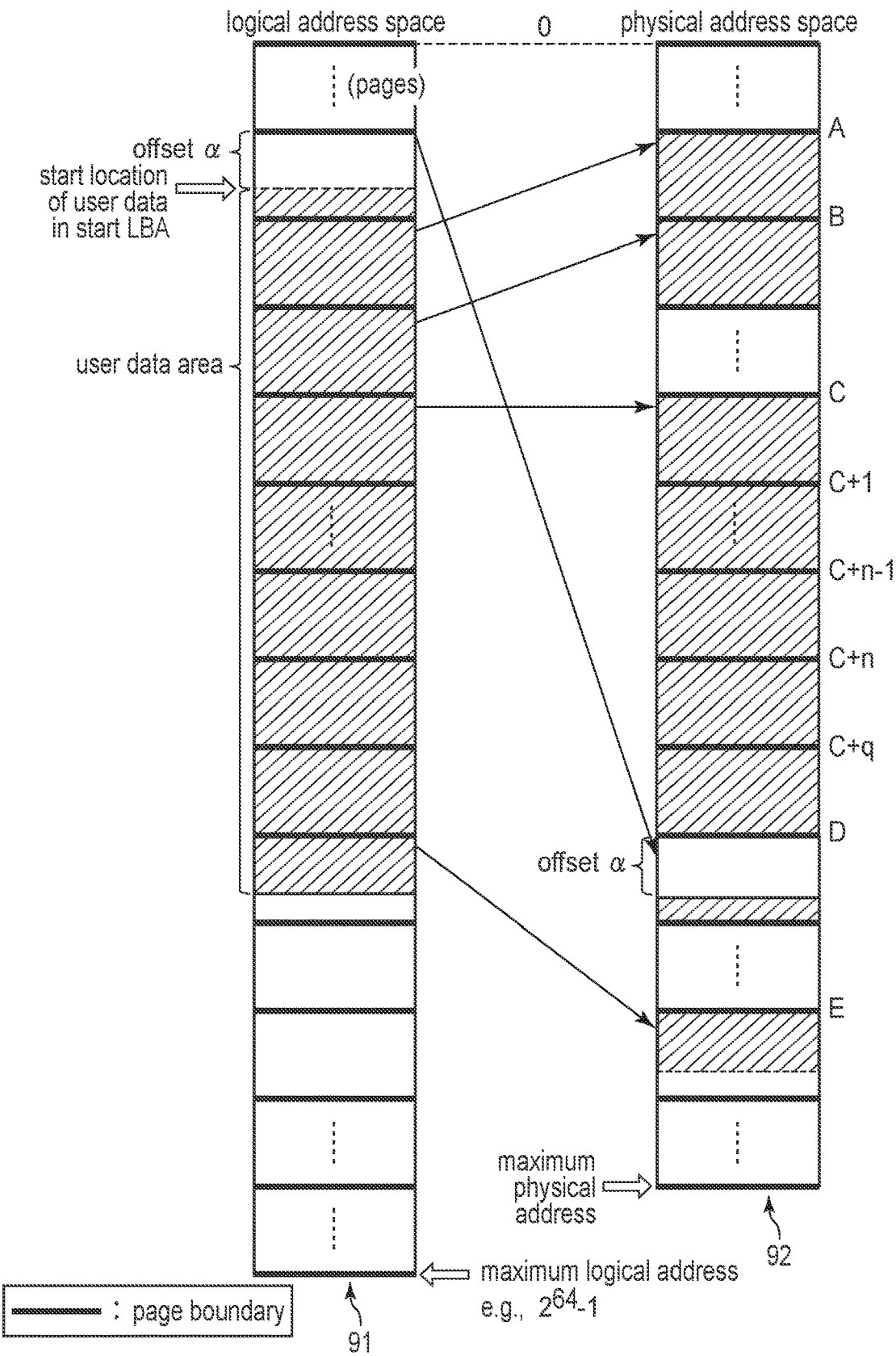
FIG. 3 is a diagram illustrating an example of mapping between a logical address space and a physical address space that is used in the information processing apparatus according to the first embodiment.

Various embodiments will be described hereinafter with reference to the accompanying drawings.

In general, according to one embodiment, an information processing apparatus is connectable to a memory system. The information processing apparatus includes a nonvolatile memory and a processor. The processor stores first data to the nonvolatile memory. The processor stores first management data to the nonvolatile memory. The first management data includes information equivalent to a first write command that is associated with the first data and designates a first logical address range. The processor performs a first transmission of the first write command to the memory system. Upon receiving, from the memory system, a first response to the first write command transmitted in the first transmission, the processor adds, to the first management data, information indicating that the first response to the first write command transmitted in the first transmission has been received. Upon receiving, from the memory system, a second response to the first write command after receiving the first response, the processor deletes the first data and the first management data from the nonvolatile memory. When either a write operation of second data to a second logical address range or deallocation of the second logical address range is requested before the second response to the first write command is received, the processor transmits, to the memory system, a command to cancel a write operation to at least a third logical address range from a write operation of the first data to the first logical address range in accordance with the first write command. The second logical address range includes the third logical address range. The third logical address range is at least a portion of the first logical address range. When the cancel of the write operation to the third logical address range is successful, the processor updates or deletes the first management data.

First Embodiment

First, a configuration of an information processing system 1 that includes an information processing apparatus according to a first embodiment will be described with reference to FIG. 1. The information processing system 1 includes an information processing apparatus 2 and a memory system 3.

The information processing apparatus 2 may be a storage server that stores a large amount of various data in the memory system 3, or may be a server or a personal computer. Hereinafter, the information processing apparatus 2 is also referred to as a host 2.

The memory system 3 is a semiconductor storage device configured to write data to a nonvolatile memory such as a NAND flash memory, and read data from the nonvolatile memory. The memory system 3 is also referred to as a storage device. The memory system 3 is realized, for example, as a solid state drive (SSD).

The memory system 3 may be used as a storage of the host 2. The memory system 3 may be provided inside the host 2 or may be connected to the host 2 via a cable or a network.

An interface for connecting the host 2 and the memory system 3 conforms to standards such as PCI Express (PCIe) (registered trademark), Ethernet (registered trademark), Fibre channel, and NVM Express (NVMe) (registered trademark).

An example of each of the configurations of the host 2 and the memory system 3 will be described below.

(Configuration Example of Host 2)

The host 2 includes, for example, a central processing unit (CPU 21), a random access memory (RAM) 22, a storage interface (storage I/F) 23, a nonvolatile random access memory (NVRAM) 24, a RAM interface (RAM I/F) 25, and an NVRAM interface (NVRAM I/F) 26. The CPU 21, the storage I/F 23, the RAM I/F 25, and the NVRAM I/F 26 may be connected to via a bus 20.

The CPU 21 is, for example, at least one processor. The CPU 21 controls operations of various components of the host 2.

The RAM 22 is a volatile memory. The RAM 22 is, for example, a dynamic random access memory (DRAM) or a static random access memory (SRAM). The storage area of the RAM 22 is allocated as, for example, a storage area of an operating system (OS) 221, a driver 222, and various application programs 223. Hereinafter, the application program 223 is also simply referred to as an application 223.

The storage I/F 23 functions as a control circuit that controls communication between the host 2 and the memory system 3. The storage I/F 23 transmits various commands, for example, input/output (I/O) commands and various control commands to the memory system 3. The I/O commands include, for example, a write command and a read command. The control commands include, for example, a trim command (unmap command), an abort command, a modify command, and a flush command.

The trim command is a command to deallocate an area of the nonvolatile memory of the memory system 3 that is allocated to a designated logical address range. As the trim command, for example, a Dataset Management command defined in the NVMe standard is used.

A logical address range includes one or more logical addresses. The logical address is used by the host 2 for addressing the memory system 3. The logical address range provided by the memory system 3 to the host 2 may be divided into multiple namespaces. The namespaces are identified by namespace IDs, respectively, and each have an independent logical address space. The logical address is, for example, a logical block address (LBA). Hereinafter, a case where the LBA is used as the logical address will be mainly explained. User data is logically stored in sectors each having a certain size. A sector is identified by an LBA. The sizes of sectors need not be the same between namespaces.

The trim command includes, for example, a data pointer that indicates a location in the host 2, a value that designates a process of deallocating LBA ranges (i.e., a trim process), and the number of LBA ranges to be deallocated. In the location in the host 2 that is indicated by the data pointer, information indicative of the LBA ranges to be deallocated is stored. The information indicative of the LBA ranges is also referred to as range information. Range information associated with a trim command is information indicative of LBA ranges to be deallocated in accordance with the trim command.

The abort command is a command to abort execution of a command that has been issued to the memory system 3. The abort command is defined in the NVMe standard, for example. The abort command includes information that can uniquely identify a command to be aborted. The information that can uniquely identify a command includes, for example, identification information of the command (command ID). The abort command is used for aborting, for example, execution of a write command that has been issued to the memory system 3.

The modify command is a command to cancel (stop) a portion of writing to an LBA range that has been designated in an issued write command. In a case where a portion of writing to an LBA range designated in an issued write command is to be canceled, the modify command includes, for example, information that uniquely identifies the write command and information (range information) indicative of the LBA range to be canceled. The modify command may include information that indicates a location in the host 2 in which the information indicative of the LBA range to be canceled is stored. The information indicative of the LBA range to be canceled may indicate multiple LBA ranges within the LBA range designated in the corresponding write command. The range information associated with the modify command is information indicative of an LBA range in which writing is to be canceled in accordance with the modify command.

The flush command includes a special flush command and a general flush command.

The special flush command is a command that causes the memory system 3 to return a second completion for an uncompleted write command or an uncompleted trim command for which a first completion has been returned by the memory system 3. The uncompleted write command or the uncompleted trim command for which a first completion has been returned will be described later. More specifically, the special flush command is a command to complete write command processing by writing, into the nonvolatile memory of the memory system 3, user data which has not been written into the nonvolatile memory and is stored in the storage area of the host 2. The special flush command is also a command to complete trim command processing.

The general flush command is a command to writing, into the nonvolatile memory of the memory system 3, user data written in a volatile write cache that is allocated in a volatile memory such as a DRAM in the memory system 3. As described later, an TO reception module 210 of the host 2 provides a virtual power loss protection function (virtual PLP function) to the application 223 and the OS 221. Therefore, when issuing an input/output request to the IO reception module 210, the application 223 or the OS 221 does not need to recognize whether or not a nonvolatile write cache is provided in the IO reception module 210 or in a destination (for example, the memory system 3) that the IO reception module 210 is to notify of the input/output request. For this reason, even when receiving a request for issuing a general flush command from the application 223 or the OS 221, the IO reception module 210 does not perform any process and necessarily returns a successful completion to the application 223 or the OS 221.

When the memory system having a PLP function receives a write command from the host, the memory system writes user data to a volatile write cache, and returns a completion response to the host before writing the user data into a nonvolatile memory. As a result, the host recognizes the memory system as if the writing could be performed at high speed in the memory system. When power supply to the memory system is lost, the memory system uses the PLP function to write, into the nonvolatile memory, the user data that is stored in the volatile write cache and has not yet been written into the nonvolatile memory. As a result, the host recognizes the memory system as if the volatile write cache is not present in the memory system. Hereinafter, the volatile write cache of the memory system having the PLP function is referred to as a write cache with PLP. In the PLP function, energy stored in a capacitor in the memory system is often used.

The IO reception module 210 provides the virtual PLP function to the application 223 and the OS 221. The virtual PLP function is a function of recovering the writing of user data to the memory system 3 (more specifically, to the nonvolatile memory of the memory system 3) that has failed to be completed because of an improper termination of the host 2, an improper termination of the memory system 3 resulting from unexpected power shutoff or the like, or an unintended restart of the memory system 3, by using data stored in the NVRAM 24. In other words, the IO reception module 210 provides the application 223 and the OS 221 with a virtual memory system having the PLP function by using the NVRAM 24 and the memory system 3.

The NVRAM 24 is a nonvolatile memory. The NVRAM 24 is also referred to as a storage class memory (SCM). As the NVRAM 24, for example, a magnetoresistive random access memory (MRAM), a phase change random access memory (PRAM), a resistive random access memory (ReRAM), or a ferroelectric random access memory (FeRAM) is used. The storage area of the NVRAM 24 is allocated as a buffer area used as a data buffer 241, an area of a submission queue (SQ) 242, an area of a completion queue (CQ) 243, a storage area of a pointer list 244, and a storage area of various data used for processing by the host 2. The various data used for processing by the host 2 includes, for example, a locked data list 245 and modify command data 246.

The data buffer 241 is a storage area for temporarily storing user data that is to be written into the nonvolatile memory of the memory system 3, and information (e.g., range information) indicative of an LBA range to be deallocated.

The submission queue 242 is a queue that stores a command to be transmitted from the host 2 to the memory system 3. The submission queue 242 is a logically ring-shaped queue. That is, the same region is repeatedly used.

The completion queue 243 is a queue that stores a response (completion) returned from the memory system 3 to the host 2. The memory system 3 may respond to one write command with multiple completions. The memory system 3 may respond to one trim command with multiple completions. The completion queue 243 is also a logically ring-shaped queue.

Note that the host 2 may implement the submission queue 243 and the completion queue 244 for each command type, for example, the submission queue 243 and the completion queue 244 for management commands and another submission queue 243 and completion queue 244 for input/output commands such as a read command and a write command, with respect to one memory system 3. In addition, the host 2 may implement multiple submission queues 243/completion queues 244 for input/output commands with respect to one memory system 3. In the embodiment, the submission queue 243/completion queue 244 is provided in the NVRAM 24, but the submission queue 243/completion queue 244 for commands other than write commands and trim commands may be provided in the RAM 22.

The pointer list 244 is a list of pointers each indicating a location in the data buffer 241 of user data that is associated with a write command or a read command. In the embodiment, the pointer list 244 is stored in the NVRAM 24, but the pointer list 244 may be stored in the RAM 22.

The locked data list 245 is a list for managing a processing status of a write command and a processing status of a trim command that are issued from the host 2 to the memory system 3. One locked data list 245 corresponds to, for example, one memory system 3. More specifically, the locked data list 245 is associated with, for example, identification information (drive ID) of a corresponding one memory system 3.

The modify command data 246 is data for managing information that relates to a modify command issued from the host 2 to the memory system 3. One piece of the modify command data 246 corresponds to, for example, one LBA range in which writing has been canceled.

The RAM I/F 25 functions as a RAM control circuit configured to control access to the RAM 22.

The NVRAM I/F 26 functions as an NVRAM control circuit configured to control access to the NVRAM 24.

FIG. 2 illustrates an example of a configuration of the locked data list 245 used in the host 2. The locked data list 245 may include one or more entries that correspond to one or more write and trim commands, respectively, that are transmitted from the host 2 to the memory system 3. In the locked data list 245, the one or more entries are stored in the order in which corresponding write or trim requests are received from the application 223 or the OS 221. Thus, areas in which the one or more entries are stored are managed in a format in which a released area is reusable, such as a ring buffer format or a list structure connected with pointers.

Each of the entries includes, for example, an SQ entry information field, a completion order field, a data region management information field, a completion state field, and a pointer to modify command data field.

The SQ entry information field indicates information (SQ entry information) representing a corresponding write command or trim command. The SQ entry information includes information such as the type and content of the command and a parameter necessary at the time of execution. Hereinafter, the SQ entry information field corresponding to a write command and the SQ entry information field corresponding to a trim command will be specifically described.

(SQ Entry Information Field Corresponding to Write Command)

The SQ entry information field corresponding to a write command indicates, for example, a command operation code, a data pointer, a command ID, a namespace ID, an LBA, and a data length.

The command operation code is a code indicative of a type of a corresponding command (here, the write command). As the command operation code, for example, Opcode defined in the NVMe standard is used.

The data pointer is information indicative of a location in the host 2 where user data to be written in accordance with the corresponding write command is stored. As the data pointer, for example, a Physical Region Page (PRP) entry or a list thereof, or a Scatter Gather List (SGL), either of which is defined in the NVMe standard is used. In a case where the PRP is used, a pointer to a list of PRP entries is stored in the SQ entry information field. In a case where the SGL is used, an address indicative of a first SGL segment of the SGL is stored in the SQ entry information field, and only a descriptor indicative of a second segment and the size is stored in the first segment. Note that the list of PRP entries, or the second and subsequent segments of the SGL are stored in the pointer list 244.

First, the PRP will be described in detail. The PRP is used to map a storage area of user data that corresponds to a contiguous logical address range of a logical address space, to physical address ranges of a physical address space.

FIG. 3 illustrates an example of mapping between a logical address space 91 and a physical address space 92. The logical address space 91 is a space of logical addresses (as described above, for example, LBAs) used by the host 2 to address the memory system 3. In this example, the physical address space 92 is a space of physical addresses to address a storage area of the data buffer 241. Each of the logical and physical address spaces 91 and 92 is divided, for example, in units of page sizes. A page of the logical address space 91 (hereinafter also referred to as a logical page) and a page of the physical address space 92 (hereinafter also referred to as a physical page) are mapped on a one-to-one basis. Note that the physical address space 92 is generally narrower than the logical address space 91. Contiguous logical addresses of the logical address space 91 may be mapped to discrete physical addresses of the physical address space 92. The memory system 3 accesses the data buffer 241 of the host 2 by using a physical address. Therefore, the host 2 needs to convert a logical address range of the logical address space 91, which is indicated only by a start logical address and a data length in a write command, into physical address ranges of the physical address space 92 and send the physical address range to the memory system 3. These physical addresses are data called PRP entries.

FIG. 4 illustrates an example of the structure of the PRP entry. The PRP entry represents one physical address as a whole. The data size of the PRP entry is, for example, 8 bytes (=64 bits). The PRP entry includes two regions, a base address and an offset. The region of the base address represents the start physical address of a certain physical page. The size of the region of the base address is, for example, 52 bits. The region of the offset indicates an offset from the start location of the physical page. The size of the region of the offset is, for example, 12 bits.

Hereinafter, a physical page whose base address is a physical address N is also referred to as a physical page N. Note that, for example, in a case where the data size of one PRP entry is 8 bytes, the offset needs to match an 8-byte boundary (that is, lower 3 bits of the offset are zeros) so that the last PRP entry in a certain physical page does not span a physical page boundary.

FIG. 5 illustrates an example in which the user data area illustrated in FIG. 3 is indicated by PRP entry lists. As illustrated in (A) of FIG. 5, a data pointer area of one I/O command (write command) may include two PRP entry fields 921 and 922.

The first PRP entry field 921 includes a base address of the first physical page in which the user data is stored and an offset indicative of a start location of the user data within the physical page.

The second PRP entry field 922 is used in a case where the size of the user data is larger than the size of the storage area in the data buffer 241 that is indicated by the first PRP entry. In a case where the size of the user data is smaller than the sum of the size of the storage area indicated by the first PRP entry and the size of a second physical page, the second PRP entry field 922 includes a base address of the second physical page. In this case, since the user data is stored from the head of the second physical page, the offset is zero.

In a case where the user data spans three or more pages, the second PRP entry field 922 includes a physical address at which a PRP entry list containing the second and subsequent PRP entries is stored. The PRP entry list is the pointer list 244.

In the example illustrated in FIG. 3 and (A) of FIG. 5, the first PRP entry field 921 indicates that the head of the user data is stored at a location of an offset α within a physical page D, that is, at a physical address D+α.

In the example illustrated in FIG. 3 and (A) of FIG. 5, the second PRP entry field 922 indicates that the list of the second and subsequent PRP entries is stored from the location of an offset λ within a physical page X (not illustrated in FIG. 3), that is, from a physical address X+λ.

As illustrated in (B) of FIG. 5, the second and subsequent PRP entries in the list that are stored from the physical address X+λ, indicate a physical page A, a physical page B, a physical page C, a physical page (C+1), . . . , and a physical page (C+n−1), respectively, that store the user data. In a case where the PRP entry list cannot be completely stored in the physical page X, the last PRP entry stored in the physical page X indicates a physical address of a physical page (page Y in the example illustrated in (B) of FIG. 5) in which the next PRP entry list is stored, instead of indicating a physical address at which the user data is stored. In a case where the data size of a PRP entry is 8 bytes and the size of one physical page is 4 KiB, one physical page may store 512 PRP entries. In the example illustrated in (B) of FIG. 5, since the PRP entries are stored from the head of the physical page Y, the offset of this PRP entry is zero.

An area in which a PRP entry list is stored is also a contiguous area in the logical address space 91. A PRP entry list may be stored from the middle of the first logical page among logical pages in which the PRP entry list is stored. In addition, the PRP entry list may be stored to the middle of the last logical page. On the other hand, the PRP entry list is necessarily stored from the head to the end of each middle logical page. Even when physical pages in which the PRP entry list is stored are not contiguous in the physical address space 92, the second and subsequent PRP entries in the list are necessarily stored from the head of a physical page.

Specifically, as illustrated in (C) of FIG. 5, the last portions of the PRP entry list stored at the physical address Y indicate a physical page (C+n), a physical page (C+q), and a physical page E, respectively, that store the user data. The number of PRP entries that are generated to indicate the area of user data corresponds to the number of one or more physical pages that stores data to be transferred in accordance with an I/O command. Since the size of a physical page is larger than the size of a sector, the user data may be stored only halfway in the physical page that is indicated by the last PRP entry.

Next, the SGL will be described in detail. The SGL is also referred to as Vectored I/O. The SGL is a data structure for enabling user data, which is stored in multiple discrete logical address ranges on the logical address space, to be written into a contiguous LBA range according to one I/O command, or for enabling user data, which is stored in a contiguous LBA range, to be read to multiple discrete logical address ranges according to one I/O command.

FIG. 6 illustrates an example of the SGL. The SGL includes one or more SGL segments (pointer list 244). Each SGL segment is a contiguous region aligned on a boundary between 8-byte unit regions, and includes one or more SGL descriptors.

An SGL descriptor other than the last SGL descriptor of each SGL segment is an SGL data block descriptor. The SGL data block descriptor indicates the size of an area in the data buffer 241 in which user data is stored and a start physical address of the area. The size of the one area in which the user data is stored does not need to be an integral multiple of the sector size.

The last SGL descriptor of each SGL segment is an SGL segment descriptor or an SGL last segment descriptor. The SGL segment descriptor indicates the size of an area in which a next SGL segment is stored and a start physical address of the area. The SGL last segment descriptor (the last SGL descriptor of the SGL segment N−1 in the example illustrated in FIG. 6) indicates that a next SGL segment (the SGL segment N in the example illustrated in FIG. 6) is the last SGL segment.

In a case where the SGL is used, a write command includes the address of the first SGL segment. The write command stores only one SGL descriptor. In a case where all areas of the data buffer 241 that store user data cannot be designated by the first SGL segment, the SGL segment descriptor or the SGL last segment descriptor is stored at the end of the first SGL segment.

The description returns to the description of the SQ entry information field that corresponds to the write command and is illustrated in FIG. 2.

The command ID is identification information of the corresponding write command.

The namespace ID is identification information of a namespace in which the corresponding write command is to be executed. The host 2 may use multiple logical address spaces (LBA spaces) for accessing the memory system 3. Each of the logical address spaces may be referred to as a namespace. One of the namespaces may be identified by a namespace ID.

The LBA is an LBA designated in the corresponding write command. The LBA indicates a start LBA of an LBA range to which user data is to be written in accordance with the write command.

The data length is a data length designated in the corresponding write command. The data length indicates the length of user data, which is to be written in accordance with the write command, in units of logical blocks (that is, the number of sectors). Therefore, by designating the LBA and the data length in the write command, it is possible to identify the LBA range to which the user data is to be written in accordance with the write command.

(SQ Entry Information Field Corresponding to Trim Command)

The SQ entry information field corresponding to a trim command indicates, for example, a command operation code, a data pointer, the number of ranges, a command ID, and a namespace ID.

The command operation code indicates the type of the corresponding command (trim command in this case).

The data pointer is information indicative of a location in the host 2 in which range information associated with the corresponding trim command is stored. An example of a specific configuration of the range information associated with the trim command will be described later with reference to FIG. 7.

The command ID is identification information of the corresponding trim command.

The namespace ID is identification information of a namespace in which the corresponding trim command is to be executed.

FIG. 7 illustrates an example of a configuration of the range information that is associated with the trim command. The range information is defined as, for example, a list of ranges (that is, LBA ranges) in the NVMe standard. In the range information, one range is indicated by, for example, a combination of a start LBA and a length in units of logical blocks (that is, the number of sectors). The number of ranges in the range information is equal to a number designated in the command.

As in the example illustrated in FIG. 7, the range information may include 256 ranges from Range 0 to Range 255. In the range information, fields for Context Attributes, a length in logical blocks, and a start LBA are provided for each range. Note that the Context Attributes field is provided but not used in the range information associated with the trim command.

The description returns to the description of each field of the locked data list 245 illustrated in FIG. 2.

The completion order field indicates the order in which a first completion for the corresponding write command or trim command is received. To each of one or more completions received by the host 2, a sequence number according to the received order is assigned. The completion order field indicates the sequence number assigned to the first completion for the corresponding write command or trim command.

The data region management information field indicates information capable of identifying a storage area (for example, a page) in the NVRAM 24 in which user data to be written in accordance with the corresponding write command is stored, or information capable of identifying a storage area in the NVRAM 24 in which range information associated with the corresponding trim command is stored. This information may be used, for example, to lock or unlock the identified storage area in the NVRAM 24 by using the function of the OS 221.

The completion state field indicates whether or not the first completion for the corresponding write command or trim command has been received. Note that the completion state field may be omitted, and the fact that the sequence number is stored in the completion order field may be considered to indicate that the first completion for the corresponding write command or trim command has been received.

In the entry corresponding to the write command, the pointer to modify command data field indicates a pointer to the modify command data 246 that is associated with the write command. The modify command data 246 associated with the write command indicates information related to an LBA range to which writing is canceled and that is within the LBA range designated in the write command. The pointer to the modify command data 246 associated with the write command indicates a location in the NVRAM 24 where the modify command data 246 is stored. In a case where writing to the LBA range designated in the write command is not canceled, for example, NULL is set in the pointer to modify command data field. In the entry corresponding to the trim command, for example, NULL is set in the pointer to modify command data field.

In the following description of the locked data list 245, a value indicated in the SQ entry information field is also simply referred to as SQ entry information. The same applies to values indicated in the other fields of the locked data list 245 and values indicated in fields of other tables.

FIG. 8 illustrates an example of a configuration of the modify command data 246. The modify command data 246 includes a start LBA of canceled writing, the number of sectors in which the writing has been canceled, and a pointer to the next modify command data.

On the basis of the start LBA of the canceled writing and the number of sectors in which the writing has been canceled, it is possible to specify an LBA range (hereinafter referred to as a first canceled LBA range) in which the writing has been canceled from the LBA range that was designated in the associated write command. The pointer to the next modify command data indicates a pointer to other modify command data 246 that is associated with the same write command. The other modify command data 246 indicates information related to another LBA range (hereinafter referred to as a second canceled LBA range) in which the writing has been canceled from the LBA range that was designated in the write command. That is, the other modify command data 246 indicates information related to the second canceled LBA range that is different from the first canceled LBA range and is within the LBA range designated in the write command. In a case where other modify command data 246 associated with the same write command is not present, for example, NULL is set as the pointer to the next modify command data.

On the basis of the pointer to the modify command data in the entry of the locked data list 245 and the pointer to the next modify command data in the modify command data 246, the modify command data 246 corresponding to one or more modify commands that modify the corresponding write command can be managed with a linked list structure. That is, it can be said that each entry of the locked data list 245 and each entry of the modify command data 246 constitute a modify command data list. As a result, (1) addition, (2) modification, (3) insertion, and (4) deletion of a canceled LBA range can be easily performed.

More specifically, in a case where a canceled LBA range is added first, a pointer to modify command data 246 that indicates the additional canceled LBA range is written to the pointer to modify command data that is included in the corresponding entry in the locked data list 245. In a case where a canceled LBA range is further added, to the pointer to next modify command data that is included in the corresponding entry in the modify command data 246, a pointer to other modify command data 246 that indicates the further additional canceled LBA range is written.

In a case where an LBA region contiguous with a canceled LBA range that has already been included in the modify command data list is additionally canceled, the start LBA corresponding to the existing canceled LBA range is made smaller and the data length (the number of sectors) to be canceled is increased, or only the data length (the number of sectors) to be canceled is increased.

In a case where multiple canceled LBA ranges are rearranged in ascending or descending order, a pointer (referred to as a pointer A) written in the pointer to the next modify command data, which is included in a corresponding entry in the modify command data list, is overwritten with a pointer to newly generated modify command data 246. Then, the pointer A is written to the pointer to the next modify command data in the newly generated modify command data 246.

When two entries in the modify command data 246 can be integrated into one entry, only one of the two entries is modified. Specifically, to delete an entry of the modify command data 246 that is no longer necessary (it is assumed that the pointer to the next modify command data of this entry stores a pointer B), the pointer B is written in the pointer to the next modify command data in other modify command data 246 in which a pointer to this entry has been written. As a result, an area in which the unnecessary entry of the modify command data 246 is stored can be released.

Hereinafter, such operations as (1) addition, (2) modification, (3) insertion, and (4) deletion of a canceled LBA range are referred to as registering modify command data 246 with the modify command data list.

By arranging entries in the modify command data list in ascending order or descending order of canceled LBA ranges, continuity between an existing canceled LBA range and a new canceled LBA range may be easily searched when the new canceled LBA range is registered with the modify command data list. As a result, for example, the size of the modify command data list can be easily maintained minimum. That is, the operation on the modify command data list can be simplified.

The description returns to FIG. 1. Here, programs executed by the CPU 21 will be described.

The CPU 21 executes various programs loaded from the NVRAM 24 to the RAM 22, for example. The programs executed by the CPU 21 include the OS 221, the driver 222, and the various applications 223.

The OS 221 is a program for controlling basic operations of various components in the host 2. The CPU 21 executing the OS 221 controls, for example, input/output, file management, memory management, and communication.

The driver 222 is a program for controlling a device connected to the host 2. For example, the CPU 21 executing the driver 222 transmits a command and data to the memory system 3 via the storage I/F 23. The CPU 21 executing the driver 222 receives a response to the command or data from the memory system 3 via the storage I/F 23.

The CPU 21 functions as, for example, the IO reception module 210, a command issuing module 211, a write/trim management module 212, and a recovery control module 213 by executing the driver 222. Specific operations of the IO reception module 210, the command issuing module 211, the write/trim management module 212, and the recovery control module 213 will be described later with reference to FIGS. 11 to 37. The IO reception module 210, the command issuing module 211, the write/trim management module 212, and the recovery control module 213 may be realized by a dedicated hardware in the host 2.

(Configuration Example of Memory System 3)

The memory system 3 includes, for example, a controller 4, a nonvolatile memory 5, and a DRAM 6. The controller 4 may be implemented with a circuit such as a system-on-a-chip (SoC). The controller 4 may include an SRAM. Further, the DRAM 6 may be provided inside the controller 4. The nonvolatile memory 5 is, for example, a NAND flash memory. Hereinafter, the nonvolatile memory 5 is referred to as a NAND flash memory 5.

The DRAM 6 is a volatile memory. A RAM such as the DRAM 6, includes, for example, a storage area of a firmware (FW) 61, a cache area of a logical-to-physical address conversion table 62, and a storage area of a write management table 63 and modify command data 64.

The FW 61 is a program for controlling an operation of the controller 4. The FW 61 is loaded from the NAND flash memory 5 to the DRAM 6, for example.

The logical-to-physical address conversion table 62 manages mapping between each logical address (e.g., each LBA) and each physical address of the NAND flash memory 5.

The write management table 63 manages information related to a received write command and a received trim command.

The modify command data 64 is data for managing information related to a modify command that is issued from the host 2 to the memory system 3. The configuration of the modify command data 64 is, for example, similar to the configuration of the modify command data 246 in the host 2 described above with reference to FIG. 8.

The NAND flash memory 5 includes multiple blocks. Each of the blocks includes multiple pages. The blocks each function as the minimum unit of a data erase operation. The block may also be referred to as an erasure block or a physical block. Each of the pages includes memory cells connected to a single word line. The pages each function as a unit of a data write operation and a data read operation. Note that the word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation (data program operation) to write data in each page of the block.

For example, user data and management data may be written into the NAND flash memory 5. The user data is data that is associated with a write command received from the host 2 and is to be written into the NAND flash memory 5.

The management data is data for managing the operation of the memory system 3. The management data includes, for example, information used in a flash translation layer (FTL) and a command log 51. The management data may include identification information (host ID) of the host 2 and information on a mode in which the memory system 3 is operating.

The command log 51 indicates a command ID of a command for which a corresponding process is completed. The command log 51 is used for debug of the memory system 3. The controller 4 stores a command ID to the command log 51 so that the order in which the process corresponding to the command is completed can be managed.

The controller 4 functions as a memory controller configured to control the NAND flash memory 5.

The controller 4 may function as the flash translation layer (FTL) configured to execute data management and block management of the NAND flash memory 5. The data management executed by the FTL includes (1) management of mapping data indicative of a relationship between each LBA and each physical address of the NAND flash memory 5, and (2) process to hide a difference between data read/write operations in units of page and data erase operations in units of block. The block management includes management of defective blocks, wear leveling, and garbage collection.

Management of mapping between each LBA and each physical address is executed by using the logical-to-physical address conversion table 62. The controller 4 uses the logical-to-physical address conversion table 62 to manage the mapping between each LBA and each physical address in a certain management size. A physical address corresponding to an LBA indicates a physical memory location in the NAND flash memory 5 to which data of the LBA is written. The controller 4 manages multiple storage areas that are obtained by logically dividing the storage area of the NAND flash memory 5, using the logical-to-physical address conversion table 62. The multiple storage areas correspond to multiple LBAs, respectively. That is, each of the storage areas is identified by one LBA. The logical-to-physical address conversion table 62 may be loaded from the NAND flash memory 5 to the DRAM 6 when the memory system 3 is boot up.

The data write operation into one page is executable only once in a single P/E cycle. Thus, the controller 4 writes updated data corresponding to an LBA not to an original physical memory location in which previous data corresponding to the LBA is stored but to a different physical memory location. Then, the controller 4 updates the logical-to-physical address conversion table 62 to associate the LBA with this different physical memory location rather than the original physical memory location and to invalidate the previous data. Data to which the logical-to-physical address conversion table 62 refers (that is, data associated with an LBA) will be referred to as valid data. Furthermore, data not associated with any LBA will be referred to as invalid data. The valid data is data to possibly be read by the host 2 later. The invalid data is data not to be read by the host 2 anymore.

The logical-to-physical address conversion table 62 on the DRAM 6 may function as a write-back cache. That is, when the content of the logical-to-physical address conversion table 62 on the DRAM 6 has been changed, the logical-to-physical address conversion table 62 is made nonvolatile in the NAND flash memory 5 at an appropriate time. Further, when certain user data has been written into the NAND flash memory 5, mapping between the LBA and the physical address of the user data is also made nonvolatile in the NAND flash memory 5. As a result, even if the logical-to-physical address conversion table 62 is lost from the DRAM 6, the logical-to-physical address conversion table 62 may be restored from the information that has been made nonvolatile in the NAND flash memory 5. In other words, even if power supply to the memory system 3 is shut off at a point of time when the writing of the user data into the NAND flash memory 5 is completed, the logical-to-physical address conversion table 62 that has been made nonvolatile and the written user data can be protected.

Upon receiving a trim command that designates a certain LBA, from the host 2, the controller 4 deallocates the LBA. That is, the controller 4 updates the logical-to-physical address conversion table 62 so as to delete the mapping of the LBA with a physical storage location. As a result, the controller 4 invalidates data associated with the LBA.

The controller 4 may include a host interface (host I/F) 11, a CPU 12, a NAND interface (NAND I/F) 13, a DRAM interface (DRAM I/F) 14, and a timer 15. The host I/F 11, the CPU 12, the NAND I/F 13, the DRAM I/F 14, and the timer 15 may be connected to via a bus 10.

The host I/F 11 functions as a circuit that receives various commands, for example, I/O commands, various control commands, and data from the host 2. In addition, the host I/F 11 functions as a circuit that transmits a response to a command and data to the host 2.

The NAND I/F 13 electrically connects the controller 4 and the NAND flash memory 5. The NAND I/F 13 conforms to an interface standard such as a toggle double data rate (DDR) and an open NAND flash Interface (ONFI).

The NAND I/F 13 functions as a NAND control circuit configured to control the NAND flash memory 5. The NAND I/F 13 may be connected to memory chips in the NAND flash memory 5 via multiple channels (Ch). By operating the memory chips in parallel, it is possible to broaden an access bandwidth between the controller and the NAND flash memory 5.

The DRAM I/F 14 functions as a DRAM control circuit configured to control access to the DRAM 6.

The timer 15 measures time. The timer 15 may provide the measured time to each unit in the controller 4.

The CPU 12 is a processor configured to control the host I/F 11, the NAND I/F 13, the DRAM I/F 14, and the timer 15. The CPU 12 performs various processes by executing the FW 61 loaded from the NAND flash memory 5 onto the DRAM 6. The FW 61 is a control program including instructions for causing the CPU 12 to execute various processes. The CPU 12 may perform command processes to execute various commands from the host 2. The operation of the CPU 12 is controlled by the FW 61 executed by the CPU 12.

The function of each unit in the controller 4 may be realized by a dedicated hardware in the controller 4, the CPU 12 executing the FW 61, or a combination thereof.

The CPU 12 functions as, for example, a command reception module 121 and a write/trim control module 122. The CPU 12 functions as these modules, for example, by executing the FW 61. Specific operations of the command reception module 121 and the write/trim control module 122 will be described later with reference to FIGS. 11 to 37.

Next, two tables used in the memory system 3 will be described with reference to FIGS. 9 and 10.

FIG. 9 illustrates an example of a configuration of the logical-to-physical address conversion table 62. The logical-to-physical address conversion table 62 manages mapping between each LBA and each physical address of the NAND flash memory 5. The controller 4 may convert an LBA into a physical address by using the logical-to-physical address conversion table 62. Further, the controller 4 may convert a physical address into an LBA by using the logical-to-physical address conversion table 62.

In the example illustrated in FIG. 9, a physical address "A", a physical address "B", and a physical address "C" are mapped to an LBA "0", an LBA "1", and an LBA "2", respectively.

FIG. 10 illustrates an example of a configuration of the write management table 63. The write management table 63 may include one or more entries that correspond to one or more write commands, respectively. Each entry includes, for example, a command ID field, an LBA field, a data length field, a data pointer field, and a pointer to modify command data field.

The command ID field indicates a command ID of a corresponding write command

The LBA field indicates an LBA designated in the corresponding write command. The LBA indicates a start LBA of an LBA range in which user data is to be written in accordance with the write command.

The data length field indicates a data length designated in the corresponding write command. The data length indicates the length of the user data that is to be written in accordance with the write command. The LBA range in which the user data is to be written in accordance with the write command is identified by using the LBA and the data length designated in the write command.

The data pointer field indicates a data pointer designated in the corresponding write command. The data pointer indicates a location in the host 2 where the user data that is to be written into the NAND flash memory 5 in accordance with the write command is stored, or a location where the pointer list 244, which indicates a location in the host 2 where the user data is stored, is stored. That is, the controller 4 acquires the user data from the location in the host 2 that is directly or indirectly indicated by the data pointer.

The pointer to modify command data field indicates a pointer to the modify command data 64 that is associated with the corresponding write command. The modify command data 64 associated with the write command indicates information related to an LBA range in which writing has been canceled from the LBA range designated in the write command. A pointer to the modify command data 64 associated with the write command indicates a location in the DRAM 6 where the modify command data 64 is stored. In a case where writing to the LBA range designated in the write command is not canceled, for example, NULL is set in the pointer to modify command data field.

Next, examples of several operations performed in the information processing system 1 will be described with reference to FIGS. 11 to 37.

(First Example of Write Operation)

First, a first example of a write operation in the information processing system 1 will be described with reference to FIGS. 11 to 18. The write operation is an operation for transmitting a write command from the host 2 to the memory system 3 and writing user data associated with the write command into the NAND flash memory 5.

Here, the submission queue 242 and the completion queue 243 that are provided in the NVRAM 24 of the host 2 will be described. The host 2 transmits a command to the memory system 3 via the submission queue 242. The memory system 3 returns a completion for a command to the host 2 via the completion queue 243.

The submission queue 242 includes multiple slots in which the host 2 stores commands, respectively, which are issued from the host 2 to the memory system 3. A location in the submission queue 242 (that is, a slot) to which the host 2 should store a command is indicated by an SQ Tail pointer. A location in the submission queue 242 from which the memory system 3 should fetch a command is indicated by an SQ Head pointer.

The completion queue 243 includes multiple slots to which the memory system 3 stores responses to commands, respectively. A location in the completion queue 243 to which the memory system 3 should store a response is indicated by a CQ Tail pointer. A location in the completion queue 243 from which the host 2 should fetch a response is indicated by a CQ Head pointer.

An example of a specific write operation in the host 2 and the memory system 3 will be described below. In the example illustrated in FIGS. 11 to 18, a case where commands written to the submission queue 242 are only write commands will be explained for easy understanding.

Figure 11:
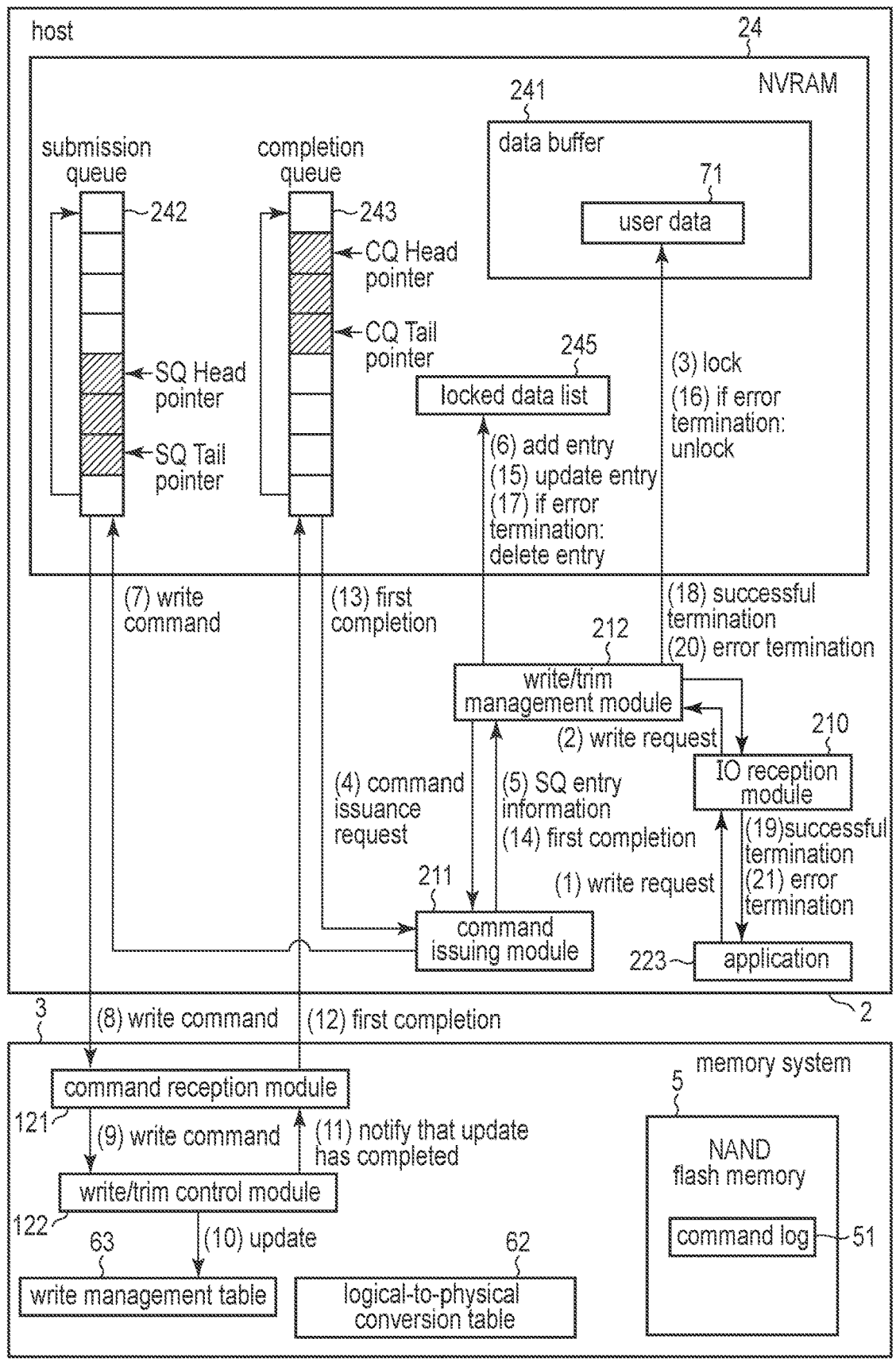
FIG. 11 is a block diagram illustrating an example of a write operation in the information processing system that includes the information processing apparatus according to the first embodiment.

FIG. 11 illustrates an example of the write operation in the information processing system 1. Here, a case where the IO reception module 210 of the host 2 receives a write request to write user data 71 into the NAND flash memory 5 will be explained. This write request is, for example, a write request by the application 223 that is executed by the CPU 21.

First, in the host 2, the IO reception module 210 receives the write request by the application 223 ((1) in FIG. 11). The IO reception module 210 sends the received write request to the write/trim management module 212 ((2) in FIG. 11). The write/trim management module 212 locks the user data 71 in the data buffer 241 that is stored by using a function of the application 223 or the OS 221 and is requested to be written ((3) in FIG. 11). More specifically, the write/trim management module 212 locks a storage area (for example, a page) in which the user data 71 is stored by using the function of the OS 221. This prevents the storage area storing the user data 71 from being unintentionally released or paged out. Further, the write/trim management module 212 inhibits writing to the storage area in which the user data 71 is stored by using the function of the OS 221.

As will be described later, the application 223 is notified of completion of the write request before the writing of the user data 71 into the NAND flash memory 5 is completed. After notified of the completion of the write request, the application 223 recognizes that the writing is completed, and thus there is a possibility that the storage area in which the user data 71 is stored is used for another purpose or is overwritten with other data. Therefore, in order to prevent the user data 71 that has not been actually written into the NAND flash memory 5 from being lost from the data buffer 241, the storage area in which the user data 71 is stored is locked and is set to be write-inhibited.

Here, a memory management mechanism of the OS 221 will be described.

The CPU 21 of the host 2 may include, for example, a memory management unit (MMU). The MMU manages mapping between each logical address for the application 223 executed by the CPU 21 to access a physical memory and each address (physical address) on the physical memory. The physical memory is, for example, the RAM 221 or the NVRAM 24. The access to the physical memory is, for example, the reading of data from the physical memory or the writing of data to the physical memory. When the application 223 requests access to the physical memory by using a logical address, the MMU converts the logical address into a physical address. The physical memory is accessed on the basis of the physical address obtained by the conversion.

The unit of mapping between the logical address and the physical address is, for example, a page. To a page accessed with the logical address (that is, the logical page described above with reference to FIG. 3), a page in the memory accessed with the physical address (that is, the physical page described above with reference to FIG. 3) may be mapped.

The MMU may manage multiple logical pages. The storage capacity of a virtual memory corresponding to the logical pages may be larger than the storage capacity of the physical memory. The OS 221 executed by the CPU 21 allocates a physical page to, for example, only a logical page actually used among the logical pages. As a result, the application 223 can operate as if it had a memory having a storage capacity larger than that of the physical memory.

The MMU manages attribute information of each of the logical pages. The attribute information of a logical page includes, for example, information indicating whether or not a physical page is mapped, information indicating whether or not the logical page is writable, a bit (or, a flag) that is set in response to the logical page having been accessed, a dirty bit that is set in response to writing to the logical page having been performed, a bit (or, a flag) that inhibits the unmapping of the physical page (that is, a bit that inhibits page-out), or information indicating an address of the corresponding physical page. When the application 223 requests access to a logical page to which a physical page is not mapped or requests writing to a logical page that is not writable, an interrupt occurs to the CPU 21 on the basis of the attribute information. The OS 221 can perform an appropriate process in accordance with the interrupt.

Figure 12:
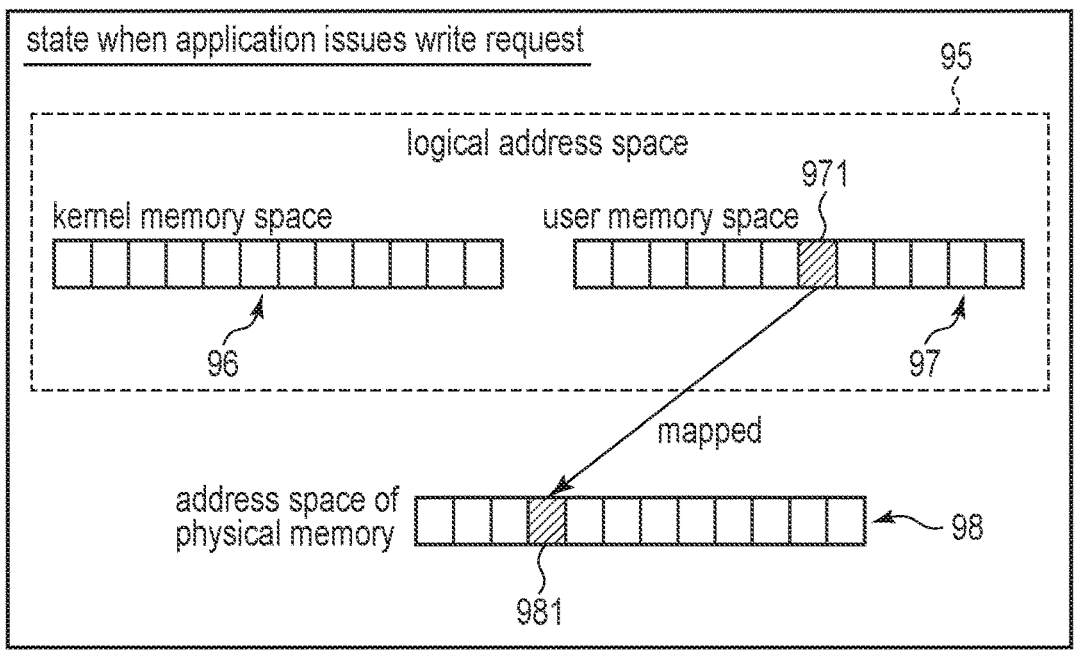
FIG. 12 is a diagram illustrating an example of a state of the logical address space and the physical address space when an application issues a write request, in the information processing apparatus according to the first embodiment.

FIG. 12 is a diagram illustrating an example of states of a logical address space 95 and a physical address space 98 at a point of time when the application 223 issues a write request. The logical address space 95 is a space of logical addresses that are managed by the MMU. The physical address space 98 is a space of physical addresses that are managed by the MMU. The logical address space 95 includes a kernel memory space 96 and a user memory space 97. The application 223 accesses the physical memory via the user memory space 97.

In FIG. 12, each cell of the logical address space 95 and each cell of the physical address space 98 represents a logical page and a physical page, respectively. A logical page 971 is a logical page in which the user data 71 is logically stored. A physical page 981 is a physical page in which the user data 71 is physically stored. The logical page 971 is mapped to the physical page 981. Although FIG. 12 illustrates the single the mapping of the logical page 971 to the physical page 981, multiple logical pages may be mapped to physical pages, respectively. Although not illustrated, a physical page is also mapped to a logical page of the user memory space 97 that does not include the user data 71 used by the application 223. A physical page is also mapped to a logical page of the kernel memory space 96 that is used.

The user memory space 97 is independent for each process. On the other hand, the IO reception module 210 and the like operate in a kernel mode, and is capable of accessing not only the user memory space 97 but also the virtual kernel memory space 96. The kernel memory space 96 is common to the applications 223, but cannot be directly accessed from the applications 223. Instead, after the application 223 requests a system call to switch to the kernel mode, the kernel memory space 96 is accessed with the requested system call. Furthermore, a portion of the OS 221 that operates in the kernel mode accesses the kernel memory space 96.

Figure 13:
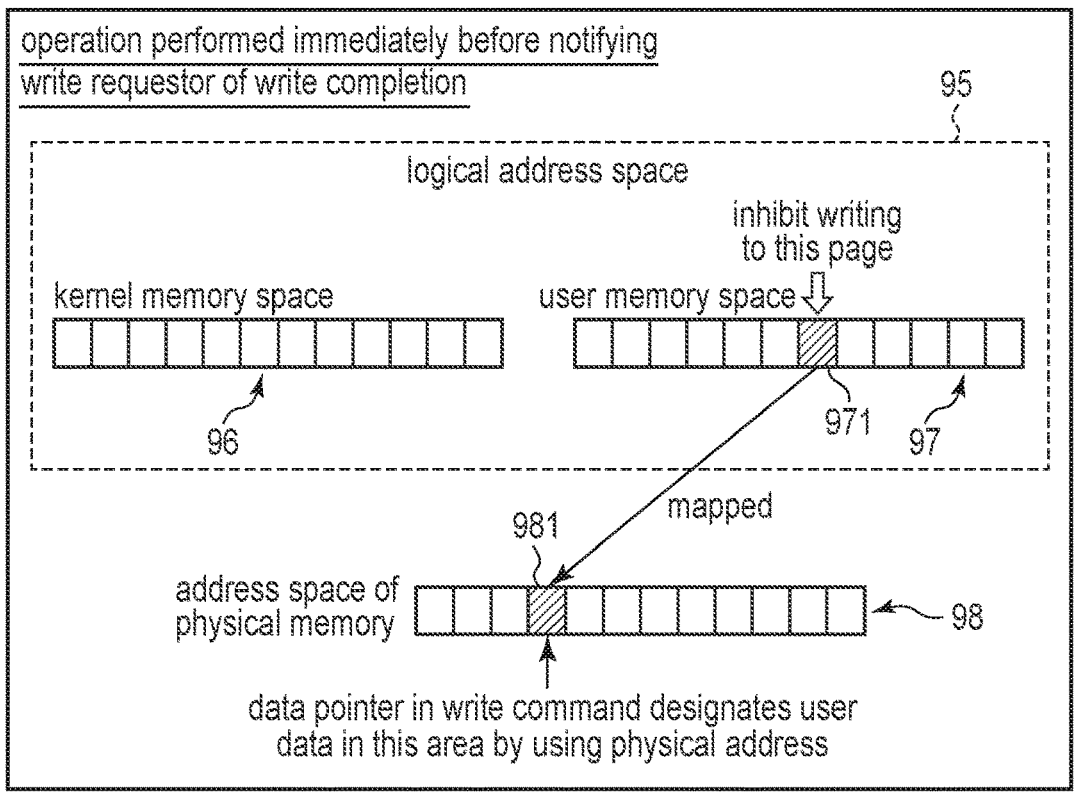
FIG. 13 is a diagram illustrating an example of an operation performed immediately before notifying a write requestor of write completion in the information processing apparatus according to the first embodiment.

FIG. 13 illustrates an example of an operation performed by the write/trim management module 212 immediately before the IO reception module 210 notifies a write requestor (for example, the application 223) of the completion of a write request. For example, immediately before the IO reception module 210 notifies the write requestor of the completion of the write request, the write/trim management module 212 inhibits writing to the logical page 971, which includes the user data 71, by using the function of the OS 221. In the pointer list 244, the location of the user data 71 is described with a physical address (physical page 981). The write inhibition operation is performed before the IO reception module 210 notifies the write requestor of the completion of the write request. For example, when the write/trim management module 212 has received, from the memory system 3, a first completion for a write command corresponding to the write request and the received completion is a successful response, the write/trim management module 212 performs the write prohibition operation. Although FIG. 13 illustrates a case where the user data 71 is present only in one logical page, the user data 71 may be present in multiple logical pages. In that case, each of the logical pages is mapped to a different physical page.

Note that the user data 71 may be stored in the RAM 22 by using the function of the application 223 or the OS 221. In a case where the user data 71 is stored in the RAM 22, the IO reception module 210 copies the user data 71 from the RAM 22 to the data buffer 241 of the NVRAM 24, and then sends the write request to the write/trim management module 212. In this case, since there is no possibility that other data is written later by the application 223 or the like, which is a write requestor, to an area in the NVRAM 24 to which the user data 71 has been copied, the area may not be write-inhibited.

The description returns to FIG. 11. The write/trim management module 212 requests the command issuing module 211 to issue a write command corresponding to the write request ((4) in FIG. 11). The command issuing module 211 issues the write command for writing the user data 71 in accordance with the write request by the write/trim management module 212. That is, the command issuing module 211 generates SQ entry information equivalent to the write command for writing the user data 71. The command issuing module 211 sends the generated SQ entry information to the write/trim management module 212 ((5) in FIG. 11).

The write/trim management module 212 generates an entry of the locked data list 245 by using the SQ entry information sent by the command issuing module 211. The generated entry includes, for example, the SQ entry information equivalent to the issued write command, and data region management information. The data region management information is information capable of identifying a storage area in the data buffer 241 in which the user data 71 is stored. The write/trim management module 212 adds the generated entry to the locked data list 245 ((6) in FIG. 11).

FIG. 14 illustrates an example of the locked data list 245 to which the entry is added in the operation of (6) in FIG. 11. The locked data list 245 includes the added entry 81.

In the example illustrated in FIG. 14, the entry 81 includes SQ entry information "sqentry_info1" equivalent to the issued write command and data region management information "region_info1" indicative of the storage area in the data buffer 241 in which the user data 71 associated with the write command is stored. Note that the entry 81 does not yet include a completion order and a completion state.

The description returns to FIG. 11. Next, the command issuing module 211 stores the issued write command (SQ entry information) to the submission queue 242 ((7) in FIG. 11). The operation of storing a command in the submission queue 242 will be described more specifically. First, the command issuing module 211 writes a command (here, the write command) in a slot in the submission queue 242 indicated by the SQ Tail pointer. The command issuing module 211 adds one to the SQ Tail pointer. When the value obtained by adding one to the SQ Tail pointer reaches the number of slots in the submission queue 242 (that is, the queue size), the command issuing module 211 sets the SQ Tail pointer to zero. Then, the command issuing module 211 writes the updated value of the SQ Tail pointer into an SQ Tail doorbell register of the memory system 3. As described above, the operation of storing a command in the submission queue 242 includes the operation of writing the command in the submission queue 242 and the operation of updating the SQ Tail pointer.

When the SQ Tail doorbell register is updated, in response to the update, the command reception module 121 of the memory system 3 acquires the write command from the submission queue 242 ((8) in FIG. 11). Then, the command reception module 121 sends the acquired write command to the write/trim control module 122 ((9) in FIG. 11). Here, the operation of acquiring a command from the submission queue 242 will be described more specifically. First, when there is a difference between the SQ Head pointer and the SQ Tail pointer, the command reception module 121 fetches a command (here, the write command) from a slot in the submission queue 242 indicated by the SQ Head pointer. The command reception module 121 adds one to the SQ Head pointer. When the value obtained by adding one to the SQ Head pointer reaches the number of slots in the submission queue 242, the command reception module 121 sets the SQ Head pointer to zero. As described above, the operation of acquiring a command from the submission queue 242 includes the operation of fetching the command from the submission queue 242 and the operation of updating the SQ Head pointer.

Next, the write/trim control module 122 updates the write management table 63 by using the write command sent by the command reception module 121 ((10) in FIG. 11). Specifically, the write/trim control module 122 adds, to the write management table 63, an entry that includes a command ID, an LBA, a data length, and a data pointer which are designated in the write command. Note that the write/trim control module 122 adds the entry to the write management table 63 after confirming that the LBA designated in the write command is valid, that data can be written to the LBA, or that the data pointer is valid. The data pointer is regarded as valid, for example, in a case where the data pointer does not indicate an inaccessible area in the host 2 and indicates an area that matches with the data length. Then, the write/trim control module 122 notifies the command reception module 121 that the update of the write management table 63 based on the write command has completed ((11) in FIG. 11).

In response to the notification from the write/trim control module 122, the command reception module 121 stores a first completion (completion indicative of successful termination) for the write command in the completion queue 243 ((12) in FIG. 11). This first completion includes the command ID of the write command. In addition, this first completion may include the updated SQ Head pointer.

The operation of storing a completion in the completion queue 243 will be described more specifically. First, the command reception module 121 writes the completion in a slot in the completion queue 243 indicated by the CQ Tail pointer. At this time, the writing of the completion is completed by inverting the value of the Phase Tag field of this slot. The host 2 reads the value of the Phase Tag field, thereby recognizing a location in the completion queue 243 indicated by the CQ Tail pointer. The command reception module 121 adds one to the CQ Tail pointer. When the value obtained by adding one to the CQ Tail pointer reaches the number of slots in the completion queue 243, the command reception module 121 sets the CQ Tail pointer to zero. Then, the command reception module 121 issues an interrupt. Note that the command reception module 121 may issue the interrupt after writing multiple completions in the completion queue 243. By issuing the interrupt, the command reception module 121 notifies the host 2 that there is a new completion to be processed in the completion queue 243. As described above, the operation of storing a completion in the completion queue 243 includes the operation of writing the completion in the completion queue 243, the operation of updating the CQ Tail pointer, and the operation of issuing an interrupt. As described above, the operation of updating the CQ Tail pointer may include an operation of notifying the host 2 of the updated SQ Head pointer. Hereinafter, performing the series of operations is also referred to as notifying the host 2 of a completion.

Note that in a case where the write command acquired from the submission queue 242 is an inexecutable command, the command reception module 121 may store a completion indicative of an error termination in the completion queue 243 as the first completion.

Next, the command issuing module 211 of the host 2 acquires the first completion for the write command from the completion queue 243 ((13) in FIG. 11). Then, the command issuing module 211 sends the acquired first completion to the write/trim management module 212 ((14) in FIG. 11).

Here, the operation of acquiring a completion from the completion queue 243 will be described more specifically. First, the command issuing module 211 fetches the completion from a slot in the completion queue 243 indicated by the CQ Head pointer, in response to an interrupt issued by the command reception module 121 of the memory system 3. The command issuing module 211 adds one to the CQ Head pointer. When the value obtained by adding one to the CQ Head pointer reaches the number of slots in the completion queue 243, the command issuing module 211 sets the CQ Head pointer to zero. Further, the value of the Phase Tag field of the slot from which the completion has been fetched is the same as the value of the Phase Tag field (inverted value when the CQ Head pointer becomes zero) of the slot (also referred to as the next slot) indicated by the updated CQ Head pointer, the command issuing module 211 fetches a completion from the next slot and updates the CQ Head pointer again. After fetching all completions from slots that have the same value in the Phase Tag fields in a similar way, the command issuing module 211 writes the value of the updated CQ Head pointer into a CQ Head doorbell register of the memory system 3. Then, the command issuing module 211 clears the interrupt received from the memory system 3. As described above, the operation of acquiring a completion from the completion queue 243 includes the operation of fetching the completion from the completion queue 243, the operation of updating the CQ Head pointer, and the operation of clearing the interrupt.

In a case where the first completion is a completion indicative of a successful termination, the write/trim management module 212 receives the first completion from the command issuing module 211 and updates the entry in the locked data list 245 that corresponds to the received first completion ((15) in FIG. 11). Specifically, the write/trim management module 212 assigns, to the received first completion, a sequence number indicating the order of reception. For example, the sequence number increases by one every time a first completion for a write command is received from the memory system 3. In addition, the write/trim management module 212 acquires the command ID included in the received first completion. The write/trim management module 212 identifies an entry in the locked data list 245 that includes SQ entry information corresponding to the acquired command ID. The write/trim management module 212 adds, to the identified entry, the assigned sequence number (that is, information indicating the order of reception) and information indicating that the first completion has been received.

In a case where the first completion is a completion indicating an error termination, the write/trim management module 212 unlocks the user data 71 in the data buffer 241 that corresponds to the received first completion ((16) in FIG. 11). Then, the write/trim management module 212 deletes an entry corresponding to the received first completion from the locked data list 245 ((17) in FIG. 11).

More specifically, the write/trim management module 212 acquires a command ID included in the received first completion. The write/trim management module 212 identifies an entry in the locked data list 245 that includes SQ entry information corresponding to the acquired command ID. The write/trim management module 212 unlocks the user data 71 associated with the write command with the error termination, by using the data region management information in the identified entry. In addition, in a case where a list of PRP entries or second and subsequent segments of SGL were created, the write/trim management module 212 also releases an area of the pointer list 244 in which the list or the segments are stored. Then, the write/trim management module 212 deletes the identified entry from the locked data list 245 (that is, deletes the identified entry from the NVRAM 24). In addition, in a case where a storage area in which the user data 71 is stored is locked or write-inhibited, the write/trim management module 212 cancels the lock or the write inhibit.

Note that, in a case where the user data 71 stored in the storage area for which the lock or the write-inhibit has been canceled is data copied by the IO reception module 210, the IO reception module 210 deletes the user data 71 from the data buffer 241. Specifically, other data may be stored in this storage area. In a case where the user data 71 is not data copied by the IO reception module 210, the application 223 or the OS 221 determines whether to reuse or release the storage area.

Hereinafter, for a certain write command, a series of operations of unlocking the associated user data 71, deleting the corresponding entry in the locked data list 245, releasing the corresponding area of the pointer list 244, canceling the lock or write-inhibit of the storage area including the user data 71, and deleting the user data 71 as described above is also referred to as an entry deletion operation for the write command.

FIG. 15 illustrates an example of the locked data list 245 in which an entry has been updated in the operation of (15) in FIG. 11. The locked data list 245 includes the updated entry 81.

In the example illustrated in FIG. 15, a completion order "cseq1" indicative of the order of reception and a completion state "completed" indicating that the first completion has been received are added to the entry 81. That is, the entry 81 indicates that the first completion has been received with the completion order "cseq1".

When the update of the locked data list 245 is completed, the write/trim management module 212 returns a response to the write request generated from the application 223 or the OS 221. Specifically, in a case where the first completion indicates a successful termination, the write/trim management module 212 notifies the IO reception module 210 that writing is completed (successful termination) ((18) in FIG. 11). Then, the IO reception module 210 notifies the application 223 or the OS 221 that writing is completed ((19) in FIG. 11). With this write completion notification, the application 223 or the OS 221 can advance processing even though writing to the NAND flash memory 5 is not actually completed in the memory system 3. As a result, although the memory system 3 does not have a write cache with PLP, the application 223 and the OS 221 recognize the memory system 3 as if the memory system 3 had a write cache with PLP.

On the other hand, when the first completion indicates an error termination (i.e., improper termination), the write/trim management module 212 notifies the IO reception module 210 of the error termination ((20) in FIG. 11). Then, the IO reception module 210 notifies the application 223 or the OS 221 of the error termination ((21) in FIG. 11). As described above, there may be a case where the application 223 or the OS 221 stores the user data 71 to the RAM 22 first, and then the IO reception module 210 copies the user data 71 from the RAM 22 to the NVRAM 24. In this case, the application 223 or the OS 221 can release an area in the RAM 22 in which the user data 71 is stored, in response to receiving the first completion indicative of the error termination, and use the area for another purpose. In addition, the IO reception module 210 can release an area in the NVRAM 24 in which the user data 71 is stored and use the area for storing other data.

Figure 16:
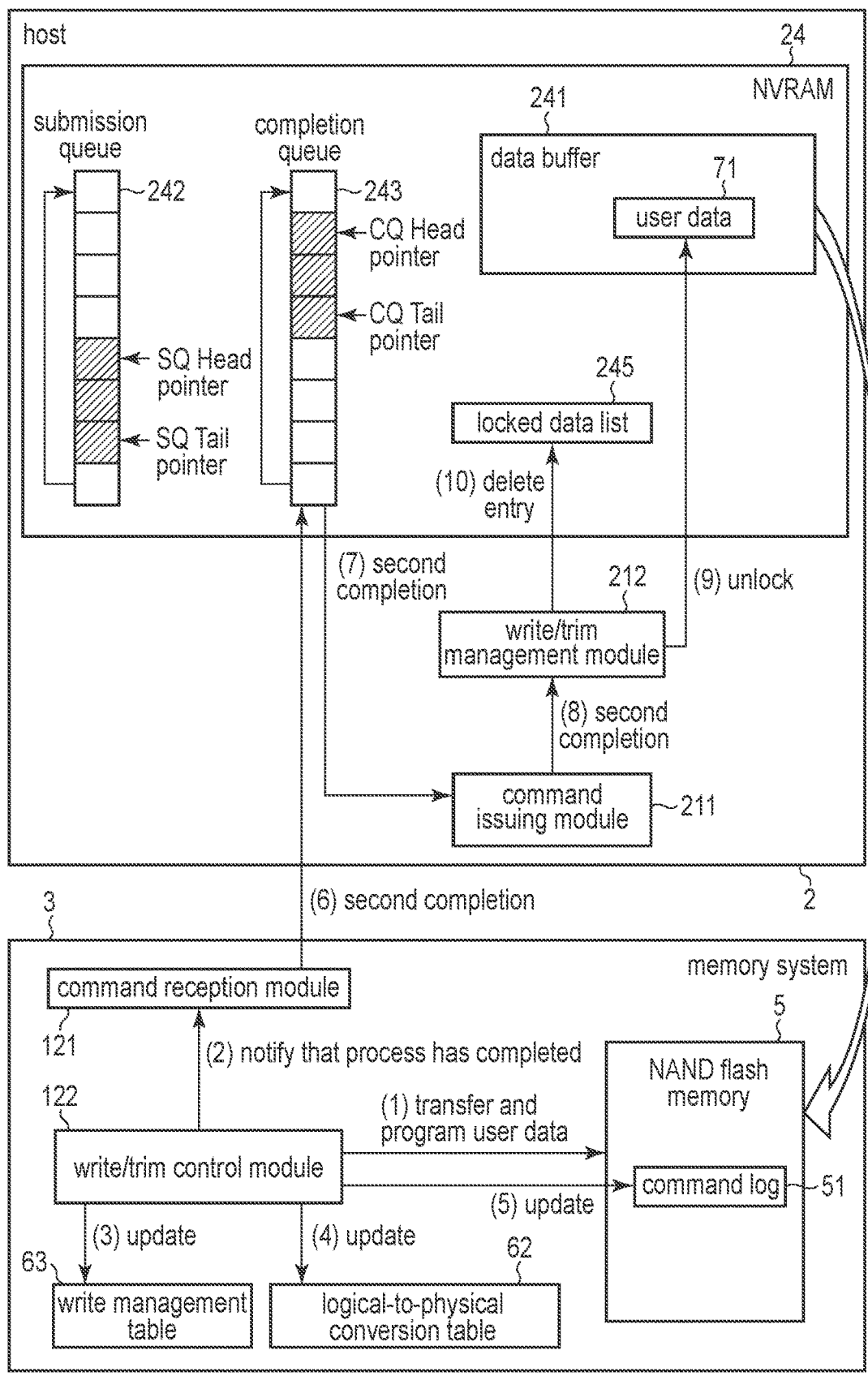
FIG. 16 is a block diagram illustrating another example of the write operation in the information processing system that includes the information processing apparatus according to the first embodiment.

FIG. 16 illustrates an example of the write operation subsequent to FIG. 11. Here, a case where the total amount of user data 71 requested to be written by write commands that are received by the memory system 3 from the host 2 reaches a specific data unit will be explained. The specific data unit is, for example, the amount of data that is writable to the NAND flash memory 5 in a single data write operation.

In the memory system 3, after the total amount of the user data 71 requested to be written by write commands that are received from the host 2 reaches the specific data unit, the command reception module 121 and the write/trim control module 122 write the user data 71 of the specific data unit into the NAND flash memory 5 and return second completions that correspond to the write commands, respectively, to the host 2. That is, the command reception module 121 and the write/trim control module 122 operate according to a mechanism (i.e., delayed write completion) in which writing in accordance a single write command is not immediately executed but writing in accordance with multiple write commands is executed after the total amount of user data 71 requested to be written by the multiple write commands reaches the specific data unit.

Specifically, the write/trim control module 122 transfers the user data 71 of the specific data unit (i.e., write unit) from the data buffer 241 to the NAND flash memory 5, and writes (programs) the transferred user data 71 of the write unit into the NAND flash memory 5 ((1) in FIG. 16). Then, in a case where there is a write command for which the whole of the corresponding user data 71 is readable from the NAND flash memory 5, the write/trim control module 122 notifies the command reception module 121 of completion of processing in accordance with the write command ((2) in FIG. 16). The write/trim control module 122 notifies the command reception module 121 of completion of processing in accordance with each of the write commands that correspond to the user data 71 of the write unit. The write/trim control module 122 deletes entries that correspond to the write commands, respectively, from the write management table 63 ((3) in FIG. 16). The write/trim control module 122 updates the logical-to-physical address conversion table 62 on the basis of processing in accordance with each of the write commands ((4) in FIG. 16). Specifically, the write/trim control module 122 updates the logical-to-physical address conversion table 62 so as to associate an LBA designated in each of the write commands with a physical storage location where the corresponding user data 71 has been written. In addition, the write/trim control module 122 adds command IDs of the respective write commands to the command log 51 ((5) in FIG. 16).

Whenever receiving the notification from the write/trim control module 122, the command reception module 121 transmits, to the host 2, a second completion indicating that processing in accordance with a corresponding write command has completed ((6) in FIG. 16). More specifically, the command reception module 121 stores the second completion for the corresponding write command in the completion queue 243 in response to the notification from the write/trim control module 122. The notification from the write/trim control module 122 includes, for example, a command ID of a write command for which processing has completed.

Note that in a case where an error occurs in processing in accordance with a write command, the command reception module 121 transmits a completion indicating the error as the second completion to the host 2.

Next, the command issuing module 211 of the host 2 acquires the second completion from the completion queue 243 ((7) in FIG. 16). Then, the command issuing module 211 sends the acquired second completion to the write/trim management module 212 ((8) in FIG. 16).

The write/trim management module 212 receives the second completion from the command issuing module 211 and unlocks the user data 71 in the data buffer 241 corresponding to the received second completion ((9) in FIG. 16). Then, the write/trim management module 212 deletes the entry corresponding to the received second completion from the locked data list 245 ((10) in FIG. 16).

More specifically, the write/trim management module 212 acquires a command ID included in the received second completion. The write/trim management module 212 identifies an entry in the locked data list 245 that includes SQ entry information corresponding to the acquired command ID. By using data region management information in the identified entry, the write/trim management module 212 unlocks the user data 71 which has been written. In addition, in a case where a list of PRP entries or second and subsequent segments of SGL were created, the write/trim management module 212 also releases an area of the pointer list 244 in which the list or the segments are stored. Then, the write/trim management module 212 deletes the identified entry from the locked data list 245 (that is, deletes the identified entry from the NVRAM 24). In addition, in a case where a storage area in which the user data 71 is stored is locked or write-inhibited, the write/trim management module 212 cancels the lock or the write inhibit. Note that, in a case where the user data 71 stored in the storage area for which the lock or the write-inhibit has been canceled is data copied by the IO reception module 210, the IO reception module 210 deletes the user data 71 from the data buffer 241. Specifically, other data may be stored in this storage area. When the user data 71 is not data copied by the IO reception module 210, the application 223 or the OS 221 determines whether to reuse or release the storage area. That is, in accordance with the second completion, the write/trim management module 212 and the IO reception module 210 perform an entry deletion operation for the corresponding write command.

In a case where the second completion indicates an error, the host 2 (specifically, the command issuing module 211, the write/trim management module 212, and the IO reception module 210) regards the error as a failure of the memory system 3. The host 2 stops processing for the memory system 3 and performs exception processing of the information processing system 1. For example, the write/trim management module 212 deletes any data related to the memory system 3. The data to be deleted includes the user data 71 in the data buffer 241 corresponding to the memory system 3 and the locked data list 245 corresponding to the memory system 3. In addition, in a case where a storage area in which the user data 71 is stored is locked or write-inhibited, the write/trim management module 212 cancels the lock or the write-inhibit. In addition, the command issuing module 211 stops at least transmitting a write command and a trim command to the memory system 3 regarded as failure. Further, the IO reception module 210 responds with errors to all write requests and trim requests from the application 223 or the OS 221.

Note that in a case where writing to the memory system 3 is not possible but reading from the memory system 3 is possible, the host 2 may protect data before deleting any data related to the memory system 3. For example, the host 2 copies data stored in all addresses of the memory system 3 to another memory system, and then overwrites the user data 71 stored in the data buffer 241 with the copied data. As a result, the host 2 can protect all the user data that is made nonvolatile in the nonvolatile memory (NVRAM 24) in the host 2 and the nonvolatile memory (NAND flash memory 5) in the memory system 3 when the memory system 3 fails.

Figure 17:
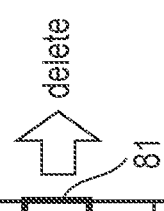
FIG. 17 is a diagram illustrating a third example of the locked data list that is updated in the information processing apparatus according to the first embodiment.

FIG. 17 illustrates an example of the locked data list 245 from which an entry is deleted in the operation of (10) in FIG. 16. The locked data list 245 includes the entry 81 corresponding to the received second completion.

In the example illustrated in FIG. 17, the entry 81 includes the SQ entry information "sqentry_info1", the completion order "cseq1", the data region management information "region_info1", and the completion state "completed". That is, the entry 81 is an entry indicating that the first completion has been received. The entry 81 is deleted in response to receiving the second completion for the corresponding write command (that is, the write command equivalent to the SQ entry information "sqentry_info1") from the memory system 3.

Note that a slot in the submission queue 242 in which the write command (SQ entry information) is stored may be overwritten for issuing a new command after, for example, the SQ Head pointer advances from the slot in response to receiving the first completion for the write command. In this case, in order to manage the state of processing corresponding to the new write command issued by the host 2, the SQ entry information corresponding to the new write command is stored in an entry in the locked data list 245.

In addition, a write command stored in the submission queue 242 may be maintained until the second completion for the write command is received. That is, in response to receiving the second completion, the host 2 may advance the SQ Head pointer from the slot in which the write command is stored. In this case, in the entry in the locked data list 245, a pointer indicative of the entry in the submission queue 242 is stored instead of the SQ entry information. Then, the write command itself stored in the submission queue 242 can be used as the SQ entry information. Note that since the write command is not cleared from the submission queue 242 and thus the SQ Head pointer is not updated, the submission queue 242 tends to be full, and there is a possibility that another command such as a read command cannot be issued. Therefore, the submission queue 242 may be provided as a dedicated submission queue for issuing a write command.

With the write operation described above, while the memory system 3 writes user data according to the delayed write completion on the basis of write commands received from the host 2, the host 2 can manage a status of processing corresponding to each of the issued write commands by using the locked data list 245.

Specifically, in the case of transmitting a write command to the memory system 3, the host 2 adds an entry corresponding to the write command to the locked data list 245. The added entry does not include yet, for example, a completion order and a completion state. Therefore, with the added entry, the host 2 can manage the fact that neither the first completion nor the second completion for the corresponding write command has been received. In other words, with the added entry, the host 2 can manage a state in which the corresponding write command has been issued (transmitted) to the memory system 3 and the first completion has not been received.

After receiving the write command from the host 2 and adding a corresponding entry to the write management table 63, the memory system 3 returns the first completion for the write command to the host 2. The host 2 updates the corresponding entry in the locked data list 245 on the basis of the first completion received from the memory system 3. In the updated entry, for example, a completion order and a completion state are added. Therefore, with the added entry, the host 2 can manage a state in which the first completion for the corresponding write command has been received and the second completion has not been received. In other words, with the added entry, the host 2 can manage a state in which the memory system 3 has received the corresponding write command.

When the writing of user data corresponding to the write command is completed according to the delayed write completion, the memory system 3 returns the second completion for the write command to the host 2. The host 2 deletes the corresponding entry in the locked data list 245 on the basis of the second completion received from the memory system 3. Therefore, the host 2 can terminate the management related to the corresponding write command by deleting the entry.

In a case where time elapsed from reception of a write command exceeds a threshold value, the write/trim control module 122 of the memory system 3 may write user data corresponding to the received write commands into the NAND flash memory 5 with padding. Here, writing user data with padding means writing data of the write unit that includes the user data and data for padding. This threshold value is based on, for example, an upper limit of response time of the second completion for the write command expected by the host 2. The time elapsed from the reception of the write command is measured by using, for example, the timer 15. More specifically, when the time elapsed from the reception of the write command exceeds the threshold value, the write/trim control module 122 transfers the user data corresponding to the received write command from the data buffer 241 of the host 2 to the NAND flash memory 5. Then, the write/trim control module 122 writes the transferred user data into the NAND flash memory 5 with padding. Accordingly, the command reception module 121 can notify the second completion for the write command within the time expected by the host 2.

Here, an operation in a case where the application 233 attempts to write to a storage area of the data buffer 241 that is locked or write-inhibited will be described. The locked or write-inhibited storage area may have stored data other than the user data 71 used by the application 223 or the like. In addition, the storage area storing the user data 71 may be rewritten after the IO reception module 210 notifies the application 223 or the OS 221 of completion of the corresponding write request. When the application 233 or the OS 211 attempts to write to the locked or write-inhibited storage area, the write/trim control module 122 is notified of the write operation with the function of the OS 221.

FIG. 18 illustrates an example of an operation after the application 223 attempts to write to the locked or write-inhibited storage area. Similarly to the examples illustrated in FIGS. 12 and 13, each cell of the logical address space 95 and each cell of the physical address space 98 represent a logical page and a physical page, respectively. The user data 71 is logically stored in the logical page 971. The user data 71 is physically stored in the physical page 981. Since the logical page 971 is mapped to the physical page 981, the user data 71 physically stored in the physical page 981 is logically stored in the logical page 971. Here, it is assumed a case where the application 233 or the OS 221 attempts to write to the locked or write-inhibited logical page 971 and the write/trim control module 122 is notified of the write operation.

Upon receiving the notification, the write/trim control module 122 maps the physical page 981 with a free logical page 961 of the kernel memory space 96 ((1) in FIG. 18). The write/trim control module 122 itself does not need to read from or write to the logical page 961 that is logically including this user data 71 as a result of the mapping with the physical page 981. However, if this mapping is not performed, since the mapping between the physical page 981 and the logical page 971 will be invalidated in a subsequent operation, the OS 211 (more specifically, the MMU) may misunderstand that the physical page 981 is not in use. That is, the reason why the physical page 981 is mapped to the free logical page 961 of the kernel memory space 96 is to cause the OS 221 to recognize that the physical page 981 is in use and prevent the OS 221 from using the physical page 981 for another purpose. Therefore, this mapping may not be performed as long as the prevention can be realized by another method.

According to this mapping, the location of the user data 71 on the logical address space 95 is changed from the logical page 971 to the logical page 961.

The write/trim control module 122 copies the user data 71 stored in the physical page 981 to a free physical page 982 in the NVRAM 24 ((2) in FIG. 18). The write/trim control module 122 changes the mapping destination of the logical page 971 to the physical page 982 of the copy destination ((3) in FIG. 18). The logical page 971 mapped to the physical page 982 of the copy destination is set to be writable ((4) in FIG. 18).

After this interrupt process is completed, when the write/trim control module 122 returns the control to the application 223 or the OS 221 as the write requestor, writing that has caused the interrupt is properly continued. That is, new writing is performed on the physical page 982 of the copy destination. As a result, the application 223 or the OS 221 can continue the operation. The application 223 or the OS 221 as the write requestor does not recognize that the interrupt has occurred. Instead, the application 223 or the OS 221 as the write requestor simply recognizes that a response to the write request is delayed.

Note that, in this case, in a case where a logical address is also used in the locked data list 245 for access in the host 2, since the logical page including the user data 71 is changed from the logical page 971 to the logical page 961, it is necessary to correct the locked data list 245 in accordance with the change. In a case where the physical page 981 is not mapped to the logical page 961, it is necessary to appropriately modify the locked data list 245.

On the other hand, the memory system 3 accesses the memory of the host 2 by using only an address in the physical address space 98. Since the physical address in which the user data 71 is stored does not change, the memory system 3 can continue to access the user data 71 in the physical page 981 of the copy source.

After the second completion is received, the physical page 981 of the copy source that has been separated from the user memory space 97 is unmapped from the logical page 961 of the kernel memory space 96 and is released.

A procedure is generally referred to as a copy-on-write in which a write request for a common memory area that is shared by multiple entities, the write request which is issued by any one of the entities, is executed on another memory area after data stored in the common memory area is copied to said another memory area of the copy destination. The copy-on-write enables suppressing the occurrence of copy and an increase in a used memory area to the minimum.

In conventional copy-on-write, applications and the like each having an independent virtual memory space share a physical memory area in which the same data is stored. When a write request for writing to the physical memory area is issued from an application or the like, another physical memory area is allocated to the application, and the data in the shared physical memory area is copied to the newly allocated physical memory area. Then, said another physical memory area is mapped to a virtual memory space of the application.

In the copy-on-write according to the present embodiment, a storage area of the data buffer 241 is shared between the memory system 3 which is an external device of the host 2 and the application 223 or the like. The memory system 3 accesses the storage area of the data buffer 241 by using a physical address not by using a logical address. The application 223 or the like writes to this storage area while the memory system 3 does not write to this storage area. Then, in response to a write request from the application 223 or the like, a copy-on-write operation is performed on the storage area. This point is different from the conventional copy-on-write.

(Second Example of Write Operation)

In the first example of the write operation described above, in a case where a request for writing the user data 71 to the NAND flash memory 5 is received, the host 2 issues one write command and the memory system 3 returns two completions for the write command. On the other hand, in a second example of the write operation, in a case where a request for writing the user data 71 to the NAND flash memory 5 is received, the host 2 transmits a write command twice and the memory system 3 returns two completions for the respective write commands.

Specifically, upon receiving a write request for writing the user data 71 to the NAND flash memory 5, the command issuing module 211 of the host 2 issues a first write command. The memory system 3 receives the first write command and returns a first completion to the host 2. The host 2 receives the first completion and issues a second write command. Then, after receiving the second write command and completing a process of writing the user data 71 to the NAND flash memory 5, the memory system 3 returns a second completion to the host 2. Both the first write command and the second write command are commands for writing the user data 71 to the NAND flash memory 5. After receiving the first write command and the second write command, the memory system 3 performs the process of writing the user data 71 to the NAND flash memory 5.

In the second example of the write operation, the operation from the issuance of the first write command by the host 2 to the return of the first completion to the host 2 from the memory system 3 is similar to that in the first example of the write operation described above with reference to FIG. 11.

FIG. 19 illustrates a write operation subsequent to FIG. 11 in the second example of the write operation.

After receiving the first completion for the first write command from the memory system 3 and updating a corresponding entry in the locked data list 245, the command issuing module 211 of the host 2 issues a second write command and stores the second write command to the submission queue 242 ((1) in FIG. 19). The second write command is, for example, a write command for requesting the writing of the same content as that of the first write command. The second write command includes information (for example, a command ID) indicative of the corresponding first write command.

The command reception module 121 of the memory system 3 acquires the second write command from the submission queue 242 ((2) in FIG. 19). Then, the command reception module 121 sends the acquired second write command to the write/trim control module 122 ((3) in FIG. 19).

Next, the write/trim control module 122 updates the write management table 63 by using the second write command sent from the command reception module 121 ((4) in FIG. 19). Specifically, the write/trim control module 122 identifies an entry in the write management table 63 that corresponds to the first write command. To identify the entry, for example, information in the second write command that indicates the first write command is used. The write/trim control module 122 updates the identified entry so that the identified entry indicates that the second write command has been received. In each entry in the write management table 63, for example, a field indicating whether a first write command has been received or a second write command has been received is further provided in addition to the configuration described above with reference to FIG. 10. The write/trim control module 122 further updates the command ID in the write management table 63 with a value of a command ID of the second write command. It can also be said that the entry indicating that the second write command has been received corresponds to a set of the first write command and the second write command. Hereinafter, the set of a first write command and a second write command is also simply referred to as a set of write commands.

Here, it is assumed a case where the total amount of user data 71 requested to be written in accordance with multiple sets of write commands that respectively correspond to entries in the write management table 63 each indicating that the second write command has been received, reaches a specific data unit. The specific data unit is, for example, the amount of data that is writable to the NAND flash memory 5 in a single data write operation.

After the total amount of the user data 71 requested to be written in accordance with the sets of write commands received from the host 2 reaches the specific data unit, the command reception module 121 and the write/trim control module 122 write the user data 71 of the specific data unit into the NAND flash memory 5 and return second completions that correspond to the sets of write commands (more specifically, second write commands), respectively, to the host 2. That is, the command reception module 121 and the write/trim control module 122 operate according to a mechanism (delayed write completion) in which writing in accordance a single set of write commands is not immediately executed but writing in accordance with multiple sets of write commands is executed after the total amount of user data 71 requested to be written by the multiple sets of write commands reaches the specific data unit.

Specifically, the write/trim control module 122 transfers the user data 71 of the write unit from the data buffer 241 to the NAND flash memory 5, and writes the transferred user data 71 of the write unit into the NAND flash memory 5 ((5) in FIG. 19). Then, in a case where there is a set of write commands for which the whole of the corresponding user data 71 is readable from the NAND flash memory 5, the write/trim control module 122 notifies the command reception module 121 of completion of processing in accordance with the set of write commands ((6) in FIG. 19). The write/trim control module 122 notifies the command reception module 121 of completion of processing in accordance with each of the sets of write commands that correspond to the user data 71 of the write unit. The write/trim control module 122 deletes entries that correspond to the sets of write commands, respectively, from the write management table 63 ((7) in FIG. 19). The write/trim control module 122 updates the logical-to-physical address conversion table 62 on the basis of processing in accordance with each of the sets of write commands ((8) in FIG. 19). Specifically, the write/trim control module 122 updates the logical-to-physical address conversion table 62 so as to associate an LBA designated in each of the sets of write commands with a physical storage location where the corresponding user data 71 has been written. In addition, the write/trim control module 122 adds command IDs of the respective sets of write commands to the command log 51 ((9) in FIG. 19).

Whenever receiving the notification from the write/trim control module 122, the command reception module 121 transmits, to the host 2, a second completion indicating that processing in accordance with a corresponding set of write commands has completed ((10) in FIG. 19). More specifically, the command reception module 121 stores the completion (second completion) for the second write command, which constitutes the corresponding set of write commands, in the completion queue 243 in response to the notification from the write/trim control module 122. The notification by the write/trim control module 122 includes, for example, a command ID of a set of write commands for which processing has completed.

Note that in a case where an error occurs in processing in accordance with a set of write commands, the command reception module 121 transmits, as the second completion, a completion indicating the error to the host 2.

Next, the command issuing module 211 of the host 2 acquires the second completion from the completion queue 243 ((11) in FIG. 19). Then, the command issuing module 211 sends the acquired second completion to the write/trim management module 212 ((12) in FIG. 19).

The write/trim management module 212 receives the second completion from the command issuing module 211 and unlocks the user data 71 in the data buffer 241 corresponding to the received second completion ((13) in FIG. 19). Then, the write/trim management module 212 deletes the entry corresponding to the received second completion from the locked data list 245 ((14) in FIG. 19). That is, in response to the second completion, the write/trim management module 212 and the IC reception module 210 perform an entry deletion operation for the corresponding write command.

In a case where the second completion indicates an error, the host 2 (specifically, the command issuing module 211, the write/trim management module 212, and the IO reception module 210) regards the error as a failure of the memory system 3. The write/trim management module 212 stops processing for the memory system 3 and performs exception processing of the information processing system 1.

Note that, in the above description, only the user data for which the second write command has been received is to be written into the NAND flash memory 5, but the command reception module 121 and the write/trim control module 122 may write into the NAND flash memory 5 user data for which only a first write command has been received. As a result, the command reception module 121 and the write/trim control module 122 write the user data into the NAND flash memory 5 before receiving a second write command. In this case, the command reception module 121 transmits a second completion to the host 2 upon receiving the second write command. Therefore, the write management table 63 needs a field indicating whether the writing of user data into the NAND flash memory 5 has completed, in addition to a field indicating whether a second write command has been received. The command reception module 121 and the write/trim control module 122 refer to an entry in the write management table 63 that corresponds to the received second write command. When the user data has already been written into the NAND flash memory 5, the command reception module 121 and the write/trim control module 122 immediately return a completion to the host 2 and delete the entry from the write management table 63.

As in the second example of the write operation described above, the information processing system 1 may include the host 2 configured to issue a write command twice when a request for writing user data 71 to the NAND flash memory 5 is received, and the memory system 3 configured to respond to the two write commands with two respective completions. The memory system 3 receives a set of write commands that is composed of the two write commands. While the memory system 3 writes user data according to the delayed write completion on the basis of the set of write commands received from the host 2, the host 2 can manage a status of processing corresponding to each of the issued write commands by using the locked data list 245.

Hereinafter, an operation in the information processing system 1 that includes the host 2 configured to issue one write command when a request for writing user data 71 to the NAND flash memory 5 is received, and the memory system 3 configured to respond to the one write command with a first completion and a second completion will be described. Note that, also in the information processing system 1 that includes the host 2 configured to issue a write command twice when a request for writing user data 71 to the NAND flash memory 5 is received, and the memory system 3 configured to respond to the two write commands with two respective completions, the same operation may be realized.

As described above, the host 2 issues a write command that corresponds to a write request from the application 223 or the OS 221, to the memory system 3. Hereinafter, a case where before processing in accordance with an issued write command is completed (that is, before making user data, which corresponds to the write command, nonvolatile is completed), another write request or trim request for an LBA designated in the write command is further generated from the application 223 or the OS 221 will be described below. Note that a write request or trim request is also referred to as a write/trim request.

For example, in a case where a write command corresponding to the further generated write request is issued, in the memory system 3, user data is written to one LBA in accordance with the write command issued earlier and then user data is written to the one LBA in accordance with the write command issued later. That is, the user data written in accordance with the write command issued earlier is invalidated. That is, although the user data is immediately invalidated, writing to the LBA is performed in accordance with the write command issued earlier. This causes wear of the NAND flash memory 5 of the memory system 3.

Furthermore, for example, in a case where a trim command corresponding to the further generated trim request is issued, in the memory system 3, user data is written to one LBA in accordance with the write command issued earlier, and then the one LBA is deallocated in accordance with the trim command issued later. That is, the user data written in accordance with the write command issued earlier is invalidated. That is, although the user data is immediately invalidated, writing to the LBA is performed in accordance with the write command issued earlier. This causes wear of the NAND flash memory 5 of the memory system 3.

Therefore, in the present embodiment, in a case where a write request for an LBA that is designated in a previously issued write command is further generated from the application 223 or the OS 221 before processing in accordance with the previously issued write command is completed, among LBA ranges designated in the previously issued write command, writing to the LBA that is designated in both the previously issued write command and the further generated write request is canceled from writing. As a result, overwriting to the LBA that is doubly designated does not occur, and thus it is possible to lower wear of the NAND flash memory 5.

In addition, in the present embodiment, in a case where a trim request for an LBA designated in the previously issued write command is further generated from the application 223 or the OS 221 before processing in accordance with the previously issued write command is completed, among LBA ranges designated in the previously issued write command, writing to the LBA that is designated in both the previously issued write command and the further generated trim request is canceled from writing. As a result, writing to the LBA that is doubly designated does not occur, and thus it is possible to lower wear of the NAND flash memory 5.

Hereinafter, a write command that has been issued from the host 2 to the memory system 3 and for which processing in the memory system 3 in accordance with the write command is not completed is also referred to as an issued-and-uncompleted write command.

A case where a write/trim request for an LBA designated in the previously issued write command is further generated from the application 223 or the OS 221 before processing in accordance with the previously issued write command is completed includes a case (1) where an LBA range designated in the write/trim request generated later wholly includes an LBA range designated in the issued-and-uncompleted write command, and a case (2) where the LBA range designated in the write/trim request generated later includes a portion of the LBA range designated in the issued-and-uncompleted write command.

The write/trim management module 212 of the host 2 uses the locked data list 245 to determine whether there is an issued-and-uncompleted write command (hereinafter also referred to as a duplicate write command) designating an LBA range that at least partially overlaps with an LBA range designated in a write/trim request generated later. When there is a duplicate write command, the write/trim management module 212 also determines an overlapping relationship between the LBA range designated in the write/trim request generated later and the LBA range designated in the duplicate write command. The overlapping relationship is, for example, that the LBA range designated in the write/trim request generated later wholly includes the LBA range designated in the duplicate write command, or that the LBA range designated in the write/trim request generated later includes a portion of the LBA range designated in the duplicate write command.

In order to efficiently retrieve an entry corresponding to the duplicate write command from the locked data list 245, the locked data list 245 may have different data structure other than a simple table structure. For example, locked data lists 245 may be generated for partial spaces, respectively, that are obtained by dividing the whole of the LBA space for accessing the memory system 3. By using the locked data list 245 corresponding to a partial space that includes the LBA range designated in the write/trim request generated later, it is possible to speed up the retrieval of the entry corresponding to the duplicate write command.

An operation of the host 2 and the memory system 3 in the case (1) where the LBA range designated in the write/trim request generated later wholly includes the LBA range designated in the issued-and-uncompleted write command and in the case (2) where the LBA range designated in the write/trim request generated later includes a portion of the LBA range designated in the issued-and-uncompleted write command will be described below.

(Case (1) Where LBA Range Designated in Write/trim Request Generated Later Wholly Includes LBA Range Designated in Issued-and-Uncompleted Write Command)

Figure 20:
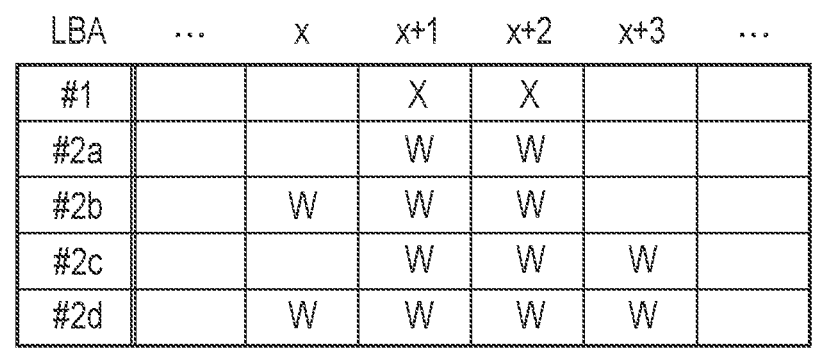

FIG. 20 illustrates an example of write/trim requests #2a to #2d each designating an LBA range that wholly includes an LBA range designated in an issued-and-uncompleted write command #1. "X" illustrated in FIG. 20 represents an LBA designated in the corresponding write command #1. "W" illustrated in FIG. 20 represents an LBA designated in the corresponding write/trim requests #2a to #2d. An LBA designated in a write command indicates a sector in which user data is to be written. An LBA designated in a write request indicates a sector in which user data is to be written. An LBA designated in a trim request indicates a sector to be deallocated. Each of the LBA ranges that are designated in the write/trim requests #2a, #2b, #2c, and #2d, respectively, is an LBA range in which writing or trimming is performed in accordance with the write/trim request (more particularly, the corresponding write command or trim command).

Specifically, in the write command #1, the LBA range from an LBA x+1 to an LBA x+2 is designated. The LBA range designated in the write command #1 is an LBA range in which making user data nonvolatile in accordance with the write command #1 is not yet completed.

In the write/trim request #2a, the LBA range from the LBA x+1 to the LBA x+2 is designated. In the write/trim request #2b, the LBA range from an LBA x to the LBA x+2 is designated. In the write/trim request #2c, the LBA range from the LBA x+1 to an LBA x+3 is designated. In the write/trim request #2d, the LBA range from the LBA x to the LBA x+3 is designated.

As described above, each of the LBA ranges designated in the write/trim requests #2a, #2b, #2c, and #2d wholly includes the LBA range designated in the write command #1. Therefore, the user data written in accordance with the write command #1 becomes invalid in accordance with a write command or a trim command corresponding to each of the write/trim requests #2a, #2b, #2c, and #2d. Cancelling writing in accordance with the write command #1 achieves lowering wear of the NAND flash memory 5 of the memory system 3. A write command (here, the write command #1) for writing user data that is to be invalid in accordance with a write/trim request (more particularly, a corresponding write command or trim command) generated later is a duplicate write command.

(Operation in Accordance With Write Request Wholly Including LBA Range Designated in Issued-and-Uncompleted Write Command)

An operation in a case where an LBA range designated in a write request generated later wholly includes an LBA range designated in an issued-and-uncompleted write command will be described with reference to FIGS. 21 and 22.

Figure 21:
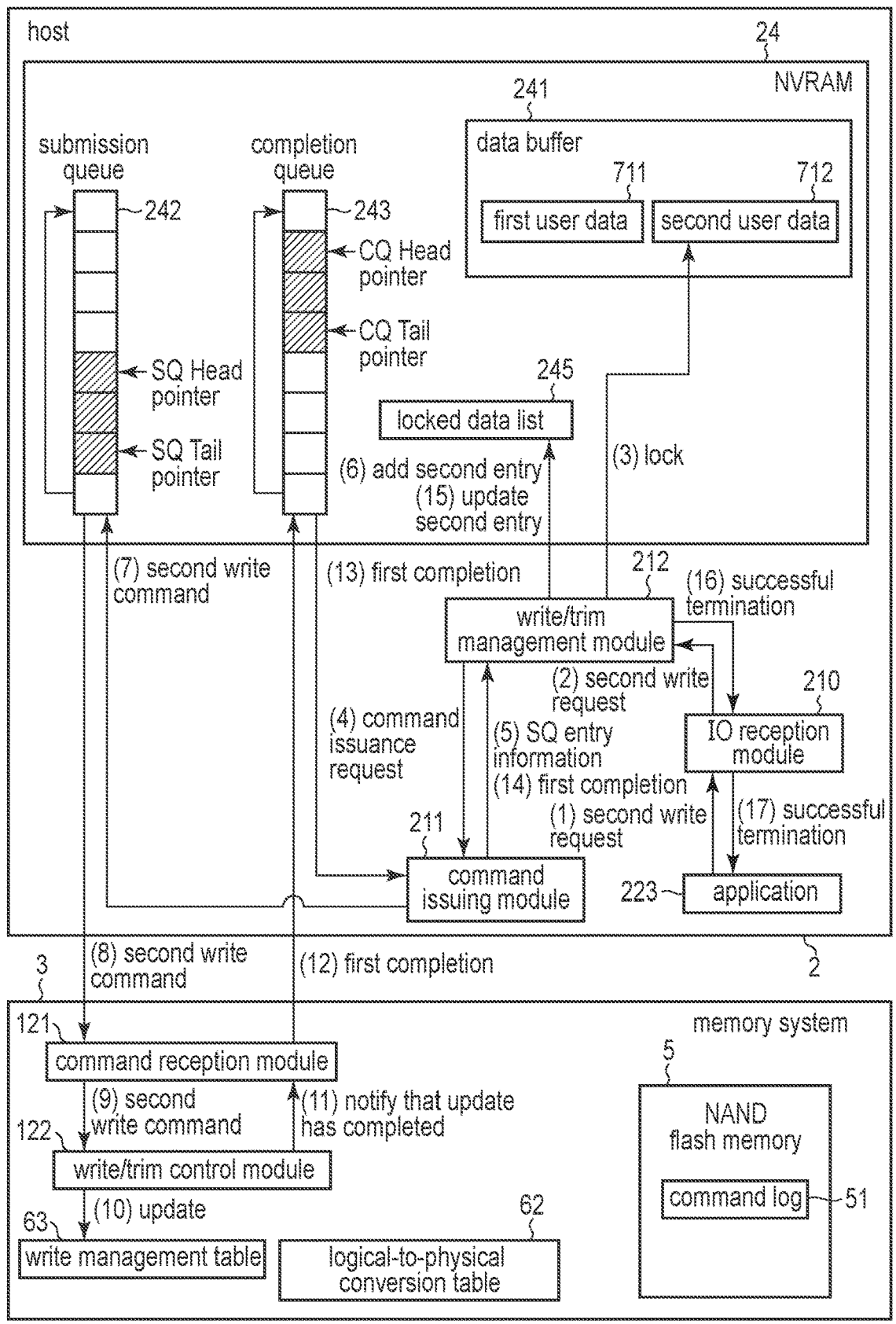
FIG. 21 is a block diagram illustrating still another example of the write operation in the information processing system that includes the information processing apparatus according to the first embodiment.

FIG. 21 illustrates an example of the operation in accordance with the write request designating the LBA range that wholly includes the LBA range designated in the issued-and-uncompleted write command. The operation illustrated in FIG. 21 is performed, for example, after the write operation described above with reference to FIG. 11. Here, the issued-and-uncompleted write command is referred to as a first write command. Also the write request designating the LBA range that wholly includes the LBA range designated in the first write command is referred to as a second write request. User data to be written in accordance with the first write command is referred to as first user data 711. User data requested to be written with the second write request is referred to as second user data 712. The first user data 711 and the second user data 712 are stored in the data buffer 241.

First, in the host 2, the IO reception module 210 receives the second write request from the application 223 or the OS 221 ((1) in FIG. 21). The IO reception module 210 sends the received second write request to the write/trim management module 212 ((2) in FIG. 21).

When the write/trim management module 212 has not received a first completion for the first write command, the write/trim management module 212 waits for reception of the first completion for the first write command. In the memory system 3, write commands and trim commands that have been received may be executed in any order regardless of the order of reception (i.e., out of order). Therefore, when multiple writing or trimming operations are performed on one LBA, the host 2 needs to control the memory system 3 according to the order in which write/trim requests are generated by the application 223 or the OS 221. Specifically, the host 2 needs to perform control so that a content corresponding to a write/trim request generated latest is finally reflected in the NAND flash memory 5 of the memory system 3. Therefore, the command issuing module 211 and the write/trim management module 212 wait for reception of the first completion for the first write command, and then perform an operation in accordance with the second write request. Hereinafter, a case where the first completion for the first write command is a successful response (that is, completion indicating a successful termination) will be explained. When the first completion for the first write command is an error response (that is, a completion indicating an error termination), the write operation described above with reference to FIGS. 11 to 18 is performed in accordance with the second write request.

In parallel with the operation of waiting for the first completion for the first write command, the write/trim management module 212 locks the second user data 712 ((3) in FIG. 21).

After receiving the first completion, which is the successful response for the first write command, the write/trim management module 212 requests the command issuing module 211 to issue a write command (hereinafter referred to as a second write command) that corresponds to the second write request ((4) in FIG. 21). The command issuing module 211 issues the second write command for writing the second user data 712, in accordance with the request by the write/trim management module 212. That is, the command issuing module 211 generates SQ entry information that corresponds to the second write command for writing the second user data 712. The command issuing module 211 sends the generated SQ entry information to the write/trim management module 212 ((5) in FIG. 21).

The write/trim management module 212 generates an entry of the locked data list 245 by using the SQ entry information sent from the command issuing module 211. Here, the generated entry is referred to as a second entry. The second entry includes, for example, the SQ entry information corresponding to the second write command, and data region management information. The data region management information is information capable of identifying a storage area in the data buffer 241 in which the second user data 712 is stored. The write/trim management module 212 adds the second entry to the locked data list 245 ((6) in FIG. 21).

Next, the command issuing module 211 stores the second write command (SQ entry information) in the submission queue 242 ((7) in FIG. 21).

Subsequent operations ((8) to (12) in FIG. 21) in the memory system 3 in accordance with the second write command are similar to the operations ((8) to (12) in FIG. 11) in the memory system 3 described above with reference to FIG. 11. Operations in the host 2 in accordance with the first completion for the second write command ((13) to (17) in FIG. 21) are similar to the operations in the host 2 ((13) to (15), (18), and (19) in FIG. 11) described above with reference to FIG. 11.

Next, when the first completion for the second write command is a successful response, the information processing system 1 performs an operation (abort operation) for aborting the first write command.

Figure 22:
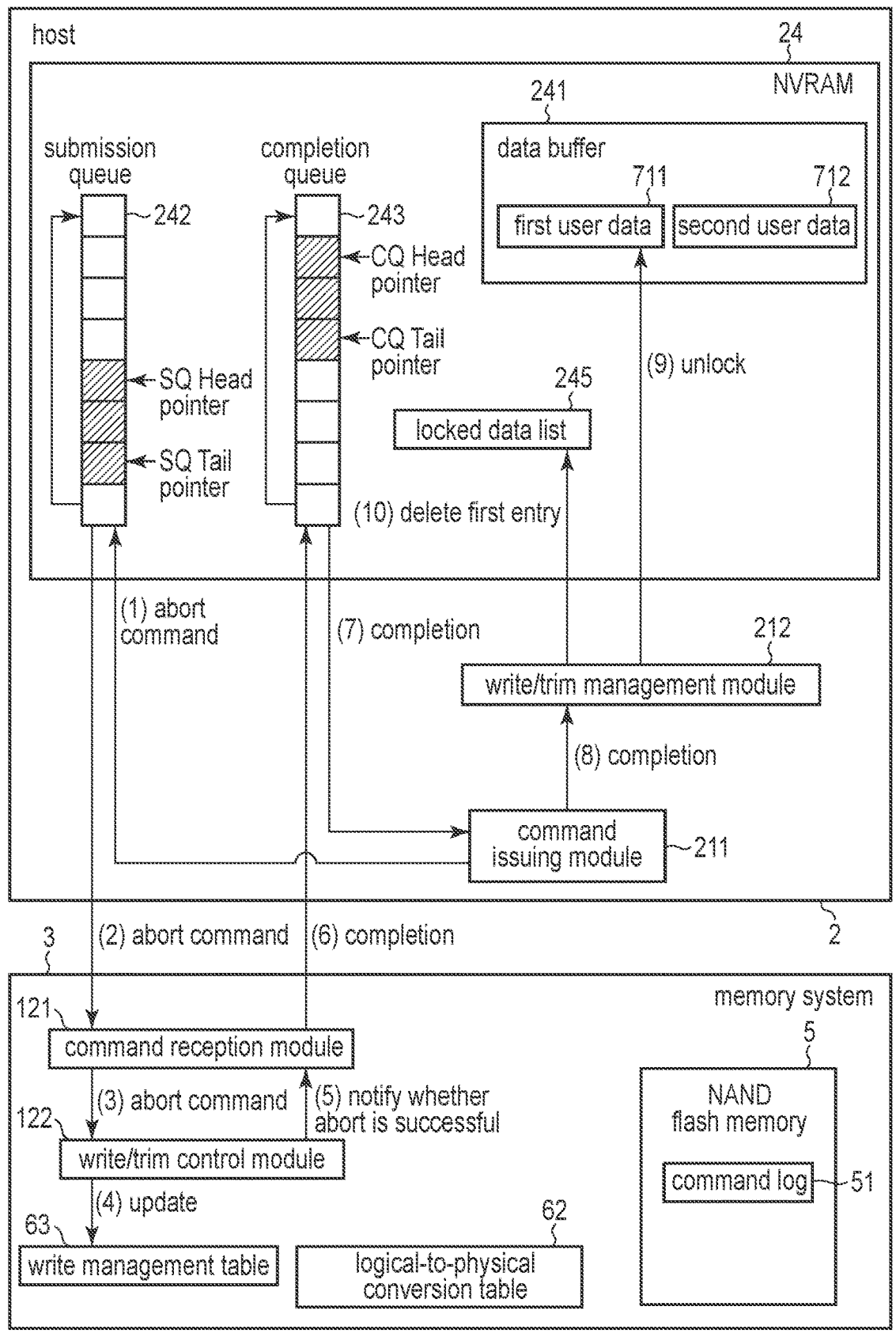
FIG. 22 is a block diagram illustrating an example of an abort operation in the information processing system that includes the information processing apparatus according to the first embodiment.

FIG. 22 illustrates the abort operation performed subsequently to FIG. 21.

First, the command issuing module 211 issues an abort command for aborting the first write command. That is, the command issuing module 211 generates SQ entry information that corresponds to the abort command for aborting the first write command. The issued abort command includes information (for example, a command ID) capable of identifying the first write command to be aborted. Next, the command issuing module 211 stores the issued abort command (SQ entry information) in the submission queue 242 ((1) in FIG. 22).

Next, the command reception module 121 of the memory system 3 acquires the abort command from the submission queue 242 ((2) in FIG. 22). Then, the command reception module 121 sends the acquired abort command to the write/trim control module 122 ((3) in FIG. 22).

The write/trim control module 122 updates the write management table 63 by using the abort command sent from the command reception module 121 ((4) in FIG. 22). Specifically, the write/trim control module 122 identifies a corresponding entry in the write management table 63 by using the command ID of the first write command designated in the abort command. When a write operation based on the identified entry has not been started, the write/trim control module 122 deletes this entry from the write management table 63. As a result, writing in accordance with the first write command is aborted. The write/trim control module 122 notifies the command reception module 121 that aborting the first write command in accordance with the abort command is successful (success of abort) ((5) in FIG. 22).

When the write operation based on the identified entry has already been started, the write/trim control module 122 notifies the command reception module 121 that aborting the first write command in accordance with the abort command is not successful (failure of abort) ((5) in FIG. 22). That is, the write/trim control module 122 refuses to abort the first write command in accordance with the abort command. In addition, also in a case where no entry corresponding to the command ID of the first write command is present in the write management table 63, the write/trim control module 122 notifies the command reception module 121 of the failure of abort ((5) in FIG. 22).

In response to the notification by the write/trim control module 122, the command reception module 121 stores a completion for the abort command in the completion queue 243 ((6) in FIG. 22). Specifically, when the write/trim control module 122 notifies the command reception module 121 of the success of abort, the command reception module 121 stores a completion indicating the success of abort (that is, successful termination) in the completion queue 243. When the write/trim control module 122 notifies the command reception module 121 of the failure of abort, the command reception module 121 stores a completion indicating the failure of abort (that is, error termination) in the completion queue 243.

Next, the command issuing module 211 of the host 2 acquires the completion for the abort command from the completion queue 243 ((7) in FIG. 22). Then, the command issuing module 211 sends the acquired completion to the write/trim management module 212 ((8) in FIG. 22).

When the completion is a completion indicating success of abort, since the first write command has been aborted, the write/trim management module 212 unlocks the first user data 711 in the data buffer 241 that should have been written in accordance with the first write command ((9) in FIG. 22). In addition, in a case where a list of PRP entries or second and subsequent segments of SGL were created, the write/trim management module 212 also releases an area of the pointer list 244 in which the list or the segments are stored. Then, the write/trim management module 212 deletes the first entry corresponding to the first write command from the locked data list 245 ((10) in FIG. 22). That is, the write/trim management module 212 and the IC reception module 210 perform an entry deletion operation for the first write command.

When the completion is a completion indicating failure of abort, since the first write command has not been aborted, the write operation in accordance with the first write command is continued. That is, the write/trim management module 212 does not unlock the first user data 711 in the data buffer 241 and does not delete the first entry from the locked data list 245.

FIG. 23 illustrates an example of the locked data list 245 from which the entry is deleted in the operation of (10) in FIG. 22. The locked data list 245 includes the entry 81 corresponding to the first write command and an entry 82 corresponding to the second write command.

The entry 81 indicates that the first completion for the first write command has been received, similarly to the entry 81 illustrated in FIG. 17. The entry 81 is deleted in response to reception of the completion from the memory system 3 that indicates success of abort of the first write command.

The entry 82 includes SQ entry information "sqentry_info2", a completion order "cseq2", data region management information "region_info2", and a completion state "completed". The entry 82 indicates that the first completion for the second write command has been received.

With the write and abort operations described above, when the LBA range designated in the second write request generated later wholly includes the LBA range designated in the issued-and-uncompleted first write command, writing in accordance with the first write command in the memory system 3 can be aborted.

Specifically, the host 2 transmits the second write command corresponding to the second write request to the memory system 3. Upon receiving the first completion that indicates successful termination of the second write command from the memory system 3, the host 2 transmits an abort command for aborting the first write command to the memory system 3.

The memory system 3 receives the abort command from the host 2, and aborts the first write command when writing in accordance with the first write command has not started. Then, the memory system 3 returns a completion indicating success of abort of the first write command to the host 2. The host 2 performs the entry deletion operation for the first write command according to the completion indicating success of abort.

As a result, in the memory system 3, writing to the NAND flash memory 5 in accordance with the first write command is not performed. That is, writing to an LBA range to which overwriting is to be performed in accordance with the second write request, is not performed. Therefore, it is possible to lower wear of the NAND flash memory 5.

Here, a case where the second example of the write operation described above is used, that is, a case where, when a request for writing user data 71 to the NAND flash memory 5 is received, the command issuing module 211 of the host 2 transmits a write command twice, and the memory system 3 responds to the two write commands with two respective completions, will be described. In this case, when the host 2 has not received the first completion for the first write command transmitted in a first transmission, or when the host 2 has received the first completion for the first write command transmitted in the first transmission but has not yet performed a second transmission of the first write command to the memory system 3, the host 2 does not perform the second transmission of the first write command to the memory system 3. Further, the host 2 may transmit, to the memory system 3, an abort command for deleting information (for example, an entry of the write management table 63) generated in the memory system 3 in accordance with the first write command transmitted in the first transmission. This abort command is a command for the first write command that was transmitted in the first transmission and has been completed. That is, the abort command is not a conventional abort command that aborts an operation requested by a certain command, but is a new type of abort command for deleting information generated in accordance with the first write command transmitted in the first transmission. As a result, similarly to the case of success of abort in FIG. 22 described above, it is possible to abort writing in accordance with the first write command. Note that, in a case where the host 2 has not transmitted the abort command when the second write command transmitted in a second transmission is completed, the host 2 deletes the entry in the locked data list 245 and the like for the first write command. In addition, the memory system 3 deletes the entry in the write management table 63 for the first write command when the second write command is completed.

When the second transmission of the first write command to the memory system 3 has been performed, the host 2 transmits, to the memory system 3, an abort command for aborting the first write command transmitted in the second transmission. As a result, writing in accordance with the first write command can be aborted.

(Operation in Accordance with Trim Request Wholly Including LBA Range Designated in Issued-and-Uncompleted Write Command)

Even in a case where the second write request described above is replaced with a trim request, a similar operation can be realized. That is, even when an LBA range designated in the trim request generated later wholly includes an LBA range designated in an issued-and-uncompleted first write command, the first write command may be similarly aborted.

An operation in a case where the LBA range designated in the trim request generated later wholly includes the LBA range designated in the issued-and-uncompleted write command will be described with reference to FIGS. 24 and 25.

Figure 24:
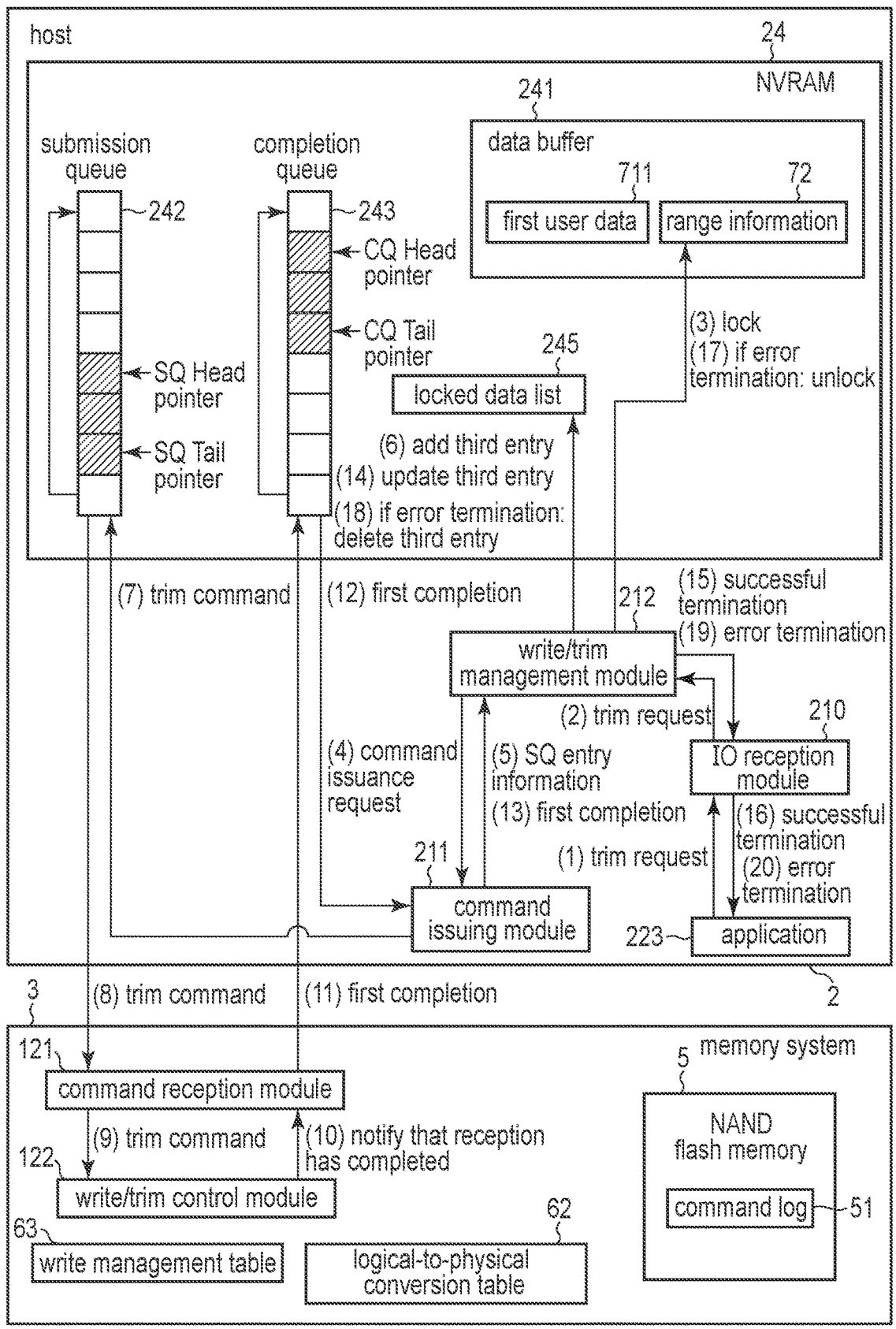
FIG. 24 is a block diagram illustrating an example of a trim operation in the information processing system that includes the information processing apparatus according to the first embodiment.

FIG. 24 illustrates an example of the operation performed in accordance with the trim request designating the LBA range that wholly includes the LBA range designated in the issued-and-uncompleted write command. The operation illustrated in FIG. 24 is performed, for example, after the write operation described above with reference to FIG. 11. Here, the issued-and-uncompleted write command is referred to as a first write command. Also user data to be written in accordance with the first write command is referred to as first user data 711. The trim request designates one or more LBA ranges that wholly include the LBA range designated in the first write command. Range information 72 is information indicating the one or more LBA ranges designated in the trim request. The first user data 711 and the range information 72 are stored in the data buffer 241.

First, in the host 2, the IO reception module 210 receives the trim request by the application 223 or the OS 221 ((1) in FIG. 24). The IO reception module 210 sends the received trim request to the write/trim management module 212 ((2) in FIG. 24).

When the write/trim management module 212 has not received a first completion for the first write command, the write/trim management module 212 waits for reception of the first completion for the first write command. Hereinafter, a case where the first completion for the first write command is a successful response will be explained.

In parallel with the operation of waiting for the first completion for the first write command, the write/trim management module 212 locks the range information 72 ((3) in FIG. 24).

After the first completion that is the successful response to the first write command is received, the write/trim management module 212 requests the command issuing module 211 to issue a trim command corresponding to the trim request ((4) in FIG. 24). The command issuing module 211 issues the trim command for deallocating the LBA ranges based on the range information 72 in response to the request by the write/trim management module 212. That is, the command issuing module 211 generates SQ entry information corresponding to the trim command for deallocating the LBA ranges based on the range information 72. The command issuing module 211 sends the generated SQ entry information to the write/trim management module 212 ((5) in FIG. 24).

The write/trim management module 212 generates an entry of the locked data list 245 by using the SQ entry information sent from the command issuing module 211. The generated entry is referred to as a third entry. The third entry includes, for example, the SQ entry information corresponding to the issued trim command, and data region management information. The data region management information is information capable of identifying a storage area in the data buffer 241 in which the range information 72 is stored. The write/trim management module 212 adds the third entry to the locked data list 245 ((6) in FIG. 24).

Next, the command issuing module 211 stores the issued trim command (SQ entry information) in the submission queue 242 ((7) in FIG. 24).

The command reception module 121 of the memory system 3 acquires the trim command from the submission queue 242 ((8) in FIG. 24). Then, the command reception module 121 sends the acquired trim command to the write/trim control module 122 ((9) in FIG. 24).

The write/trim control module 122 confirms that the trim command sent from the command reception module 121 is executable. Specifically, the write/trim control module 122 confirms, for example, that a data pointer is valid, or that the LBA range designated in the range information 72 is valid. When the trim command is executable, the write/trim control module 122 notifies the command reception module 121 that the reception of the trim command has been completed ((10) in FIG. 24).

In response to the notification from the write/trim control module 122, the command reception module 121 stores a first completion (completion indicative of successful termination) for the trim command in the completion queue 243 ((11) in FIG. 24). This first completion includes a command ID of the trim command.

Note that in a case where the trim command acquired from the submission queue 242 is an inexecutable command, the command reception module 121 may store a completion indicative of an error termination in the completion queue 243 as the first completion.

Next, the command issuing module 211 of the host 2 acquires the first completion for the trim command from the completion queue 243 ((12) in FIG. 24). Then, the command issuing module 211 sends the acquired first completion to the write/trim management module 212 ((13) in FIG. 24).

When the first completion is a completion indicative of a successful termination, the write/trim management module 212 updates the third entry in the locked data list 245 that corresponds to the trim command ((14) in FIG. 24). More specifically, the write/trim management module 212 adds, to the third entry, an assigned sequence number (that is, information indicating the order of reception of the first completion) and information indicating that the first completion has been received. The write/trim management module 212 notifies the IO reception module 210 of completion (successful termination) of trimming ((15) in FIG. 24). Then, the IO reception module 210 notifies the application 223 or the OS 221 of completion of trimming ((16) in FIG. 24).

When the first completion is a completion indicative of an error termination, the write/trim management module 212 unlocks the range information 72 in the data buffer 241 that corresponds to the trim command ((17) in FIG. 24). Then, the write/trim management module 212 deletes the third entry corresponding to the trim command from the locked data list 245 ((18) in FIG. 24). The write/trim management module 212 notifies the IO reception module 210 of the error termination ((19) in FIG. 24). Then, the IO reception module 210 notifies the application 223 or the OS 221 of the error termination ((20) in FIG. 24).

When the first completion for the trim command is a successful response, the host 2 and the memory system 3 further perform an operation (abort operation) for aborting the first write command. This abort operation is similar to the abort operation described above with reference to FIG. 22.

As described above, the host 2 starts the operation for aborting the first write command after receiving the first completion that indicates the successful termination of the trim command. This is because, for example, after the first completion for the first write command is a successful completion, if the LBA range to be designated in the trim command becomes write-inhibited due to security settings before the trim command is sent, the trim command does not succeed, and the first write command needs to be successfully completed. Except for a case where the first completion for the trim command cannot be received due to a failure or the like of the memory system 3, that is, when it is guaranteed that the first completion indicating the successful termination of the trim command can be received, the host 2 may start an operation for aborting the first write command before receiving the first completion indicating the successful termination of the trim command.

In the host 2 and the memory system 3, an operation for deallocating the designated LBA range is performed in accordance with the trim command received by the memory system 3.

FIG. 25 illustrates an example of the operation in accordance with the trim command received by the memory system 3. The operation illustrated in FIG. 25 is performed, for example, after a write command that precedes the trim command and designates an LBA range overlapping with the LBA range designated in the trim command is completed or aborted.

First, the write/trim control module 122 of the memory system 3 deallocates the LBA ranges designated in the range information 72 corresponding to the trim command ((1) in FIG. 25). For example, the write/trim control module 122 updates the logical-to-physical address conversion table 62 so that the LBA ranges designated in the range information 72 are not mapped to any physical address, thereby deallocating the LBA ranges. Then, the write/trim control module 122 notifies the command reception module 121 of completion of processing in accordance with the trim command ((2) in FIG. 25). In addition, the write/trim control module 122 adds the command ID of the trim command to the command log 51 ((3) in FIG. 25).

Upon receiving the notification from the write/trim control module 122, the command reception module 121 transmits, to the host 2, a second completion indicating that the processing in accordance with the trim command has been completed ((4) in FIG. 25). More specifically, the command reception module 121 stores the second completion for the trim command in the completion queue 243 in response to the notification from the write/trim control module 122. The notification from the write/trim control module 122 includes, for example, the command ID of the trim command for which the processing has been completed.

Note that when an error occurs in the processing in accordance with the trim command, the command reception module 121 transmits, as the second completion, a completion indicating the error to the host 2.

Next, the command issuing module 211 of the host 2 acquires the second completion from the completion queue 243 ((5) in FIG. 25). Then, the command issuing module 211 sends the acquired second completion to the write/trim management module 212 ((6) in FIG. 25).

The write/trim management module 212 receives the second completion from the command issuing module 211 and unlocks the range information 72 corresponding to the trim command ((7) in FIG. 25). Then, the write/trim management module 212 deletes the third entry corresponding to the trim command from the locked data list 245 ((8) in FIG. 25).

Note that when the second completion indicates an error, the host 2 (specifically, the write/trim management module 212) regards the error as a failure of the memory system 3. The write/trim management module 212 stops processing for the memory system 3 and performs exception processing of the information processing system 1.

With the trim and abort operations described above, when the LBA range designated in the trim request generated later wholly includes the LBA range designated in the issued-and-uncompleted first write command, writing to the memory system 3 in accordance with the first write command can be aborted.

Specifically, the host 2 transmits a trim command corresponding to the trim request to the memory system 3. Upon receiving a first completion indicating successful termination for the trim command from the memory system 3, the host 2 transmits an abort command for aborting the first write command to the memory system 3.

The memory system 3 receives the abort command from the host 2, and aborts the first write command when writing in accordance with the first write command has not started. Then, the memory system 3 returns a completion indicating success of abort of the first write command to the host 2. The host 2 deletes an entry corresponding to the first write command from the locked data list 245 according to the completion indicating the success of abort.

As a result, in the memory system 3, writing to the NAND flash memory 5 in accordance with the first write command is not performed. That is, writing to the LBA range to be deallocated according to the trim request is not performed. Therefore, it is possible to lower wear of the NAND flash memory 5.

Similarly to the second example of the write operation described above, when the IO reception module 210 of the host 2 receives a trim request for deallocating LBA ranges, the command issuing module 211 of the host 2 may be configured to issue a trim command twice, and the memory system 3 may be configured to respond to the two trim commands with two respective completions. Also in this configuration, even when the LBA ranges designated in the trim request generated later wholly includes the LBA range designated in the issued-and-uncompleted first write command, the first write command can be similarly aborted.

Here, a case where a plurality of issued-and-uncompleted write commands each designating an LBA range that is wholly included in an LBA range (or LBA ranges) designated in a write/trim request generated later are present will be described.

FIG. 26 illustrates an example of a write/trim request #2 designating an LBA range that wholly includes LBA ranges designated in issued-and-uncompleted write commands #1X and #1Y, respectively. "X" illustrated in FIG. 26 represents an LBA designated in the corresponding write command #1X. "Y" illustrated in FIG. 26 represents an LBA designated in the corresponding write command #1Y. "W" illustrated in FIG. 26 represents an LBA designated in the corresponding write/trim request #2. The LBA range designated in the write/trim request #2 is an LBA range in which writing or trimming is performed in accordance with the write/trim request (more particularly, the corresponding write command or trim command).

Specifically, in the write command #1X, the LBA range from an LBA x+1 to an LBA x+2 is designated. The LBA range designated in the write command #1X is an LBA range in which making user data nonvolatile in accordance with the write command 41X is not yet completed.

In the write command #1Y, the LBA range from an LBA x+4 to an LBA x+5 is designated. The LBA range designated in the write command #1Y is an LBA range in which making user data nonvolatile in accordance with the write command #1Y is not yet completed.

In the write/trim request #2, the LBA range from an LBA x to an LBA x+6 is designated.

As described above, the LBA range designated in the write/trim request #2 wholly includes the LBA ranges designated in the write commands #1X and #1Y.

In a case where an LBA range designated in a write/trim request generated later wholly includes LBA ranges designated in a plurality of issued-and-uncompleted write commands, the above-described abort operation is performed for each of the write commands.

(Case (2) Where LBA Range Designated in Write/Trim Request Generated Later Includes Portion of LBA Range Designated in Issued-and-Uncompleted Write Command)

When an LBA range designated in a write/trim request generated later includes a portion of an LBA range designated in an issued-and-uncompleted write command, either a method (2-a) of modifying the issued-and-uncompleted write command or a method (2-b) of aborting the issued-and-uncompleted write command may be used. Each of these two methods will be described.

(Method (2-a) of Modifying Issued-and-Uncompleted Write Command)

FIG. 27 illustrates an example of write/trim requests #2a and #2b each designating an LBA range that includes a portion of an LBA range designated in an issued-and-uncompleted write command #1. "X" illustrated in FIG. 27 represents an LBA designated in the corresponding write command #1. "W" illustrated in FIG. 27 represents an LBA designated in the corresponding write/trim requests #2a and #2b. The LBA range designated in each of the write/trim requests #2a and #2b is an LBA range in which writing or trimming is performed in accordance with the write/trim request (more particularly, the corresponding write command or trim command).

Specifically, in the write command #1, the LBA range from an LBA x+1 to an LBA x+2 is designated. The LBA range designated in the write command #1 is an LBA range in which making user data nonvolatile in accordance with the write command #1 is not yet completed.

In the write/trim request #2a, the LBA range from an LBA x to the LBA x+1 is designated. The LBA range designated in the write/trim request #2a includes a contiguous portion from the start LBA toward the end LBA within the LBA range designated in the write command #1. Note that the contiguous portion from the start LBA toward the end LBA may be only the start LBA.

In the write/trim request #2b, an LBA range from the LBA x+2 to an LBA x+3 is designated. The LBA range designated in the write/trim request #2b includes a contiguous portion from the end LBA toward the start LBA within the LBA range designated in the write command #1. Note that the contiguous portion from the end LBA toward the start LBA may be only the end LBA.

More specifically, the LBA range from the LBA x to the LBA x+1 designated in the write/trim request #2a includes, among the LBAs x+1 and x+2 designated in the write command #1, the LBA x+1 (that is, a sector in which overwriting or trimming is performed) but does not include the LBA x+2 (that is, a sector in which overwriting or trimming is not performed). In other words, the LBAs x+1 and x+2 designated in the write command #1 include, among the LBAs x and x+1 designated in the write/trim request #2a, not only the LBA x+1 (that is, the sector in which overwriting or trimming is performed) but also the LBA x+2 (that is, the sector in which overwriting or trimming is not performed).

In addition, the LBA range from the LBA x+2 to the LBA x+3 designated in the write/trim request #2b includes, among the LBAs x+1 and x+2 designated in the write command #1, the LBA x+2 (that is, the sector in which overwriting or trimming is performed) but does not include the LBA x+1 (that is, the sector in which overwriting or trimming is not performed). In other words, the LBAs x+1 and x+2 designated in the write command #1 include, among the LBAs x+2 and x+3 designated in the write/trim request #2b, not only the LBA x+2 (that is, the sector in which overwriting or trimming is performed) but also the LBA x+1 (that is, the sector in which overwriting or trimming is not performed).

As described above, the write/trim request designating the LBA range that includes a portion of the LBA range designated in the issued-and-uncompleted write command is, for example, (A) a write/trim request designating the LBA range that includes a contiguous portion from a start LBA toward an end LBA within the LBA range designated in the write command, or (B) a write/trim request designating the LBA range that includes a contiguous portion from the end LBA toward the start LBA within the LBA range designated in the write command.

Alternatively, the write/trim request designating the LBA range that includes a portion of the LBA range designated in the issued-and-uncompleted write command may be (C) a write/trim request designating an intermediate LBA range that is within the LBA range designated in the write command and includes neither the start LBA nor the end LBA of the LBA range designated in the write command.

FIG. 28 illustrates an example of a write/trim request #2 designating an intermediate LBA range that is within the LBA range designated in a write command #1 and includes neither the start LBA nor the end LBA of the LBA range designated in the issued-and-uncompleted write command #1.

Specifically, in the write command #1, an LBA range from an LBA x to an LBA x+4 is designated. The LBA range designated in the write command #1 is an LBA range in which making user data nonvolatile in accordance with the write command #1 is not yet completed.

In the write/trim request #2, an LBA range from an LBA x+1 to an LBA x+2 is designated. The LBA range designated in the write/trim request #2 is an LBA range in which writing or trimming is performed in accordance with the write/trim request (more particularly, the corresponding write command or trim command).

As described above, the LBA range designated in the write/trim request #2 includes an intermediate portion within the LBA range designated in the write command #1.

More specifically, the LBAs x+1 and x+2 designated in the write/trim request #2 include, among the LBAs x to x+4 designated in the write command #1, the LBAs x+1 and x+2 (that is, sectors in which overwriting or trimming is performed) but does not include the start LBA x and a continuous LBA range from the end LBA x+4 toward the start LBA to the LBA x+3 (that is, sectors in which overwriting or trimming is not performed). In other words, the LBA range from the LBA x to the LBA x+4 designated in the write command #1 includes, among the LBAs x+1 and x+2 designated in the write/trim request #2, not only the LBAs x+1 and x+2 (that is, the sectors in which overwriting or trimming is performed) but also the LBA x and an LBA range from the LBA x+3 to the LBA x+4 (that is, the sectors in which overwriting or trimming is not performed).

As illustrated in FIG. 27, each of the LBA ranges designated in the write/trim requests #2a and #2b generated later includes a portion of the LBA range designated in the issued-and-uncompleted write command #1. As illustrated in FIG. 28, the LBA range designated in the write/trim request #2 generated later includes a portion of the LBA range designated in the issued-and-uncompleted write command #1.

An operation in a case where an LBA range designated in a write request generated later includes a portion of an LBA range designated in an issued-and-uncompleted write command will be described.

FIG. 29 illustrates an example of the operation in accordance with a write request designating an LBA range that includes a portion of an LBA range designated in an issued-and-uncompleted write command. The operation illustrated in FIG. 29 is performed, for example, after the write operation described above with reference to FIG. 11.

First, similarly to the operation illustrated in FIG. 21, after the host 2 receives a first completion for the issued-and-uncompleted write command (first write command), the host 2 and the memory system 3 perform an operation in accordance with the write request (hereinafter referred to as a third write request) designating an LBA range that includes a portion of the LBA range designated in the first write command. That is, after receiving the first completion that is a successful response to the first write command, the host 2 transmits a write command (hereinafter referred to as a third write command) corresponding to the third write request to the memory system 3 and manages an entry in the locked data list 245 that corresponds to the third write command. The memory system 3 updates the write management table 63 according to the third write command, and returns the first completion for the third write command to the host 2.

Then, when the first completion for the third write command is a successful response, the host 2 updates the entry in the locked data list 245 that corresponds to the third write command so that the entry indicates that the first completion has been received.

User data to be written in accordance with the first write command is referred to as first user data 711. User data requested to be written by the third write request is referred to as third user data 713. The first user data 711 and the third user data 713 are stored in the data buffer 241.

The command issuing module 211 issues a modify command for modifying the first write command. That is, the command issuing module 211 generates SQ entry information corresponding to the modify command for modifying the first write command. The issued modify command includes information (for example, the command ID) capable of identifying the first write command to be modified and information indicative of an LBA range in which writing is to be canceled. The LBA range in which writing is to be canceled indicates an overlapping portion between the LBA range designated in the first write command and the LBA range designated in the third write request. The command issuing module 211 stores the issued modify command (SQ entry information) in the submission queue 242 ((1) in FIG. 29).

Next, the command reception module 121 of the memory system 3 acquires the modify command from the submission queue 242 ((2) in FIG. 29). Then, the command reception module 121 sends the acquired modify command to the write/trim control module 122 ((3) in FIG. 29).

The write/trim control module 122 updates the write management table 63 by using the modify command sent from the command reception module 121 ((4) in FIG. 29). Specifically, the write/trim control module 122 identifies an entry in the write management table 63 that corresponds to the first write command, by using the command ID of the first write command designated in the modify command. In a case where a write operation based on the identified entry has not been started and the LBA range designated in the modify command is valid (that is, it is within the LBA range designated in the first write command), the write/trim control module 122 updates this entry so that writing to the LBA range designated in the modify command is canceled. More specifically, the write/trim control module 122 generates the modify command data 64 from the information indicating the LBA range designated in the modify command. Then, the write/trim control module 122 registers a pointer to the generated modify command data 64 with the pointer to modify command data field of this entry. As a result, when writing to the NAND flash memory 5 is performed in accordance with the first write command, the write/trim control module 122 controls the writing to avoid writing to the LBA range designated in the modify command within the LBA range designated in the first write command, according to the updated entry. Then, the write/trim control module 122 notifies the command reception module 121 that modification of the first write command in accordance with the modify command is successful (success of modify) ((5) in FIG. 29).

Note that it is possible to perform operations such as (1) addition, (2) modification, (3) insertion, and (4) deletion of the modify command data 64 in the memory system 3 by forming a list structure similarly to the registration with the modify command data list in the host 2.

When the write operation based on the identified entry has already been started or when the LBA range designated in the modify command is invalid, the write/trim control module 122 notifies the command reception module 121 that modification of the first write command in accordance with the modify command is not successful (failure of modification) ((5) in FIG. 29). That is, the write/trim control module 122 refuses to modify the first write command in accordance with the modify command. In addition, also in a case where no entry corresponding to the command ID of the first write command is present in the write management table 63, the write/trim control module 122 notifies the command reception module 121 of the failure of modification ((5) in FIG. 29).

In response to the notification from the write/trim control module 122, the command reception module 121 stores a completion for the modify command in the completion queue 243 ((6) in FIG. 29).

Specifically, when the write/trim control module 122 notifies the command reception module 121 of the success of the modification, the command reception module 121 stores a completion indicating the success of the modification (that is, successful termination) to the completion queue 243. When the write/trim control module 122 notifies the command reception module 121 of the failure of the modification, the command reception module 121 stores a completion indicating the failure of the modification (that is, error termination) to the completion queue 243.

Next, the command issuing module 211 of the host 2 acquires the completion for the modify command from the completion queue 243 ((7) in FIG. 29). Then, the command issuing module 211 sends the acquired completion to the write/trim management module 212 ((8) in FIG. 29).

In a case where the completion is a completion indicating the success of modification, since the first write command is modified, the write/trim management module 212 generates the modify command data 246 indicative of the LBA range designated in the modify command (that is, the LBA range for which writing has been canceled) ((9) in FIG. 29). Then, the write/trim management module 212 registers a pointer to the generated modify command data 246 with the first entry (more specifically, the pointer to modify command data field) in the locked data list 245 that corresponds to the first write command ((10) in FIG. 29).

Furthermore, in a case where the third write request is (A) the above-described write/trim request designating an LBA range that includes a contiguous portion from a start LBA toward an end LBA within the LBA range designated in a write command, the LBA range designated in the first write command is reduced so as to exclude the contiguous portion from the start LBA toward the end LBA in accordance with the modification. Regarding this operation, (a) a case where PRP is used as the data pointer and (b) a case where SGL is used as the data pointer will be described below.

(a) Case Where PRP is Used as Data Pointer

In this case, the LBA range can be excluded only by modifying an entry in the locked data list 245. That is, instead of generating the modify command data 246 and registering the generated modify command data 246 with the modify command data list of the first entry, the write/trim management module 212 updates information of the data pointer in the SQ entry information of the first entry so that the information indicates a storage location of user data to be written to the reduced LBA range. Further, the write/trim management module 212 updates the start LBA of the LBA range in the SQ entry information of the first entry so that the LBA range indicates the reduced LBA range. Note that the write/trim management module 212 may unlock the user data 71 that is no longer required to be written.

Specifically, when the data pointer in the SQ entry information of the first entry in the locked data list 245 includes the first PRP entry 921 described with reference to (A) of FIG. 5, the write/trim management module 212 rewrites the first PRP entry 921 so that the first PRP entry 921 indicates a physical address of a storage area in which the head of the user data 71 to be written to the new start LBA is stored. Furthermore, when the data pointer in the SQ entry information of the first entry includes the second PRP entry 922 described with reference to (A) of FIG. 5, the write/trim management module 212 rewrites the second PRP entry 922 so that the second PRP entry 922 indicates a physical address of storage area in which the user data 71 to be written to the new LBA range is stored.

In the host 2, the areas in which the user data 71 is stored may be managed with the data region management information in the locked data list 245 by using addresses on the logical address space. In a case where the data region management information is designated with a start LBA and an end LBA, the write/trim management module 212 simply changes the start LBA to a new start address. In a case where the data region management information is designated with the start LBA and a data length, the write/trim management module 212 changes both the start LBA and the data length.

Regardless of whether the areas in which the user data 71 is stored are managed with physical addresses or logical addresses, the write/trim management module 212 unlocks a storage area in which user data 71 that is no longer required to be written to the memory system 3 by having changed the start address of the LBA range, is stored after confirming successful termination of the modify command. As a result, the storage area is released and may be used for another purpose.

(b) Case Where SGL is Used as Data Pointer

In this case, the data pointer in the SQ entry information of the first entry in the locked data list 245 indicates an address of an SGL segment. Each of SGL segments is on the pointer list 244 and is also referred to from the memory system 3. When the start LBA is changed according to the modify command, the content of each SGL segment also needs to be modified accordingly. However, since each SGL segment is also referred to from the memory system 3, a function of locking a storage area in which each SGL segment is stored and a recovery function to be used at the time of an error termination are required for the modification. That is, the modification of SGL is more complex than PRP usage in which a storage area managed only by the host 2 and a storage area managed only by the memory system 3 are modified separately. Therefore, when SGL is used, it is desirable that the host 2 uses the modify command data 246 and the memory system 3 uses the modify command data 64.

Furthermore, in a case where the third write request is (B) the above-described write/trim request designating an LBA range that includes a contiguous portion from an end LBA toward a start LBA within an LBA range designated in a write command, the LBA range designated in the first write command is reduced so as to exclude the contiguous portion from the end LBA toward the start LBA in accordance with the modification. Also in this case, instead of generating the modify command data 246 and registering the generated modify command data 246 with the modify command data list of the first entry, the write/trim management module 212 may update the number of sectors indicative of the LBA range that is indicated by the SQ entry information in the first entry so that the number of sectors indicates the reduced LBA range. Note that the write/trim management module 212 may unlock user data 71 that does not need to be written.

In a case where the third write request is either (B) the above-described write/trim request designating an LBA range that includes a contiguous portion from an end LBA toward a start LBA within an LBA range designated in a write command or (C) a write/trim request designating an intermediate LBA range that is within an LBA range designated in a write command and includes neither a start LBA nor an end LBA of the LBA range designated in the write command, the start LBA of the LBA range designated in the first write command is not changed. Therefore, also when the modify command data 246 is not registered with the modify command data list of the first entry, the write/trim management module 212 does not need to change the data pointer indicating the storage location of the user data 71 to be written in accordance with the first write command and the start LBA.

In addition, in a case where the third write request is (C) the above-described write/trim request designating an intermediate LBA range that is within an LBA range designated in a write command and includes neither a start LBA nor an end LBA of the LBA range designated in the write command, the LBA range designated in the first write command changes to two LBA ranges by excluding the intermediate LBA range in accordance with the modification. These two LBA ranges are identifiable by the LBA range indicated by the SQ entry information in the first entry and the LBA range indicated by the generated modify command data 246.

When the completion for the modify command indicates the failure of modification, since the first write command is not modified, the write operation in accordance with the original first write command is continued. That is, the write/trim management module 212 does not generate the modify command data 246 corresponding to the modify command and does not update the first entry in the locked data list 245.

FIG. 30 illustrates an example of the modify command data 246 generated in the operation of (9) in FIG. 29. The modify command data 246 includes a start LBA "LBAx" of writing that has been canceled, the number of sectors "n" for which writing has been canceled, and a pointer "NULL" to the next modify command data.

The start LBA of writing that has been canceled indicates the start LBA of the LBA range designated in the modify command (that is, the LBA range for which writing has been canceled). The number of sectors for which writing has been canceled indicates the length of the LBA range designated in the modify command. Therefore, the LBA range designated in the modify command is obtained on the basis of the start LBA "LBAx" of writing that has been canceled and the number of sectors "n" for which writing has been canceled.

The pointer to the next modify command data indicates a pointer to other modify command data 246 generated for the first write command. Here, since the other modify command data 246 has not yet been generated, "NULL" is set to the pointer to the next modify command data.

Note that in a case where the LBA range for which writing has been canceled is simply extended by modification in accordance with the next modify command for the first write command, the host 2 may update the modify command data 246, which is already stored, so that the modify command data 246 indicates the extended LBA range, instead of generating new modify command data 246. In addition, in a case where, by modification in accordance with the next modify command for the first write command, the modified LBA range can be represented by simply reducing the LBA range designated in the first write command without specifying the LBA range for which writing has been canceled, the corresponding modify command data 246 may be deleted, and the LBA range indicated by the SQ entry information of the first entry in the locked data list 245 may be updated so as to indicate the reduced LBA range.

Further, when writing to the whole of the LBA range designated in the first write command is canceled as a result of modification in accordance with multiple modify commands, an abort operation of aborting the first write command (that is, the abort operation illustrated in FIG. 22) is performed similarly to the operation in the above-described case (1) where the LBA range designated in the write/trim request generated later wholly includes the LBA range designated in the issued-and-uncompleted write command.

When an entry in the locked data list 245 that corresponds to a write command is deleted, the modify command data 246 associated by the pointer to modify command data in the entry is also deleted. When the pointer to next modify command data in the associated modify command data 246 is set, other modify command data 246 associated by the pointer is also deleted. Similarly, all modify command data 246 that is associated, by pointers for a list structure, with the entry in the locked data list 245 to be deleted is also deleted.

FIG. 31 illustrates an example of the locked data list 245 in which the entry has been updated in the operation of (10) in FIG. 29. The locked data list 245 includes the entry 81 corresponding to the first write command and an entry 83 corresponding to the third write command.

The entry 81 is an entry indicating that the first completion for the first write command has been received, similarly to the entry 81 illustrated in FIG. 17. A pointer "ptr1" to the modify command data 246 is set in the pointer to modify command data field of the entry 81. The modify command data 246 is generated in response to reception of the completion indicative of the success of modification of the first write command from the memory system 3.

The entry 83 includes SQ entry information "sqentry_info3", a completion order "cseq3", data region management information "region_info3", and a completion state "completed". The entry 83 is an entry indicating that the first completion for the third write command has been received.

With the write and modify operations described above, when the LBA range designated in the third write request generated later wholly includes a portion of the LBA range designated in the issued-and-uncompleted first write command, a portion of writing to the memory system 3 in accordance with the first write command can be canceled.

Specifically, the host 2 transmits the third write command corresponding to the third write request to the memory system 3. Upon receiving the first completion indicative of a successful termination for the third write command from the memory system 3, the host 2 transmits a modify command for modifying the first write command to the memory system 3.

The memory system 3 receives the modify command from the host 2, and modifies the first write command when writing in accordance with the first write command is not started and the LBA range designated in the modify command is valid. Then, the memory system 3 returns a completion indicating the success of modification of the first write command to the host 2. The host 2 updates the entry in the locked data list 245 that corresponds to the first write command in response to the completion indicating the success of modification. Specifically, for example, the host 2 generates the modify command data 246 in response to the completion indicating the success of modification. Then, the host 2 registers the generated modify command data 246 with the modify command data list of the entry in the locked data list 245 that corresponds to the first write command.

As a result, in the memory system 3, a portion of writing to the NAND flash memory 5 in accordance with the first write command is canceled. That is, writing to the LBA range in which overwriting is to be performed according to the third write request is not performed. Therefore, it is possible to lower wear of the NAND flash memory 5.

Here, a case where the second example of the write operation described above is used, that is, a case where, when the IC reception module 210 of the host 2 receives a request for writing user data 71 to the NAND flash memory 5, the command issuing module 211 of the host 2 transmits a write command twice, and the memory system 3 responds to the two write commands with two respective completions will be described. In this case, when the host 2 has not received the first completion for the first write command transmitted in the first transmission, or when the host 2 has received the first completion for the first write command transmitted in the first transmission but has not yet performed the second transmission of the first write command to the memory system 3, the host 2 performs the second transmission of the first write command that designates a reduced LBA range, to the memory system 3. The reduced LBA range is obtained by excluding an LBA range for which writing is to be canceled from the LBA range designated in the first write command transmitted in the first transmission. As a result, similarly to the case of the successful modification in FIG. 29 described above, it is possible to cancel a portion of writing in accordance with the first write command. In this case, the write/trim control module 122 of the memory system 3 modifies a start LBA, a data pointer, and a data length of the corresponding entry in the write management table 63. Alternatively, the write/trim control module 122 may create modify command data 64 and write the pointer into the corresponding entry in the write management table 63.

When multiple separated LBA ranges are obtained by excluding an LBA range for which writing is to be canceled from the LBA range that is designated in the first write command transmitted in the first transmission, the host 2 transmits a command indicative of the excluded LBA range to the memory system 3. This command is, for example, a command having a data structure such as a trim command. In addition, the host 2 creates modify command data 246 and writes the pointer into the entry in the locked data list 245 that corresponds to the first write command.

When the second transmission of the first write command to the memory system 3 has been performed, the host 2 transmits a modify command for modifying the first write command to the memory system 3. As a result, a portion of writing in accordance with the first write command can be canceled.

Also, in a case where the third write request described above is replaced with a trim request, a similar operation can be realized. That is, when an LBA range designated in the trim request generated later wholly includes a portion of the LBA range designated in the issued-and-uncompleted first write command, the first write command may be similarly modified. In this case, in the operations described above with reference to FIGS. 21 and 29 to 31, the third write request is replaced with the trim request, and the third write command is replaced with a trim command. The trim operation performed in the host 2 and the memory system 3 in accordance with the trim request is as described above with reference to FIGS. 24 and 25.

Further, similarly to the second example of the write operation described above, when the IO reception module 210 of the host 2 receives the trim request, the command issuing module 211 of the host 2 may be configured to issue the trim command twice, and the memory system 3 may be configured to respond to the two trim commands with two respective completions. Also in this configuration, when the LBA range designated in the trim request includes a portion of the LBA range designated in the issued-and-uncompleted first write command, the first write command may be similarly modified.

Here, a case will be described where a plurality of issued-and-uncompleted write commands each designating an LBA range that is partially or wholly included in an LBA range designated in a write/trim request generated later are present.

FIG. 32 illustrates an example of a write/trim request #2a designating an LBA range that includes a portion or all of each of LBA ranges that are designated in issued-and-uncompleted write commands #1X, #1Y, and #1Z, respectively. "X" illustrated in FIG. 32 represents an LBA designated in the corresponding write command #1X. "Y" illustrated in FIG. 32 represents an LBA designated in the corresponding write command #1Y. "Z" illustrated in FIG. 32 represents an LBA designated in the corresponding write command #1Z. "W" illustrated in FIG. 32 represents an LBA designated in the corresponding write/trim request #2a. The LBA range designated in the write/trim request #2a is an LBA range in which writing or trimming is performed in accordance with the write/trim request (more particularly, the corresponding write command or trim command).

Specifically, in the write command #1X, an LBA range from an LBA x to an LBA x+1 is designated. The LBA range designated in the write command #1X is an LBA range in which making user data nonvolatile in accordance with the write command #1X is not yet completed.

In the write command #1Y, an LBA range from an LBA x+6 to an LBA x+7 is designated. The LBA range designated in the write command #1Y is an LBA range in which making user data nonvolatile in accordance with the write command #1Y is not yet completed.

In the write command #1Z, an LBA x+3 is designated. The LBA range (i.e., the LBA x+3) designated in the write command #1Z is an LBA range in which making user data nonvolatile in accordance with the write command #1Z is not yet completed.

In the write/trim request #2a, an LBA range from the LBA x+1 to the LBA x+6 is designated.

As described above, the LBA range designated in the write/trim request #2a includes a portion of the LBA range designated in the write command #1X, a portion of the LBA range designated in the write command #1Y, and the whole of the LBA designated in the write command #1Z. In this case, for example, the operation in the above-described case (1) where an LBA range designated in a write/trim request generated later wholly includes an LBA range designated in an issued-and-uncompleted write command is performed on the write command #1Z. On the other hand, the operation in the above-described case (2) where an LBA range designated in a write/trim request generated later includes a portion of an LBA range designated in an issued-and-uncompleted write command, the operation using the method (2-a) of modifying the issued-and-uncompleted write command, is performed on the write commands #1X and #1Y.

(Method (2-b) of Aborting Issued-and-Uncompleted Write Command)

Next, a method of aborting an issued-and-uncompleted write command will be described. In this method, when a write request designating an LBA range that includes a portion of an LBA range designated in the issued-and-uncompleted write command is generated, the host 2 transmits, to the memory system 3, a write command for performing writing in which writing in accordance with the write command and writing in accordance with the generated write request are merged. Thereafter, the host 2 aborts the issued-and-uncompleted write command. Hereinafter, a write command for performing writing that merges writing in accordance with an issued-and-uncompleted write command and writing in accordance with a write request designating an LBA range that includes a portion of the LBA range designated in the issued-and-uncompleted write is also referred to as a merge write command.

FIG. 33 illustrates an example of a merge write command #3 that is issued when a write request #2 designating an LBA range that includes a portion of an LBA range designated in an issued-and-uncompleted write command #1 is generated. "A" and "B" illustrated in FIG. 33 represent user data portions to be written in LBAs that are designated in the corresponding write command #1. "C" and "D" illustrated in FIG. 33 represent user data portions to be written in LBAs that are designated in the corresponding write request #2. That is, each of the user data portions A to D represents a specific data string.

Specifically, in the write command #1, an LBA range from an LBA x+1 to an LBA x+2 is designated. In the write command #1, the user data portions A and B to be written to the LBAs x+1 and x+2, respectively, are designated. The LBA range designated in the write command #1 is an LBA range in which making the user data portions A and B nonvolatile in accordance with the write command #1 is not yet completed.

In the write request #2, an LBA range from an LBA x to the LBA x+1 is designated. In the write request #2, the user data portions C and D to be written to the LBAs x and x+1, respectively, are designated.

The LBA range designated in the write request #2 includes the LBA x+1 (that is, a sector in which data is to be overwritten) that is a portion of the LBA range designated in the write command #1, and the LBA x (that is, a sector in which data is not overwritten) outside the LBA range designated in the write command #1. In other words, the LBA range designated in the write command #1 includes the LBA x+1 (that is, the sector in which data is to be overwritten) that is a portion of the LBA range designated in the write request #2, and the LBA x+2 (that is, a sector in which data is not overwritten) outside the LBA range designated in the write request #2.

The merge write command #3 is a write command for performing writing that merges writing in accordance with the write command #1 and writing in accordance with the write request #2. The merge write command #3 is generated on the basis of the user data portions C, D, and B that are to be finally written in an LBA range from the LBA x to the LBA x+2 if writing in accordance with the write request #2 is performed after writing in accordance with the write command #1 is performed. Therefore, in the merge write command #3, the LBA range from the LBA x to the LBA x+2 is designated. The LBA range from the LBA x to the LBA x+2 includes at least one of the LBA range designated in the write command #1 and the LBA range designated in the write request #2. The user data portions C, D, and B that are to be written to the LBAs x, x+1 and x+2, respectively, are associated with the merge write command #3. In the range where the write command #1 and the write request #2 overlap, the user data portion corresponding to the later write request #2 is written.

FIG. 34 illustrates another example of the merge write command #3 that is issued when the write request #2 designating the LBA range that includes a portion of the LBA range designated in the issued-and-uncompleted write command #1 is generated. "A" to "5" illustrated in FIG. 34 represent user data portions to be written in LBAs designated in the corresponding write command #1. "F" and "G" illustrated in FIG. 34 represent user data portions to be written in LBAs designated in the corresponding write request #2. That is, each of the user data portions A to G represents a specific data string.

Specifically, in the write command #1, an LBA range from an LBA x to an LBA x+4 is designated. In the write command #1, the user data portions A, B, C, D, and E that are to be written to the LBAs x, x+1, x+2, x+3, and x+4, respectively, are designated. The LBA range designated in the write command #1 is an LBA range in which making the user data portions A, B, C, D, and E nonvolatile in accordance with the write command #1 is not yet completed.

In the write request #2, an LBA range from the LBA x+1 to the LBA x+2 is designated. In the write request #2, the user data portions F and G that are to be written to the LBA x+1 and the LBA x+2, respectively, are designated.

The LBA range designated in the write request #2 includes the LBAs x+1 and x+2 (that is, sectors in which data is to be overwritten) that are a portion of the LBA range designated in the write command #1. In other words, the LBA range designated in the write command #1 includes the LBAs x+1 and x+2 (that is, the sectors in which data is to be overwritten) that are the LBA range designated in the write request #2, and the LBAs x, x+3, and x+4 (that is, sectors in which data is not overwritten) outside the LBA range designated in the write request #2.

The merge write command #3 is a write command for performing writing that merges writing in accordance with the write command #1 and writing in accordance with the write request #2. The merge write command #3 is generated on the basis of the user data portions A, F, G, D, and E that are to be finally written in the LBA range from the LBA x to the LBA x+4 in a case where writing in accordance with the write request #2 is performed after writing in accordance with the write command #1 is performed. Therefore, in the merge write command #3, the LBA range from the LBA x to the LBA x+4 is designated. The LBA range from the LBA x to the LBA x+4 includes at least one of the LBA range designated in the write command #1 and the LBA range designated in the write request #2. The user data portions A, F, G, D, and E that are to be written to the LBAs x, x+1, x+2, x+3, and x+4, respectively, are associated with the merge write command #3. In the range where the write command #1 and the write request #2 overlap, the user data portions corresponding to the later write request #2 is written.

As illustrated in FIGS. 33 and 34, when the write request #2 designating an LBA range that includes a portion of the LBA range designated in the issued-and-uncompleted write command #1 is generated, the merge write command #3 is used for aborting the write command #1.

An operation of issuing a merge write command and aborting an issued-and-uncompleted write command in a case where an LBA range designated in a write request generated later includes a portion of an LBA range designated in the issued-and-uncompleted write command will be described with reference to FIGS. 35 and 36.

FIG. 35 illustrates an example of an operation in response to a write request designating a logical address range that includes a portion of a logical address range designated in an issued-and-uncompleted write command. The operation illustrated in FIG. 35 is performed, for example, after the write operation described above with reference to FIG. 11. Here, the issued-and-uncompleted write command is referred to as a first write command. The write request designating an LBA range that includes a portion of the LBA range designated in the first write command is referred to as a third write request. User data to be written in accordance with the first write command is referred to as first user data 711. User data requested to be written by the third write request is referred to as third user data 713. The first user data 711 and the third user data 713 are stored in the data buffer 241.

First, in the host 2, the IO reception module 210 receives the third write request by the application 223 or the OS 221 ((1) in FIG. 35). The IO reception module 210 sends the received third write request to the write/trim management module 212 ((2) in FIG. 35).

In a case where the write/trim management module 212 has not received the first completion for the first write command, the write/trim management module 212 waits for reception of the first completion for the first write command. In the memory system 3, write commands and trim commands that have been received may be executed in any order regardless of the order of reception (out of order). Therefore, when multiple writing or trimming operations are performed on one LBA, the host 2 needs to control the memory system 3 according to the order in which write/trim requests are generated by the application 223 or the OS 221. Specifically, the host 2 needs to perform control so that a content corresponding to a write/trim request generated latest is finally reflected in the NAND flash memory 5 of the memory system 3. Therefore, the command issuing module 211 and the write/trim management module 212 wait for reception of the first completion for the first write command, and then perform an operation in accordance with the third write request. Hereinafter, a case where the first completion for the first write command is a successful response will be explained. When the first completion for the first write command is an error response, the write operation described above with reference to FIGS. 11 to 18 is performed in accordance with the third write request.

After the first completion that is the successful response to the first write command is received, the write/trim management module 212 determines user data 714 (hereinafter referred to as merged user data 714) to be written in accordance with the merge write command. The merged user data 714 is user data that is to be finally written in a case where writing in accordance with the third write request is performed after writing in accordance with the first write command is performed.

In a case where PRP is used as a data pointer indicating a storage location of the merged user data 714, the write/trim management module 212 copies a portion of the first user data 711 and the third user data 713 that are used as the merged user data 714, thereby generating the merged user data 714. The write/trim management module 212 stores the generated merged user data 714 to the data buffer 241.

In PRP, a storage location of data is represented by a list (that is, a list of PRP entries) in which physically discontinuous pages on the NVRAM 24 are linked. In the first page of the pages indicated by the list of PRP entries, an area for storing data may start from the middle of the first page. That is, data may not be stored in the head portion of the first page. In the last page, an area for storing data may end in the middle of the last page. That is, data may not be stored in the end portion of the last page. In intermediate pages between the first page and the last page, there should be no area in which no data is stored.

Here, a case where the page size of the NVRAM 24 is M times as large as the sector size which is a unit of an LBA will be considered. Note that M is an integer greater than one. In this case, the area in the NVRAM 24 in which the portion of the first user data 711 and the third user data 713, which are used as the merged user data 714, are stored may start from the middle of a page or may end in the middle of a page. Therefore, there is a possibility that the storage location of the portion of the first user data 711 and the third user data 713, which are used as the merged user data 714, cannot be represented by the list of PRP entries.

Therefore, when PRP is used as the data pointer indicating the storage location of the merged user data 714, the write/trim management module 212 copies the portion of the first user data 711 and the third user data 713 that are used as the merged user data 714, and stores the copied data to the NVRAM 24 such that the storage location of the merged user data 714 is a set of pages that can be represented by the list of PRP entries.

The write/trim management module 212 generates a data pointer (here, a list of PRP entries) that indicates the storage location of the merged user data 714. Then, the write/trim management module 212 locks the merged user data 714 ((3) in FIG. 35). FIG. 35 illustrates an example in which the merged user data 714 is stored in the data buffer 241 in the NVRAM 24 and locked.

In a case where SGL is used as the data pointer indicating the storage location of the merged user data 714, the write/trim management module 212 may not copy the portion of the first user data 711 and the third user data 713 that are used as the merged user data 714. In SGL, the storage location of the portion of the first user data 711 and the third user data 713, which are used as the merged user data 714, can be represented. Therefore, the write/trim management module 212 generates SGL indicating the storage location of the portion of the first user data 711 and the third user data 713 that are used as the merged user data 714. Then, the write/trim management module 212 locks the portion of the first user data 711 and the third user data 713 that are used as the merged user data 714 ((4) in FIG. 35). Note that the storage location of the portion of the first user data 711 used as the merged user data 714 may be temporarily referred to from both the first write command and the merge write command. In that case, since the first user data 711 is already locked when the first write command was issued, the write/trim management module 212 increments a reference counter for the portion of the first user data 711 that is used as the merged user data 714. The reference counter indicates the number of commands referring to corresponding data of a specific unit. When a command referring to certain data is newly issued, the reference counter corresponding to the data is incremented. When a process in accordance with a command referring to the certain data is completed, the reference counter corresponding to the data is decremented. When the decremented reference counter becomes zero, the write/trim management module 212 unlocks the corresponding data.

After locking the merged user data 714 in a case where PRP is used, or after locking the portion of the first user data 711 and the third user data 713 that are used as the merged user data 714 in a case where SGL is used, the write/trim management module 212 requests the command issuing module 211 to issue a write command (merge write command) for writing the merged user data 714 ((5) in FIG. 35). The command issuing module 211 issues the merge write command in response to the request from the write/trim management module 212. That is, the command issuing module 211 generates SQ entry information equivalent to the merge write command for writing the merged user data 714. The merge write command designates an LBA range including the LBA range designated in the first write command and the LBA range designated in the third write request. The command issuing module 211 sends the generated SQ entry information to the write/trim management module 212 ((6) in FIG. 35).

The write/trim management module 212 generates an entry of the locked data list 245 by using the SQ entry information sent from the command issuing module 211. The generated entry is referred to as a fourth entry. The fourth entry includes, for example, the SQ entry information equivalent to the issued merge write command and data region management information. The data region management information is information capable of identifying a storage area in the data buffer 241 in which the merged user data 714 is stored. The write/trim management module 212 adds the fourth entry to the locked data list 245 ((7) in FIG. 35).

Next, the command issuing module 211 stores the issued merge write command (SQ entry information) in the submission queue 242 ((8) in FIG. 35).

Subsequent operations ((9) to (13) in FIG. 35) in the memory system 3 in accordance with the merge write command are similar to the operations ((8) to (12) in FIG. 11) in the memory system 3 described above with reference to FIG. 11.

Next, the command issuing module 211 of the host 2 acquires the first completion for the merge write command from the completion queue 243 ((14) in FIG. 35). Then, the command issuing module 211 sends the acquired first completion to the write/trim management module 212 ((15) in FIG. 35).

When the first completion is a completion indicative of a successful termination, the write/trim management module 212 updates the fourth entry in the locked data list 245 that corresponds to the merge write command ((16) in FIG. 35). More specifically, the write/trim management module 212 adds, to the fourth entry, an assigned sequence number (that is, information indicating the order of reception of the first completion) and information indicating that the first completion has been received. The write/trim management module 212 notifies the IO reception module 210 of completion of writing (successful termination) ((17) in FIG. 35). Then, the IO reception module 210 notifies the application 223 or the OS 221 of the completion of writing ((18) in FIG. 35).

When the first completion is a completion indicative of an error termination, the write/trim management module 212 unlocks the merged user data 714 ((19) in FIG. 35) or unlocks the portion of the first user data 711 and the third user data 713 that are used as the merged user data 714 ((20) in FIG. 35). Then, the write/trim management module 212 deletes the fourth entry from the locked data list 245 ((21) in FIG. 35). The write/trim management module 212 uses the data region management information in the fourth entry to unlock the merged user data 714. Alternatively, the write/trim management module 212 decrements the reference counter for the portion of the first user data 711 used as the merged user data 714, and unlocks the third user data 713. In addition, in a case where the list of PRP entries or the second and subsequent segments of SGL were created, the write/trim management module 212 also releases the area of the pointer list 244 in which the list of PRP entries or the segments of SGL are stored. Then, the write/trim management module 212 deletes the fourth entry from the locked data list 245. The write/trim management module 212 notifies the IO reception module 210 of the error termination ((22) in FIG. 35). Then, the IO reception module 210 notifies the application 223 or the OS 221 of the error termination ((23) in FIG. 35).

Next, in the case where the first completion for the merge write command is a successful response, an operation (abort operation) of aborting the first write command is performed in the information processing system 1. This abort operation is similar to the abort operation described above with reference to FIG. 22. In the abort operation illustrated in FIG. 22, the first user data 711 to be written in accordance with the first write command is unlocked when the first write command is successfully aborted ((9) in FIG. 22). In contrast, in the method using the merge write command, the portion of the first user data 711 may be referred to not only from the first write command but also from the merge write command. In that case, in response to the successful abort of the first write command, the write/trim management module 212 unlocks a portion of the first user data 711 that is not referred to from the merge write command, and decrements the reference counter for the portion of the first user data 711 that is referred to from the merge write command. In a case where the merged user data 714 is generated by copying the portion of the first user data 711, the write/trim management module 212 unlocks the whole of the first user data 711 in response to the successful abort of the first write command.

FIG. 36 illustrates an example of the locked data list 245 updated in the abort operation when the first completion for the merge write command is a successful response. The locked data list 245 includes the entry 81 corresponding to the first write command and an entry 84 corresponding to the merge write command.

The entry 81 indicates that the first completion for the first write command has been received, similarly to the entry 81 illustrated in FIG. 17. The entry 81 is deleted in response to reception of a completion that indicates success of abort of the first write command from the memory system 3.

The entry 84 includes SQ entry information "sqentry_info4", a completion order "cseq4", data region management information "region_info4", and a completion state "completed". The entry 84 indicates that the first completion for the merge write command has been received.

With the write and abort operations described above, when the LBA range designated in the third write request generated later wholly includes a portion of the LBA range designated in the issued-and-uncompleted first write command, writing in accordance with the first write command in the memory system 3 can be aborted.

Specifically, the host 2 transmits, to the memory system 3, the merge write command obtained by merging the first write command and the third write request. Upon receiving the first completion indicating a successful termination for the merge write command from the memory system 3, the host 2 transmits an abort command for aborting the first write command to the memory system 3.

The memory system 3 receives the abort command from the host 2, and aborts the first write command when writing in accordance with the first write command is not started. Then, the memory system 3 returns a completion indicating the success of abort of the first write command to the host 2. The host 2 deletes the entry corresponding to the first write command from the locked data list 245 on the basis of the completion indicating the success of abort.

As a result, in the memory system 3, writing to the NAND flash memory 5 in accordance with the first write command is aborted. That is, writing to the LBA range in which overwriting is to be performed according to the third write request is not performed. Therefore, it is possible to lower wear of the NAND flash memory 5.

When the memory system 3 has a security function, and an LBA range in which overwriting is not performed in accordance with the third write request becomes write-inhibited after the memory system 3 receives the first write command, the host 2 does not issue the merge write command. Alternatively, after the host 2 receives an error from the memory system 3, the write operation described above with reference to FIGS. 11 to 18 is performed in accordance with the third write request.

(Recovery Operation)

Next, a recovery operation in the information processing system 1 will be described. The recovery operation is an operation for recovering the writing of user data into the memory system 3 that has failed to complete because of improper termination or unintentional restart of one or both of the host 2 and the memory system 3, by using data stored in the NVRAM 24. Here, the improper termination means that one or both of the host 2 and the memory system 3 terminate the operation before completing the writing of user data corresponding to all write commands received by the memory system 3. In addition, the unintentional restart indicates that one or both of the host 2 and the memory system 3 are restarted without completing a shutdown operation.

FIG. 37 illustrates an example of the recovery operation in the information processing system 1. Here, it is assumed a case where one or both of the host 2 and the memory system 3 were improperly terminated immediately before the current start or is unintentionally restarted. Specifically, the case is a case where the memory system 3 was improperly terminated or is restarted while the host 2 was operating properly, a case where the host 2 was improperly terminated or is restarted while the memory system 3 was operating properly, or a case where both the host 2 and the memory system 3 were improperly terminated or are restarted. First, when at least one of the host 2 and the memory system 3 remains in improperly terminated, the operator manually restarts the at least one of the host 2 or the memory system 3, for example. Then, the command issuing module 211 of the host 2 resets the memory system 3. At this time, in a case where the host 2 continues to operate properly, the command issuing module 211 discards the submission queue 242 and the completion queue 243 and newly creates a submission queue 242 and a completion queue 243. That is, the empty queues are created.

In addition, it is assumed that there is the writing of user data into the memory system 3 that has failed to complete because of the improper termination or the unintentional restart. That is, it is assumed that an entry indicating that the first completion has been received is included in the locked data list 245.

First, the IO reception module 210 of the host 2 suspends a process of receiving a new I/O request from the application 223 or the OS 221. That is, even upon receiving a new I/O request, the IO reception module 210 does not start a process for the new I/O request. The recovery control module 213 of the host 2 changes the locked data list 245 associated with the memory system 3 so that duplicate writing to one LBA is canceled ((1) in FIG. 37). Specifically, the recovery control module 213 sequentially identifies, in order from the head of the locked data list 245, one or more entries each indicating that the first completion has been received. In a case where at least a portion of an LBA range designated in a write command issued earlier overlaps with an LBA range designated in a write command issued later or a trim command issued later, the recovery control module 213 changes or deletes an entry corresponding to the write command issued earlier so that writing to the overlapping portion is not performed by using the identified one or more entries. As a result, in a case where writing or trimming based on the locked data list 245 is requested to the memory system 3 again, it is possible to avoid overwriting to a certain LBA or writing to a certain LBA that is trimmed later. Therefore, it is possible to lower wear of the NAND flash memory 5 of the memory system 3. The locked data list 245 including an entry that is changed so that duplicate writing to an LBA is canceled is also referred to as a deduplicated locked data list 245.

After acquiring the deduplicated locked data list 245, the recovery control module 213 sequentially identifies, in order from the head of the locked data list 245, N entries each indicating that the first completion has been received ((2) in FIG. 37). Note that N is an integer of one or more.

The recovery control module 213 selects an entry of the N entries from the locked data list 245. Since duplication is canceled at this time, the recovery control module 213 may process the entries in any order, and does not have to select each entry in an order from the head. Hereinafter, the selected entry is also referred to as a target entry. In the subsequent operations illustrated in FIG. 37, the N entries are used as the target entry one by one in the order from the head.

The recovery control module 213 locks corresponding user data 71 or corresponding range information 72 in the data buffer 241 by using the data region management information included in the target entry ((3) in FIG. 37). Then, the recovery control module 213 requests the command issuing module 211 to issue a corresponding write command or issue a corresponding trim command by using SQ entry information included in the target entry ((4) in FIG. 37).

Note that when the host 2 is restarted and the locked data list 245 includes an entry indicating that the first completion is not received, the recovery control module 213 deletes the entry. This is because the application 223 or the like is not a requestor and the recovery control module 213 cannot transmit a completion notification to the requestor. The entry indicating that the first completion is not received is, for example, an entry that does not include a completion order or a completion state. Since the first completion is not received, the recovery control module 213 determines that a write command or a trim command corresponding to this entry has not been received by the memory system 3. In addition, since the first completion is not received, the application 223 or the like terminates in a state where the application 223 or the like that has requested writing or trimming corresponding to this entry is not notified of completion of the writing or trimming. Therefore, it is not necessary to transmit the write command or the trim command that corresponds to the entry indicating that the first completion is not received, to the memory system 3 again. Therefore, the recovery control module 213 deletes the entry indicating that the first completion is not received from the locked data list 245.

The command issuing module 211 stores, in the submission queue 242, a write command or a trim command equivalent to the SQ entry information in the target entry in accordance with the request for issuing either the write command or the trim command by the recovery control module 213 ((5) in FIG. 37).

Then, the recovery control module 213 deletes the completion order and the completion state in the target entry ((6) in FIG. 37). Accordingly, the target entry indicates a state in which the corresponding write command or trim command is issued (transmitted) to the memory system 3 and the first completion thereof is not received.

Subsequent operations (7) to (11) in FIG. 37 in a case where the target entry corresponds to a write command are similar to the operations (8) to (12) in the write operation described above with reference to FIG. 11. Note that, in a case where the target entry corresponds to a trim command, the operations (7) to (11) in FIG. 37 are replaced with the operations (8) to (11) of the trim operation described above with reference to FIG. 24. That is, the command reception module 121 and the write/trim control module 122 of the memory system 3 receive the write command or the trim command from the submission queue 242, and store the first completion in the completion queue 243.

Then, the command issuing module 211 of the host 2 acquires the first completion for the write command or the trim command from the completion queue 243 ((12) in FIG. 37). The command issuing module 211 sends the acquired first completion to the recovery control module 213 ((13) in FIG. 37).

The recovery control module 213 receives the first completion from the command issuing module 211, and updates an entry in the locked data list 245 corresponding to the received first completion ((14) in FIG. 37). Specifically, the recovery control module 213 adds a sequence number indicating the order in which the first completion has been received and information indicating that the first completion has been received, to the entry corresponding to the received first completion.

By the recovery operation illustrated in FIG. 37 described above, the host 2 changes the locked data list 245 so that duplicate writing to an LBA is canceled or writing to an LBA that is trimmed later is canceled. Thereafter, the host 2 may transmit a write command for requesting the writing of corresponding user data 71 or a trim command for requesting deallocation of an LBA range based on corresponding range information 72, to the memory system 3 again by using the N entries each indicating that the first completion has been received. Therefore, it is possible to reproduce transmission of write commands and trim commands in which processing has failed to complete because of the improper termination or the unintentional restart of one or both of the host 2 and the memory system 3, in consideration of the order of requests of the write commands and the trim commands by the application 223 or the OS 221.

In the memory system 3, an operation in accordance with the transmitted write command or trim command is performed. In writing in accordance with the transmitted write command, duplicate writing to one LBA has been canceled.

The recovery control module 213 and the command issuing module 211 of the host 2 transmit, to the memory system 3, a special flush command for completing write commands or trim commands for which the first completions each indicating a successful termination have been received. Then, after the second completions for all the write commands and trim commands transmitted from the host 2 to the memory system 3 are received, the recovery control module 213 and the command issuing module 211 start processing a new I/O request from the application 223 or the OS 221. Alternatively, the recovery control module 213 and the command issuing module 211 may start processing a new I/O request from the application 223 or the OS 221 upon receiving the first completions for all the write commands or trim commands transmitted from the host 2 to the memory system 3. The new I/O request is a new request for reading data from the memory system 3 or a new request for writing data to the memory system 3. That is, the command issuing module 211 of the host 2 becomes capable of newly issuing a read command or a write command that corresponds to a received new I/O request, to the memory system 3.

With the recovery operation described above, it is possible to complete the writing of the user data and deallocation of the LBA range that have failed to complete because of the improper termination or the unintentional restart of one or both of the host 2 and the memory system 3. That is, by using the locked data list 245 that manages processing status of issued write commands and trim commands, the host 2 can recover the uncompleted writing and trimming for the memory system 3. Then, the command issuing module 211 of the host 2 can start processing a new I/O request received by the IO reception module 210 from the application 223 or the OS 221.

Note that, in any of the operations described above, an operation on data for managing writing or trimming for the memory system 3 needs to be performed atomically so that data mismatch does not occur even if processing is stopped at any time because of unexpected power loss, a crash of the OS 221, or the like. That is, it is necessary to perform a series of operations related to the data for managing writing or trimming for the memory system 3 so that the operations do not terminate halfway. Thus, for this operation, for example, a command that is guaranteed to be executed atomically, or an algorithm capable of returning to a consistent state when the atomic operation is not completed, is used. The operations that need to be performed atomically include changing each entry in the locked data list 245, adding an entry to the locked data list 245, deleting an entry from the locked data list 245, generating the modify command data 246, and deleting the modify command data 246.

In addition, each entry in the locked data list 245 includes a completion order. However, as described above, in a case where the above-described write operation, abort operation, and modify operation are applied to all write requests and trim requests from the application 223 or the OS 221, during the recovery operation, duplicate writing to an LBA is not performed, and trimming of an LBA is not performed after writing to the LBA is performed. Therefore, the completion order field may not be included in each entry in the locked data list 245. In addition, in the memory system 3, the order in which commands issued during the recovery operation are processed may not be guaranteed. However, it is necessary to add entries to the locked data list 245 according to the order in which corresponding write requests and trim requests are received from the application 223 or the OS 221. In addition, as described above, when there is a duplicate command having been issued, it is necessary to issue a next command after the first completion for the duplicate command is received.

Note that, in a case where a mode (speed priority mode) in which the above-described write operation, abort operation, and modify operation are not applied is provided to prioritize the processing speed, the above-described write operation, abort operation, and modify operation are applied only to some of write requests and trim requests from the application 223 or the OS 221, for example. In this case, each entry in the locked data list 245 needs to include a completion order.

Next, processes executed in the host 2 and the memory system 3 will be described with reference to flowcharts of FIGS. 38 to 54.

(Write Request Control Process in Host 2)

Figure 38:
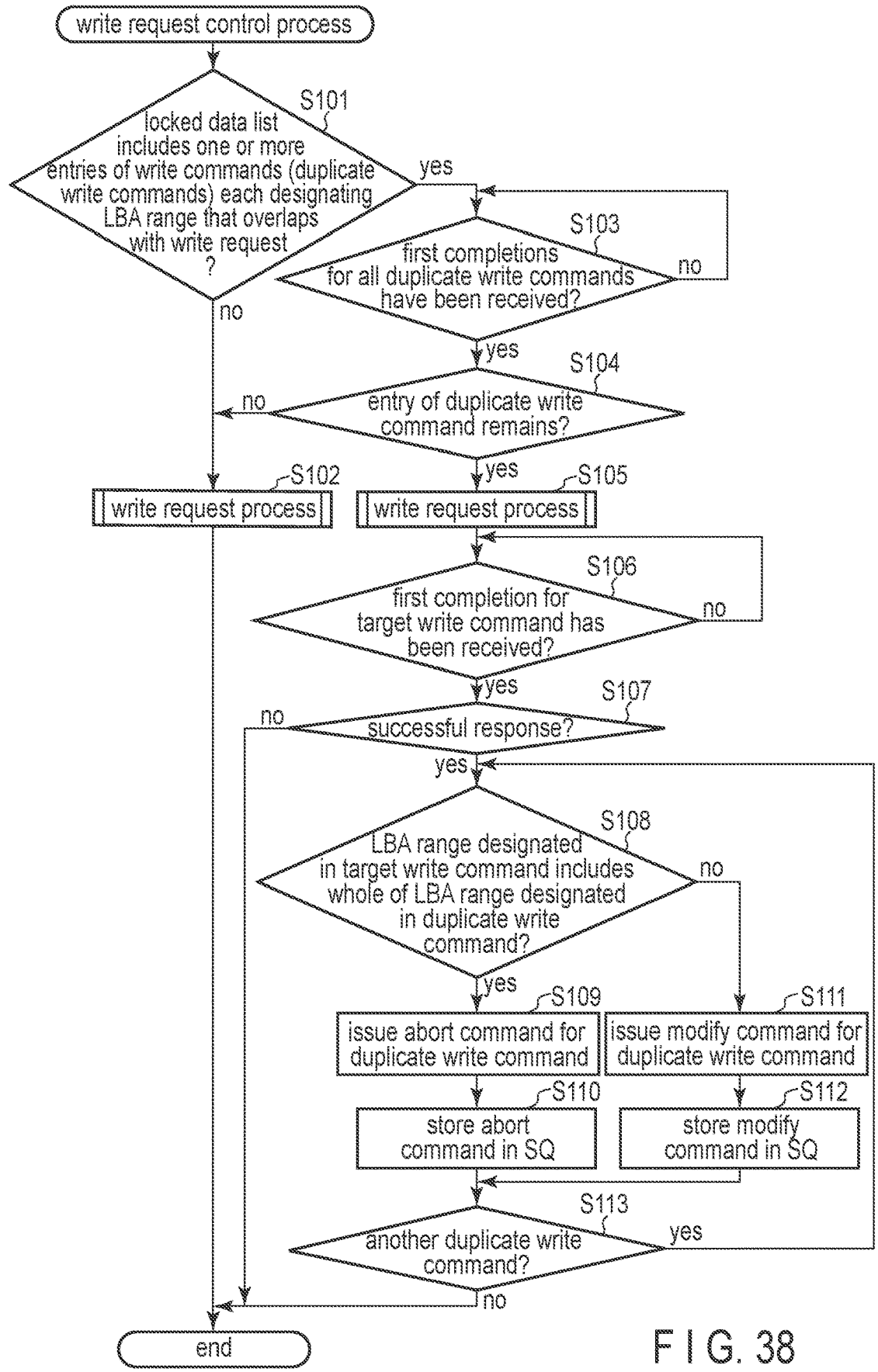
FIG. 38 is a flowchart illustrating an example of the procedure of a write request control process executed in the information processing apparatus according to the first embodiment.

FIG. 38 is a flowchart illustrating an example of the procedure of a write request control process executed by the CPU 21 of the host 2. This write request control process is a process for controlling writing to the NAND flash memory 5 of the memory system 3 depending on whether or not an LBA range designated in a new write request generated by the application 223 or the OS 221 overlaps with an LBA range designated in an issued-and-uncompleted write command. This write request control process is a process that implements: the above-described operation in the case (1) where the LBA range designated in the write/trim request generated later wholly includes the LBA range designated in the issued-and-uncompleted write command; and the above-described operation using the method (2-a) of modifying the issued-and-uncompleted write command in the case (2) where the LBA range designated in the write/trim request generated later includes a portion of the LBA range designated in the issued-and-uncompleted write command. The CPU 21 executes the write request control process when a new write request has been generated by the application 223 or the OS 221.

First, the CPU 21 determines whether or not the locked data list 245 includes one or more entries each indicating a write command (duplicate write command) designating an LBA range that at least partially overlaps with an LBA range designated in the current write request (step S101). Specifically, the CPU 21 determines whether or not an LBA range based on SQ entry information included in each entry in the locked data list 245 overlaps with the LBA range designated in the current write request.

When the locked data list 245 does not include any entry of a duplicate write command (no in step S101), the CPU 21 executes a write request process based on the current write request (step S102), and ends the write request control process. The write request process is a process in which the host 2 requests the memory system 3 to write user data. In the write request process, the CPU 21 issues a write command for writing user data, which is designated in the current write request, to the LBA range designated in the current write request. In addition, since the locked data list 245 does not include any entry of a duplicate write command, the CPU 21 does not perform a process for aborting or modifying a write command indicated by the locked data list 245. A specific procedure of the write request process will be described later with reference to the flowchart of FIG. 39.

When the locked data list 245 includes one or more entries of duplicate write commands (yes in step S101), the CPU 21 determines whether or not the first completions for all the duplicate write commands have been received (step S103). The CPU 21 makes the determination by determining whether a completion state in each of the one or more entries indicates that the first completion has been received and whether any of the one or more entries has been deleted according to the first completion indicative of an error termination. When the first completion for at least one of the duplicate write commands has not yet been received (no in step S103), the process by the CPU 21 returns to step S103.

That is, the CPU 21 waits until receiving the first completions for all the duplicate write commands.

When the first completions for all the duplicate write commands have been received (yes in step S103), the CPU 21 confirms that at least one of the first completions is a successful response, that is, confirms that any of the one or more entries of the duplicate write commands remains in the locked data list 245 (step S104). When the first completion for a duplicate write command is an error response, an entry corresponding to the duplicate write command is deleted from the locked data list 245. Thus, after receiving the first completions for all the duplicate write commands, the CPU 21 determines whether or not any of the one or more entries of the duplicate write commands remains in the locked data list 245.

When any of the one or more entries of the duplicate write commands does not remain (no in step S104), that is, when errors occur in processing for the duplicate write commands in the memory system 3 and the locked data list 245 does not include the entries of the duplicate write commands, the CPU 21 performs the write request process based on the current write request (step S102) and ends the write request control process. The CPU 21 does not perform processing for aborting or modifying a write command indicated in the locked data list 245.

When any of the one or more entries of the duplicate write commands remains (yes in step S104), the CPU 21 performs the write request process based on the current write request (step S105). In the locked data list 245, there is a possibility that an LBA range designated in a write command of a previous entry is modified or invalidated according to a write command or a trim command of a subsequent entry. On the other hand, there is no possibility that an LBA range designated in a write command of a subsequent entry is modified or invalidated according to a write command or a trim command of a previous entry. Therefore, in the present embodiment, sequence numbers are not essential. Note that sequence numbers are necessary when deduplication between an LBA range designated in a previous write command and an LBA range designated in a subsequent write command or trim command is not performed. Hereinafter, a write command issued in the write request process in step S105 is referred to as a target write command.

The CPU 21 determines whether or not the first completion for the target write command has been received (step S106). When the first completion for the target write command has not been received (no in step S106), the process by the CPU 21 returns to step S106. That is, the CPU 21 waits until receiving the first completion for the target write command.

Upon receiving the first completion for the target write command (yes in step S106), the CPU 21 determines whether or not the first completion for the target write command is a successful response (step S107). When the first completion for the target write command is an error response (no in step S107), the CPU 21 ends the write request control process. That is, since an error has occurred in processing for the target write command in the memory system 3, the CPU 21 does not perform processing for aborting or modifying the duplicate write command indicated in the locked data list 245.

When the first completion for the target write command is a successful response (yes in step S107), the CPU 21 determines whether or not the LBA range designated in the target write command (that is, the current write request) includes the whole of the LBA range designated in the duplicate write command (step S108). When the LBA range designated in the target write command includes the whole of the LBA range designated in the duplicate write command (yes in step S108), the CPU 21 issues an abort command for the duplicate write command (step S109). The abort command includes information (for example, a command ID) by which the duplicate write command to be aborted is identifiable. Then, the CPU 21 stores the issued abort command (that is, SQ entry information representing the abort command) in the submission queue 242 (step S110). As a result, the CPU 21 can request the memory system 3 to abort the writing of user data that is to be performed in accordance with the duplicate write command.

When the LBA range designated in the target write command includes only a portion of the LBA range designated in the duplicate write command (no in step S108), the CPU 21 issues a modify command for the duplicate write command (step S111). The modify command includes information by which the duplicate write command to be modified is identifiable, and information indicating an LBA range for which writing is to be canceled within the LBA range designated in the duplicate write command. Then, the CPU 21 stores the issued modify command (that is, SQ entry information representing the modify command) in the submission queue 242 (step S112). As a result, the CPU 21 can request the memory system 3 to cancel a portion of the writing of the user data that is to be performed in accordance with the duplicate write command.

Next, the CPU 21 determines whether or not another duplicate write command is present by using the locked data list 245 (step S113). When another duplicate write command is present (yes in step S113), the process by the CPU 21 returns to step S108. Accordingly, either an abort command or a modify command is issued for said another duplicate write command.

When another duplicate write command is not present (no in step S113), the CPU 21 ends the write request control process.

With the write request control process described above, when a new write request is generated by the application 223 or the OS 221, and an uncompleted write command (duplicate write command) designating an LBA range that overlaps with an LBA range designated in the new write request is present, the CPU 21 can request the memory system 3 to abort or modify the duplicate write command.

Specifically, the CPU 21 determines the presence or absence of a duplicate write command by using the locked data list 245. When a duplicate write command is present, the CPU 21 determines whether the LBA range designated in the new write request includes the whole of an LBA range designated in the duplicate write command or includes only a portion of the LBA range designated in the duplicate write command by using the locked data list 245. When the LBA range designated in the new write request includes the whole of the LBA range designated in the duplicate write command, the CPU 21 requests the memory system 3 to abort the duplicate write command. When the LBA range designated in the new write request includes only a portion of the LBA range designated in the duplicate write command, the CPU 21 requests the memory system 3 to modify the duplicate write command.

In this manner, when a duplicate write command designating an LBA range that overlaps with the LBA range designated in the new write request is present, the CPU 21 can request the memory system 3 to abort writing to be performed in accordance with the duplicate write command or to cancel a portion of writing to be performed in accordance with the duplicate write command.

(Process of Writing User Data to Memory System 3 in Host 2)

Figure 39:
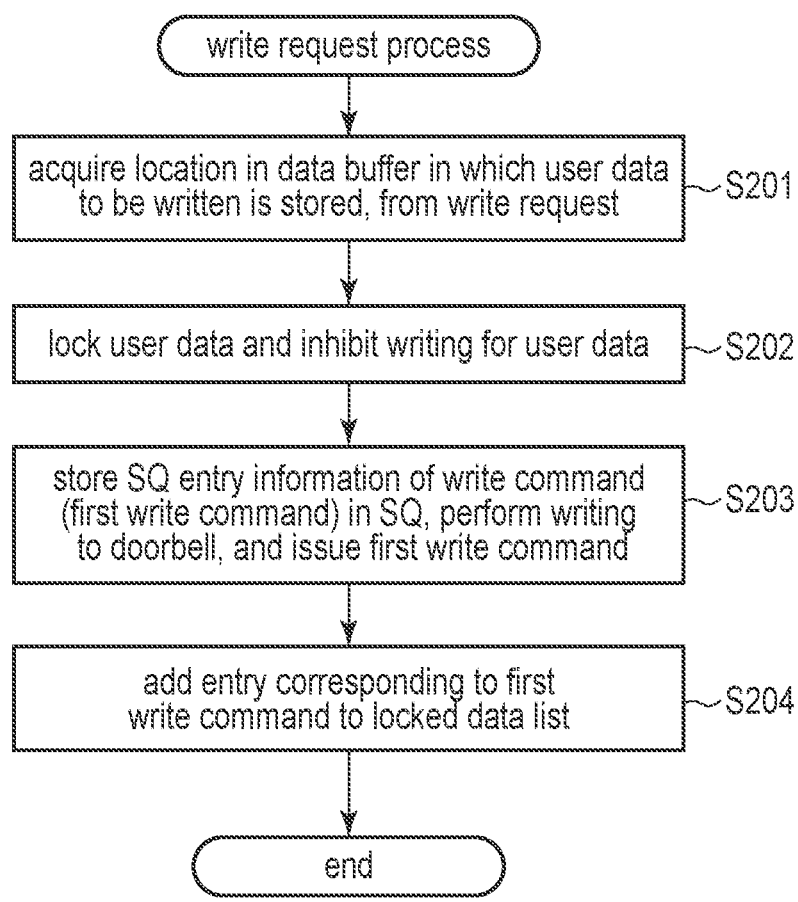
FIG. 39 is a flowchart illustrating an example of the procedure of a write request process executed in the information processing apparatus according to the first embodiment.

FIG. 39 is a flowchart illustrating an example of the procedure of the write request process performed by the CPU 21 of the host 2. The write request process is a process in which the host 2 requests the memory system 3 to write user data. The write request process corresponds to each of steps S102 and S105 of the write request control process described above with reference to FIG. 38.

First, the CPU 21 acquires, from a write request, a location of a storage area in the data buffer 241 in which user data to be written into the NAND flash memory 5 is stored (step S201). When the user data to be written into the NAND flash memory 5 is stored in the RAM 22, the CPU 21 copies the user data to the data buffer 241. Then, the CPU 21 acquires a location of a storage area in which the user data is copied. Next, the CPU 21 locks the user data stored in the data buffer 241 and inhibits writing for the user data (step S202). More specifically, the CPU 21 sets a state of the storage area (for example, a page), in which the user data is stored and which may be used by the driver 222 later, in a lock state and in a write-inhibited state by using a function of the OS 221 being executed. As a result, it is possible to prevent the storage area in which the user data is stored from being unintentionally released and prevent the user data from being overwritten. That is, after notifying the application 223 or the OS 221 of completion of the write request upon receiving the first completion, the CPU 21 can detect that the user data stored in the storage area is about to be overwritten.

The CPU 21 issues a write command (hereinafter, referred to as a first write command) for writing the user data stored in the data buffer 241 into the NAND flash memory 5 (step S203). More specifically, the CPU 21 stores SQ entry information of the first write command in the submission queue 242, and writes the value of the SQ Tail pointer to the SQ Tail doorbell register of the memory system 3.

Next, the CPU 21 adds an entry corresponding to the first write command to the locked data list 245 (step S204). The added entry includes, for example, the SQ entry information and the data region management information that correspond to the first write command. The SQ entry information corresponding to the first write command is information representing the first write command. More specifically, the SQ entry information corresponding to the first write command is information stored in the submission queue 242 to cause the memory system 3 to execute processing in accordance with the first write command. The data region management information corresponding to the first write command is information by which a storage area in the data buffer 241 in which the user data corresponding to the first write command is stored is identifiable. The SQ entry information also includes information for identifying the storage area in the data buffer 241. However, since this information in the SQ entry information is described with physical addresses, the data region management information is desirably described with logical addresses.

Note that the CPU 21 may execute the procedure of step S204 of adding the entry corresponding to the first write command to the locked data list 245 before the procedure of step S203 of storing the first write command in the submission queue 242. In addition, the CPU 21 may execute the procedure of step S203 and the procedure of step S204 in parallel.

With the write request process described above, the CPU 21 can request the memory system 3 to write the user data stored in the data buffer 241. In addition, the CPU 21 can manage information related to writing requested to the memory system 3 (that is, information related the issued write command) by using the locked data list 245.

(Process for Writing User Data in Memory System 3)

Figure 40:
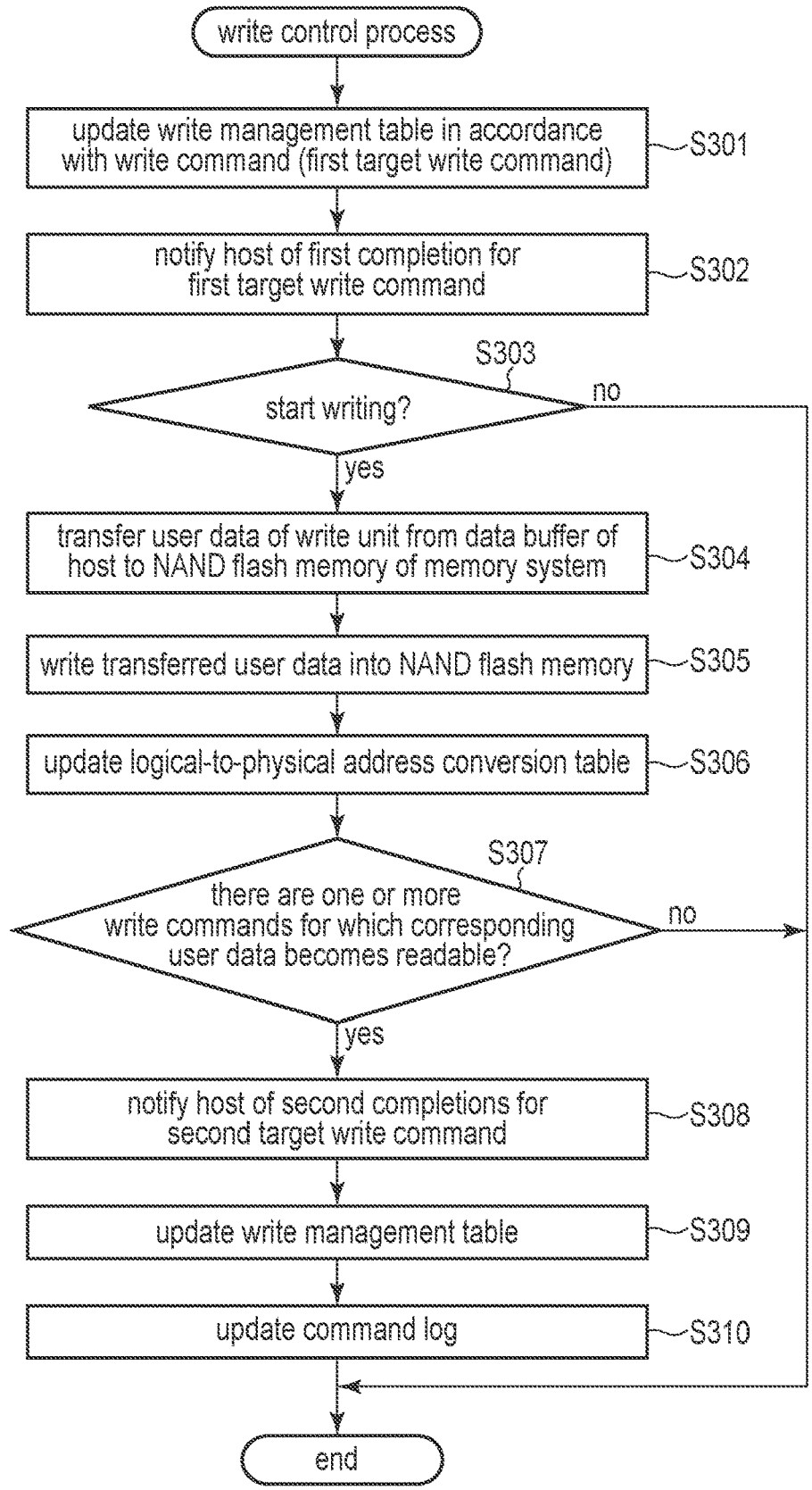
FIG. 40 is a flowchart illustrating an example of the procedure of a write control process executed in the memory system that communicates with the information processing apparatus according to the first embodiment.

FIG. 40 is a flowchart illustrating an example of the procedure of a write control process executed by the controller 4 (specifically, by the CPU 12) of the memory system 3. The write control process is a process for receiving a write command issued by the host 2 and controlling the writing of user data corresponding to write commands that have been received. The CPU 12 executes the write control process upon acquiring a write command issued by the host 2 from the submission queue 242. Here, the write command acquired from the submission queue 242 is referred to as a first target write command.

First, the CPU 12 updates the write management table 63 on the basis of the first target write command (step S301). Specifically, the CPU 12 acquires, for example, a command ID, an LBA (a start LBA), a data length, and a data pointer from the first target write command. The CPU 12 adds an entry indicating the acquired command ID, LBA, data length, and data pointer, to the write management table 63.

Then, the CPU 12 notifies the host 2 of the first completion for the first target write command (step S302). More specifically, the CPU 12 stores the first completion in the completion queue 243 and notifies the host 2 of an interrupt. The CPU 12 may notify the host 2 of an interrupt once after storing multiple completions in the completion queue 243. The first completion for the first target write command includes a command ID of the first target write command.

Next, the CPU 12 determines whether it is possible to start the writing of user data (step S303). More specifically, for example, the CPU 12 starts the writing of user data when a total amount that is obtained by subtracting the amount of user data canceled in accordance with a modify command (or modify commands) from the total amount of user data that is to be written in accordance with one or more write commands for which the first completions have been returned, has reached the write unit. The CPU 12 calculates the total amount of user data to be written excluding the user data canceled in accordance with the modify command by using the write management table 63 and the modify command data 64. That is, the CPU 12 calculates a data amount that is obtained by subtracting the amount of user data corresponding to an LBA range (or LBA ranges) in which writing has been canceled in accordance with the modify command from the total amount of user data that is to be written and is stored in the data buffer 241 of the host 2.

Note that, when an abort command or a modify command for a previous write command is scheduled to be transmitted subsequent to the first target write command to cancel duplicate writing caused by the previous write command and the first target command, a flag indicating the transmission schedule may be added to the first target write command. When multiple abort commands or modify commands will be transmitted, a flag indicating that an abort command or a modify command is scheduled to be further transmitted may be added to each of the abort commands or modify commands. As a result, even when the total amount of user data to be written has reached the write unit in response to reception of the first target write command, the CPU 12 can wait for a subsequent abort command or modify command without starting writing to the NAND flash memory 5. This can avoid failure of the abort command or the modify command. Furthermore, it is possible to prevent the writing of user data to be written from being started when the total amount of user data to be written has not reached the write unit according to execution of the abort command or the modify command.

When the total amount of user data to be written excluding the canceled user data has not reached the write unit (no in step S303), the CPU 12 ends the write control process.

When the total amount of user data to be written excluding the canceled user data has reached the write unit (yes in step S303), the CPU 12 transfers the user data of the write unit from the data buffer 241 of the host 2 to the NAND flash memory 5 of the memory system 3 (step S304). The CPU 12 writes the transferred user data into the NAND flash memory 5 (step S305). Next, the CPU 12 updates the logical-to-physical address conversion table 62 so that it indicates the correspondence between a physical address and an LBA to which the user data is written (step S306).

Next, the CPU 12 determines whether or not there are one or more write commands for which corresponding user data becomes readable from the NAND flash memory 5 (step S307). When there is no write command for which corresponding user data becomes readable (no in step S307), the process by the CPU 12 ends. That is, since the CPU 12 has not yet notified the host 2 of the second completion indicating that the writing of user data in accordance with a write command is completed, the process by the CPU 12 ends.

When there are one or more write commands for which corresponding user data, which is written in step S305, becomes readable, that is, there are one or more write commands that have been completed (yes in step S307), the CPU 12 notifies the host 2 of the one or more second completions for the one or more write commands (step S308). A write command for which corresponding user data has been written (and becomes readable) is hereinafter referred to as a second target write command. The second completion for the second target write command includes a command ID of the second target write command. Then, the CPU 12 updates the write management table 63 (step S309). Specifically, the CPU 12 deletes an entry corresponding to the second target write command from the write management table 63. In a case where there is the modify command data 64 that is associated with the entry corresponding to the second target write command, the CPU 12 also deletes the modify command data 64. Then, the CPU 12 updates the command log 51 so as to add the command ID of the second target write command to the command log 51 (step S310), and ends the write control process.

With the write control process described above, the CPU 12 can manage a write command received from the host 2 and control the writing of user data corresponding to write commands that have been received. Specifically, when receiving a write command from the host 2, the CPU 12 updates the write management table 63 on the basis of the write command and returns the first completion to the host 2. Further, when user data of the write unit (user data excluding user data canceled in accordance with a modify command) is stored in the data buffer 241, the CPU 12 writes the user data of the write unit into the NAND flash memory 5. Then, the CPU 12 returns, to the host 2, the second completions for write commands that correspond to the user data which has been written.

Therefore, the CPU 12 can notify the host 2 of a processing state of a write command by returning the first completion and the second completion to the host 2. In addition, the CPU 12 can efficiently use the storage area of the NAND flash memory 5 by writing according to the delayed write completion.

Note that, not only when the total amount of user data that is to be written excluding user data canceled in accordance with a modify command has reached the write unit (yes in step S303), but also when time elapsed after a write command is received exceeds a threshold value, the CPU 12 may write user data that correspond to write commands into the NAND flash memory 5 with padding. Specifically, when time elapsed from reception of a write command exceeds the threshold value, the CPU 12 transfers user data that corresponds to write commands having been received and excludes user data canceled in accordance with a modify command, from the data buffer 241 of the host 2 to the NAND flash memory 5. Then, the CPU 12 writes the transferred user data with padding into the NAND flash memory 5. That is, when time elapsed from reception of a write command exceeds the threshold value, the CPU 12 performs the procedures in and after step S304 of the write control process illustrated in FIG. 40. In this case, user data of the write unit in step S304 is replaced with data obtained by adding the padding data to the user data that corresponds to write commands having been received. Accordingly, the CPU 12 can notify the second completion for the write command within time expected by the host 2.

Further, when time elapsed from execution of an erase operation on a block of the NAND flash memory 5 exceeds a threshold value, the CPU 12 may write user data with padding up to the end of the block in a similar way described above. As a result, the quality of user data written in the block can be maintained.

Further, upon receiving a special flush command, the CPU 12 may write user data that correspond to all write commands having been received into the NAND flash memory 5 with padding to complete these write commands. That is, upon receiving the special flush command, the CPU 12 may perform the procedures in and after step S304 of the write control process illustrated in FIG. 40. In this case, user data of the write unit in step S304 is replaced with data obtained by adding the padding data to the user data that corresponds to the write commands having been received.

(Process for Aborting Duplicate Write Command in Memory System 3)

Figure 41:
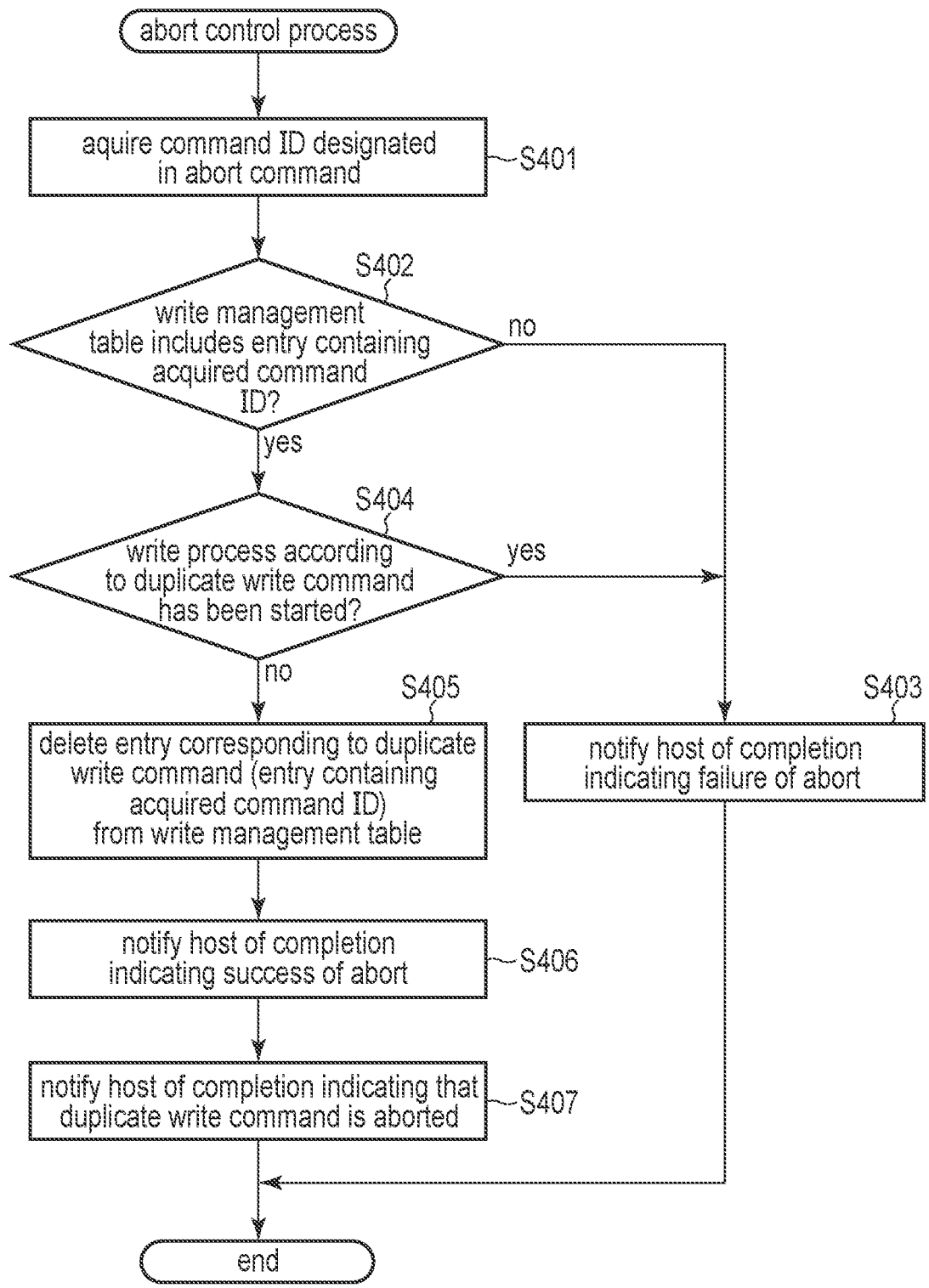
FIG. 41 is a flowchart illustrating an example of the procedure of an abort control process executed in the memory system that communicates with the information processing apparatus according to the first embodiment.

FIG. 41 is a flowchart illustrating an example of the procedure of an abort control process executed by the CPU 12 of the memory system 3. The abort control process is a process based on an abort command received from the host 2. The CPU 12 executes the abort control process in response to acquiring an abort command issued by the host 2 from the submission queue 242. Here, a case where a target to be aborted by the abort command is a duplicate write command will be explained.

First, the CPU 12 acquires a command ID designated in the abort command (step S401). The acquired command ID is a command ID of the duplicate write command to be aborted in accordance with the abort command. The CPU 12 determines whether or not the write management table 63 includes an entry containing the acquired command ID (step S402).

When the write management table 63 does not include an entry containing the acquired command ID (no in step S402), since no duplicate write command is present, the CPU 12 notifies the host 2 of a completion indicating a failure of abort (step S403), and ends the abort control process.

When the write management table 63 includes the entry containing the acquired command ID (yes in step S402), the CPU 12 determines whether or not the write process in accordance with the duplicate write command has been started (step S404). For example, when the procedure of step S305 of the write control process described above with reference to FIG. 40 is being performed or is completed on the basis of one or more write commands that include the duplicate write command to be aborted, the CPU 12 determines that the write process in accordance with the duplicate write command has been started. In other words, the CPU 12 determines whether writing to the NAND flash memory 5 has been started or completed.

When the write process in accordance with the duplicate write command has already been started (yes in step S404), the CPU 12 cannot abort the write process in accordance with the duplicate write command, and thus notifies the host 2 of a completion indicating a failure of abort (step S403), and ends the abort control process.

When the write process in accordance with the duplicate write command has not yet been started (no in step S404), the CPU 12 deletes the entry corresponding to the duplicate write command (that is, the entry including the acquired command ID) from the write management table 63 (step S405). When the transfer of user data corresponding to the duplicate write command from the data buffer 241 (step S304 in FIG. 40) has been started, the CPU 12 stops the transfer. Even when the transfer has been completed, the CPU 12 does not perform writing to the NAND flash memory 5 (step S305 in FIG. 40). As a result, the CPU 12 can abort writing the user data in accordance with the duplicate write command. Then, the CPU 12 notifies the host 2 of a completion indicating a success of abort (step S406). Further, the CPU 12 notifies the host 2 of a completion indicating that the duplicate write command has been aborted (step S407), and ends the abort control process.

Note that, after finding the entry in the write management table 63 that contains the acquired command ID (step S402) until deleting the entry (step S405), the CPU 12 does not start a process of writing the user data corresponding to the duplicate write command into the NAND flash memory 5. That is, when the abort command has been received between step S304 and step S305, the CPU 12 stops the write control process until the abort command is completed. Since the total amount of user data to be written excluding the canceled user data may still reach the write unit, the CPU 12 may resume the write control process by returning to step 303 after completion of the abort command. In a case where the flag indicating that an abort command or a modify command is scheduled to be transmitted subsequent to the write command is used, the abort process is completed before the determination in step S303. In this case, the total amount of user data does not change after the total amount of user data to be written excluding the canceled user data reaches the write unit (yes in step S303), and thus the CPU 12 does not need to recalculate the total amount of user data.

In addition, in a case where receiving an abort command for a duplicate write command during the write process that is performed when time elapsed from reception of the write command exceeds the threshold value or during the process according to a flush command, and then stopping the write control process before step S305, the CPU 12 restarts the stopped process from the beginning.

With the abort control process described above, when the CPU 12 receives the abort command from the host 2, and the write process in accordance with the duplicate write command has not been started, the CPU 12 can stop writing user data in accordance with the duplicate write command.

(Process for Modifying Duplicate Write Command in Memory System 3)

Figure 42:
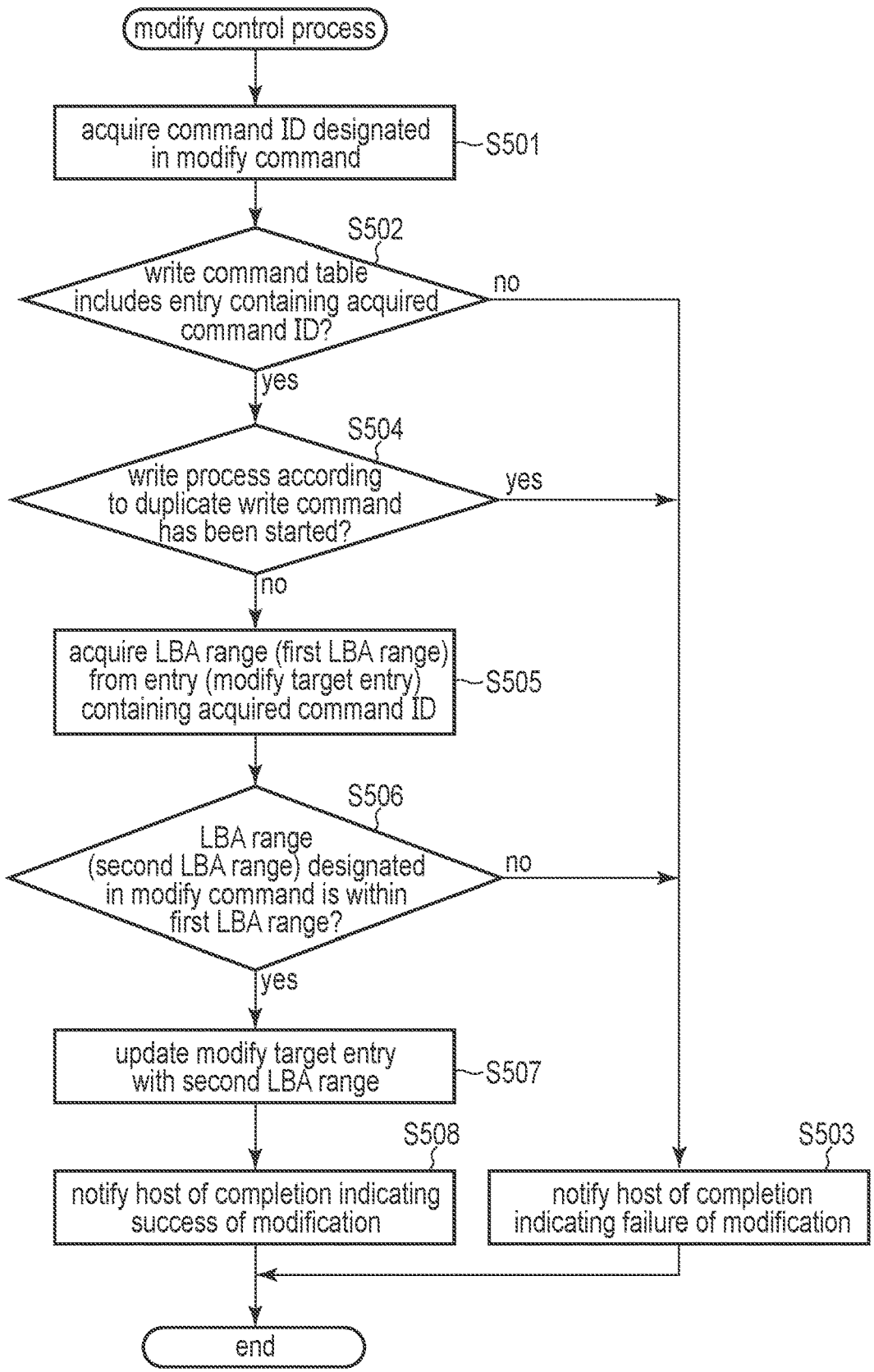
FIG. 42 is a diagram illustrating an example of the procedure of a modify control process executed in the memory system that communicates with the information processing apparatus according to the first embodiment.

FIG. 42 is a flowchart illustrating an example of the procedure of a modify control process executed by the CPU 12 of the memory system 3. The modify control process is a process based on a modify command received from the host 2. The CPU 12 executes the modify control process in response to acquiring the modify command, which is issued by the host 2, from the submission queue 242.

First, the CPU 12 acquires a command ID designated in the modify command (step S501). The acquired command ID is a command ID of a write command (that is, a duplicate write command) to be modified in accordance with the modify command. The CPU 12 determines whether or not the write management table 63 includes an entry containing the acquired command ID (step S502). The entry containing the acquired command ID is also referred to as a modification target entry.

When the write management table 63 does not include the modification target entry (no in step S502), no duplicate write command is present, and thus the CPU 12 notifies the host 2 of a completion indicating a failure of modification (step S503), and ends the modify control process.

When the write management table 63 includes the modification target entry (yes in step S502), the CPU 12 determines whether or not the write process in accordance with the duplicate write command has been started (step S504). For example, when the procedure of step S305 of the write control process described above with reference to FIG. 40 is being performed or is completed on the basis of one or more write commands that include the duplicate write command to be modified, the CPU 12 determines that the write process in accordance with the duplicate write command has been started. In other words, the CPU 12 makes the determination on the basis of whether writing to the NAND flash memory 5 has been started or completed.

When the write process in accordance with the duplicate write command has already been started (yes in step S504), the CPU 12 cannot modify the write process in accordance with the duplicate write command, and thus notifies the host 2 of a completion indicating a failure of modification (step S503), and ends the modify control process.

When the write process in accordance with the duplicate write command has not been started (no in step S504), the CPU 12 acquires an LBA range from the modification target entry (step S505). Specifically, the CPU 12 acquires the LBA range (first LBA range) on the basis of an LBA and a data length that are indicated in the modification target entry. Then, the CPU 12 determines whether or not an LBA range (second LBA range) designated in the modify command is within the first LBA range (step S506).

When at least a portion of the second LBA range is outside the first LBA range (no in step S506), the CPU 12 notifies the host 2 of a completion indicating the failure of modification (step S503) since the designated second LBA range is inappropriate, and ends the modify control process.

When the second LBA range is within the first LBA range (yes in step S506), the CPU 12 updates the modification target entry by using the second LBA range (step S507). Specifically, the CPU 12 generates the modify command data 64 indicative of the second LBA range. Then, the CPU 12 registers a pointer to the generated modify command data 64 with the pointer to modify command data field of the modification target entry. As a result, the CPU 12 can manage the second LBA range in which writing is to be canceled within the first LBA range by using the modification target entry and the modify command data 64. Then, the CPU 12 notifies the host 2 of a completion indicating a success of modification (step S508), and ends the modify control process.

With the modify control process described above, the CPU 12 can update the write management table 63 so that writing to the second LBA range within the first LBA range which is designated in the duplicate write command, is canceled in accordance with the modify command received from the host 2. That is, the CPU 12 can modify the first LBA range which is designated in the duplicate write command, in accordance with the modify command. The CPU 12 does not write user data to the second LBA range within the first LBA range which is designated in the duplicate write command, according to the updated write management table 63.

(Process in Host 2 On the basis of Response to Write Command from Memory System 3)

FIG. 43 is a flowchart illustrating an example of the procedure of a write response reception process executed by the CPU 21 of the host 2. The write response reception process is a process based on a response (completion) to a write command received from the memory system 3. The CPU 21 executes the write response reception process in response to acquiring a completion for a write command from the completion queue 243.

First, the CPU 21 identifies an entry in the locked data list 245 that corresponds to a command ID included in the acquired completion (step S601). The CPU 21 determines whether or not the acquired completion is the first completion by using the identified entry (step S602). Specifically, for example, in a case where no value is set as the completion state in the identified entry, the CPU 21 determines that the acquired completion is the first completion. In a case where a value indicating that the first completion has been received is set as the completion state in the identified entry, the CPU 21 determines that the acquired completion is the second completion.

When the acquired completion is the first completion (yes in step S602), the CPU 21 determines whether or not the completion is a successful response (step S603).

When the acquired completion is the successful response (yes in step S603), the CPU 21 adds one to a variable Cseq (that is, increments the variable Cseq) that is used for assigning a sequence number to a completion (step S604). Then, the CPU 21 updates the identified entry by using the variable Cseq (step S605). Specifically, the CPU 21 adds (sets) the sequence number indicated by the variable Cseq as the completion order in the identified entry. Accordingly, the sequence number indicated by the variable Cseq is assigned to the acquired completion. In addition, the CPU 21 adds a value indicating that the first completion has been received as the completion state in the identified entry. Then, the CPU 21 returns a response indicating that writing has been completed to a write request generated by the application 223 or the OS 221 (step S606), and ends the write response reception process.

Note that there may be a case where a method of transmitting a write command to the memory system 3 twice in accordance with a write request that is generated by the application 223 or the OS 221, and receiving, from the memory system 3, the first completion for the first write command (i.e., the write command transmitted in the first transmission) and the second completion for the second write command (i.e., the write command transmitted in the second transmission), is used. In this case, for example, after updating the identified entry in step S605, the CPU 21 stores a second write command in the submission queue 242 (step S607), rewrites the command ID in the identified entry with a command ID of the second write command, and ends the write response reception process.

When the acquired completion (that is, the first completion) is an error response (no in step S603), the CPU 21 unlocks user data in the data buffer 241 that is associated with the command ID in the completion (step S608). The application 223 or the OS 221 deletes the user data after the data buffer 241 is unlocked. For example, the CPU 21 can identify the user data in the data buffer 241 that is to be unlocked by using the data region management information in the identified entry. After the user data is unlocked, the user data may be deleted. That is, a storage area in the data buffer 241 (that is, the storage area in the NVRAM 24) in which the user data is stored is released. The CPU 21 deletes the identified entry from the locked data list 245 (step S609). Note that, in a case where a list of PRP entries or second and subsequent segments of SGL were created for this entry, the CPU 21 also releases an area of the pointer list 244 in which the list or the segments are stored. Then, the CPU 21 notifies the application 223 or the OS 221 that the processing corresponding to the command of the identified entry has failed (step S610), and ends the write response reception process.

When the acquired completion is the second completion (no in step S602), the CPU 21 determines whether or not the completion is a successful response (step S611).

When the acquired completion is a successful response (yes in step S611), the CPU 21 unlocks the user data in the data buffer 241 that is associated with the command ID in the completion and cancels write inhibition thereof (step S612). Then, the CPU 21 deletes the identified entry from the locked data list 245 (step S613), and ends the write response reception process. Note that, in a case where a list of PRP entries or second and subsequent segments of SGL were created for this entry, the CPU 21 also releases an area of the pointer list 244 in which the list and the segments are stored. In addition, in a case where the modify command data 246 was created for this entry, the CPU 21 also releases an area in which the modify command data 246 is stored.

When the acquired completion (that is, the second completion) is an error response (no in step S611), the CPU 21 regards the memory system 3 as having failed, stops processing for the memory system 3 (step S614), notifies the OS 221 of the occurrence of failure, and ends the write response reception process. In this case, exception processing of the information processing system 1 is performed. Thereafter, the IO reception module 210 rejects all requests to changing user data, such as a write request and a trim request, generated from the application 233 or the OS 211.

With the write response reception process described above, the CPU 21 can perform different processes depending on whether the received completion is the first completion or the second completion for a corresponding write command, and whether the received completion is a successful response or an error response. That is, when the received completion is the first completion and is a successful response, the CPU 21 adds, to the corresponding entry in the locked data list 245, the sequence number Cseq assigned to the completion and information indicating that the first completion has been received, and returns a completion response for the write request. When the received completion is the first completion and is an error response, the CPU 21 deletes the corresponding user data and the corresponding entry in the locked data list 245 from the NVRAM 24, and returns an error response for the write request. When the received completion is the second completion and is a successful response, the CPU 21 deletes the corresponding user data (that is, the user data which has been written) and the corresponding entry in the locked data list 245 from the NVRAM 24. When the received completion is the second completion and is an error response, the CPU 21 regards the memory system 3 as having failed and stops processing for the memory system 3.

(Process in Host 2 On the basis of Response to Abort Command from Memory System 3)

Figure 44:
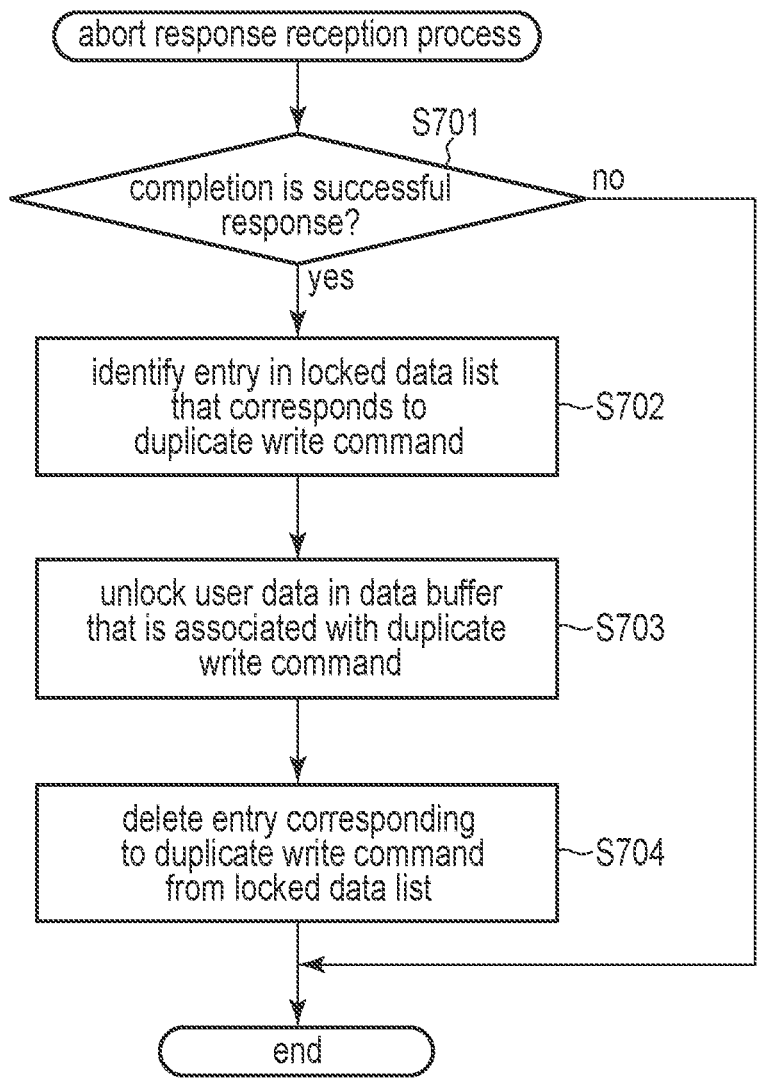
FIG. 44 is a flowchart illustrating an example of the procedure of an abort response reception process executed in the information processing apparatus according to the first embodiment.

FIG. 44 is a flowchart illustrating an example of the procedure of an abort response reception process executed by the CPU 21 of the host 2. The abort response reception process is a process based on a response (completion) to an abort command received from the memory system 3. The CPU 21 executes the abort response reception process in response to acquiring a completion for an abort command from the completion queue 243. Here, a case where the abort command corresponding to the acquired completion is an abort command requesting abort of a duplicate write command will be explained.

First, the CPU 21 determines whether or not the acquired completion is a successful response (step S701). That is, the CPU 21 determines whether or not abort of the duplicate write command is successful on the basis of the acquired completion.

When the acquired completion is a successful response (yes in step S701), the CPU 21 identifies an entry in the locked data list 245 that corresponds to the duplicate write command (step S702). The CPU 21 unlocks user data in the data buffer 241 that is associated with the duplicate write command by using the identified entry (step S703). The CPU 21 uses, for example, the data region management information in the identified entry, thereby identifying the user data in the data buffer 241 that is to be unlocked.

Then, the CPU 21 deletes the identified entry from the locked data list 245 (step S704), and ends the abort response reception process. Note that, in a case where a list of PRP entries or second and subsequent segments of SGL were created for this entry, the CPU 21 also releases an area of the pointer list 244 in which the list or the segments are stored. In addition, in a case where the modify command data 246 was created for this entry, the CPU 21 also releases an area in which the modify command data 246 is stored.

When the acquired completion is an error response (no in step S701), the CPU 21 ends the abort response reception process. That is, since abort of the duplicate write command is not successful, the CPU 21 ends the abort response reception process without unlocking the user data associated with the duplicate write command and deleting the entry corresponding to the duplicate write command from the locked data list 245.

With the abort response reception process described above, when abort of the duplicate write command is successful, the CPU 21 can unlock the user data associated with the duplicate write command and delete the entry corresponding to the duplicate write command from the locked data list 245.

(Process in Host 2 On the basis of Response to Modify Command from Memory System 3)

Figure 45:
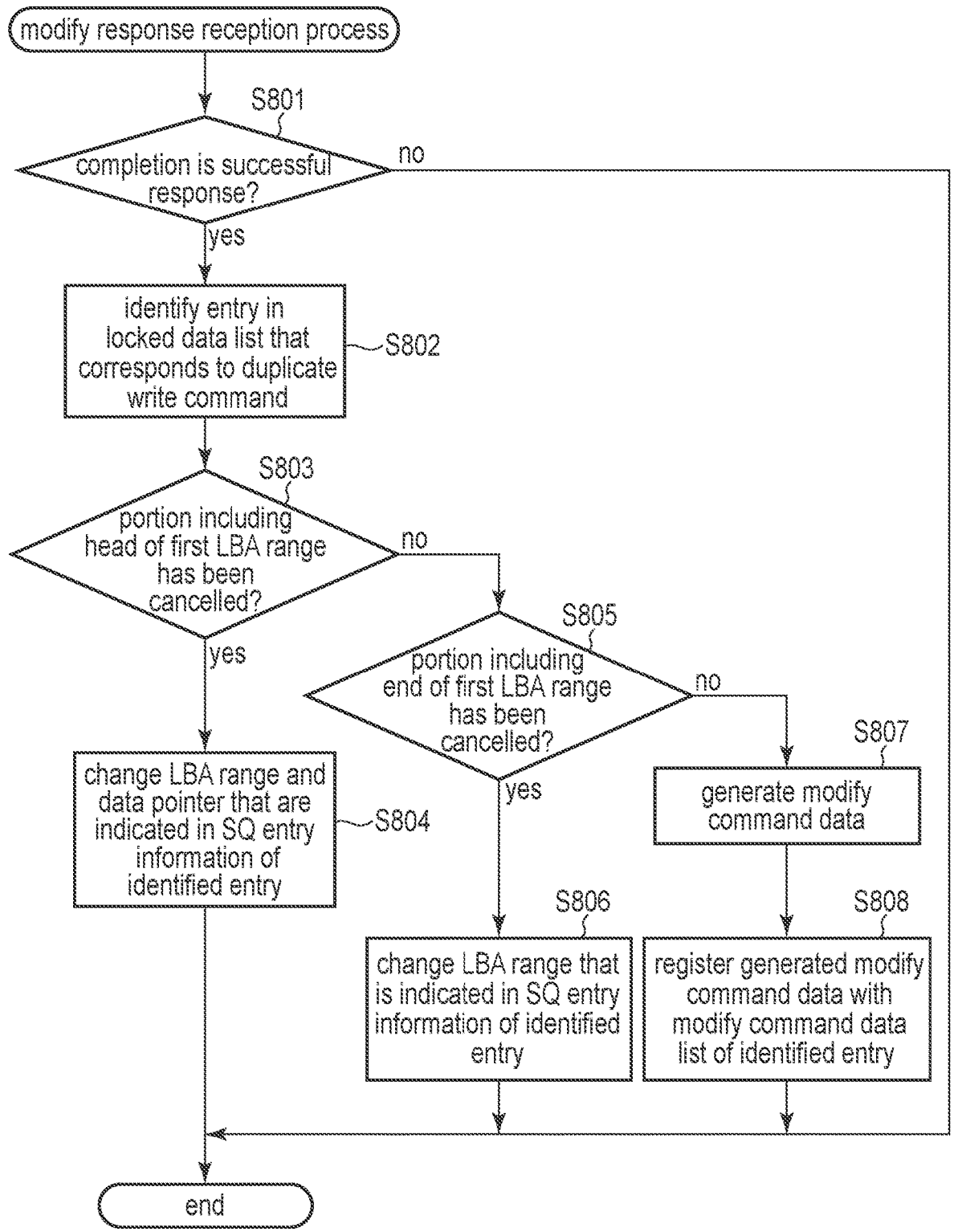
FIG. 45 is a flowchart illustrating an example of the procedure of a modify response reception process executed in the information processing apparatus according to the first embodiment.

FIG. 45 is a flowchart illustrating an example of the procedure of a modify response reception process executed by the CPU 21 of the host 2. The modify response reception process is a process based on a response (completion) to a modify command received from the memory system 3. The CPU 21 executes the modify response reception process in response to acquiring a completion for a modify command from the completion queue 243. Here, a case where the modify command corresponding to the acquired completion is a modify command requesting modification of a duplicate write command and PRP is used will be explained.

First, the CPU 21 determines whether or not the acquired completion is a successful response (step S801). That is, the CPU 21 determines whether or not modification of the duplicate write command is successful on the basis of the acquired completion.

When the acquired completion is a successful response (yes in step S801), the CPU 21 identifies an entry in the locked data list 245 that corresponds to the duplicate write command (step S802). Then, the CPU 21 determines whether or not a portion including the head of an LBA range (first LBA range) that is designated in the duplicate write command has been canceled on the basis of an LBA range (second LBA range) that is designated in the modify command (step S803).

When the portion including the head of the first LBA range has been canceled (yes in step S803), the CPU 21 changes an LBA range and a data pointer that are indicated by the SQ entry information in the identified entry (step S804), and ends the modify response reception process. Specifically, the CPU 21 changes the LBA range (for example, a start LBA and a data length) indicated by the SQ entry information so that the LBA range, which is indicated by the SQ entry information, indicates an LBA range obtained by excluding the second LBA range from the first LBA range. Then, the CPU 21 changes the data pointer indicated by the SQ entry information so that the data pointer indicates a location where user data to be written to the LBA range obtained by excluding the second LBA range from the first LBA range is stored. In addition, the CPU 21 unlocks and releases an area in which a portion of user data that becomes unnecessary due to this exclusion is stored.

Change of the data pointer in step S804 can be performed in a case where PRP is used for indicating a storage area in which user data is stored and cancellation of the LBA range including the start LBA can be represented only by modification of the entry in the locked data list 245. In contrast, in a case where SGL is used for indicating a storage area in which user data is stored, cancellation of the LBA range including the start LBA cannot be represented unless data in the locked data list 245, which is read by the memory system 3, is also modified. In this case, the CPU 21 performs processing equivalent to that in step S807.

When the portion including the head of the first LBA range is not canceled (no in step S803), the CPU 21 determines whether or not a portion including the end of the first LBA range has been canceled on the basis of the second LBA range (step S805).

When the portion including the end of the first LBA range has been canceled (yes in step S805), the CPU 21 changes the LBA range indicated by the SQ entry information in the identified entry (step S806), and ends the modify response reception process. Specifically, the CPU 21 changes the LBA range indicated by the SQ entry information so that the LBA range, which is indicated by the SQ entry information, indicates an LBA range obtained by excluding the second LBA range from the first LBA range. When the portion including the end of the first LBA range has been canceled, the CPU 21 can manage that a portion from the head of the user data, which is stored at the location indicated by the data pointer of the SQ entry information, to the changed end stores user data to be written on the basis of the changed LBA range. That is, the head of the user data to be written is stored at the location indicated by the data pointer of the SQ entry information. Therefore, the CPU 21 may not change the data pointer indicated by the SQ entry information. In addition, the CPU 21 unlocks and releases a storage area in which a portion of user data that becomes unnecessary due to the exclusion is stored.

When the portion including the end of the first LBA range is not canceled (no in step S805), that is, when an intermediate portion that is within the first LBA range and includes neither the head nor the end of the first LBA range has been canceled, the CPU 21 generates the modify command data 246 based on the second LBA range (step S807). The modify command data 246 includes, for example, a start LBA of the second LBA range and the length (for example, the number of sectors) of the second LBA range. Then, the CPU 21 registers the generated modify command data 246 with the modify command data list of the identified entry (step S808), unlocks a storage area in which a portion of user data that becomes unnecessary due to the exclusion is stored, and ends the modify response reception process.

When the completion is an error response (no in step S801), the CPU 21 ends the modify response reception process. That is, since modification of the duplicate write command is not successful, the CPU 21 ends the modify response reception process without changing the entry corresponding to the duplicate write command.

With the modify response reception process described above, when modification of the duplicate write command is successful, the CPU 21 can change the entry corresponding to the duplicate write command so that the entry indicates that writing to the second LBA range designated in the modify command is canceled.

(Another Example of Write Request Control Process in Host 2)

Figure 46:
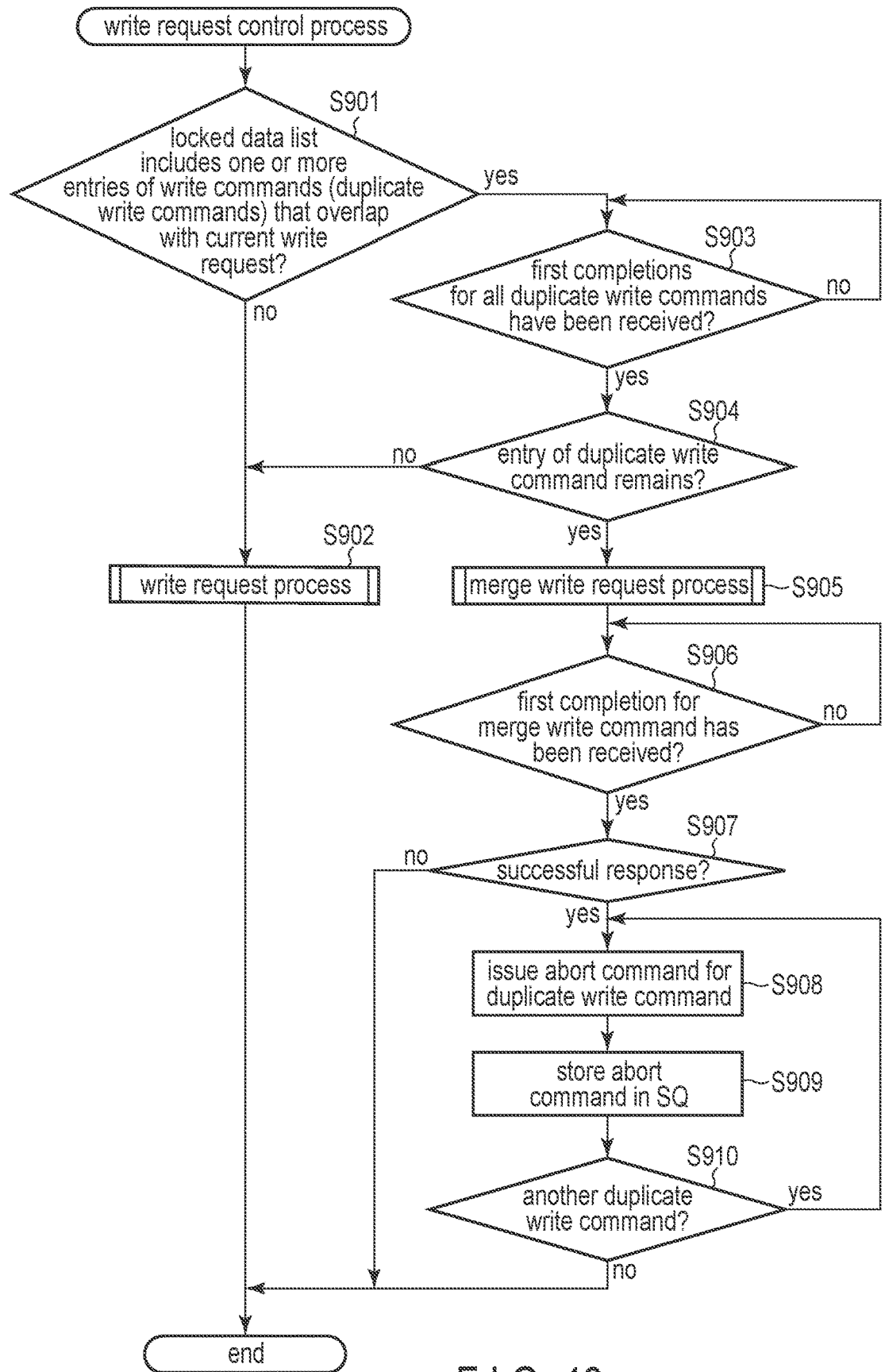
FIG. 46 is a flowchart illustrating another example of the procedure of the write request control process executed in the information processing apparatus according to the first embodiment.

FIG. 46 is a flowchart illustrating another example of the procedure of the write request control process executed by the CPU 21 of the host 2. In the write request control process according to said another example, in a case where an LBA range designated in a new write request generated by the application 223 or the OS 221 overlaps with an LBA range designated in an issued-and-uncompleted write command, writing to an LBA range obtained by merging the LBA range designated in the new write request and the LBA range designated in the issued-and-uncompleted write command (duplicate write command) is requested to the memory system 3. Then, the memory system 3 is requested to abort the duplicate write command. That is, this write request control process is a process that implements: the above-described operation in the case (1) where the LBA range designated in the write/trim request generated later wholly includes the LBA range designated in the issued-and-uncompleted write command, and the above-described operation using the method (2-b) of aborting the issued-and-uncompleted write command in the case (2) where the LBA range designated in the write/trim request generated later includes a portion of the LBA range designated in the issued-and-uncompleted write command.

The LBA range designated in the write request includes at least a portion of the LBA range designated in the duplicate write command. Therefore, the LBA range designated in the write request may include the whole of the LBA range designated in the duplicate write command.

The CPU 21 executes the write request control process when a new write request has been generated by the application 223 or the OS 221.

The procedure of step S901, step S902, and step S903 in FIG. 46 are similar to the procedure of step S101, step S102, and step S103 of the write request control process described above with reference to FIG. 38.

In a case where the locked data list 245 includes one or more entries each indicating a write command (duplicate write command) designating an LBA range that at least partially overlaps with the LBA range designated in the current write request (yes in step S901), and the first completions for all the duplicate write commands have been received (yes in step S903), the CPU 21 determines whether or not any of the one or more entries of the duplicate write commands remains in the locked data list 245 (step S904). When the first completion for a duplicate write command is an error response, an entry corresponding to the duplicate write command is deleted from the locked data list 245. Thus, after receiving the first completions for all the duplicate write commands, the CPU 21 determines whether or not any of the one or more entries of the duplicate write commands remains in the locked data list 245.

When any of the one or more entries of the duplicate write commands does not remain (no in step S904), that is, when the first completions for all the duplicate write commands are error responses, the CPU 21 executes the write request process based on the current write request (step S902), and ends the write request control process. The specific procedure of the write request process has been described above with reference to the flowchart of FIG. 39.

When any of the one or more entries of the duplicate write commands remains (yes in step S904), the CPU 21 executes a merge write request process based on the write request and the duplicate write command (step S905). The merge write request process is a process for requesting the memory system 3 to perform writing that merges the duplicate write command and the current write request. More specifically, in the merge write request process, user data (merged user data) that is to be finally written in the NAND flash memory 5 if user data is written into the NAND flash memory 5 of the memory system 3 in accordance with the duplicate write command and the current write request, is determined. Then, one write command (merge write command) for writing the determined merged user data is issued to the memory system 3. A specific procedure of the merge write request process will be described later with reference to the flowchart of FIG. 47.

Next, the CPU 21 determines whether or not the first completion for the merge write command has been received (step S906). When the first completion for the merge write command has not been received (no in step S906), the process by the CPU 21 returns to step S906. That is, the CPU 21 waits until receiving the first completion for the merge write command.

Upon receiving the first completion for the merge write command (yes in step S906), the CPU 21 determines whether or not the first completion for the merge write command is a successful response (step S907).

When the first completion for the merge write command is a successful response (yes in step S907), the CPU 21 issues an abort command for aborting the duplicate write command (step S908). The CPU 21 stores the issued abort command in the submission queue 242 (step S909). Then, the CPU 21 determines whether or not the locked data list 245 includes another duplicate write command (step S910). When the locked data list 245 includes another duplicate write command (yes in step S910), the process by the CPU 21 returns to step S908. Accordingly, another abort command is issued for said another duplicate write command.

When the locked data list 245 does not include another duplicate write command (no in step S910), the CPU 21 ends the write request control process.

When the completion for the merge write command is an error response (no in step S907), the CPU 21 ends the write request control process. That is, since writing in accordance with the merge write command is not performed, the CPU 21 ends the write request control process without performing processing for aborting the duplicate write command.

With the write request control process according to said another example, when a new write request is generated by the application 223 or the OS 221, and there is an uncompleted write command (duplicate write command) designating an LBA range that overlaps with an LBA range designated in the new write request, the CPU 21 can request the memory system 3 to perform writing that merges the duplicate write command and the new write request, and to abort the duplicate write command.

Specifically, the CPU 21 determines the presence or absence of a duplicate write command by using the locked data list 245. When a duplicate write command is present, the CPU 21 issues a merge write command based on the new write request and the duplicate write command. When the first completion for the merge write command is a successful response, the CPU 21 issues an abort command for aborting the duplicate write command.

Accordingly, when the duplicate write command for the new write request is present, the CPU 21 can request the memory system 3 to stop writing in accordance with the duplicate write command.

(Merge write request process in Host 2)

Figure 47:
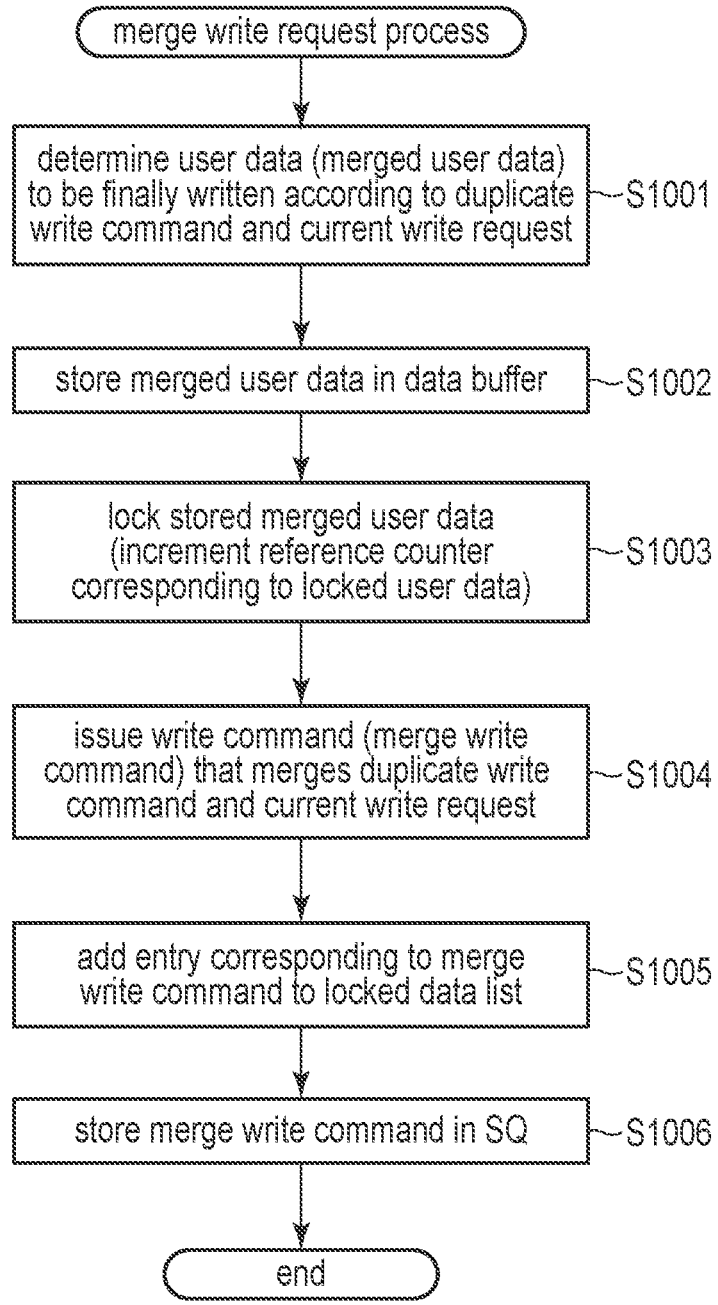
FIG. 47 is a flowchart illustrating an example of the procedure of a merge write request process executed in the information processing apparatus according to the first embodiment.

FIG. 47 is a flowchart illustrating an example of the procedure of a merge write request process executed by the CPU 21 of the host 2. The merge write request process is a process for requesting the memory system 3 to perform writing that merges at least one duplicate write command which is uncompleted and for which the first completion is a successful response with a new write request generated by the application 223 or the OS 221. The merge write request process corresponds to step S905 of the write request control process described above with reference to FIG. 46. In the following description with reference to FIG. 47, at least one duplicate write command which is uncompleted and for which the first completion is a successful response is simply referred to as a duplicate write command.

First, the CPU 21 determines user data (merged user data) that is to be finally written in the NAND flash memory 5 of the memory system 3 if user data is written into the NAND flash memory 5 in accordance with the duplicate write command and the current write request (step S1001). The merged user data is determined according to the order of writing requests in which the duplicate write command and the current write request are requested. That is, user data to be written to a certain LBA is user data corresponding to either the duplicate write command or the write request that has last requested writing to the LBA. In a case where the LBA range designated in the current write request wholly includes the LBA range designated in the duplicate write command, the merged user data is user data corresponding to the current write request.

The CPU 21 stores the merged user data to the data buffer 241 (step S1002). More specifically, the CPU 21 stores the user data to be written in accordance with the current write request to the data buffer 241. The user data to be written in accordance with the duplicate write command has already been stored in the data buffer 241.

A case where PRP is used as information indicating a storage location of the merged user data (that is, a data pointer) will be specifically described. The CPU 21 may copy user data that is to be contained in the merged user data selected from the user data to be written in accordance with the duplicate write command, from its original storage area to another storage area in the data buffer 241. For example, it is assumed a case where the CPU 21 sequentially combines user data stored in a physical page A and user data stored in a physical page B to generate the merged user data. In this case, for example, the CPU 21 copies the user data stored in the physical page B to another storage area in the data buffer 241 whose physical address is contiguous with the physical page A, thereby generating the merged user data. Hereinafter, the storage areas that store the merged user data are referred to as a combined storage area. The combined storage area is formed to have contiguous logical addresses. In the combined storage area, the merged user data may be stored from the middle of the first physical page. In addition, in the combined storage area, the merged user data may be stored up to the middle of the last physical page. However, the merged user data needs to be stored from the beginning to the end of each of the other physical pages included in the combined storage area. As a result, the storage location of the merged user data can be designated by PRP. Note that, in a case where other user data is stored in said another storage area in the data buffer 241 whose physical address is contiguous with the physical page A, the CPU 21 copies the user data stored in the physical page A to still another storage area in the data buffer 241 whose physical address is contiguous with the physical page B, thereby generating the merged user data.

In a case where SGL is used as information indicating the storage location of the merged user data, the CPU 21 does not need to copy the user data to be written in accordance with the duplicate write command. This is because SGL is capable of designating storage areas in the NVRAM 24 each starting from the middle of a physical page as the storage location of user data. In this case, the CPU 21 creates SGL that includes multiple SGL descriptors each indicating storage areas in which the merged user data is stored.

The CPU 21 locks the stored merged user data (step S1003). Note that, in a case where the user data to be written in accordance with the duplicate write command is used as a portion of the merged user data without being copied, the user data is already locked. When a portion of the merged user data is already locked, the CPU 21 increments the reference counter corresponding to the locked user data. The CPU 21 newly locks a portion of the merged user data that has not been locked. The reference counter is incremented when a write command for writing the corresponding user data is newly issued. In addition, the reference counter is decremented when the second completion for the write command for writing the corresponding user data is received, or when the write command is aborted. Then, when the reference counter becomes zero by the decrement, the CPU 21 unlocks the corresponding user data.

Next, the CPU 21 issues a write command (merge write command) obtained by merging the duplicate write command and the current write request (step S1004). The merge write command designates an LBA range including the LBA range designated in the duplicate write command and the LBA range designated in the current write request. In addition, user data to be written in accordance with the merge write command is the merged user data. When the LBA range designated in the current write request wholly includes the LBA range designated in the duplicate write command, the merge write command is a write command corresponding to the current write request.

The CPU 21 adds an entry corresponding to the merge write command to the locked data list 245 (step S1005). Then, the CPU 21 stores the merge write command in the submission queue 242 (step S1006), and ends the merge write request process.

With the merge write request process described above, the CPU 21 can request the memory system 3 to write the merged user data on the basis of the duplicate write command and the current write request. The merged user data is user data that should be finally written in the NAND flash memory 5 of the memory system 3 when user data is written into the NAND flash memory 5 in accordance with the duplicate write command and the current write request.

Next, a trim request control process will be described with reference to FIGS. 48 and 49. The trim request control process is a process for controlling writing to the NAND flash memory 5 of the memory system 3 depending on whether or not an LBA range designated in a new trim request, which is generated by the application 223 or the OS 221, overlaps with the LBA range designated in an issued-and-uncompleted write command.

(Trim Request Control Process in Host 2)

Figure 48:
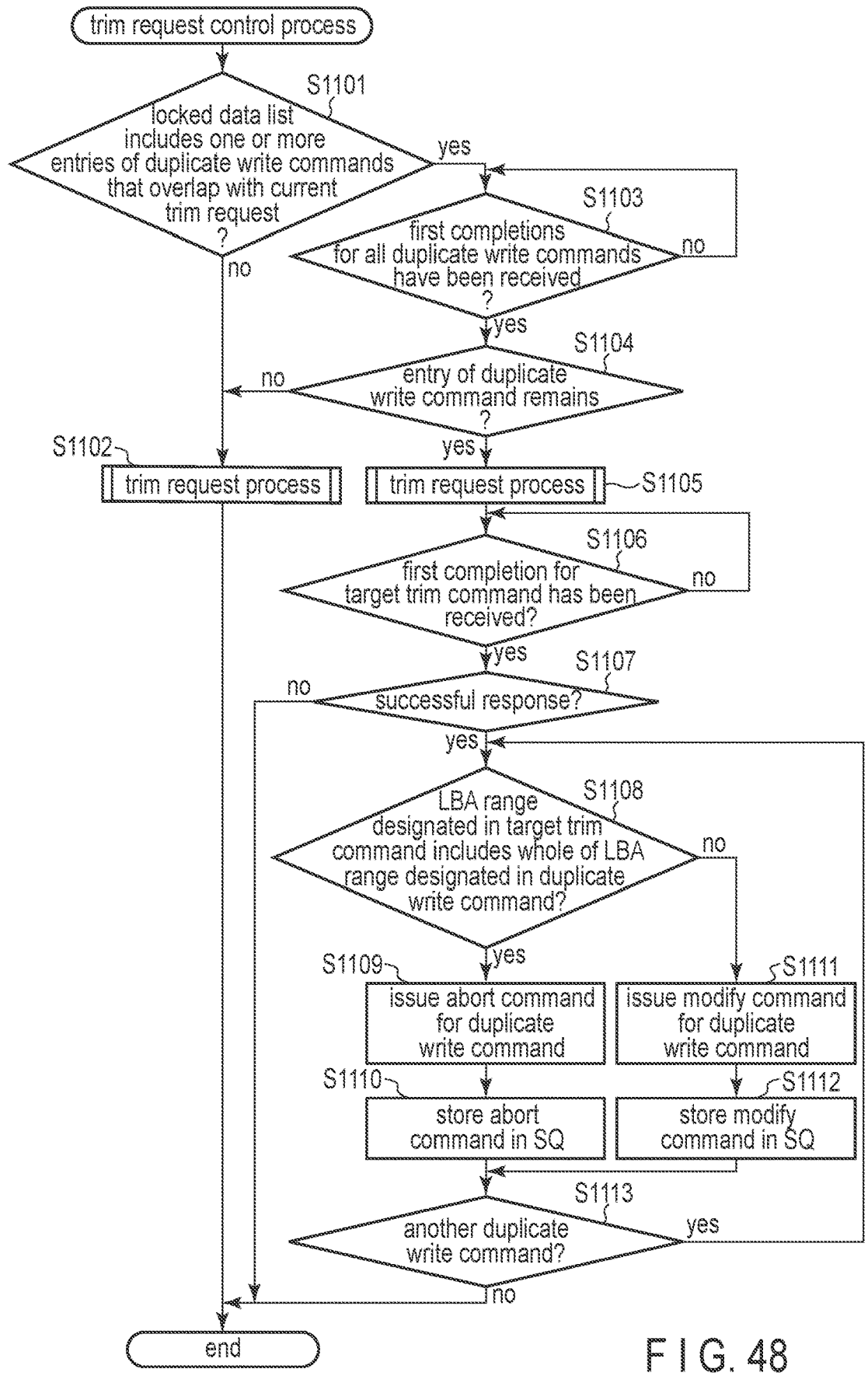
FIG. 48 is a flowchart illustrating an example of the procedure of a trim request control process executed in the information processing apparatus according to the first embodiment.

FIG. 48 is a flowchart illustrating an example of the procedure of the trim request control process executed by the CPU 21 of the host 2. The CPU 21 executes the trim request control process when a trim request is generated by the application 223 or the OS 221.

First, the CPU 21 determines whether or not the locked data list 245 includes one or more entries each indicating a write command (duplicate write command) designating an LBA range that at least partially overlaps with the LBA range designated in the trim request (step S1101). Specifically, the CPU 21 determines whether or not an LBA range based on SQ entry information included in each entry in the locked data list 245 overlaps with the LBA range designated in the trim request.

When the locked data list 245 does not include any entry of a duplicate write command (no in step S1101), the CPU 21 executes a trim request process based on the trim request (step S1102), and ends the trim request control process. The trim request process is a process in which the host 2 requests the memory system 3 to deallocate an LBA range. In the trim request process, the CPU 21 issues a trim command for deallocating the LBA range designated in the trim request. In addition, since the locked data list 245 does not include any entry of a duplicate write command, the CPU 21 does not perform processing for aborting or modifying a write command indicated by the locked data list 245. A specific procedure of the trim request process will be described later with reference to the flowchart of FIG. 49.

When the locked data list 245 includes one or more entries of duplicate write commands (yes in step S1101), the CPU 21 determines whether or not the first completions for all the duplicate write commands have been received (step S1103). When the first completion for at least one of the duplicate write commands has not yet been received (no in step S1103), the process by the CPU 21 returns to step S1103. That is, the CPU 21 waits until receiving the first completions for all the duplicate write commands.

When the first completions for all the duplicate write commands have been received (yes in step S1103), the CPU 21 confirms that at least one of the first completions is a successful response. That is, the CPU 21 confirms that any of the one or more entries of the duplicate write commands remains in the locked data list 245 (step S1104). When any of the one or more entries of the duplicate write command does not remain (no in step S1104), since the duplicate write commands have disappeared, the process by the CPU 21 proceeds to the trim request process of step S1102 without performing processing for aborting or modifying a duplicate write command.

When any of the one or more entries of the duplicate write commands remains (yes in step S1104), the CPU 21 performs the trim request process based on the trim request (step S1105). Hereinafter, a trim command issued in the trim request process in step S1105 is referred to as a target trim command.

The CPU 21 determines whether or not the first completion for the target trim command has been received (step S1106). When the first completion for the target trim command has not been received (no in step S1106), the process by the CPU 21 returns to step S1106. That is, the CPU 21 waits until receiving the first completion for the target trim command.

Upon receiving the first completion for the target trim command (yes in step S1106), the CPU 21 determines whether or not the first completion for the target trim command is a successful response (step S1107). When the first completion for the target trim command is an error response (no in step S1107), the CPU 21 ends the trim request control process. That is, since an error has occurred in the process for the target trim command in the memory system 3, the CPU 21 does not perform processing for aborting or modifying the duplicate write command indicated in the locked data list 245.

When the first completion for the target trim command is a successful response (yes in step S1107), the CPU 21 determines whether or not the LBA range designated in the target trim command (that is, the current trim request) includes the whole of the LBA range designated in a duplicate write command (step S1108). When the LBA range designated in the target trim command includes the whole of the LBA range designated in the duplicate write command (yes in step S1108), the CPU 21 issues an abort command for the duplicate write command (step S1109). Then, the CPU 21 stores the issued abort command in the submission queue 242 (step S1110). Accordingly, the CPU 21 can request the memory system 3 to abort the writing of user data to be performed in accordance with the duplicate write command.

When the LBA range designated in the target trim command includes only a portion of the LBA range designated in the duplicate write command (no in step S1108), the CPU 21 issues a modify command for the duplicate write command (step S1111). Then, the CPU 21 stores the issued modify command in the submission queue 242 (step S1112). Accordingly, the CPU 21 can request the memory system 3 to cancel a portion of the writing of user data to be performed in accordance with the duplicate write command.

Next, the CPU 21 determines whether or not another duplicate write command is present by using the locked data list 245 (step S1113). When another duplicate write command is present (yes in step S1113), the process by the CPU 21 returns to step S1108. Accordingly, either an abort command or a modify command is issued for said another duplicate write command.

When another duplicate write command is not present (no in step S1113), the CPU 21 ends the trim request control process.

With the trim request control process described above, when a trim request is generated by the application 223 or the OS 221, and there is an uncompleted write command (duplicate write command) designating an LBA range that overlaps with the LBA range designated in the trim request, the CPU 21 can request the memory system 3 to abort or modify the duplicate write command.

Specifically, the CPU 21 determines the presence or absence of a duplicate write command by using the locked data list 245. When a duplicate write command is present, the CPU 21 determines whether the LBA range designated in the trim request includes the whole of the LBA range designated in the duplicate write command or includes only a portion of the LBA range designated in the duplicate write command by using the locked data list 245. When the LBA range designated in the trim request includes the whole of the LBA range designated in the duplicate write command, the CPU 21 requests the memory system 3 to abort the duplicate write command. When the LBA range designated in the trim request includes only a portion of the LBA range designated in the duplicate write command, the CPU 21 requests the memory system 3 to modify the duplicate write command.

As a result, when the duplicate write command for the trim request is present, the CPU 21 can request the memory system 3 to abort writing performed in accordance with the duplicate write command or to cancel a portion of writing performed in accordance with the duplicate write command.

(Trim Request Process to Memory System 3 in Host 2)

Figure 49:
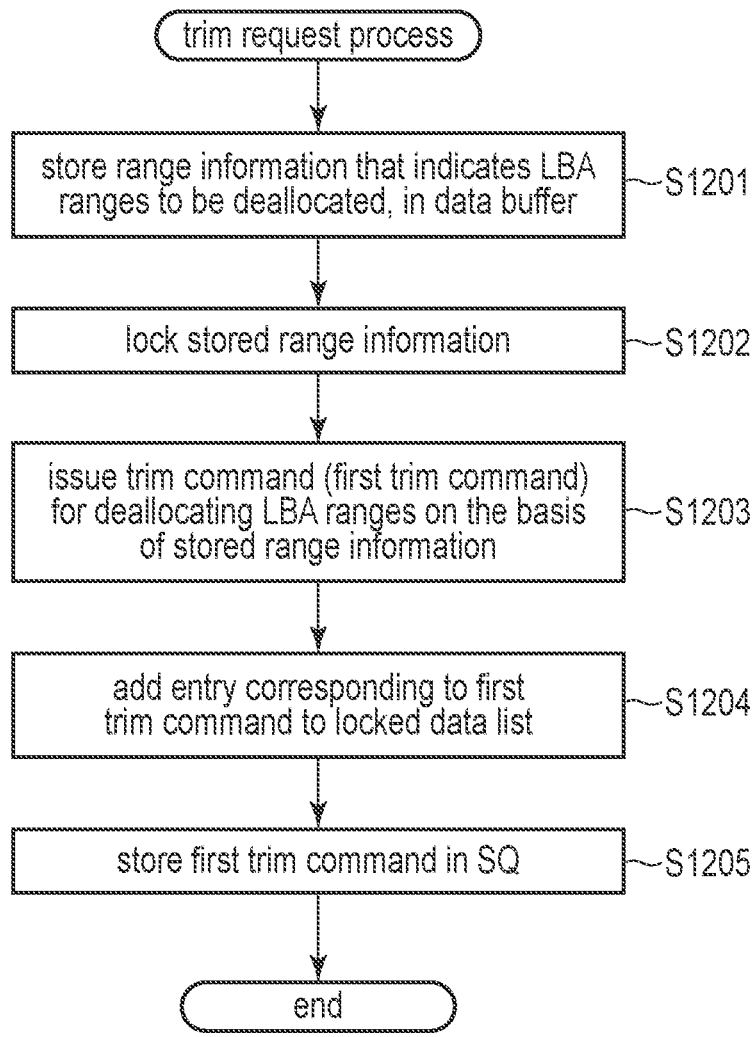
FIG. 49 is a flowchart illustrating an example of the procedure of a trim request process executed in the information processing apparatus according to the first embodiment.

FIG. 49 is a flowchart illustrating an example of the procedure of a trim request process executed by the CPU 21 of the host 2. The trim request process is a process in which the host 2 requests the memory system 3 to deallocate (that is, trim or unmap) one or more LBA ranges. The trim request process corresponds to each of steps S1102 and S1105 of the trim request control process described above with reference to FIG. 48.

First, the CPU 21 stores range information indicating LBA ranges to be deallocated, in the data buffer 241 (step S1201). The range information indicates one or more LBA ranges. The CPU 21 locks the range information stored in the data buffer 241 (step S1202). This prevents a storage area storing the range information from being unintentionally released.

The CPU 21 issues a trim command (hereinafter, referred to as a first trim command) for deallocating the LBA range on the basis of the range information stored in the data buffer 241 (step S1203).

Next, the CPU 21 adds an entry corresponding to the first trim command to the locked data list 245 (step S1204). The added entry includes, for example, the SQ entry information and the data region management information that correspond to the first trim command. The SQ entry information corresponding to the first trim command is information indicative of the first trim command. More specifically, the SQ entry information corresponding to the first trim command is information to be stored in the submission queue 242 to cause the memory system 3 to execute processing in accordance with the first trim command. In addition, the data region management information corresponding to the first trim command is information by which a storage area in the data buffer 241 in which the range information corresponding to the first trim command is stored is identifiable.

Then, the CPU 21 stores the first trim command (that is, the SQ entry information representing the first trim command) in the submission queue 242 (step S1205).

Note that the CPU 21 may execute the procedure of step S1204 of adding the entry corresponding to the first trim command to the locked data list 245 after the procedure of step S1205 of storing the first trim command in the submission queue 242. Alternatively, the CPU 21 may execute the procedure of step S1204 and the procedure of step S1205 in parallel.

With the trim request process described above, the CPU 21 can request the memory system 3 to perform trimming based on the range information stored in the data buffer 241. In addition, the CPU 21 can manage information regarding trimming requested to the memory system 3 (that is, information regarding the issued trim command) by using the locked data list 245.

(Process for Trimming LBA Range in Memory System 3)

FIG. 50 is a flowchart illustrating an example of the procedure of a trim control process executed by the CPU 12 of the memory system 3. The trim control process is a process for receiving a trim command issued by the host 2 and deallocating a designated LBA range (or LBA ranges). The CPU 12 executes the trim control process in response to acquiring a trim command issued by the host 2 from the submission queue 242. Here, the trim command acquired from the submission queue 242 is referred to as a target trim command.

First, the CPU 12 notifies the host 2 of the first completion for the target trim command (step S1301). The first completion for the target trim command includes a command ID of the target trim command.

Next, the CPU 12 determines whether or not it is possible to start trimming (step S1302). More specifically, for example, the CPU 12 acquires, from the submission queue 242, an abort command or a modify command for a duplicate write command that corresponds to the target trim command, processes the acquired command, notifies the host 2 of a completion. Further, in a case where writing to the NAND flash memory 5 in accordance with the duplicate write command has already started, the CPU 12 determines that it is possible to start trimming when the writing has been completed. With respect to a write command received after the first completion for the target trim command is returned, the CPU 12 does not start processing for writing to the NAND flash memory 5 until the target trim command is completed even after returning the first completion for the write command to the host 2.

Similarly to the write command described above, in a case where an abort command or a modify command for a write command (that is, a duplicate write command) is scheduled to be transmitted subsequent to the target trim command, a flag indicating the transmission schedule may be added to the trim command. This enables the CPU 12 to perform processing by reliably grasping the abort command or the modify command to be transmitted for the duplicate write command. When multiple abort commands or modify commands will be transmitted, a flag indicating that an abort command or a modify command is scheduled to be further transmitted may be added to each of the abort commands or modify commands.

When it is impossible to start trimming (no in step S1302), the process by the CPU 12 returns to step S1302.

When it is possible to start trimming (yes in step S1302), the CPU 12 acquires range information designated in the target trim command from the data buffer 241 of the host 2 (step S1303). The range information indicates one or more LBA ranges. The CPU 12 deallocates the one or more LBA ranges indicated by the range information (step S1304). That is, the CPU 12 updates the logical-to-physical address conversion table 62 to indicate that each of the one or more LBA ranges indicated by the range information is not mapped to any physical address of the NAND flash memory 5. Then, the CPU 12 notifies the host 2 of the second completion for the target trim command (step S1305), and ends the trim control process.

Note that, upon receiving a special flush command, the CPU 12 writes user data corresponding to all write commands having been received into the NAND flash memory 5 with padding, thereby completing these write commands. As a result, since the condition for step S1302 is satisfied, the CPU 12 performs the processes of steps S1303 to S1305. After notifying the host 2 of the second completions for all trim commands, the CPU 12 notifies the host 2 of completion of the special flush command.

With the trim control process described above, the CPU 12 can deallocate the designated LBA ranges in accordance with the trim command received from the host 2.

(Process in Host 2 On the basis of Response to Trim Command from Memory System 3)

Figure 51:
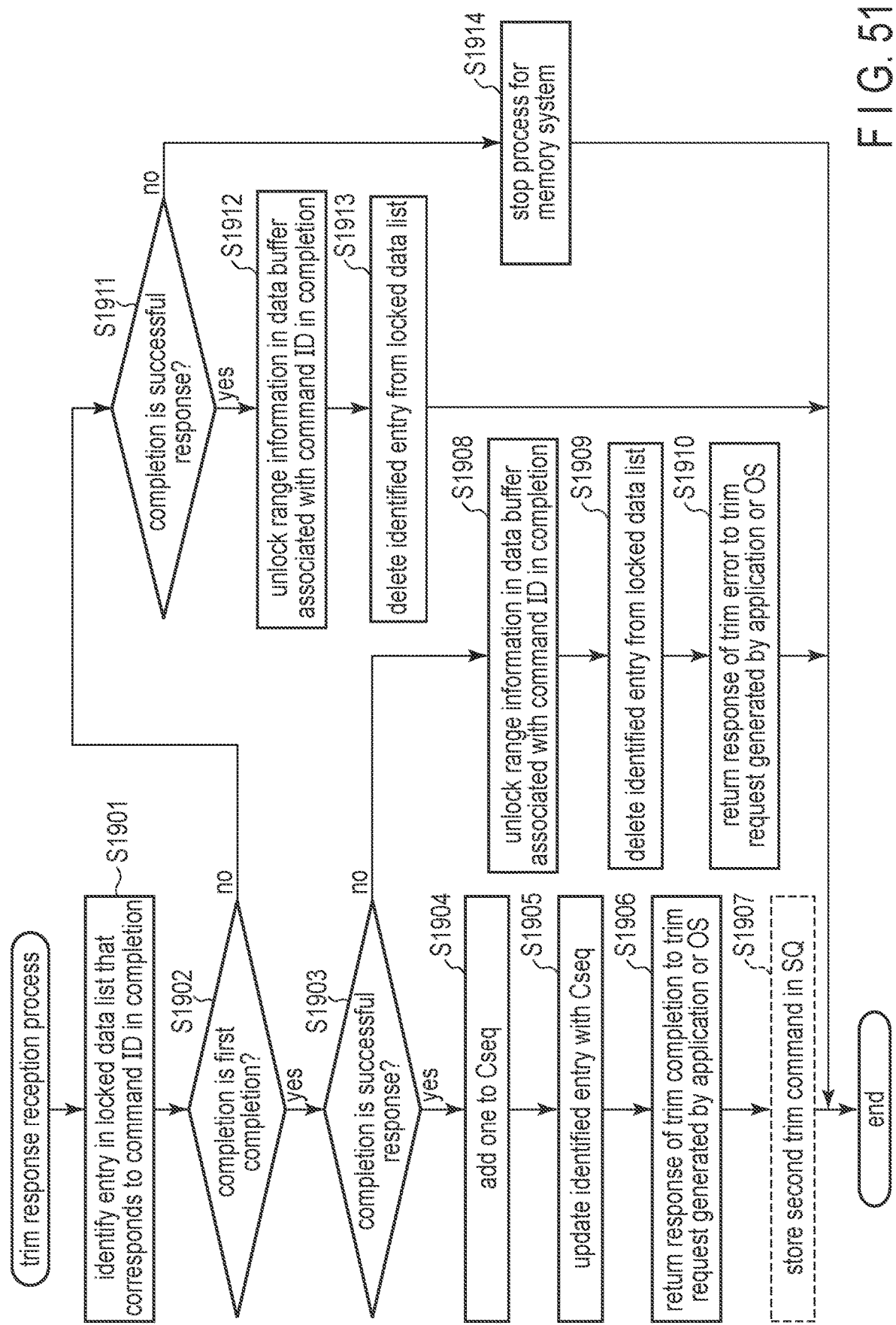
FIG. 51 is a flowchart illustrating an example of the procedure of a trim response reception process executed in the information processing apparatus according to the first embodiment.

FIG. 51 is a flowchart illustrating an example of the procedure of a trim response reception process executed by the CPU 21 of the host 2. The trim response reception process is a process based on a response (completion) to a trim command received from the memory system 3. The CPU 21 executes the trim response reception process in response to acquiring a completion for a trim command from the completion queue 243.

First, the CPU 21 identifies an entry in the locked data list 245 corresponding to a command ID in the acquired completion (step S1901). The CPU 21 determines whether or not the acquired completion is the first completion by using the identified entry (step S1902). Specifically, for example, when no value is set as the completion state in the identified entry, the CPU 21 determines that the acquired completion is the first completion. When a value indicating that the first completion has been received is set as the completion state in the identified entry, the CPU 21 determines that the acquired completion is the second completion.

When the acquired completion is the first completion (yes in step S1902), the CPU 21 determines whether or not the completion is a successful response (step S1903).

When the acquired completion is a successful response (yes in step S1903), the CPU 21 adds one to a variable Cseq (that is, increments the variable Cseq) that is used for assigning a sequence number to a completion (step S1904). Then, the CPU 21 updates the identified entry by using the variable Cseq (step S1905). Specifically, the CPU 21 adds (sets) the sequence number indicated by the variable Cseq as the completion order in the identified entry. Accordingly, the sequence number indicated by the variable Cseq is assigned to the acquired completion. In addition, the CPU 21 adds a value indicating that the first completion has been received as the completion state in the identified entry. Then, the CPU 21 returns a response indicating that trimming has been completed to a trim request generated by the application 223 or the OS 221 (step S1906), and ends the trim response reception process.

Note that there may be a case where the method of transmitting a trim command to the memory system 3 twice in accordance with a trim request that is generated by the application 223 or the OS 221, and receiving, from the memory system 3, the first completion for the first trim command (the trim command transmitted in a first transmission) and the second completion for the second trim command (i.e., the trim command transmitted in a second transmission), is used. In this case, for example, after updating the identified entry in step S1905, the CPU 21 stores a second trim command in the submission queue 242 (step S1907), rewrites the command ID of the identified entry with a command ID of the second trim command, and ends the trim response reception process.

When the acquired completion (that is, the first completion) is an error response (no in step S1903), the CPU 21 unlocks the range information in the data buffer 241 that is associated with the command ID in the completion (step S1908). The application 223 or the OS 221 deletes the range information after the data buffer 241 is unlocked. For example, the CPU 21 can identify the range information in the data buffer 241 that is to be unlocked by using the data region management information in the identified entry. After the range information is unlocked, the range information may be deleted. That is, a storage area in the data buffer 241 (that is, the storage area in the NVRAM 24) in which the range information is stored is released. The CPU 21 deletes the identified entry from the locked data list 245 (step S1909). Then, the CPU 21 notifies the application 223 or the OS 221 that processing corresponding to the trim command of the identified entry has failed (step S1910), and ends the trim response reception process.

When the acquired completion is the second completion (no in step S1902), the CPU 21 determines whether or not the completion is a successful response (step S1911).

When the acquired completion is a successful response (yes in step S1911), the CPU 21 unlocks the range information in the data buffer 241 that is associated with the command ID in the completion and cancels write inhibition thereof (step S1912). Then, the CPU 21 deletes the identified entry from the locked data list 245 (step S1913), and ends the trim response reception process.

When the acquired completion (that is, the second completion) is an error response (no in step S1911), the CPU 21 regards the memory system 3 as having failed, stops processing for the memory system 3 (step S1914), notifies the OS 221 of the occurrence of failure, and ends the trim response reception process. In this case, exception processing of the information processing system 1 is performed. Thereafter, the IO reception module 210 rejects all requests to changing user data, such as a write request and a trim request, generated from the application 233 or the OS 211.

With the trim response reception process described above, the CPU 21 can perform different processes depending on whether the received completion is the first completion or the second completion for a corresponding trim command and whether the received completion is a successful response or an error response. That is, when the received completion is the first completion and is a successful response, the CPU 21 adds, to the corresponding entry in the locked data list 245, the sequence number Cseq assigned to the completion and information indicating that the first completion has been received, and returns a completion response for the trim request. When the received completion is the first completion and is an error response, the CPU 21 deletes the corresponding range information and the corresponding entry in the locked data list 245 from the NVRAM 24, and returns an error response for the trim request. When the received completion is the second completion and is a successful response, the CPU 21 deletes the corresponding range information (that is, the range information indicating the LBA ranges in which trimming is completed) and the corresponding entry in the locked data list 245 from the NVRAM 24. When the received completion is the second completion and is an error response, the CPU 21 regards the memory system 3 as having failed and stops processing for the memory system 3.

Next, a recovery write request process will be described with reference to FIGS. 52 to 54. The recovery write request process is a process for recovering the writing of user data and the trimming of LBA ranges which have failed to be completed because of improper termination or unintentional restart of one or both of the host 2 and the memory system 3 immediately before the current start, by using the locked data list 245.

(Recovery Write Request Process in Host 2)

Figure 52:
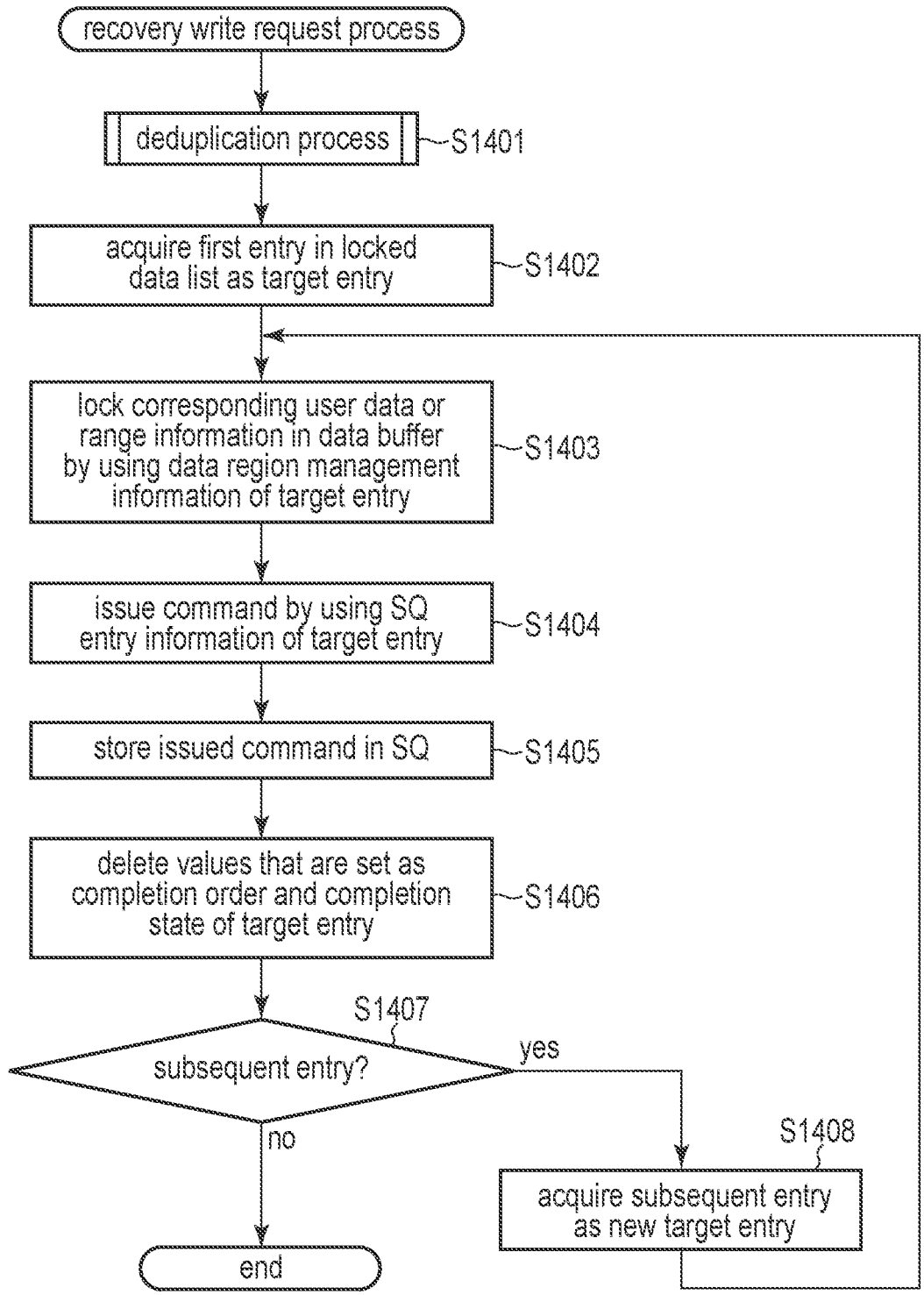
FIG. 52 is a flowchart illustrating an example of the procedure of a recovery write request process executed in the information processing apparatus according to the first embodiment.

FIG. 52 is a flowchart illustrating an example of the procedure of a recovery write request process executed by the CPU 21 of the host 2. When one or both of the host 2 and the memory system 3 improperly terminated immediately before the current start, or when one or both of the host 2 and the memory system 3 unintentionally restart, the CPU 21 executes the recovery write request process. Here, it is assumed a case where the locked data list 245 includes one or more entries each indicating that the first completion has been received.

First, the CPU 21 executes a deduplication process on the locked data list 245 (step S1401). The deduplication process is a process for modifying an entry in the locked data list 245 that corresponds to a write command issued earlier so that, when at least a portion of the LBA range designated in the write command issued earlier overlaps with the LBA range designated in a write command or trim command issued later, writing to the overlapping portion is not performed. With the deduplication process, it is possible to avoid overwriting to a certain LBA or writing to a certain LBA that is trimmed later in the recovery write request process. As a result, it is possible to lower wear of the NAND flash memory 5 of the memory system 3. A specific procedure of the deduplication process will be described later with reference to FIG. 53.

Since the locked data list that has been deduplicated is used, the same result can be obtained regardless of the order in which entries in the locked data list 245 are executed, but the CPU 21 processes the entries in order from the head entry in this example.

The CPU 21 acquires the head entry as a target entry from the locked data list 245 obtained by the deduplication process (step S1402).

The CPU 21 locks corresponding user data or range information in the data buffer 241 by using the data region management information of the target entry (step S1403). More specifically, the CPU 21 identifies a storage area in the data buffer 241 in which the user data or the range information is stored by using the data region management information of the target entry. Then, the CPU 21 locks the identified storage area by using the function of the OS 221 being executed.

Next, the CPU 21 issues a command based on the SQ entry information of the target entry (step S1404). The issued command is either a write command or a trim command. When the LBA range indicated by the SQ entry information of the target entry is reduced on the basis of the modify command data 246 associated with the target entry, the CPU 21 issues a write command designating the reduced LBA range. In addition, in a case where there are multiple LBA ranges to be designated in a write command on the basis of the LBA range indicated by the SQ entry information of the target entry and the modify command data 246 associated with the target entry, the CPU 21 issues as many write commands as the LBA ranges. In this case, the CPU 21 first issues only one write command, and issues the remaining write commands after adding entries corresponding to the write commands to the locked data list 245. For example, when there are two LBA ranges to be designated in a write command, the CPU 21 issues a write command designating one of the LBA ranges and adds, to the locked data list 245, an entry corresponding to a write command for writing to the other LBA range.

The CPU 21 stores the issued command in the submission queue 242 (step S1405). Then, the CPU 21 deletes values set as the completion order and the completion state in the target entry (step S1406). That is, the CPU 21 updates the target entry so that the target entry indicates that the first completion has not been received yet after issuance of the corresponding command. The CPU 21 also updates a command ID in the target entry. In addition, when two or more write commands are issued from one entry, the CPU 21 creates an entry corresponding to the second write command and modified the entry corresponding to the first write command so that one LBA range is designated.

Next, the CPU 21 determines whether or not a subsequent entry is present in the locked data list 245 (step S1407). When a subsequent entry is present (yes in step S1407), the CPU 21 acquires the subsequent entry as a new target entry (step S1408), and the process by the CPU 21 returns to step S1403. That is, the CPU 21 further performs processing for transmitting a write command or a trim command based on the subsequent entry to the memory system 3.

When the subsequent entry is not present (no in step S1407), the CPU 21 ends the recovery write request process.

With the recovery write request process described above, the CPU 21 can request the memory system 3 to perform the writing of user data or the trimming of LBA ranges that has failed to be completed because of improper termination immediately before the current start or unintentional restart of the memory system 3. In addition, by performing the deduplication process on the locked data list 245 before requesting the writing of user data or the trimming of LBA ranges, it is possible to avoid overwriting to a certain LBA or writing to a certain LBA that is trimmed later in the recovery write request process. As a result, it is possible to lower wear of the NAND flash memory 5 of the memory system 3.

After receiving the first completions for all commands issued in the recovery write request process, the CPU 21 issues a special flush command. Then, upon receiving the second completions for all the commands issued in the recovery write request process, the CPU 21 determines that the memory system 3 has completed the writing of user data and the trimming of LBA ranges, which have failed to be completed because of the improper termination immediately before the current start or the unintentional restart of the memory system 3. Then, the CPU 21 starts receiving a new I/O request from the application 223 or the like.

Alternatively, upon receiving the first completions for all the commands issued in the recovery write request process, the CPU 21 may determine that the memory system 3 has completed the writing of user data and the trimming of LBA ranges, which have failed to be completed because of the improper termination immediately before the current start or the unintentional restart of the memory system 3. In this case, upon receiving the first completions for all the commands issued in the recovery write request process, the CPU 21 starts receiving a new I/O request from the application 223 or the like.

(Deduplication Process in Host 2)

Figure 53:
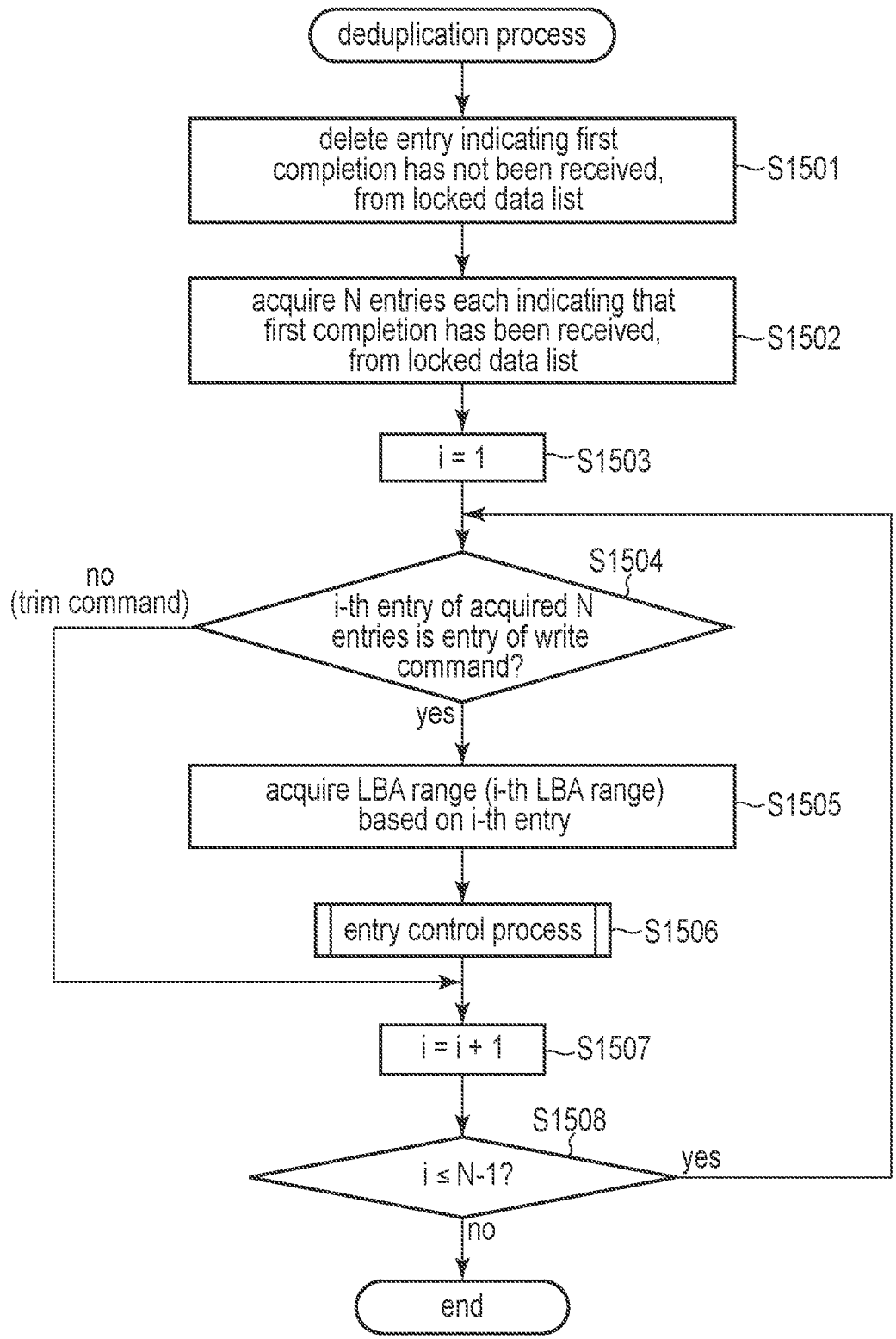
FIG. 53 is a flowchart illustrating an example of the procedure of a deduplication process executed in the information processing apparatus according to the first embodiment.

FIG. 53 is a flowchart illustrating an example of the procedure of the deduplication process executed by the CPU 21 of the host 2. The deduplication process is a process for changing an entry in the locked data list 245 that corresponds to a write command issued earlier so that, when at least a portion of the LBA range designated in the write command issued earlier overlaps with an LBA range designated in a write command or trim command issued later, writing to the overlapping portion is not performed. The deduplication process corresponds to step S1401 of the recovery write request process described above with reference to the flowchart of FIG. 52.

First, the CPU 21 deletes an entry indicating that the first completion has not been received from the locked data list 245 (step S1501). With respect to the entry indicating that the first completion has not been received, the application 223 or the like that requested writing or trimming corresponding to the entry has not been notified of a completion of processing in accordance with the request. Therefore, it is not necessary to transmit a write command or a trim command corresponding to the entry indicating that the first completion has not been received, to the memory system 3 again. Therefore, the CPU 21 deletes the entry indicating that the first completion has not been received from the locked data list 245.

Next, the CPU 21 sequentially acquires N entries in the locked data list 245 each indicating that the first completion has been received in order from the head entry (step S1502). Note that N is an integer of one or more. Then, the CPU 21 sets one to a variable i (step S1503). The variable i is used for identifying one of the N entries. Hereinafter, the i-th entry of the N entries is referred to as an i-th entry.

The CPU 21 determines whether or not the i-th entry is an entry corresponding to a write command (step S1504). More specifically, the CPU 21 determines whether the i-th entry is an entry corresponding to a write command or an entry corresponding to a trim command on the basis of a command operation code included in the SQ entry information of the i-th entry.

When the i-th entry is an entry corresponding to a write command (yes in step S1504), the CPU 21 acquires an LBA range (hereinafter, referred to as an i-th LBA range) based on the i-th entry (step S1505). Specifically, the CPU 21 acquires the LBA range indicated by the SQ entry information of the i-th entry as the i-th LBA range. When the modify command data 246 associated with the i-th entry is present, the CPU 21 acquires, as the i-th LBA range, an LBA range obtained by excluding the LBA range indicated by the modify command data 246 from the LBA range based on the SQ entry information.

Next, the CPU 21 executes an entry control process on the i-th entry (step S1506), and the process by the CPU 21 proceeds to step S1507. The entry control process is a process for deleting or changing the i-th entry so that writing to portions within the i-th LBA range that overlap with LBA ranges based on one or more entries subsequent to the (i+1)-th entry is not performed. In the entry control process, any one of (1) deletion of the i-th entry, (2) reduction of the LBA range indicated by the SQ entry information (more specifically, a start LBA and a data length) of the i-th entry, or (3) registration of the modify command data 246 indicating the overlapping portions with a modify command data list of the i-th entry, is performed. A specific procedure of the entry control process will be described later with reference to the flowchart of FIG. 54.

In step S1507, the CPU 21 adds one to the variable i. Accordingly, the subsequent entry is set as a new i-th entry. Next, the CPU 21 determines whether or not the variable i is N−1 or less (step S1508). When the variable i is N−1 or less (yes in step S1508), the process by the CPU 21 returns to step S1504. That is, the CPU 21 performs processing depending on whether an LBA range based on the new i-th entry overlaps with an LBA based on entries after the i-th entry. When the variable i is larger than N−1 (no in step S1508), the CPU 21 ends the deduplication process.

When the i-th entry is not an entry corresponding to a write command (no in step S1504), that is, when the i-th entry is an entry corresponding to a trim command, the process by the CPU 21 proceeds to step S1507. With respect to a trim command, since writing to the NAND flash memory 5 does not occur, it is not necessary to deduplicate a designated LBA range between the trim command and each of subsequent write and trim commands. Therefore, the process by the CPU 21 proceeds to a process for deduplication related to the next entry. The specific procedure of steps S1507 and S1508 is as described above.

With the deduplication process described above, it is possible to change the locked data list 245 so that overwriting to a certain LBA or writing to a certain LBA that is to be trimmed later is avoided in the recovery write request process. As a result, it is possible to lower wear of the NAND flash memory 5 of the memory system 3 that occurs because of redundant writing.

(Entry Control Process in Host 2)

FIG. 54 is a flowchart illustrating an example of the procedure of the entry control process executed by the CPU 21 of the host 2. The entry control process is a process for deleting or changing an i-th entry in the locked data list 245 so that writing to a portion within an i-th LBA range based on the i-th entry that overlaps with any of LBA ranges based on an (i+1)-th and subsequent entries. The i-th entry is an entry corresponding to a write command. Each of the (i+1)-th and subsequent entries is an entry corresponding to either a write command or a trim command. The entry control process corresponds to step S1506 of the deduplication process described above with reference to the flowchart of FIG. 53.

First, the CPU 21 sets i+1 to a variable j (step S1601). The variable j is used for identifying one of the N entries acquired in step S1502 of the deduplication process described above with reference to FIG. 53. A j-th entry of the N entries is hereinafter referred to as a j-th entry. The j-th entry is an entry corresponding to a write command or a trim command that is a target for determining whether the LBA range designated in the command of the j-th entry overlaps with the LBA range designated in the write command of the i-th entry. The CPU 21 acquires the LBA range (j-th LBA range) based on the j-th entry (step S1602). Then, the CPU 21 determines whether or not the j-th LBA range includes at least a portion of the i-th LBA range (step S1603).

When the j-th LBA range and the i-th LBA range do not overlap at all (no in step S1603), the process by the CPU 21 proceeds to step S1604.

When the j-th LBA range includes at least a portion of the i-th LBA range (yes in step S1603), the CPU 21 determines whether or not the j-th LBA range includes the whole of the i-th LBA range (step S1606). When the j-th LBA range includes the whole of the i-th LBA range (yes in step S1606), the CPU 21 deletes the i-th entry from the locked data list 245 (step S1607), and ends the entry control process. That is, since data written to the i-th LBA range in accordance with the write command corresponding to the i-th entry is overwritten in accordance with the write command corresponding to the j-th entry or is invalidated by the trim command corresponding to the j-th entry, the CPU 21 deletes the i-th entry so that the write command corresponding to the i-th entry is not issued.

When the j-th LBA range includes only a portion of the i-th LBA range (no in step S1606), the CPU 21 determines whether or not the j-th LBA range includes the head of the i-th LBA range (step S1608). When the j-th LBA range includes the head of the i-th LBA range (yes in step S1608), the CPU 21 changes the LBA range indicated by the SQ entry information of the i-th entry to indicate a new i-th LBA range reduced by excluding the overlapping portion of the original i-th LBA range and the j-th LBA range (step S1609). Then, the CPU 21 changes a data pointer indicated by the SQ entry information of the i-th entry in accordance with the reduced i-th LBA range (step S1610), and the process by the CPU 21 proceeds to step S1604. Note that when SGL is used, the LBA range cannot be modified by changing the data pointer information indicated by the SQ entry information. In this case, the CPU 21 registers the modify command data 246 indicating the portion overlapping with the j-th LBA range, with a modify command data list of the i-th entry as in step S1613 described later.

When the j-th LBA range does not include the head of the i-th LBA range (no in step S1608), the CPU 21 determines whether or not the j-th LBA range includes the end of the i-th LBA range (step S1611). When the j-th LBA range includes the end of the i-th LBA range (yes in step S1611), the CPU 21 changes the LBA range indicated by the SQ entry information of the i-th entry to indicate a new i-th LBA range reduced by excluding the overlapping portion of the original i-th LBA range and the j-th LBA range (step S1612), and the process by the CPU 21 proceeds to step S1604. Since the head of the i-th LBA range is not changed in step S1612, it is not necessary to change the data pointer indicated by the SQ entry information of the i-th entry.

When the j-th LBA range does not include the end of the i-th LBA range (no in step S1611), that is, when the j-th LBA range includes neither the head nor the end of the i-th LBA range and includes only an intermediate portion of the i-th LBA range, the CPU 21 registers the modify command data 246 indicating the portion overlapping with the j-th LBA range, with the modify command data list of the i-th entry (step S1613), and the process by the CPU 21 proceeds to step S1604. More specifically, the CPU 21 generates the modify command data 246 indicating the portion overlapping with the j-th LBA range. Then, the CPU 21 registers the generated modify command data 246 with the modify command data list of the i-th entry.

In step S1604, the CPU 21 adds one to the variable j. As a result, the subsequent entry is set as a new j-th entry. The CPU 21 determines whether or not the variable j is N or less (step S1605). When the variable j is N or less (yes in step S1605), the process by the CPU 21 returns to step S1602. That is, the CPU 21 performs processing depending on whether the i-th LBA range and an LBA range based on the new j-th entry overlap.

When the variable j is larger than N (no in step S1605), the CPU 21 ends the entry control process.

With the entry control process described above, the CPU 21 can delete or change the i-th entry so that writing to a portion within the i-th LBA range that overlaps with LBA ranges based on the (i+1)-th and subsequent entries is not performed.

(Write Control Process in Memory System 3)

When a write command is issued in the recovery write request process in the host 2, the memory system 3 performs a write control process in accordance with the issued write command. The specific procedure of the write control process is as described above with reference to the flowchart of FIG. 40.

(Trim Control Process in Memory System 3)

When a trim command is issued in the recovery write request process in the host 2, the memory system 3 performs the trim control process in accordance with the issued trim command. The specific procedure of the trim control process is as described above with reference to the flowchart of FIG. 50.

(Regarding Read Operation)

A case where the application 223 or the OS 221 issues a read request to the IO reception module 210 will be described. In this case, the IO reception module 210 first reads entries in the locked data list 245 in order from the newest entry via the write/trim management module 212 until an entry including a write command that designates, as its write range, one or more LBAs requested to be read by the read request is found. When the entry including the write command is found, the IO reception module 210 sends a portion of user data 71 in the data buffer 241 that corresponds to the LBAs, to the requestor. When an entry including the write command is not found, the IO reception module 210 reads user data corresponding to the LBAs from the memory system 3 and sends the user data to the requestor. Note that, in a case where an entry including a write command designating, as its write range, a portion of the LBAs requested to be read by the read request is found, the IO reception module 210 sends user data read from the data buffer 241 and user data read from the memory system 3 together to the requestor. With this operation, the IO reception module 210 can correctly return the data virtually written in the memory system 3 to the requestor. In addition, in a case where user data still remains in the NVRAM 24 (data buffer 241), the IO reception module 210 can respond to the read request at a high speed by sending the user data to the requestor.

Second Embodiment

In the first embodiment, when the LBA range designated in an issued-and-uncompleted write command (i.e., a write command that has been issued to the memory system 3 and is not completed) at least partially overlaps with the LBA range designated in a new write request, writing to at least the overlapping portion is canceled in writing in accordance with the write command. On the contrary, in a second embodiment, while a write command for writing an updated data portion in a memory mapped file is already issued to the memory system 3 and is not completed, when at least a portion of the updated data portion is further updated, the writing of the portion of the updated data portion in accordance with the write command, is canceled. A file stored in the memory system 3 (more specifically, the NAND flash memory 5) is mapped to the memory mapped file in a main memory of a host so that a CPU of the host executing an application is capable of reading and writing data of the file by using a read/write instruction from and to the main memory, without using a read/write request to the memory system 3.

Configurations of a host 2 and the memory system 3 according to the second embodiment are similar to those of the host 2 and the memory system 3 according to the first embodiment. The second embodiment is different from the first embodiment in terms of the host 2 including a storage area of a memory mapped file in the data buffer 241 of the NVRAM 24 and performing an operation according to reading and writing with respect to the memory mapped file. Hereinafter, the difference from the first embodiment will be mainly described.

FIG. 55 illustrates a configuration of an information processing system 1 that includes an information processing apparatus (for example, the host 2) according to the second embodiment. As described above, in the host 2 according to the second embodiment, in addition to the configuration of the host 2 according to the first embodiment, a storage area of a memory mapped file 247 is provided in the NVRAM 24. A portion of the area of the memory mapped file 247 is treated as user data 71 for a write request that is issued by the OS 221 to the IO reception module 210.

Next, the memory mapped file 247 will be described.

As described above, a file stored in a storage is mapped to the memory mapped file 245 stored in a main memory so that the application 223 is capable of reading and writing data of the file by using a read/write request for the main memory by the CPU 21, without using a read/write instruction for the storage. The storage is, for example, the memory system 3 (more specifically, the NAND flash memory 5). The main memory is, for example, the RAM 22 or the NVRAM 24. When the memory mapped file 247 on the main memory is shared by multiple processes executed on the CPU 21, the memory mapped file 247 may be used as a shared file among the processes.

The virtual memory described above is used for the memory mapped file 247. Therefore, in response to a request for opening the file (that is, starting to use the file), a storage area for storing the whole of the file is not always allocated in a physical memory (real memory).

When the application 223 requests access to a certain logical address, and a physical page on the physical memory is not allocated to a logical page having the logical address, a page fault occurs.

The OS 221 performs processing in response to the occurred page fault. Specifically, when the requested access to the logical address is access to a new file or access to an extended portion of an existing file, the OS 221 allocates a storage area (physical page) in the physical memory and fills the allocated storage area with specific data (for example, all zeros).

When the requested access to the logical address is access to the existing file, the OS 221 identifies an LBA corresponding to a logical page having the logical address. The OS 221 has a function (for example, a file system) of managing a correspondence relationship between a logical address (or a logical address range) indicating a storage area on a virtual memory in which a file is virtually stored and an LBA (or an LBA range) indicating a storage area on the memory system 3 in which the file is logically stored. The OS 221 reads data of the identified LBA from the memory system 3. The OS 221 writes the read data into a physical page that is allocated to the logical page.

As a result, the application 223 becomes capable of reading data on the logical address, which is requested to be accessed, from the logical page having the logical address, or writing data to the requested logical address in the logical page. When the data is written by the application 223 to the logical address, a dirty bit is set for the logical page having the logical address. The OS 221 writes data in the logical page for which the dirty bit is set, to the memory system 3 by using the corresponding LBA at a specific time when the dirty bit needs to be cleared. As a result, data rewritten on the memory mapped file 247 is reflected in the corresponding file in the memory system 3.

The specific time is, for example, a case where reading and writing from and to a logical page whose dirty bit is set are not performed for a while, and the logical page and a physical page allocated to the logical page are desired to be released in order to use for other purposes. In this case, after writing data stored in the logical page to the memory system 3, the OS 221 clears the dirty bit and further invalidates mapping between the logical page and the corresponding physical page (that is, performs a page-out operation). This allows the physical page becomes available for other purposes. The algorithm for selecting a logical page for the page-out operation is not limited to the above description.

Here, a case where a storage area of the RAM 22 is allocated as a storage area of the memory mapped file 247 is considered. The application 233 may request writing to one logical page of the memory mapped file 247 before processing in accordance with a write command transmitted to the memory system 3 is completed. As described above, a dirty bit is set for a logical page to which data is written. The IO reception module 210 requests the memory system 3 to write data in the logical page. More specifically, as described in the first embodiment, first, the IO reception module 210 copies data to be written from the RAM 22 to the NVRAM 24 to provide a function (virtual PLP function) of recovering the writing of the data to the memory system 3 by using the data stored in the NVRAM 24. Then, the IO reception module 210 transmits to the memory system 3 a write command for writing the copied data that designates an LBA corresponding to the logical page for which the dirty bit is set. When the IO reception module 210 has received the first completion for the write command, the OS 221 clears the dirty bit since the OS 221 treats the writing as having been completed.

Therefore, thereafter, when the application 223 requests writing to the same logical page in the memory mapped file 247 before processing in accordance with the transmitted write command is completed, there is a possibility that the write command transmitted to the memory system 3 can be canceled. On the other hand, since the OS 221 treats the writing as having already been completed, the cancellation is not issued.

In order to prevent this, it is necessary to modify the OS 221 so that the IO reception module 210 notifies the OS 221 the second completion has been received after the OS 221 issues a write request to the IO reception module 210, and writing to the logical page is inhibited until reception of the second completion is notified. Then, when a request for writing to the logical page is generated, the OS 221 issues, to the IO reception module 210, a cancel request for canceling an LBA range that overlaps with the LBA range designated in the further generated write request from writing in accordance with an uncompleted write command. Further, the OS 221 needs to cancel the write inhibition so that writing to the logical page is enabled. The dirty bit is set again by the new writing, and the OS 221 sends a write request to the IO reception module 210 at a later appropriate time.

The method of canceling writing to the LBA that overlaps with the LBA range designated in the further generated write request from writing in accordance with the uncompleted write command is the same as that described in the first embodiment except that no additional write command is issued. As a result, overwriting to the overlapping LBA does not occur, and thus, it is possible to lower wear of the NAND flash memory 5.

However, in a case where the storage area of the RAM 22 is allocated as the storage area of the memory mapped file 247, copy of data, which is to be written, to the NVRAM 24 always occurs. An operation for copying and a storage area used for copying is a load of the host 2. As described above, even when the OS 221 controls the memory mapped file 247, it is necessary to modify the OS 221 so as to inhibit writing to the logical page until the OS 221 receives the notification of the second completion. Without such modification on the OS 221, writing cannot be canceled, and it is not possible to lower wear of the NAND flash memory 5.

Thus, in the host 2 according to the present embodiment, a storage area is allocated from the NVRAM 24 as the storage area of the memory mapped file 247. Accordingly, the IO reception module 210 does not need to copy data to be written.

As described above, when the application 223 requests writing to one logical page in the memory mapped file 247 and data is written to the logical page, the CPU 21 sets a dirty bit for the logical page. The OS 221 requests the IO reception module 210 to write data in the logical page, and the IC reception module 210 requests the memory system 3 to write the data in the logical page via the command issuing module 211, in which processing related to write inhibition is changed from the first embodiment as described later.

In the first embodiment, the process of inhibiting writing to a logical page including user data 71 may be performed after the IO reception module 210 receives a write request until a successful termination is returned to the write requestor. This is because, in the first embodiment, it is assumed that the write requestor such as the application 223 or the like does not change the user data 71 until the write request is completed after the write request is issued. On the other hand, in the second embodiment, a process of inhibiting writing to a logical page including user data 71 is performed before a write command is sent to the memory system 3. This is because it can be detected that the application 223 changes user data 71 before a write request is completed. In the case of the memory mapped file 247, there is a possibility that the application 223 changes the user data 71 before the write request is completed, because the writing of the user data 71 to a logical page by the application 223 and a request to the write/trim management module 212 for writing the user data 71 to the memory system 3 by the OS 221 are independently performed.

In a case where the application 223 performs writing to the same logical page in the memory mapped file 247 before processing in accordance with a transmitted write command is completed, there is a possibility that writing to the LBA designated in the write command can be canceled. In this case, the OS 221 of the present embodiment cancels writing to an LBA in accordance with the uncompleted write command that overlaps with writing in accordance with the further generated write request. When the cancellation processing is started, write inhibition for the logical page is also canceled. As a result, the application 223 can complete writing to the logical page, and does not need to wait for the canceling of the write inhibition according to completion of the write command. Therefore, it is possible to shorten a stop period. Further, since writing to the overlapping LBA is not performed, it is possible to lower wear of the NAND flash memory 5.

More specifically, instead of the copy-on-write processing performed when writing to the write-inhibited logical page is attempted as described in the first embodiment, a function of canceling the writing of the user data 71 in the memory system 3 that corresponds to the write-inhibited logical page is provided.

Note that such an event occurs when access to a logical page from the application 223 is not made for a while, and the application 223 performs writing again after the OS 221 attempts to release the corresponding physical memory page, that is, to perform page-out.

In a conventional memory mapped file of a host, page-out is enabled when an OS makes a write request to a memory system and receives completion only once. Then, the OS invalidates mapping between a logical page and a physical page, thereby performing page-out. Thereafter, when an access request for accessing to a logical page not mapped to a physical page is generated by an application, the OS reads data of the logical page, which is requested to be accessed, again from the memory system into a physical page not mapped to any logical page. Then, the OS maps the physical page into which the data is read with the logical page which is requested to be accessed (that is, performs a page-in operation).

As described in the first embodiment, since a storage area of the data buffer 241 in which the user data 71 is stored is locked until the second completion is received by the write/trim management module 212, page-out is not actually performed yet. In the present embodiment, writing to the memory system 3 for page-out by the OS 221 may not be immediately completed and may take time. In such a case, even when the application 223 attempts to perform writing to a write-inhibited logical page in which the page-out is not completed, no copy occurs unlike the first embodiment. The OS 221 cancels writing to an LBA that is within an LBA range designated in a write command already transmitted to the memory system 3 and corresponds to the logical page to which data was attempted to be newly written. The OS 221 further cancels inhibition of writing to the logical page. As a result, writing to the logical page by the application 223 is also completed.

Specifically, the process on a write-inhibited page that is performed in the first embodiment is changed as follows.

In a case where, after the OS 221 requests the IO reception module 210 to perform the writing of data stored in a logical page, a write request is newly generated by the application 223 or the like with respect to the logical page, the write/trim management module 212 is notified of occurrence of an interrupt as described in the first embodiment. Upon receiving the notification, the write/trim management module 212 obtains an LBA range corresponding to the logical page to which the writing is attempted. Then, the write/trim management module 212 finds a command ID of a write command requesting the memory system 3 to perform writing to the LBA range, from entries in the locked data list 245. After receiving the first completion for the write command, the IO reception module 210 returns a successful completion for the write request to the OS 221.

Thereafter, the write/trim management module 212 requests the command issuing module 211 to send an abort command or a modify command to the memory system 3 in accordance with the LBA range. This process is the same as the process that is described in the first embodiment and is performed when a write request overlapping the LBA range is received, except that a new write command is not issued. Regardless of whether the abort command or the modify command is successful, the write/trim management module 212 confirms that the dirty bit is cleared by the OS 221 that has received the successful completion for the write request. When the dirty bit is not cleared, the write/trim management module 212 waits until the dirty bit is cleared. Then, the write/trim management module 212 cancels inhibition of writing to the logical page. As a result, writing by the application 223 or the like is resumed. The dirty bit is set again by the new writing, but writing to the memory system 3 for clearing the new dirty bit is performed by the OS 221 later.

The operations of the host 2 and the memory system 3 described above will be described more specifically below.

Figure 56:
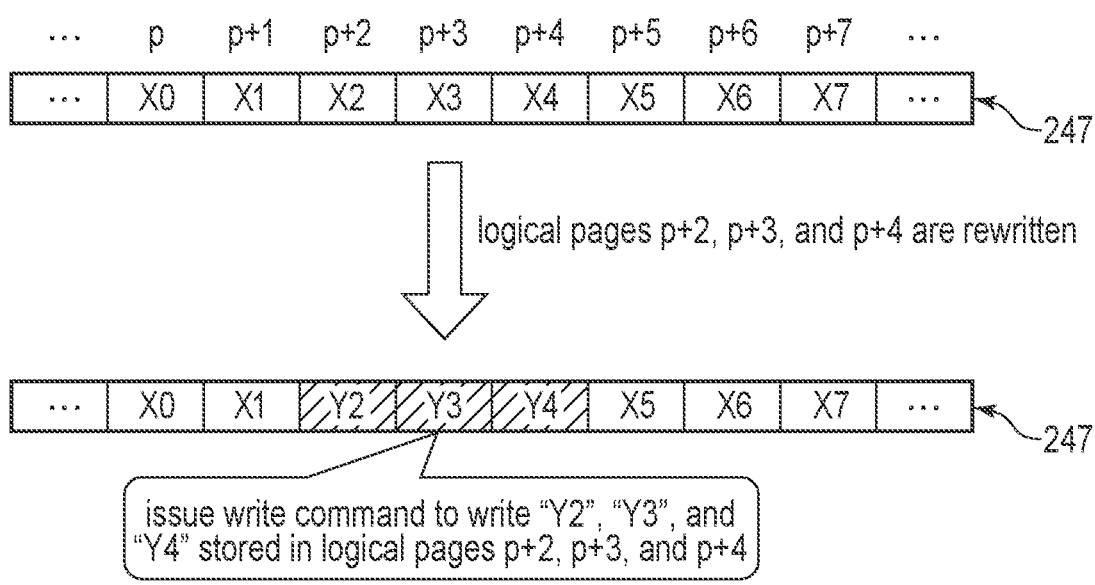
FIG. 56 is a diagram illustrating an example of the rewriting of a memory mapped file in the information processing apparatus according to the second embodiment.

FIG. 56 illustrates an example of rewriting the memory mapped file 247. In FIG. 56, first, data portions X0 to X7 are stored in logical pages from p to p+7 in the memory mapped file 247, respectively. Each of the data portions X0 to X7 is, for example, a data portion included in a file that is read from the memory system 3.

In FIG. 56, the data portions X2, X3, and X4 that are stored in the logical pages p+2, p+3, and p+4 are rewritten to data portions Y2, Y3, and Y4, respectively, in accordance with a write request by the application 223. A dirty bit is set for each of the logical pages p+2, p+3, and p+4 in which the data portions have been rewritten.

The OS 221 requests the IO reception module 210 to write, to the memory system 3, the data portions Y2, Y3, and Y4 in the logical pages p+2, p+3, and p+4 for which the dirty bits are set at a specific time.

FIG. 57 illustrates an example of a write operation for writing data in one or more logical pages for which dirty bits are set. Here, it is assumed that the OS 221 sends, to the IO reception module 210, a write request for requesting the writing of data in one or more contiguous logical pages for which dirty bits are set. The one or more contiguous logical pages for which the dirty bits are set will be hereinafter referred to as first target logical pages. The data stored in the first target logical pages is referred to as first target data.

First, in the host 2, the IO reception module 210 receives the write request from the OS 221 ((1) in FIG. 57). The IO reception module 210 transmits the received write request to the write/trim management module 212 ((2) in FIG. 57).

In accordance with the write request received from the IO reception module 210, the write/trim management module 212 locks the first target logical pages in the memory mapped file 247 and inhibits writing thereto ((3) in FIG. 57). That is, the write/trim management module 212 inhibits invalidating the mapping (page-out) of a physical page with the first target logical pages. The write/trim management module 212 requests the command issuing module 211 to issue a write command corresponding to the write request ((4) in FIG. 57).

The command issuing module 211 issues the write command (hereinafter, referred to as a fourth write command) for writing the first target data in response to the request from the write/trim management module 212. That is, the command issuing module 211 generates SQ entry information corresponding to the fourth write command. The generated SQ entry information includes information indicating an LBA range corresponding to the first target logical pages (that is, the LBA range in which the first target data is to be written) and a data pointer indicating a storage location of the first target data in the host 2. The command issuing module 211 sends the generated SQ entry information to the write/trim management module 212 ((5) in FIG. 57).

The write/trim management module 212 generates an entry of the locked data list 245 by using the SQ entry information sent from the command issuing module 211. The generated entry is referred to as a fifth entry. The fifth entry includes, for example, the SQ entry information equivalent to the issued write command and data region management information. The data region management information is information by which a storage area in the memory mapped file 247 (that is, the storage area in the NVRAM 24) in which the first target data is stored is identifiable. The write/trim management module 212 adds the fifth entry to the locked data list 245 ((6) in FIG. 57).

Next, the command issuing module 211 stores the issued fourth write command (SQ entry information) in the submission queue 242 ((7) in FIG. 57).

Subsequent operations ((8) to (12) in FIG. 57) in the memory system 3 in accordance with the fourth write command are similar to the operations ((8) to (12) in FIG. 11) in the memory system 3 described above with reference to FIG. 11.

Next, the command issuing module 211 of the host 2 acquires the first completion for the fourth write command from the completion queue 243 ((13) in FIG. 57). Then, the command issuing module 211 sends the acquired first completion to the write/trim management module 212 ((14) in FIG. 57).

When the first completion indicates a successful termination, the write/trim management module 212 updates the fifth entry in the locked data list 245 ((15) in FIG. 57). More specifically, the write/trim management module 212 adds, to the fifth entry, an assigned sequence number (that is, information indicating the order that the first completion is received) and information indicating that the first completion has been received. The write/trim management module 212 notifies the IO reception module 210 of completion (successful termination) of the writing ((16) in FIG. 57). Then, the IO reception module 210 notifies the OS 221 of the successful termination ((17) in FIG. 57). Upon receiving the notification of the successful termination, the OS 221 clears the dirty bits set for the first target logical pages ((18) in FIG. 57).

When the first completion indicates an error termination, the write/trim management module 212 unlocks the first target logical pages in the memory mapped file 247 ((19) in FIG. 57). Then, the write/trim management module 212 deletes the fifth entry from the locked data list 245 ((20) in FIG. 57). Then, the write/trim management module 212 cancels inhibition of writing to the first target logical pages. The write/trim management module 212 notifies the IO reception module 210 of the error termination ((21) in FIG. 57). Then, the IO reception module 210 notifies the OS 221 of the error termination ((22) in FIG. 57). The OS 221 notifies the application 223 or the like that uses the memory mapped file 247 of the error.

Figure 58:
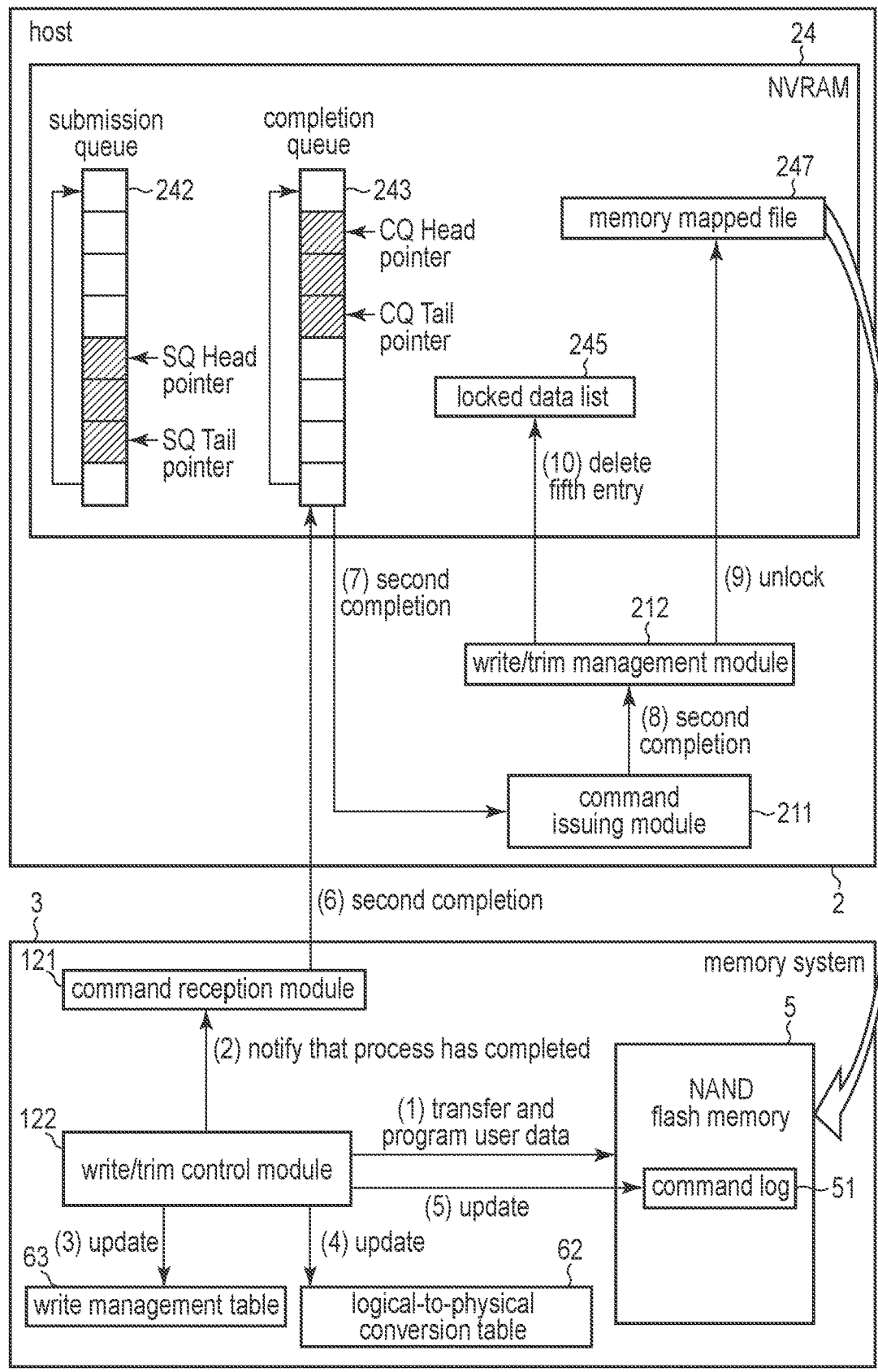
FIG. 58 is a block diagram illustrating another example of the write operation in the information processing system that includes the information processing apparatus according to the second embodiment.

FIG. 58 illustrates a write operation subsequent to FIG. 57.

Operations ((1) to (6) in FIG. 58) in the memory system 3 according to write commands that have been received are similar to the operations ((1) to (6) in FIG. 16) in the memory system 3 described above with reference to FIG. 16. That is, the memory system 3 writes user data according to the delayed write completion on the basis of write commands that have been received from the host 2.

Next, the command issuing module 211 of the host 2 acquires the second completion for the fourth write command from the completion queue 243 ((7) in FIG. 58). Then, the command issuing module 211 sends the acquired second completion to the write/trim management module 212 ((8) in FIG. 58).

The write/trim management module 212 receives the second completion for the fourth write command from the command issuing module 211, unlocks the first target logical pages in the memory mapped file 247, and cancels inhibition of writing to the first target logical pages ((9) in FIG. 58). Then, the write/trim management module 212 deletes the fifth entry from the locked data list 245 ((10) in FIG. 58).

When the second completion indicates an error, the host 2 (specifically, the write/trim management module 212) regards the error as a failure of the memory system 3. The write/trim management module 212 stops processing on the memory system 3 and performs abnormality processing of the information processing system 1.

With the write operation described above, the data in logical pages in the memory mapped file 247 for which the dirty bits are set can be reflected in the corresponding file in the memory system 3. While the memory system 3 writes the data according to the delayed write completion on the basis of write commands that have been received by the memory system 3 from the host 2, the host 2 can manage a processing status of each of the issued write commands by using the locked data list 245.

Here, a case where the application 223 further requests writing to at least a portion of the first target logical pages after the host 2 issues the fourth write command for writing the first target data and before the host 2 receives the second completion for the fourth write command will be described.

Even when the first completion indicates a successful termination, and then the dirty bits set for the first target logical pages are cleared, writing to the first target logical pages is still inhibited. If writing to the first target logical pages is permitted in response to the clearing of the dirty bits, the dirty bits are set again in response to new writing to the first target logical pages. Then, the OS 221 requests the writing of new first target data in the first target logical pages in which the dirty bits are set again at a later appropriate time, and another write command for writing the new first target data is transmitted to the memory system 3. This causes duplicate writing to the same LBA in the memory system 3. Therefore, even when the dirty bits set for the first target logical pages are cleared, the write/trim management module 212 inhibits writing to the first target logical pages until the writing of the first target data in accordance with the fourth write command in the memory system 3 is completed. As a result, the write/trim management module 212 can detect that a logical page corresponding to an LBA range in which data is attempted to be written in the memory system 3 has been updated, and can cancel writing to the corresponding LBA range of the uncompleted write command issued earlier.

When the application 223 requests writing to a logical address in the locked first target logical pages, since writing thereto is prohibited, an interrupt is generated, and the OS 221 notifies the write/trim management module 212 of the interrupt.

In response to notification of the interrupt, the write/trim management module 212 retrieves an entry containing a write command for a logical page having the logical address to which data is requested to be written, from entries of uncompleted write commands in the locked data list 245. In a case where the first completion has not been received for the write command indicated in the retrieved entry, the write/trim management module 212 waits until the first completion is received. Upon receiving the first completion, the write/trim management module 212 attempts to cancel writing to an LBA range that corresponds to the logical page having the logical address where the data is requested to be written. The logical page having the logical address where the data is requested to be written is referred to as a second target logical page. The second target logical page is at least one page of the first target logical pages. The writing of data in the second target logical page to the memory system 3 has been requested to the command issuing module 211 and the write/trim management module 212, and is about to be performed in accordance with a write command for which the first completion has been received and which is not completed.

The write/trim management module 212 performs an operation for cancelling the writing of the data in the second target logical page to the memory system 3. Specifically, the write/trim management module 212 identifies an entry in the locked data list 245 corresponding to the fourth write command designating the LBA range that includes an LBA range corresponding to the second target logical page. When a value is not set in the completion state field (or the completion order field) of the entry after the entry is identified, the write/trim management module 212 waits until the value is set. The identified entry is the fifth entry corresponding to the fourth write command for writing the first target data to the first target logical pages. The LBA range corresponding to the first target logical pages is referred to as a third LBA range. The LBA range corresponding to the second target logical page is referred to as a fourth LBA range. The command issuing module 211 and the write/trim management module 212 perform an operation of aborting or modifying the fourth write command depending on an overlapping relationship between the third LBA range and the fourth LBA range (that is, an overlapping relationship between the first target logical pages and the second target logical page) by using the specified fifth entry. A specific example of the operation of aborting or modifying the fourth write command depending on the overlapping relationship between the third LBA range and the fourth LBA range will be described later with reference to FIGS. 59 to 62.

The write/trim management module 212 waits for the OS 221 to clear the dirty bit set for the second target logical page, and cancels the inhibition of writing to the second target logical page. Accordingly, writing to the second target logical page requested by the application 223 is resumed. As a result, the stopped application 223 is resumed, the dirty bit is set again, and the OS 221 issues a write request to the IO reception module 210 at an appropriate time.

A specific example of the operation of aborting or modifying the fourth write command depending on the overlapping relationship between the third LBA range and the fourth LBA range will be described.

(Case Where Fourth LBA Range Matches Third LBA Range)

Figure 59:
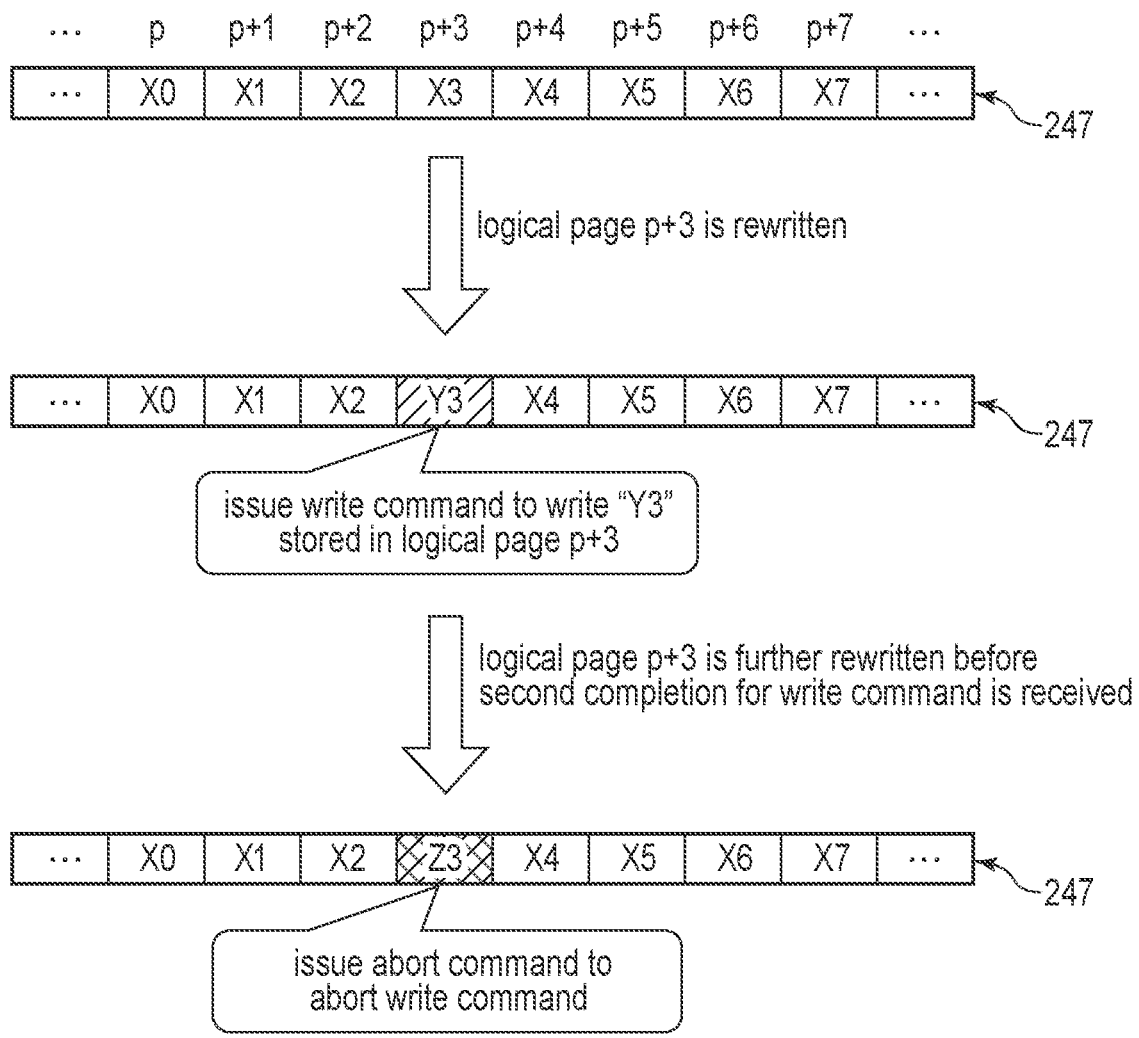
FIG. 59 is a diagram illustrating a first example of the memory mapped file in the information processing apparatus according to the second embodiment.

FIG. 59 illustrates a first example of the memory mapped file 247 in which data is further written to the first target logical page after the fourth write command designating the third LBA range corresponding to the first target logical page is issued and before a process in accordance with the fourth write command is completed. In FIG. 59, first, data portions X0 to X7 are stored in logical pages from p to p+7 in the memory mapped file 247, respectively.

The data portion X3 stored in the logical page p+3 (first target logical page) is rewritten to a data portion Y3 in accordance with a write request from the application 223. A dirty bit is set for the logical page p+3 in which the data portion has been rewritten.

The OS 221 requests the IO reception module 210 to write, to the memory system 3, the data portion Y3 in the logical page p+3 for which the dirty bit is set at a specific time. The IO reception module 210 sends the request to the write/trim management module 212. The write/trim management module 212 inhibits writing to the logical page p+3. The write/trim management module 212 locks related data corresponding to the fourth write command that is to be issued and designates an LBA range (third LBA range) corresponding to the logical page p+3. The write/trim management module 212 adds an entry corresponding to the fourth write command to the locked data list 245. In response to an instruction from the write/trim management module 212, the command issuing module 211 issues the fourth write command.

When another write request for the logical page p+3 (second target logical page) is generated by the application 223 before the second completion for the issued fourth write command is received from the memory system 3, an interrupt is generated because the logical page p+3 is write-inhibited, and the OS 221 notifies the write/trim management module 212 of the interrupt. The write/trim management module 212 that has received the notification waits for the OS 221 to clear the dirty bit set for the logical page p+3 in response to the command issuing module 211 receiving the first completion for the fourth write command and the OS 221 being notified the reception via the write/trim management module 212 and the IO reception module 210. When the dirty bit set for the logical page p+3 is cleared, the write/trim management module 212 permits writing to the logical page p+3. Then, the write/trim management module 212 requests the command issuing module 211 to cancel writing to the LBA range (third LBA range) corresponding to the logical page p+3. After that, the data portion Y3 stored in the logical page p+3 is rewritten to a data portion Z3 in response to said another write request by the application 223, and the dirty bit for the logical page p+3 is set again.

In this case, the logical page p+3 (second target logical page) where data is to be written in accordance with the write request generated later matches the logical page p+3 (first target logical page) corresponding to the third LBA range designated in the issued-and-uncompleted write command. That is, the LBA range (fourth LBA range) corresponding to the logical page p+3 where the data is to be written in accordance with the write request generated later matches the third LBA range designated in the issued-and-uncompleted write command.

When the fourth LBA range matches the third LBA range, the host 2 and the memory system 3 perform an operation (abort operation) for aborting the issued-and-uncompleted write command.

FIG. 60 illustrates an example of the abort operation performed when the fourth LBA range matches the third LBA range. Here, a case where the abort operation is performed after the write operation of FIG. 57 will be explained.

First, the command issuing module 211 issues an abort command for aborting the fourth write command that designates the third LBA range. That is, the command issuing module 211 generates SQ entry information corresponding to the abort command for aborting the fourth write command. The issued abort command includes information (for example, the command ID) capable of identifying the fourth write command to be aborted. Next, the command issuing module 211 stores the issued abort command (SQ entry information) in the submission queue 242 ((1) in FIG. 60).

Subsequent operations ((2) to (6) in FIG. 60) in the memory system 3 in accordance with the abort command are similar to the operations ((2) to (6) in FIG. 22) in the memory system 3 described above with reference to FIG. 22.

Next, the command issuing module 211 of the host 2 acquires a completion for the abort command from the completion queue 243 ((7) in FIG. 60). Then, the command issuing module 211 sends the acquired completion to the write/trim management module 212 ((8) in FIG. 60).

When the completion indicates a success of abort, since the fourth write command is aborted, the write/trim management module 212 unlocks the first target logical page in the memory mapped file 247 that stores data which should have been written in accordance with the fourth write command ((9) in FIG. 60). Then, the write/trim management module 212 deletes the fifth entry corresponding to the fourth write command from the locked data list 245 ((10) in FIG. 60).

When the completion indicates a failure of abort, since the fourth write command is not aborted, the write operation in accordance with the fourth write command is continued. That is, the write/trim management module 212 does not unlock the first target logical page in the memory mapped file 247 and does not delete the fifth entry from the locked data list 245. In this case, which of the data portions Y3 and Z3 of the logical page p+3 (second target logical page) is written depends on the timing when the memory system 3 reads data from a corresponding physical page of the host 2, and is indefinite. Thus, the OS 221 treats the data portion Y3 as having been written. However, since the dirty bit is already set when the application 223 writes the data portion Z3, the OS 221 requests the IO reception module 210 to write the data in the logical page p+3 at a specific time.

With the abort operation described above, the host 2 can abort writing in accordance with the fourth write command in the memory system 3 when the fourth LBA range matches the third LBA range.

Specifically, the host 2 transmits an abort command for aborting the fourth write command to the memory system 3.

The memory system 3 receives the abort command from the host 2, and aborts the fourth write command when writing in accordance with the fourth write command has not been started. Then, the memory system 3 returns a completion indicating a success of abort of the fourth write command to the host 2. On the basis of the completion indicating the success of abort, the host 2 unlocks the user data or the like and deletes the fifth entry corresponding to the fourth write command from the locked data list 245.

As a result, in the memory system 3, writing to the NAND flash memory 5 in accordance with the fourth write command is not performed. That is, writing to the LBA range corresponding to the logical page in the memory mapped file 247 that stores data which has been overwritten is not performed. Therefore, it is possible to lower wear of the NAND flash memory 5.

(Case Where Fourth LBA Range is Portion of Third LBA Range)

Figure 61:
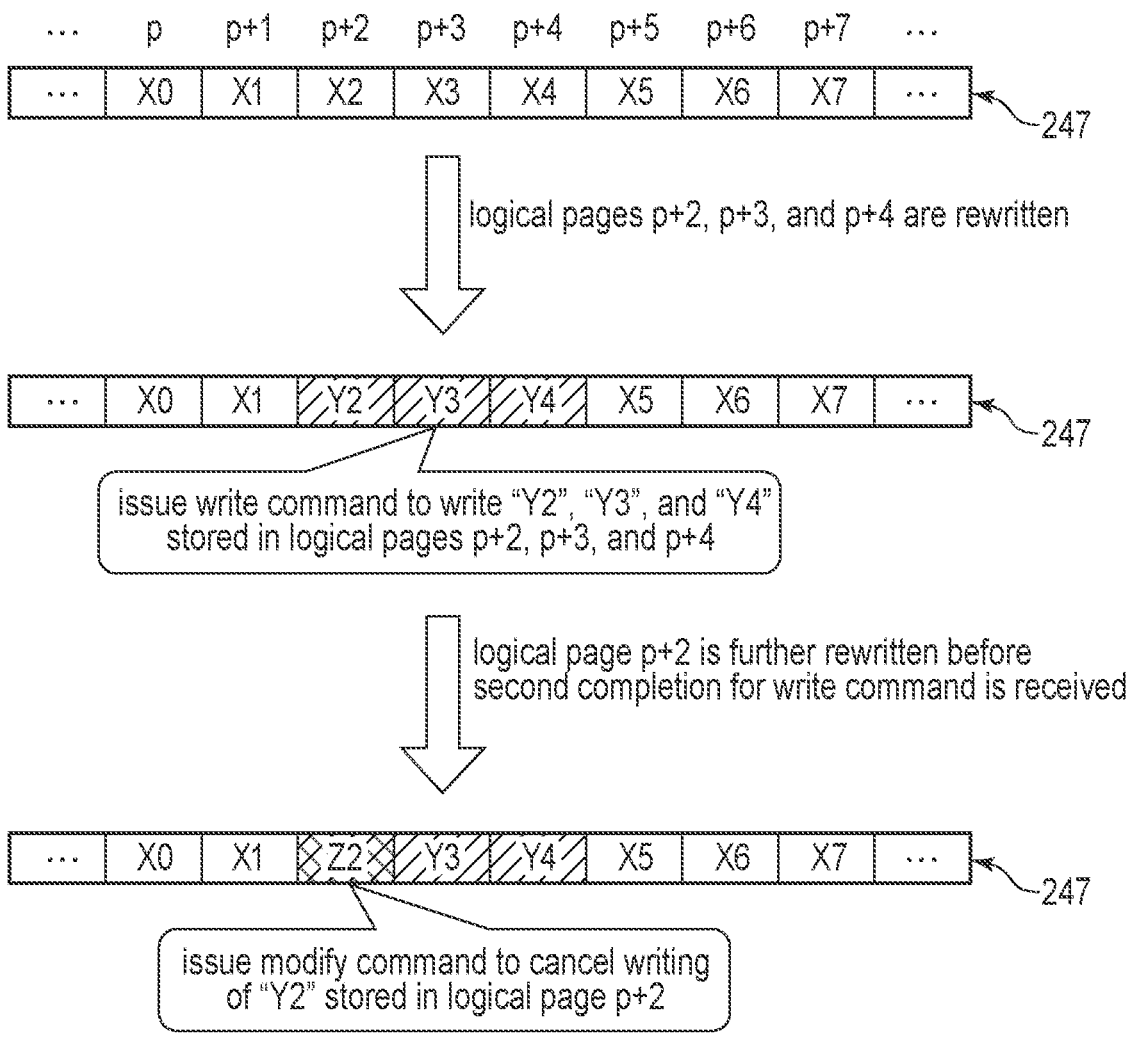
FIG. 61 is a diagram illustrating a second example of the memory mapped file in the information processing apparatus according to the second embodiment.

FIG. 61 illustrates an example of the memory mapped file 247 in which data is further written to a portion of the first target logical pages after the fourth write command designating the third LBA range corresponding to the first target logical pages is issued and before the process according to the fourth write command is completed. In FIG. 61, first, data portions X0 to X7 are stored in logical pages from p to p+7 in the memory mapped file 247, respectively.

The data portions X2, X3, and X4 stored in the logical pages p+2, p+3, and p+4 (first target logical pages) are rewritten to data portions Y2, Y3, and Y4, respectively, in accordance with a write request from the application 223. A dirty bit is set for each of the logical pages p+2, p+3, and p+4 in which the data portions have been rewritten.

The OS 221 requests the IO reception module 210 to write, to the memory system 3, the data portions Y2, Y3, and Y4 in the logical pages p+2, p+3, and p+4 for which the dirty bits are set, at a specific time. The IO reception module 210 sends the request to the write/trim management module 212, and the write/trim management module 212 inhibits writing to the logical pages p+2, p+3, and p+4. The write/trim management module 212 locks related data corresponding to the fourth write command to be issued that designates an LBA range (third LBA range) corresponding to the logical pages p+2, p+3, and p+4. Then, the write/trim management module 212 adds an entry corresponding to the fourth write command to the locked data list 245. In response to an instruction from the write/trim management module 212, the command issuing module 211 issues the fourth write command.

When another write request for the logical page p+2 (second target logical page) of the logical pages p+2, p+3, and p+4 (first target logical pages) is generated by the application 223 before the second completion for the issued fourth write command is received from the memory system 3, an interrupt is generated because the logical page p+2 is write-inhibited, and the OS 221 notifies the write/trim management module 212 of the interrupt. The write/trim management module 212 that has received the notification waits for the OS 221 to clear the dirty bit set for the logical page p+2 in response to the command issuing module 211 receiving the first completion for the fourth write command and the OS 221 being notified of the reception via the write/trim management module 212 and the IO reception module 210. When the dirty bit set for the logical page p+2 is cleared, the write/trim management module 212 permits writing to the logical page p+2. Then, the data portion Y2 stored in the logical page p+2 is rewritten to a data portion Z2 in accordance with said another write request by the application 223, and the dirty bit for the logical page p+2 is set again.

In this case, the logical page p+2 (second target logical page) to which data is to be written in accordance with said another write request generated later is a portion of the logical pages p+2, p+3, and p+4 (first target logical pages) corresponding to the third LBA range that is designated in the issued-and-uncompleted write command. That is, the LBA range (fourth LBA range) corresponding to the logical page p+2 to which the data is to be written in accordance with said another write request generated later is a portion of the third LBA range designated in the issued-and-uncompleted write command. More specifically, the fourth LBA range is (A) a contiguous portion from the head toward the end of the third LBA range.

The fourth LBA range may be (B) a contiguous portion from the end toward the head of the third LBA range. This is, for example, a case where, after the data portions Y2, Y3, and Y4 are stored in the logical pages p+2, p+3, and p+4 in the example illustrated in FIG. 61, the data portion Y4 stored in the logical page p+4 is rewritten to a data portion Z4.

Figure 62:
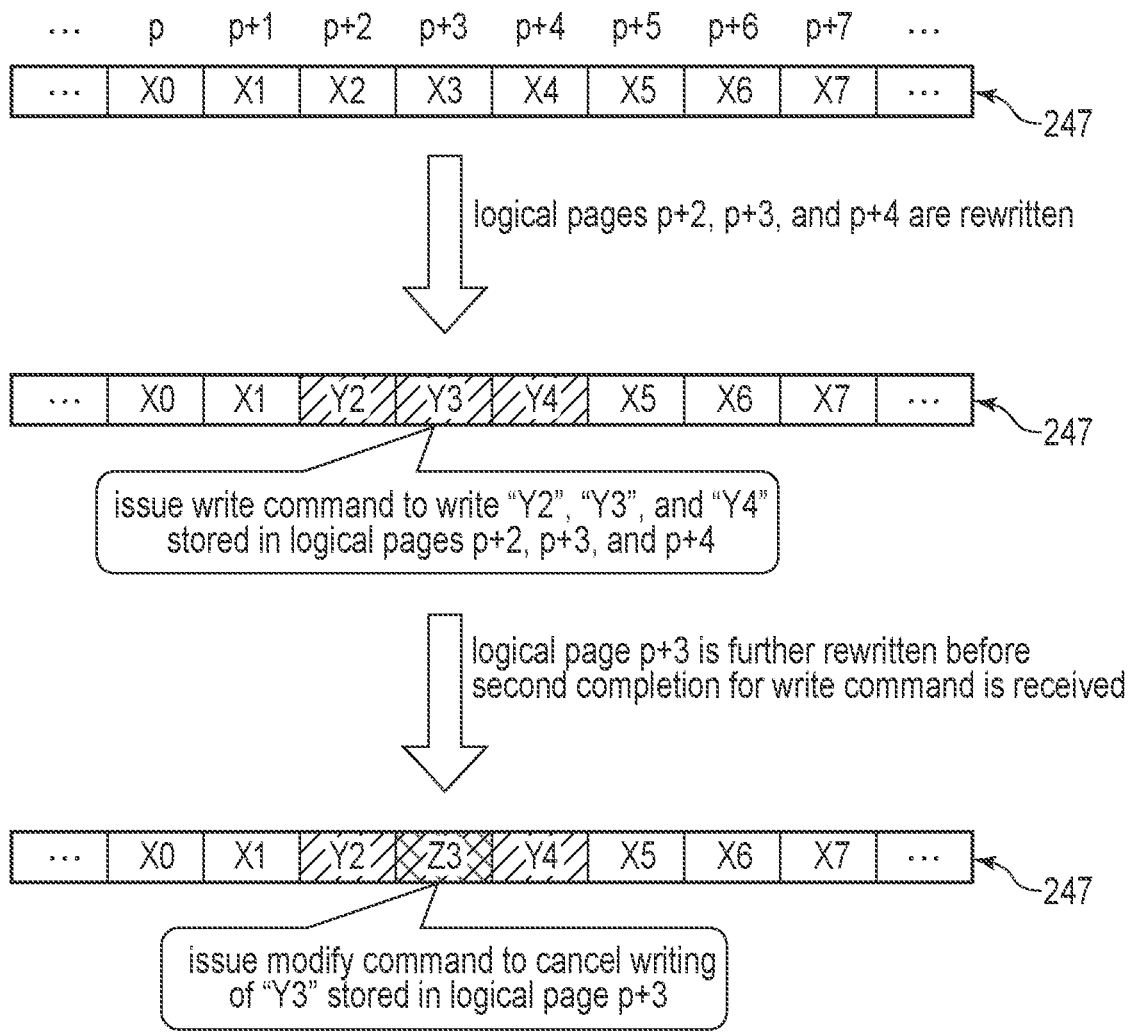
FIG. 62 is a diagram illustrating a third example of the memory mapped file in the information processing apparatus according to the second embodiment.

Furthermore, the fourth LBA range may be (C) only an intermediate portion of the third LBA range that includes neither the head nor the end of the third LBA range. This is, for example, a case where, after the data portions Y2, Y3, and Y4 are stored in the logical pages p+2, p+3, and p+4 as illustrated in FIG. 62, the data portion Y3 stored in the logical page p+3 is rewritten to a data portion Z3.

When the fourth LBA range is a portion of the third LBA range, the host 2 and the memory system 3 perform an operation (modify operation) for modifying the issued-and-uncompleted write command.

FIG. 63 illustrates an example of the modify operation performed in a case where the fourth LBA range is a portion of the third LBA range. Here, a case where the modify operation is performed after the write operation illustrated in FIG. 57 will be explained.

First, the command issuing module 211 issues a modify command for modifying the fourth write command that designates the third LBA range. That is, the command issuing module 211 generates SQ entry information equivalent to the modify command for modifying the fourth write command. The issued modify command includes information capable of identifying the fourth write command to be modified and information indicating the fourth LBA range in which writing is to be canceled. The command issuing module 211 stores the issued modify command (SQ entry information) in the submission queue 242 ((1) in FIG. 63).

Subsequent operations ((2) to (6) in FIG. 62) in the memory system 3 in accordance with the modify command are similar to the operations ((2) to (6) in FIG. 29) in the memory system 3 described above with reference to FIG. 29.

Next, the command issuing module 211 of the host 2 acquires a completion for the modify command from the completion queue 243 ((7) in FIG. 63). Then, the command issuing module 211 sends the acquired completion to the write/trim management module 212 ((8) in FIG. 63).

When the completion indicates a success of modification, the write/trim management module 212 unlocks the second target logical page in the memory mapped file 247 ((9) in FIG. 63). Since the fourth write command is modified, the write/trim management module 212 generates the modify command data 246 indicating the fourth LBA range designated in the modify command (that is, the fourth LBA range in which writing is canceled) ((10) in FIG. 63). Then, the write/trim management module 212 registers the generated modify command data 246 with a modify command data list of the fifth entry in the locked data list 245 that corresponds to the fourth write command ((11) in FIG. 63).

When the fourth LBA range is (A) the above-described contiguous portion from the head toward the end of the third LBA range, the third LBA range designated in the fourth write command is reduced according to the modification so as to exclude the contiguous portion (fourth LBA range) from the head toward the end. Therefore, instead of registering the modify command data 246, the write/trim management module 212 may update a data pointer of the SQ entry information of the fifth entry in the locked data list 245 that corresponds to the fourth write command so that the data pointer indicates a storage location of user data to be written in the reduced LBA range, and update the LBA range indicated by the SQ entry information in the fifth entry so that the LBA range indicates the reduced LBA range. For example, the write/trim management module 212 increases a value of the LBA field by X and decreases a value of the data length field by X in the SQ entry information illustrated in FIG. 2. Note that this method can be used only when PRP is used, and cannot be used when SGL is used.

In a case where the fourth LBA range is (B) the above-described contiguous portion from the end toward the head of the third LBA range, the third LBA range designated in the fourth write command is reduced so as to exclude the contiguous portion from the end toward the head according to the modification. Also in this case, instead of generating the modify command data 246 and registering the generated modify command data 246 with the modify command data list of the fifth entry, the write/trim management module 212 may update the LBA range indicated by the SQ entry information in the fifth entry so that the LBA range indicates the reduced LBA range.

When the fourth LBA range is either (B) the contiguous portion from the end toward the head of the third LBA range or (C) only the intermediate portion of the third LBA range that includes neither the head nor the end, the head of the third LBA range designated in the fourth write command is not changed. Therefore, the write/trim management module 212 does not change the data pointer indicating the storage location of user data to be written in accordance with the fourth write command.

In addition, in a case where the fourth LBA range is (C) only the intermediate portion of the third LBA range that includes neither the start LBA nor the end LBA, the third LBA range designated in the fourth write command becomes two LBA ranges due to the exclusion of the fourth LBA range that is the intermediate portion according to the modification. These two LBA ranges are identifiable by the third LBA range indicated by the SQ entry information in the fifth entry and the fourth LBA range indicated by the generated modify command data 246.

When the completion for the modify command indicates a failure of modification, since the fourth write command is not modified, the write operation in accordance with the fourth write command is continued. That is, the write/trim management module 212 does not generate the modify command data 246 corresponding to the modify command and does not update the fifth entry in the locked data list 245 that corresponds to the fourth write command. In this case, which of data before the update and data after the update is written depends on a timing when the memory system 3 reads data from a corresponding physical page of the host 2, and is indefinite. Thus, the OS 221 treats the data before the update as having been written. However, since the dirty bit is set when the application 223 writes the data after the update, the OS 221 requests the IO reception module 210 to write the data in the logical page at a specific time.

With the modify operation described above, when the fourth LBA range is a portion of the third LBA range, and writing in accordance with the fourth write command in the memory system 3 has not been started, the writing in accordance with the fourth write command can be modified.

Specifically, the host 2 transmits the modify command for modifying the fourth write command to the memory system 3.

The memory system 3 receives the modify command from the host 2, and modifies the fourth write command when writing in accordance with the fourth write command has not been started and the LBA range designated in the modify command is valid. Then, the memory system 3 returns a completion indicating a success of modification of the fourth write command to the host 2. In response to the completion indicating the success of modification, the host 2 unlocks user data for which writing is cancelled and updates the entry in the locked data list 245 that corresponds to the fourth write command. Specifically, for example, the host 2 generates the modify command data 246 in accordance with the completion indicating the success of modification. Then, the host 2 registers the generated modify command data 246 with the modify command data list of the entry in the locked data list 245 that corresponds to the fourth write command.

As a result, in the memory system 3, a portion of writing to the NAND flash memory 5 in accordance with the fourth write command is canceled. That is, writing to the LBA range that corresponds to the overwritten logical page (second target logical page) in the memory mapped file 247 is not performed. Therefore, it is possible to lower wear of the NAND flash memory 5.

A dirty bit is set for the overwritten second target logical page. The OS 221 requests the IO reception module 210 to write the data in the second target logical page to the memory system 3 at the next time when the dirty bit needs to be cleared. As a result, a new write command for writing the data in the second target logical page to the memory system 3 is transmitted to the memory system 3.

Finally, when a dirty bit remains set for a page in the memory mapped file 247 after the application 223 completes use of the memory mapped file 247 or at a timing when the application 223 requests the OS 221, the application 223 or the OS 221 requests the IO reception module 210 to write, to the memory system 3, data in the page for which the dirty bit is set. As a result, the data rewritten on the memory mapped file 247 is reflected in the corresponding file in the memory system 3, and the file becomes consistent.

Next, processes executed in the host 2 and the memory system 3 will be described.

(Write Request Process in Host 2)

Figure 64:
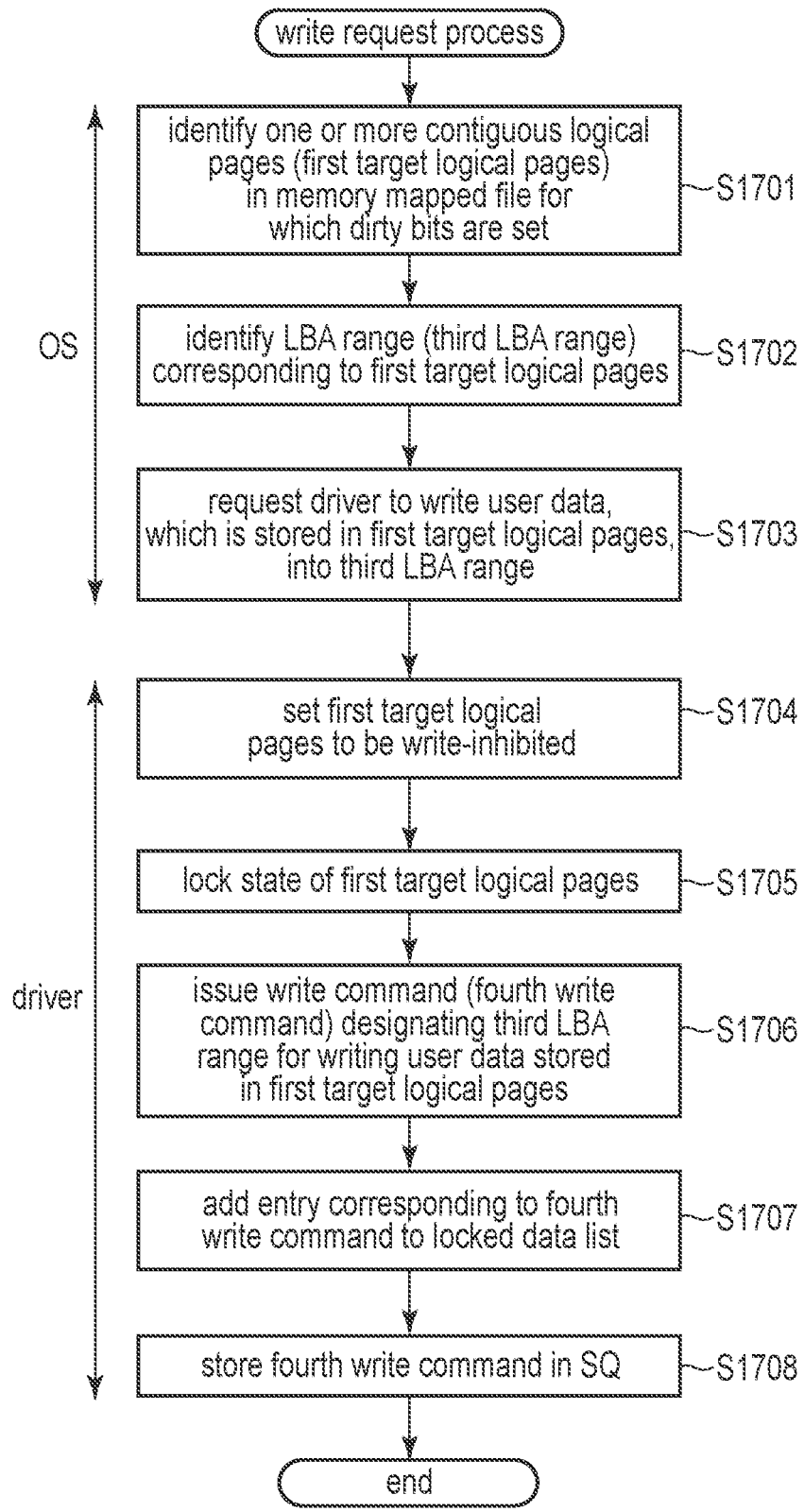
FIG. 64 is a flowchart illustrating an example of the procedure of a write request process executed in the information processing apparatus according to the second embodiment.

FIG. 64 is a flowchart illustrating an example of the procedure of a write request process executed by the CPU 21 of the host 2. The write request process is a process in which the host 2 requests the memory system 3 to write user data in one or more logical pages in the memory mapped file 247 for which dirty bits are set. The CPU 21 executes the write request process at a specific time when the dirty bits need to be cleared.

First, the CPU 21 identifies one or more contiguous logical pages (first target logical pages) in the memory mapped file 247 for which dirty bits are set (step S1701).

The CPU 21 identifies an LBA range (third LBA range) corresponding to the first target logical pages (step S1702). Specifically, the CPU 21 identifies the third LBA range on the basis of a location of the first target logical pages in the memory mapped file 247 and an LBA range of a file managed by the file system of the OS 221. Then, the application 223 or the OS 221 requests the driver 222 to write user data stored in the first target logical pages to the third LBA range (step S1703).

Next, the CPU 21 sets the first target logical pages to be write-inhibited (step S1704) and locks a state of the first target logical pages (step S1705). This prevents the first target logical pages from being unintentionally released. The CPU 21 issues a write command (fourth write command) for writing the user data stored in the first target logical pages that designates the third LBA range (step S1706).

The CPU 21 adds an entry corresponding to the fourth write command to the locked data list 245 (step S1707). The added entry includes, for example, the SQ entry information and data region management information that correspond to the fourth write command. The SQ entry information corresponding to the fourth write command is information indicating the fourth write command. More specifically, the SQ entry information corresponding to the fourth write command is stored in the submission queue 242 to cause the memory system 3 to execute processing in accordance with the fourth write command. In addition, the data region management information corresponding to the fourth write command is capable of identifying a storage area in the memory mapped file 247 in which the user data corresponding to the fourth write command is stored.

Then, the CPU 21 stores the fourth write command (that is, the SQ entry information indicating the fourth write command) in the submission queue 242 (step S1708).

Note that the procedure from step S1701 to step S1703 described above is realized by, for example, the CPU 21 executing the OS 221. In addition, the procedure from step S1704 to step S1708 is realized by, for example, the CPU 21 executing the driver 222.

With the write request process described above, the CPU 21 can identify one or more contiguous logical pages in the memory mapped file 247 for which dirty bits are set and request the memory system 3 to write user data stored in the identified one or more logical pages. In addition, the CPU 21 can manage information regarding writing requested to the memory system 3 (that is, information regarding the issued write command) by using the locked data list 245.

(Write Request Control Process in Host 2)

Figure 65:
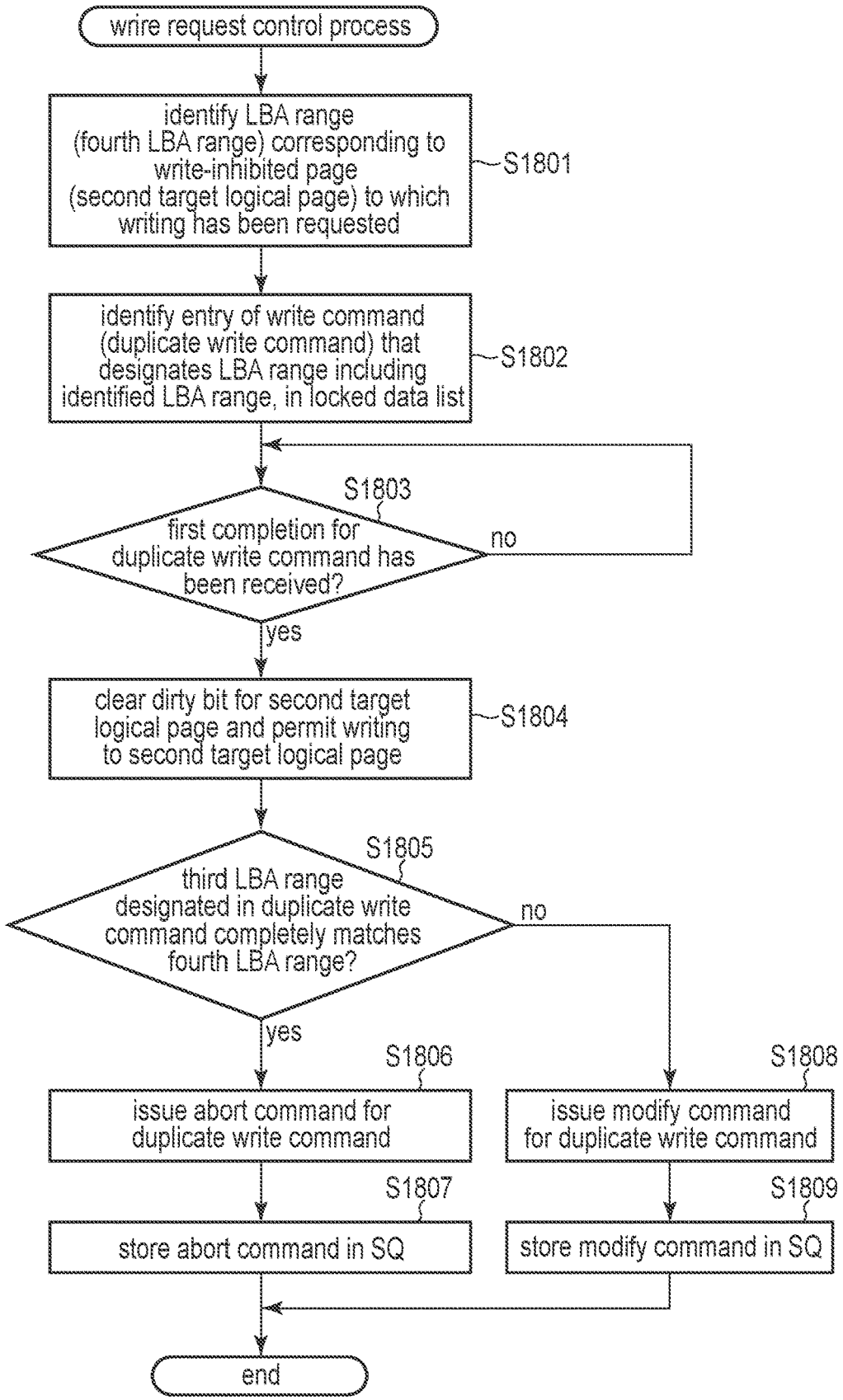
FIG. 65 is a flowchart illustrating an example of the procedure of a write request control process executed in the information processing apparatus according to the second embodiment.

FIG. 65 is a flowchart illustrating an example of the procedure of a write request control process executed by the CPU 21 of the host 2. The write request control process is a process for canceling the writing of user data stored in a write-inhibited logical page in the memory mapped file 247 from writing in accordance with a write command that has been issued to the memory system 3, when writing to the write-inhibited logical page is requested. Here, the fact that writing to a certain logical page is inhibited when writing to the logical page is requested means that a write command for requesting the writing of user data stored in the logical page has been issued to the memory system 3 and has not been completed. The CPU 21 executes the write request control process when writing to a logical page (second target logical page) for which writing is inhibited is requested.

First, the CPU 21 identifies an LBA range (fourth LBA range) corresponding to the second target logical page (step S1801). Specifically, the CPU 21 identifies the fourth LBA range on the basis of a location of the second target logical page in the memory mapped file 247 and an LBA range of a file managed by the file system of the OS 221. Then, the CPU 21 identifies an entry in the locked data list 245 that corresponds to a write command designating an LBA range that includes the fourth LBA range (step S1802). The write command designating the LBA range that includes the fourth LBA range is referred to as a duplicate write command.

Next, the CPU 21 determines whether or not the first completion for the duplicate write command has been received (step S1803). When the first completion for the duplicate write command has not yet been received (no in step S1803), the process by the CPU 21 returns to step S1803. That is, the CPU 21 waits until receiving the first completion for the duplicate write command.

When the first completion for the duplicate write command has been received (yes in step S1803), the CPU 21 clears a dirty bit set for the second target logical page and permits writing to the second target logical page (step S1804). Then, the CPU 12 determines whether or not the LBA range (third LBA range) designated in the duplicate write command completely matches the fourth LBA range (step S1805). That is, the CPU 21 determines whether the third LBA range designated in the duplicate write command includes only the fourth LBA range or further includes another LBA range.

When the third LBA range designated in the duplicate write command completely matches the fourth LBA range (yes in step S1805), the CPU 21 issues an abort command for the duplicate write command (step S1806). Then, the CPU 21 stores the issued abort command in the submission queue 242 (step S1807), and ends the write request control process. As a result, the CPU 21 can request the memory system 3 to abort the writing of user data performed in accordance with the duplicate write command. That is, the CPU 21 can request the memory system 3 to abort the writing of user data stored in the second target logical page.

When the third LBA range designated in the duplicate write command further includes an LBA range other than the fourth LBA range (no in step S1805), the CPU 21 issues a modify command for the duplicate write command (step S1808) and ends the write request control process. The modify command includes information capable of identifying the duplicate write command and information indicating the fourth LBA range in which writing is to be canceled.

Then, the CPU 21 stores the issued modify command in the submission queue 242 (step S1809). As a result, the CPU 21 can request the memory system 3 to cancel writing corresponding to the fourth LBA range from the writing of the user data performed in accordance with the duplicate write command.

With the write request control process described above, when writing to a write-inhibited logical page in the memory mapped file 247 is requested, the CPU 21 can request the memory system 3 to abort or modify an uncompleted write command (duplicate write command) designating at least an LBA range that corresponds to the logical page.

Specifically, the CPU 21 determines whether the third LBA range designated in the duplicate write command includes only the LBA range (fourth LBA range) corresponding to the write-inhibited logical page for which writing is requested or further includes another LBA range. When the third LBA range designated in the duplicate write command includes only the fourth LBA range, the CPU 21 requests the memory system 3 to abort the duplicate write command. When the third LBA range designated in the duplicate write command further includes an LBA range other than the fourth LBA range, the CPU 21 requests the memory system 3 to modify the duplicate write command.

As a result, when the write request for writing to the write-inhibited logical page (second target logical page) is generated, the CPU 21 can request the memory system 3 to abort or partially cancel writing in accordance with the duplicate write command designating the third LBA range that corresponds to the second target logical page.

In addition, since writing to the second target logical page is permitted in step S1804, the write request that is issued by the application 223 or the like and is interrupted due to inhibition of writing is resumed, and user data is overwritten to the second target logical page. The CPU 21 detects the overwriting and sets the dirty bit for the second target logical page. The OS 221 transmits, to the memory system 3, a new write command for writing the data in the second target logical page to the memory system 3 at a next time when the dirty bit needs to be cleared.

(Write Control Process, Abort Control Process, and Modify Control Process in Memory System 3)

In the memory system 3, the CPU 12 executes a write control process in accordance with a write command stored in the submission queue 242. A specific procedure of the write control process is as described above with reference to the flowchart of FIG. 40.

The CPU 12 executes an abort control process in accordance with an abort command stored in the submission queue 242. The specific procedure of the abort control process is as described above with reference to the flowchart of FIG. 41.

The CPU 12 executes a modify control process in accordance with a modify command stored in the submission queue 242. The specific procedure of the modify control process is as described above with reference to the flowchart of FIG. 42.

(Write Response Reception Process, Abort Response Reception Process, and Modify response Reception Process in Host 2)

In the host 2, the CPU 21 executes a write response reception process in accordance with a response (more specifically, the first completion and the second completion) to a write command stored in the completion queue 243. In the write response reception process of the second embodiment, a procedure of clearing a dirty bit set for a corresponding logical page in the memory mapped file 247 when it is determined in step S603 that the first completion is a successful response, is added to the procedure of the write response reception process described above with reference to the flowchart of FIG. 43.

The CPU 12 executes an abort response reception process in accordance with a response to an abort command stored in the completion queue 243. The specific procedure of the abort response reception process is as described above with reference to the flowchart of FIG. 44.

The CPU 12 executes a modify response reception process in accordance with a response to a modify command stored in the completion queue 243. The specific procedure of the modify response reception process is as described above with reference to the flowchart of FIG. 45.

As described above, according to the first and second embodiments, it is possible to lower wear of the nonvolatile memory (for example, the NAND flash memory 5) of the memory system 3.

The write/trim management module 212 and the command issuing module 211 store, to the NVRAM 24, first management data that is associated with first data and includes information equivalent to a first write command designating a first logical address range, and performs a first transmission of the first write command to the memory system 3. Upon receiving, from the memory system, a first response to the first write command transmitted in the first transmission, the write/trim management module 212 adds, to the first management data, information indicating that the first response to the first write command transmitted in the first transmission has been received. Upon receiving, from the memory system 3, a second response to the first write command after receiving the first response, the write/trim management module 212 deletes the first data and the first management data from the NVRAM 24. When either a write operation of second data to a second logical address range including a third logical address range that is at least a portion of the first logical address range or deallocation of the second logical address range is requested before receiving the second response to the first write command, the write/trim management module 212 and the command issuing module 211 transmit, to the memory system 3, a command to cancel a write operation to at least the third logical address range from a write operation of the first data to the first logical address range in accordance with the first write command. When the cancel of the write operation to the third logical address range is successful, the write/trim management module 212 updates or deletes the first management data.

As a result, in a case where either the write operation of the second data to the second logical address range including the third logical address range that is at least a portion of the first logical address range or the deallocation of the second logical address range is requested before the second response to the first write command is received, when the write operation to the NAND flash memory 5 in accordance with the first write command has not been started in the memory system 3, it is possible to cancel the write operation to at least the third logical address range from the write operation of the first data to the first logical address range in accordance with the first write command. Therefore, it is possible to lower wear of the NAND flash memory 5.

Each of various functions described in the first and second embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An information processing apparatus connectable to a memory system, the information processing apparatus comprising:
    a nonvolatile memory; and
    a processor configured to:
        store first data to the nonvolatile memory;
        store first management data to the nonvolatile memory, the first management data including information equivalent to a first write command that is associated with the first data and designates a first logical address range;
        perform a first transmission of the first write command to the memory system;
        upon receiving, from the memory system, a first response to the first write command transmitted in the first transmission, add, to the first management data, information indicating that the first response to the first write command transmitted in the first transmission has been received; and
        upon receiving, from the memory system, a second response to the first write command after receiving the first response, delete the first data and the first management data from the nonvolatile memory,
    wherein
    the processor is further configured to:
        when either a write operation of second data to a second logical address range or deallocation of the second logical address range is requested before the second response to the first write command is received,
            wait to receive the first response to the first write command, and
            after receiving the first response to the first write command, transmit, to the memory system, a command to cancel a write operation to at least a third logical address range from a write operation of the first data to the first logical address range in accordance with the first write command, the second logical address range including the third logical address range, the third logical address range being at least a portion of the first logical address range; and
        when the cancel of the write operation to the third logical address range is successful, update or delete the first management data.

2. The information processing apparatus according to claim 1, wherein
    the processor is configured to delete the first data and the first management data from the nonvolatile memory when the second response is received in a second reception from the memory system with respect to the first write command transmitted in the first transmission, after receiving the first response.

3. The information processing apparatus according to claim 1, wherein
    the processor is further configured to:
        perform a second transmission of the first write command to the memory system after receiving the first response; and
        delete the first data and the first management data from the nonvolatile memory when the second response to the first write command transmitted in the second transmission is received from the memory system.

4. The information processing apparatus according to claim 1, wherein
    in a case where the second logical address range includes a whole of the first logical address range,
    the processor is further configured to,
        when the write operation of the second data to the second logical address range is requested before receiving the second response to the first write command transmitted in the first transmission:
            store the second data to the nonvolatile memory;
            store second management data to the nonvolatile memory, the second management data including information equivalent to a second write command that is associated with the second data and designates the second logical address range; and
            perform a first transmission of the second write command to the memory system, and
    the processor is further configured to:
        when receiving, from the memory system, a third response to the second write command transmitted in the first transmission,
            add, to the second management data, information indicating that the third response to the second write command transmitted in the first transmission has been received, and
            transmit, to the memory system, a command to cancel the write operation of the first data to the first logical address range in accordance with the first write command;
        when the cancel of the write operation to the first logical address range is successful, delete the first data and the first management data from the nonvolatile memory; and
        upon receiving a fourth response to the second write command from the memory system after receiving the third response, delete the second data and the second management data from the nonvolatile memory.

5. The information processing apparatus according to claim 4, wherein
    the processor is configured to delete the second data and the second management data from the nonvolatile memory when the fourth response is received in a second reception from the memory system with respect to the second write command transmitted in the first transmission, after receiving the third response.

6. The information processing apparatus according to claim 4, wherein
    the processor is further configured to:
        perform a second transmission of the second write command to the memory system after receiving the third response; and delete the second data and the second management data from the nonvolatile memory when the fourth response to the second write command transmitted in the second transmission is received from the memory system.

7. The information processing apparatus according to claim 1, wherein
in a case where the first logical address range includes the third logical address range and one or more fourth logical address ranges that are different from the third logical address range, and
the second logical address range includes the third logical address range and does not include the fourth logical address ranges,
the processor is further configured to,
when the write operation of the second data to the second logical address range is requested before receiving the second response to the first write command transmitted in the first transmission:
store the second data to the nonvolatile memory;
store second management data to the nonvolatile memory, the second management data including information equivalent to a second write command that is associated with the second data and designates the second logical address range; and
perform a first transmission of the second write command to the memory system, and
the processor is further configured to:
when receiving, from the memory system, a third response to the second write command transmitted in the first transmission,
add, to the second management data, information indicating that the third response to the second write command transmitted in the first transmission has been received, and
transmit, to the memory system, a command to cancel the write operation to the third logical address range from the write operation of the first data to the first logical address range in accordance with the first write command;
when the cancel of the write operation to the third logical address range is successful, update the first management data so that the first write command designates the one or more fourth logical address ranges and does not designate the third logical address range; and
upon receiving a fourth response to the second write command from the memory system after receiving the third response, delete the second data and the second management data from the nonvolatile memory.

8. The information processing apparatus according to claim 1, wherein
in a case where the first logical address range includes the third logical address range and one or more fourth logical address ranges that are different from the third logical address range, and
the second logical address range includes the third logical address range and does not include the fourth logical address ranges,
the processor is further configured to:
transmit, to the memory system, a command to cancel the write operation to the third logical address range from the write operation of the first data to the first logical address range in accordance with the first write command; and
when the cancel of the write operation to the third logical address range is successful, update the first management data so that the first write command designates the one or more fourth logical address ranges and does not designate the third logical address range.

9. The information processing apparatus according to claim 1, wherein
in a case where the first logical address range includes the third logical address range and one or more fourth logical address ranges that are different from the third logical address range, and
the first data includes one or more first data portions to be written to the one or more fourth logical address ranges, respectively, and a second data portion to be written to the third logical address range,
the processor is further configured to,
when the write operation of the second data to the third logical address range is requested before receiving the second response to the first write command transmitted in the first transmission:
store the second data to the nonvolatile memory;
store second management data to the nonvolatile memory, the second management data including information equivalent to a second write command that is associated with the second data and the one or more first data portions and designates a logical address range that includes the one or more fourth logical address ranges and the second logical address range; and
perform a first transmission of the second write command to the memory system, and
the processor is further configured to:
when receiving, from the memory system, a third response to the second write command transmitted in the first transmission,
add, to the second management data, information indicating that the third response to the second write command transmitted in the first transmission has been received, and
transmit, to the memory system, a command to cancel the write operation of the first data to the first logical address range in accordance with the first write command;
when the cancel of the write operation to the first logical address range is successful, delete, from the nonvolatile memory, the first management data and at least the second data portion; and
upon receiving a fourth response to the second write command from the memory system after receiving the third response, delete the second data, the one or more first data portions, and the second management data from the nonvolatile memory.

10. The information processing apparatus according to claim 1, wherein
in a case where the second logical address range includes a whole of the first logical address range,
the processor is further configured to,
when the deallocation of the second logical address range is requested before receiving the second response to the first write command transmitted in the first transmission:
store third data indicative of the second logical address range to the nonvolatile memory;
store third management data to the nonvolatile memory, the third management data including information equivalent to a first deallocation command that designates the second logical address range; and perform a first transmission of the first deallocation command to the memory system, and the processor is further configured to:
when receiving, from the memory system, a fifth response to the first deallocation command transmitted in the first transmission,
add, to the third management data, information indicating that the fifth response to the first deallocation command transmitted in the first transmission has been received, and
transmit, to the memory system, a command to cancel the write operation of the first data to the first logical address range in accordance with the first write command;
when the cancel of the write operation to the first logical address range is successful, delete the first data and the first management data from the nonvolatile memory; and
delete the third data and the third management data from the nonvolatile memory upon receiving a sixth response to the first deallocation command from the memory system after receiving the fifth response.

11. The information processing apparatus according to claim 10, wherein
the processor is configured to delete the third data and the third management data from the nonvolatile memory when the sixth response is received in a second reception from the memory system with respect to the first deallocation command transmitted in the first transmission, after receiving the fifth response.

12. The information processing apparatus according to claim 10, wherein
the processor is further configured to:
perform a second transmission of the first deallocation command to the memory system after receiving the fifth response; and
delete the third data and the third management data from the nonvolatile memory when the sixth response to the first deallocation command transmitted in the second transmission is received from the memory system.

13. The information processing apparatus according to claim 1, wherein
in a case where the first logical address range includes the third logical address range and one or more fourth logical address ranges that are different from the third logical address range, and
the second logical address range includes the third logical address range and does not include the fourth logical address ranges,
the processor is further configured to,
when the deallocation of the second logical address range is requested before receiving the second response to the first write command transmitted in the first transmission:
store third data indicative of the second logical address range to the nonvolatile memory;
store third management data to the nonvolatile memory, the third management data including information equivalent to a first deallocation command that designates the second logical address range; and
perform a first transmission of the first deallocation command to the memory system, and the processor is further configured to:
upon receiving, from the memory system, a fifth response to the first deallocation command transmitted in the first transmission,
add, to the third management data, information indicating that the fifth response to the first deallocation command transmitted in the first transmission has been received, and
transmit, to the memory system, a command to cancel the write operation to the third logical address range from the write operation of the first data to the first logical address range in accordance with the first write command;
when the cancel of the write operation to the third logical address range is successful, update the first management data so that the first write command designates the one or more fourth logical address ranges and does not designate the third logical address range; and
delete the third data and the third management data from the nonvolatile memory upon receiving a sixth response to the first deallocation command from the memory system after receiving the fifth response.

14. The information processing apparatus according to claim 1, wherein
in a case where the first logical address range includes the third logical address range and one or more fourth logical address ranges that are different from the third logical address range, and
the second logical address range includes the third logical address range and does not include the fourth logical address ranges,
the processor is further configured to:
transmit, to the memory system, a command to cancel the write operation to the third logical address range from the write operation of the first data to the first logical address range in accordance with the first write command; and
when the cancel of the write operation to the third logical address range is successful, update the first management data so that the first write command designates the one or more fourth logical address ranges and does not designate the third logical address range.

15. An information processing apparatus connectable to a memory system, the information processing apparatus comprising:
a nonvolatile memory; and
a processor configured to:
read, from the memory system, one or more first data portions that are stored in a first logical address range;
store the read one or more first data portions to the nonvolatile memory;
after one or more contiguous second data portions among the one or more first data portions that are stored in the nonvolatile memory are rewritten,
store first management data to the nonvolatile memory, the first management data including information equivalent to a first write command that is associated with the one or more second data portions and designates a second logical address range that corresponds to the one or more second data portions, and
perform a first transmission of the first write command to the memory system;

upon receiving, from the memory system, a first response to the first write command transmitted in the first transmission, add, to the first management data, information indicating that the first response to the first write command transmitted in the first transmission has been received; and upon receiving a second response to the first write command from the memory system after receiving the first response, delete the first management data from the nonvolatile memory, wherein the processor is further configured to:
when a third data portion of the one or more second data portions is rewritten before receiving the second response,
wait to receive the first response to the first write command, and
after receiving the first response to the first write command, transmit, to the memory system, a command to cancel a write operation to a third logical address range from a write operation of the one or more second data portions to the second logical address range in accordance with the first write command, the third logical address range corresponding to the third data portion; and
when the cancel of the write operation to the third logical address range is successful, update or delete the first management data.

16. The information processing apparatus according to claim 15, wherein
the processor is configured to delete the first management data from the nonvolatile memory when the second response is received in a second reception from the memory system with respect to the first write command transmitted in the first transmission, after receiving the first response.

17. The information processing apparatus according to claim 15, wherein
the processor is further configured to:
perform a second transmission of the first write command to the memory system after receiving the first response; and
delete the first management data from the nonvolatile memory when the second response to the first write command transmitted in the second transmission is received from the memory system.

18. The information processing apparatus according to claim 15, wherein
in a case where the third data portion includes all the one or more second data portions,
the processor is configured to delete the first management data from the nonvolatile memory when the cancel of the write operation to the third logical address range is successful.

19. The information processing apparatus according to claim 15, wherein
in a case where the third data portion includes either a head data portion or an end data portion of the one or more second data portions, and the second logical address range includes the third logical address range and a fourth logical address range,
the processor is further configured to, when the cancel of the write operation to the third logical address range is successful, update the first management data so that the first write command does not designate the third logical address range, is associated with a data portion of the one or more second data portions that corresponds to the fourth logical address range, and designates the fourth logical address range.

20. The information processing apparatus according to claim 15, wherein
in a case where the third data portion includes neither a head data portion nor an end data portion of the one or more second data portions, and the second logical address range includes the third logical address range and one or more fourth logical address ranges,
the processor is further configured to,
when the cancel of the write operation to the third logical address range is successful, update the first management data so that the first write command does not designate the third logical address range, is associated with a data portion of the one or more second data portions that corresponds to the one or more fourth logical address ranges, and designates the one or more fourth logical address ranges.

* * * * *